US012717117B2

(12) United States Patent
Fu et al.

(10) Patent No.: US 12,717,117 B2
(45) Date of Patent: Aug. 25, 2026

(54) IMAGING SYSTEM LENS ASSEMBLY, IMAGING APPARATUS AND ELECTRONIC DEVICE

(71) Applicant: LARGAN PRECISION CO., LTD., Taichung City (TW)

(72) Inventors: Wei-Xiang Fu, Taichung City (TW); Hsin-Hsuan Huang, Taichung City (TW); Meng-Kuan Cho, Taichung City (TW)

(73) Assignee: LARGAN PRECISION CO., LTD., Taichung City (TW)

( * ) Notice: Subject to any disclaimer, the term of this patent is extended or adjusted under 35 U.S.C. 154(b) by 881 days.

(21) Appl. No.: 17/932,729

(22) Filed: Sep. 16, 2022

(65) Prior Publication Data

US 2023/0121630 A1 Apr. 20, 2023

(30) Foreign Application Priority Data

Oct. 20, 2021 (TW) ................................ 110138933
Dec. 6, 2021 (TW) ................................ 110145489

(51) Int. Cl.

*G02B 13/00* (2006.01)
*G02B 9/62* (2006.01)
*G02B 13/06* (2006.01)

(52) U.S. Cl.

CPC .......... *G02B 13/0045* (2013.01); *G02B 9/62* (2013.01); *G02B 13/06* (2013.01)

(58) Field of Classification Search

CPC ........ G02B 9/62; G02B 9/64; G02B 13/0045; G02B 13/16; G02B 13/18; G02B 13/0015; G02B 27/0025; G02B 27/0012; G02B 15/146; G02B 5/005; H04N 5/222; H04N 5/2254

USPC ......... 359/657–658, 708, 713, 749, 756–762

See application file for complete search history.

(56) References Cited

U.S. PATENT DOCUMENTS 2,644,362 A 7/1953 Ravizza
5,157,555 A 10/1992 Reno
5,216,545 A 6/1993 Saito
6,028,717 A 2/2000 Kohno et al.

(Continued)

FOREIGN PATENT DOCUMENTS

CN 203882002 U 10/2014
CN 206757161 U 12/2017

(Continued)

OTHER PUBLICATIONS

Original and foreign translation of CN112748517 (Year: 2019).*
Original and foreign translation of CN212540839 (Year: 2020).*

*Primary Examiner* — Travis S Fissel
(74) *Attorney, Agent, or Firm* — McClure, Qualey & Rodack, LLP

(57) ABSTRACT

An imaging system lens assembly includes six lens elements, which are, in order from an object side to an image side along an optical path, a first lens element, a second lens element, a third lens element, a fourth lens element, a fifth lens element and a sixth lens element. Each of the six lens elements has an object-side surface towards the object side and an image-side surface towards the image side. The third lens element has negative refractive power. At least one surface of at least one of the first lens element to the sixth lens element includes at least one inflection point.

28 Claims, 69 Drawing Sheets

(56) References Cited

U.S. PATENT DOCUMENTS

| | | | |
|---|---|---|---|
| 8,670,194 B2 | 3/2014 | Yoshinaga et al. |
| 8,717,682 B2 | 5/2014 | Yoshinaga et al. |
| 9,602,731 B2 | 3/2017 | Lin |
| 9,817,217 B2 | 11/2017 | Nakayama |
| 10,175,486 B2 | 1/2019 | Watanabe |
| 2012/0057249 A1 | 3/2012 | Yamamoto |
| 2015/0362709 A1 | 12/2015 | Wang |
| 2017/0212337 A1 | 7/2017 | Lee et al. |
| 2017/0329103 A1 | 11/2017 | Lai et al. |
| 2017/0329104 A1 | 11/2017 | Lai et al. |
| 2018/0011294 A1 | 1/2018 | Lai et al. |
| 2018/0011295 A1 | 1/2018 | Lai et al. |
| 2021/0096325 A1 | 4/2021 | Wu et al. |
| 2021/0364738 A1 | 11/2021 | Huang et al. |

FOREIGN PATENT DOCUMENTS

| | | | | | |
|---|---|---|---|---|---|
| CN | 109932807 A | | 6/2019 | |
| CN | 110879473 A | | 3/2020 | |
| CN | 110989151 A | | 4/2020 | |
| CN | 111352211 A | | 6/2020 | |
| CN | 210690931 U | | 6/2020 | |
| CN | 111830683 A | | 10/2020 | |
| CN | 212540839 U | * | 2/2021 | |
| CN | 112612114 A | | 4/2021 | |
| CN | 112748517 A | * | 5/2021 | ............ G02B 13/18 |
| CN | 112748518 A | | 5/2021 | |
| CN | 213513728 U | | 6/2021 | |
| JP | S6095417 A | | 5/1985 | |
| JP | H0611649 A | | 1/1994 | |
| JP | H112762 A | | 1/1999 | |
| JP | H11326758 A | | 11/1999 | |
| JP | 2000292708 A | | 10/2000 | |
| JP | 2004294910 A | | 10/2004 | |
| JP | 2005258294 A | | 9/2005 | |
| JP | 2012220741 A | | 11/2012 | |
| JP | 2016065954 A | | 4/2016 | |
| JP | 2017026891 A | | 2/2017 | |
| TW | M537220 U | | 2/2017 | |
| TW | M545910 U | | 7/2017 | |
| TW | I704387 B | | 9/2020 | |
| TW | I721888 B | | 3/2021 | |
| WO | 2012026069 A1 | | 3/2012 | |
| WO | 2012026070 A1 | | 3/2012 | |
| WO | 2015050194 A1 | | 4/2015 | |
| WO | 2021027642 A1 | | 2/2021 | |
| WO | 2022058807 A1 | | 3/2022 | |

* cited by examiner

12

IMAGING SYSTEM LENS ASSEMBLY, IMAGING APPARATUS AND ELECTRONIC DEVICE

RELATED APPLICATIONS

This application claims priority to Taiwan Application Serial Number 110138933, filed Oct. 20, 2021 and Taiwan Application Serial Number 110145489, filed Dec. 6, 2021, which are herein incorporated by reference.

BACKGROUND

Technical Field

The present disclosure relates to an imaging system lens assembly and an imaging apparatus. More particularly, the present disclosure relates to an imaging system lens assembly and an imaging apparatus with compact size applicable to electronic devices.

Description of Related Art

With recent technology of semiconductor process advances, performances of image sensors are enhanced, so that the smaller pixel size can be achieved. Therefore, optical lens assemblies with high image quality have become an indispensable part of many modern electronics. With rapid developments of technology, applications of electronic devices equipped with optical lens assemblies increase and there is a wide variety of requirements for optical lens assemblies. However, in a conventional optical lens assembly, it is hard to balance among image quality, sensitivity, aperture size, volume or field of view. Thus, there is a demand for an imaging system lens assembly that meets the aforementioned needs.

SUMMARY

According to one aspect of the present disclosure, an imaging system lens assembly includes six lens elements, the six lens elements being, in order from an object side to an image side along an optical path, a first lens element, a second lens element, a third lens element, a fourth lens element, a fifth lens element and a sixth lens element. Each of the six lens elements has an object-side surface towards the object side and an image-side surface towards the image side. The third lens element preferably has negative refractive power. At least one surface of at least one of the first lens element to the sixth lens element preferably includes at least one inflection point. When an axial distance between the second lens element and the third lens element is T23, a focal length of the imaging system lens assembly is f, a focal length of the first lens element is f1, a focal length of the second lens element is f2, a composite focal length of the first lens element and the second lens element is f12, a curvature radius of the object-side surface of the sixth lens element is R11, a curvature radius of the image-side surface of the sixth lens element is R12, and a maximum field of view of the imaging system lens assembly is FOV, the following conditions preferably are satisfied: $0.45<T23/f<3.50$; $-0.55<(R11-R12)/(R11+R12)<0.75$; 30.0 degrees$<FOV<$125.0 degrees; $-1.22<f2/f1$; and $0.16<f/f12<0.67$.

According to one aspect of the present disclosure, an imaging system lens assembly includes six lens elements, the six lens elements being, in order from an object side to an image side along an optical path, a first lens element, a second lens element, a third lens element, a fourth lens element, a fifth lens element and a sixth lens element. Each of the six lens elements has an object-side surface towards the object side and an image-side surface towards the image side. The third lens element preferably has negative refractive power. The image-side surface of the sixth lens element preferably is concave in a paraxial region thereof. When an axial distance between the second lens element and the third lens element is T23, a focal length of the imaging system lens assembly is f, a focal length of the fifth lens element is f5, a focal length of the sixth lens element is f6, a composite focal length of the third lens element, the fourth lens element, the fifth lens element and the sixth lens element is f3456, a curvature radius of the image-side surface of the third lens element is R6, a curvature radius of the object-side surface of the fourth lens element is R7, a curvature radius of the object-side surface of the sixth lens element is R11, a curvature radius of the image-side surface of the sixth lens element is R12, and a maximum field of view of the imaging system lens assembly is FOV, the following conditions preferably are satisfied: $0.45<T23/f<3.50$; $-0.80<(R11-R12)/(R11+R12)<1.20$; 30.0 degrees$<FOV<$125.0 degrees; $f5\times f6/(f\times f)<0.90$; $0.55<f/f3456<1.10$; and $-0.75<(R6-R7)/(R6+R7)<1.50$.

According to one aspect of the present disclosure, an imaging system lens assembly includes six lens elements, the six lens elements being, in order from an object side to an image side along an optical path, a first lens element, a second lens element, a third lens element, a fourth lens element, a fifth lens element and a sixth lens element. Each of the six lens elements has an object-side surface towards the object side and an image-side surface towards the image side. The third lens element preferably has negative refractive power. The image-side surface of the sixth lens element preferably is concave in a paraxial region thereof. When an axial distance between the second lens element and the third lens element is T23, a focal length of the imaging system lens assembly is f, a focal length of the fifth lens element is f5, a focal length of the sixth lens element is f6, a curvature radius of the image-side surface of the third lens element is R6, a curvature radius of the object-side surface of the fourth lens element is R7, a curvature radius of the object-side surface of the sixth lens element is R11, and a curvature radius of the image-side surface of the sixth lens element is R12, the following conditions preferably are satisfied: $0.78<T23/f<3.30$; $-0.35<(R11-R12)/(R11+R12)<1.20$; $f5\times f6/(f\times f)<9.0$; $-0.47<(R6-R7)/(R6+R7)<1.90$; and $R6/R7<1.25$.

According to one aspect of the present disclosure, an imaging apparatus includes the imaging system lens assembly of the aforementioned aspect and an image sensor, wherein the image sensor is disposed on an image surface of the imaging system lens assembly.

According to one aspect of the present disclosure, an electronic device includes the imaging apparatus of the aforementioned aspect.

According to one aspect of the present disclosure, an imaging system lens assembly includes six lens elements, the six lens elements being, in order from an object side to an image side along an optical path, a first lens element, a second lens element, a third lens element, a fourth lens element, a fifth lens element and a sixth lens element. Each of the six lens elements has an object-side surface towards the object side and an image-side surface towards the image side. The second lens element preferably has positive refractive power. The third lens element preferably has negative refractive power. The image-side surface of the sixth lens element preferably is concave in a paraxial region thereof. The image-side surface of the sixth lens element preferably includes at least one inflection point. When an axial distance between the second lens element and the third lens element is T23, a focal length of the imaging system lens assembly is f, a curvature radius of the object-side surface of the first lens element is R1, a curvature radius of the object-side surface of the second lens element is R3, and a curvature radius of the image-side surface of the second lens element is R4, the following conditions preferably are satisfied: $0.45<T23/f<3.5$; $-0.90<f/R1<5.0$; and $0<(R3-R4)/(R3+R4)$.

According to one aspect of the present disclosure, an imaging system lens assembly includes six lens elements, the six lens elements being, in order from an object side to an image side along an optical path, a first lens element, a second lens element, a third lens element, a fourth lens element, a fifth lens element and a sixth lens element. Each of the six lens elements has an object-side surface towards the object side and an image-side surface towards the image side. The object-side surface of the fourth lens element preferably is convex in a paraxial region thereof. Both of the object-side surface and the image-side surface of the fifth lens element preferably are aspheric, and at least one of the object-side surface and the image-side surface of the fifth lens element preferably includes at least one inflection point. The image-side surface of the sixth lens element preferably is concave in a paraxial region thereof. The image-side surface of the sixth lens element preferably includes at least one inflection point. When the imaging system lens assembly further includes an aperture stop, an axial distance between the aperture stop and an image surface is SL, an axial distance between the object-side surface of the first lens element and the image surface is TL, an axial distance between the first lens element and the second lens element is T12, an axial distance between the second lens element and the third lens element is T23, an axial distance between the third lens element and the fourth lens element is T34, an axial distance between the fourth lens element and the fifth lens element is T45, an axial distance between the fifth lens element and the sixth lens element is T56, a maximum among T12, T23, T34, T45, T56 is ATmax, a focal length of the imaging system lens assembly is f, and a curvature radius of the object-side surface of the fourth lens element is R7, the following conditions preferably are satisfied: $0.85<ATmax/f<5.0$; $0.90\leq SL/TL<1.50$; and $0.0<f/R7<5.0$.

According to one aspect of the present disclosure, an imaging system lens assembly includes six lens elements, the six lens elements being, in order from an object side to an image side along an optical path, a first lens element, a second lens element, a third lens element, a fourth lens element, a fifth lens element and a sixth lens element. Each of the six lens elements has an object-side surface towards the object side and an image-side surface towards the image side. The sixth lens element preferably has negative refractive power, the image-side surface of the sixth lens element preferably is concave in a paraxial region thereof; the image-side surface of the sixth lens element preferably includes at least one inflection point. When the imaging system lens assembly further includes an aperture stop, an axial distance between the aperture stop and an image surface is SL, an axial distance between the object-side surface of the first lens element and the image surface is TL, an axial distance between the first lens element and the second lens element is T12, an axial distance between the second lens element and the third lens element is T23, an axial distance between the third lens element and the fourth lens element is T34, an axial distance between the fourth lens element and the fifth lens element is T45, an axial distance between the fifth lens element and the sixth lens element is T56, a maximum among T12, T23, T34, T45, T56 is ATmax, and a focal length of the imaging system lens assembly is f, the following conditions preferably are satisfied: $0.85<ATmax/f<5.0$; and $0.90\leq SL/TL<1.50$.

According to one aspect of the present disclosure, an imaging system lens assembly includes, in order from an object side to an image side along an optical path, a first lens containing mechanism and a second lens containing mechanism. The first lens containing mechanism preferably includes a first lens group, the first lens group includes at least one lens element. The at least one lens element of the first lens group has an object-side surface towards the object side and an image-side surface towards the image side. The second lens containing mechanism preferably includes a prism and a second lens group, the second lens group preferably includes at least one lens element. Each of the prism and the at least one lens element of the second lens group has an object-side surface towards the object side and an image-side surface towards the image side. An optical axis of the first lens group is a first optical axis; an optical axis of the second lens group is a second optical axis. The imaging system lens assembly preferably further includes a light blocking element, the light blocking element preferably includes a light blocking portion and an aperture portion. The light blocking portion is a portion of the light blocking element which a light cannot pass through. The aperture portion is a portion of the light blocking element which the light can pass through, the aperture portion preferably defines a circumscribed circle and an inscribed circle. The circumscribed circle is a largest aperture of the aperture portion, a radius of the circumscribed circle of the largest aperture of the aperture portion of the light blocking element is D1; the inscribed circle is a largest aperture without covering the light blocking portion, a radius of the inscribed circle of the largest aperture without covering the light blocking portion of the light blocking element is D2, and the following condition preferably is satisfied: $0.5<D2/D1<1.0$, wherein D1 preferably is unequal to D2.

According to one aspect of the present disclosure, an imaging system lens assembly includes, in order from an object side to an image side along an optical path, a first lens containing mechanism and a second lens containing mechanism. The first lens containing mechanism preferably includes a first lens group, the first lens group includes at least one lens element. The at least one lens element of the first lens group has an object-side surface towards the object side and an image-side surface towards the image side. The second lens containing mechanism preferably includes a prism and a second lens group, the second lens group preferably includes at least one lens element. Each of the prism and the at least one lens element of the second lens group has an object-side surface towards the object side and an image-side surface towards the image side. An optical axis of the first lens group is a first optical axis; an optical axis of the second lens group is a second optical axis. When a shortest distance along the second optical axis between an intersection of an object-side surface of the prism and the first optical axis and the second lens containing mechanism is PD1, a maximum image height of the imaging system lens assembly is ImgH, an axial distance between a most object-side lens element surface and a most image-side lens element surface of the first lens group is TD1, an axial distance between a most object-side lens element surface and a most image-side lens element surface of the second lens group is TD2, a length of the first optical axis in the prism is THP1, and a length of the second optical axis in the prism is THP2, the following conditions preferably are satisfied: 0.20<PD1/ImgH<0.60; and 0.85<(TD1+TD2)/(THP1+THP2)<1.50.

DETAILED DESCRIPTION

Figure 1A:
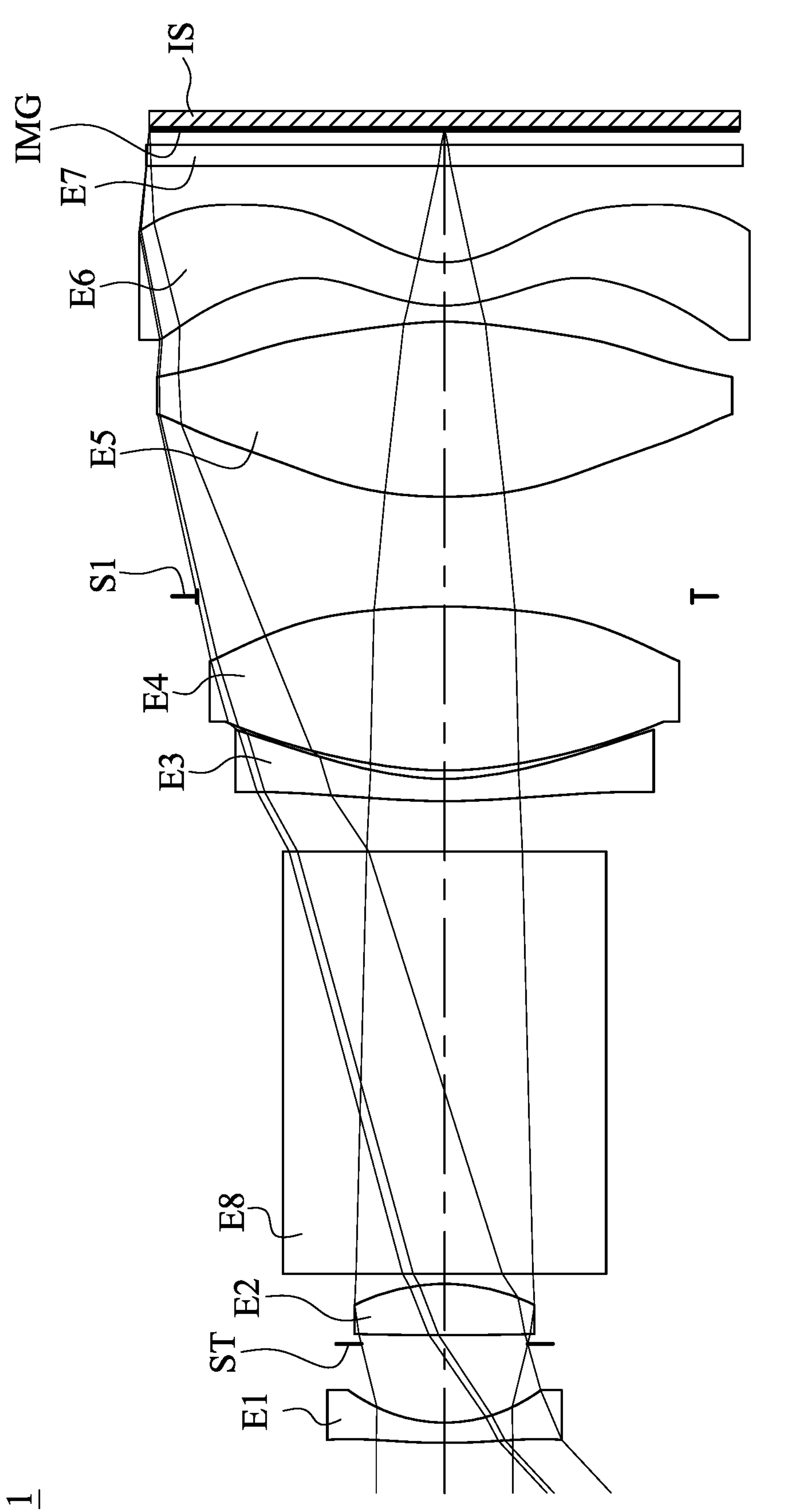
FIG. 1A is a schematic view of an imaging apparatus according to the 1st embodiment of the present disclosure.

The present disclosure provides an imaging system lens assembly including six lens elements, the six lens elements being, in order from an object side to an image side along an optical path, a first lens element, a second lens element, a third lens element, a fourth lens element, a fifth lens element and a sixth lens element. Each of the six lens elements has an object-side surface towards the object side and an image-side surface towards the image side. There is an air gap between each of adjacent lens elements of the six lens elements, which is favorable for avoiding the adjacent lens elements contacting with each other so as to reduce the difficulties of manufacturing and assembling of lens elements.

The first lens element can be meniscus in a paraxial region thereof, so that it is favorable for compressing the volume on the object side of the imaging system lens assembly. In detail, one lens element being meniscus means one of the object-side surface and the image-side surface thereof being concave in a paraxial region thereof, and the other one of the object-side surface and the image-side surface thereof being convex in a paraxial region thereof.

The second lens element can have positive refractive power, which can be cooperated with the first lens element so as to correct aberrations, such as spherical aberration etc. The image-side surface of the second lens element can be convex in a paraxial region thereof, which can adjust the surface shape and refractive power of the second lens element so as to correct aberrations.

The third lens element has negative refractive power, which can be cooperated with the fourth lens element so as to correct aberrations, such as spherical aberration etc. The image-side surface of the third lens element can be concave in a paraxial region thereof, which can adjust the surface shape and refractive power of the third lens element so as to correct chromatic aberration in the peripheral field of view.

The object-side surface of the fourth lens element can be convex in a paraxial region thereof, which can adjust the surface shape and refractive power of the fourth lens element so as to correct aberrations. The object-side surface of the fourth lens element can include at least one convex surface in an off-axis region thereof, which can adjust the surface shape of the fourth lens element so as to reduce the height of the effective radius of the imaging system lens assembly. The image-side surface of the fourth lens element can include at least one convex surface in an off-axis region thereof, which can adjust the surface shape of the fourth lens element so as to correct off-axis aberrations, such as field curvature etc.

The fifth lens element can have positive refractive power, which can be cooperated with adjacent lens elements for adjusting overall focal length so as to obtain the balance between the total track length and the image quality of the imaging system lens assembly. Both of the object-side surface and the image-side surface of the fifth lens element can be aspheric, so that it is favorable for reducing image coma aberrations of different fields of view by arranging curvature various on the surface of the lens element along different height. At least one of the object-side surface and the image-side surface of the fifth lens element can include at least one inflection point, so that it is favorable for obtaining larger image surface in the limited size.

The sixth lens element can have negative refractive power, which can reduce spherical aberration in the central field of view. The object-side surface of the sixth lens element can be convex in a paraxial region thereof, so that it is favorable for enlarging the image surface by adjusting the traveling direction of light. The image-side surface of the sixth lens element can be concave in a paraxial region thereof, so that it is favorable for reducing the back focal length. Further, the image-side surface of the sixth lens element can include at least one inflection point, so that it is favorable for enlarging the size of the image surface and reducing field curvature. The image-side surface of the sixth lens element can include at least one critical point, so that it is favorable for correcting field curvature.

The fifth lens element and the sixth lens element can have refractive power with different signs. Therefore, it is favorable for correcting aberrations, such as spherical aberration etc., by cooperating the fifth lens element and the sixth lens element.

At least one surface of at least one of the first lens element to the sixth lens element can include at least one inflection point. Therefore, it is favorable for correcting aberrations and compressing the size of the lens element by increasing the variation of the surface of the lens element. Further, at least one surface of each of at least two of the first lens element to the sixth lens element can include at least one inflection point. Furthermore, at least one surface of each of at least three of the first lens element to the sixth lens element can include at least one inflection point.

The imaging system lens assembly can further include a reflective element disposed between the first lens element and the sixth lens element, which can fold the optical axis for achieving the compact size of the imaging system lens assembly. Further, the reflective element can be disposed between the second lens element and the third lens element. Specifically, the reflective element can be prism, mirror etc., wherein the prism can be made of glass or plastic etc., but is not limited thereto. In detail, the incident surface of the prism can be planar surface or curved surface; the exiting surface of the prism can be planar surface or curved surface.

The first lens element and the second lens element can belong a front lens group, the third lens element, the fourth lens element, the fifth lens element and the sixth lens element can belong a rear lens group, the rear lens group can be movable relative to the front lens group. Therefore, the rear lens group can be the movable lens element in the auto-focusing system which is favorable for focusing at more ideal position during photographing on different object distances, so that the image quality can be enhanced. Further, the first lens element can be movable relative to the sixth lens element. Therefore, it is favorable for increasing detail resolution of the imaged object which can be applied during capturing the object at different object distances. It should be mentioned that the movement of the rear lens group can be parallel or perpendicular to the optical axis, rotation, etc., but the present disclosure is not limited thereto.

When an axial distance between the second lens element and the third lens element is T23, and a focal length of the imaging system lens assembly is f, the following condition is satisfied: $0.45<T23/f<3.50$. Therefore, it is favorable for balancing the arrangement of the volume of the imaging system lens assembly by adjusting the arrangement of the lens elements. Further, the following condition can be satisfied: $0.78<T23/f<3.30$. Furthermore, the following condition can be satisfied: $0.85<T23/f<2.0$.

When a curvature radius of the object-side surface of the sixth lens element is R11, and a curvature radius of the image-side surface of the sixth lens element is R12, the following condition is satisfied: $-0.80<(R11-R12)/(R11+R12)<1.20$. Therefore, the curvature radii of the object-side surface and the image-side surface of the sixth lens element of the imaging system lens assembly can be adjusted so as to correct the field curvature of the imaging system lens assembly. Further, the following condition can be satisfied: $-0.55<(R11-R12)/(R11+R12)<0.75$. Furthermore, the following condition can be satisfied: $-0.35<(R11-R12)/(R11+R12)<1.20$. Moreover, the following condition can be satisfied: $-0.35<(R11-R12)/(R11+R12)<0.55$.

When a maximum field of view of the imaging system lens assembly is FOV, the following condition is satisfied: 30.0 degrees<FOV<125.0 degrees. Therefore, the imaging system lens assembly can obtain characteristic of wide field of view, and aberrations, such as distortion etc., due to the excessive field of view can be avoided. Further, the following condition can be satisfied: 40.0 degrees<FOV<95.0 degrees.

When a focal length of the first lens element is f1, and a focal length of the second lens element is f2, the following condition is satisfied: $-1.22<f2/f1$. Therefore, it is favorable for correcting aberrations by adjusting the refractive power of the first lens element and the second lens element of the imaging system lens assembly. Further, the following condition can be satisfied: $-1.22<f2/f1<1.0$. Furthermore, the following condition can be satisfied: $-1.20<f2/f1<0$. Moreover, the following condition can be satisfied: $-1.20<f2/f1<-0.50$.

When the focal length of the imaging system lens assembly is f, and a composite focal length of the first lens element and the second lens element is f12, the following condition is satisfied: $0.16<f/f12<0.67$. Therefore, it is favorable for correcting aberrations, such as astigmatism etc., by adjusting the overall refractive power of the first lens element and the second lens element of the imaging system lens assembly.

When the focal length of the imaging system lens assembly is f, a focal length of the fifth lens element is f5, and a focal length of the sixth lens element is f6, the following condition is satisfied: $f5 \times f6/(f \times f)<0.90$. Therefore, it is favorable for compressing the size and correcting aberrations by adjusting the overall refractive power of the fifth lens element and the sixth lens element. Further, the following condition can be satisfied: $-50.0<f5 \times f6/(f \times f)<0.50$. Furthermore, the following condition can be satisfied: $-25.0<f5 \times f6/(f \times f)<0.10$.

When the focal length of the imaging system lens assembly is f, and a composite focal length of the third lens element, the fourth lens element, the fifth lens element and the sixth lens element is f3456, the following condition is satisfied: $0.55<f/f3456<1.10$. Therefore, it is favorable for enhancing the central focusing quality by adjusting the overall refractive power from the third lens element to the sixth lens element. Further, the following condition can be satisfied: $0.50<f/f3456<1.10$. Furthermore, the following condition can be satisfied: $0.50<f/f3456<0.95$. Moreover, the following condition can be satisfied: $0.55<f/f3456<0.95$. Furthermore, the following condition can be satisfied: $0.60<f/f3456<0.90$.

When a curvature radius of the image-side surface of the third lens element is R6, and a curvature radius of the object-side surface of the fourth lens element is R7, the following condition is satisfied: $-0.75<(R6-R7)/(R6+R7)$ $<1.50$. Therefore, it is favorable for correcting image chromatic aberration of the imaging system lens assembly by adjusting the curvature radii of two adjacent curved surfaces in the imaging system lens assembly. Further, the following condition can be satisfied: $-0.65<(R6-R7)/(R6+R7)<0.50$. Furthermore, the following condition can be satisfied: $-0.47<(R6-R7)/(R6+R7)<1.90$.

When the curvature radius of the image-side surface of the third lens element is R6, and the curvature radius of the object-side surface of the fourth lens element is R7, the following condition is satisfied: $R6/R7<1.25$. Therefore, it is favorable for reducing image chromatic aberration in the peripheral field of view by adjusting the curvature radii of two adjacent curved surfaces in the imaging system lens assembly. Further, the following condition can be satisfied: $-2.0<R6/R7<1.25$. Furthermore, the following condition can be satisfied: $0<R6/R7<1.25$. Moreover, the following condition can be satisfied: $0.40<R6/R7<1.20$.

When the focal length of the imaging system lens assembly is f, and a curvature radius of the object-side surface of the first lens element is R1, the following condition is satisfied: $-0.90<f/R1<5.0$. Therefore, the refractive power of the imaging system lens assembly and the surface shape of the first lens element can be adjusted so as to enhance the image effect. Further, the following condition can be satisfied: $-0.30<f/R1<3.0$. Furthermore, the following condition can be satisfied: $-0.10<f/R1<1.0$.

When a curvature radius of the object-side surface of the second lens element is R3, and a curvature radius of the image-side surface of the second lens element is R4, the following condition is satisfied: $0<(R3-R4)/(R3+R4)$. Therefore, it is favorable for enhancing the central focusing effect by adjusting the curvature radii of the object-side surface and the image-side surface of the second lens element. Further, the following condition can be satisfied: $0.30<(R3-R4)/(R3+R4)<2.50$.

When a refractive index of the third lens element is N3, and a refractive index of the sixth lens element is N6, the following condition is satisfied: $1.60<(N3+N6)/2$. Therefore, it is favorable for obtaining greater image height in the restricted space by cooperating the material of the lens elements. Further, the following condition can be satisfied: $1.65<(N3+N6)/2<1.75$.

When an axial distance between the third lens element and the fourth lens element is T34, an axial distance between the fifth lens element and the sixth lens element is T56, and a sum of all axial distances between adjacent lens elements of the imaging system lens assembly is ΣAT, the following condition is satisfied: $0<(T34+T56)/\Sigma AT<0.09$. Therefore, it is favorable for compressing the size of the imaging system lens assembly by adjusting the distance between each adjacent lens elements thereof.

When the focal length of the imaging system lens assembly is f, and a composite focal length of the fifth lens element and the sixth lens element is f56, the following condition is satisfied: $0.75<f56/f<5.00$. Therefore, it is favorable for correcting field curvature by adjusting the overall refractive power of the fifth lens element and the sixth lens element. Further, the following condition can be satisfied: $1.0<f56/f<2.50$.

When the focal length of the imaging system lens assembly is f, a central thickness of the first lens element is CT1, a central thickness of the second lens element is CT2, and an axial distance between the first lens element and the second lens element is T12, the following condition is satisfied: $0.30<(CT1+T12+CT2)/f<0.85$. Therefore, the arrangement of the lens element on the object side of the imaging system lens assembly can be adjusted so as to compress the volume on the object side.

When the axial distance between the second lens element and the third lens element is T23, and a maximum image height of the imaging system lens assembly is ImgH, the following condition is satisfied: $1.00<T23/ImgH<2.00$. Therefore, it is favorable for arranging other optical element between the lens elements by adjusting the arrangement of the lens elements. Further, the following condition can be satisfied: $1.20<T23/ImgH<1.80$.

When an Abbe number of the third lens element is V3, an Abbe number of the fourth lens element is V4, an Abbe number of the fifth lens element is V5, and an Abbe number of the sixth lens element is V6, the following condition is satisfied: $2.50<(V4+V5)/(V3+V6)<4.00$. Therefore, it is favorable for correcting aberrations, such as chromatic aberration, etc., by cooperating the material of the lens elements.

When the focal length of the second lens element is f2, and the composite focal length of the fifth lens element and the sixth lens element is f56, the following condition is satisfied: $0.25<f2/f56<2.20$. Therefore, it is favorable for changing the focusing location and reducing the size of the lens assembly by adjusting the surface shape of the second lens element and the overall refractive power of the fifth lens element and the sixth lens element.

When the focal length of the sixth lens element is f6, the curvature radius of the object-side surface of the sixth lens element is R11, and the curvature radius of the image-side surface of the sixth lens element is R12, the following condition is satisfied: $-12.00<f6/R11+f6/R12<-6.00$. Therefore, it is favorable for the manufacturability of the lens element and enlarging the image size by adjusting the surface shape and refractive power of the sixth lens element.

When the composite focal length of the first lens element and the second lens element is f12, and the curvature radius of the image-side surface of the second lens element is R4, the following condition is satisfied: $-7.50<f12/R4<-1.00$. Therefore, it is favorable for increasing the screen ratio of the electronic device by adjusting the surface shape of the second lens element and the overall refractive power of the first lens element to the second lens element.

When the focal length of the second lens element is f2, and the curvature radius of the image-side surface of the second lens element is R4, the following condition is satisfied: $-3.50<f2/R4<-0.80$. Therefore, it is favorable for compressing the volume and correcting aberrations by adjusting the surface shape and refractive power of the second lens element.

When an axial distance between the object-side surface of the first lens element and an image surface is TL, and an entrance pupil diameter of the imaging system lens assembly is EPD, the following condition is satisfied: $6.00<TL/EPD<10.00$. Therefore, it is favorable for obtaining the balance between the total track length and the aperture size.

When the axial distance between the object-side surface of the first lens element and the image surface is TL, and the maximum image height of the imaging system lens assembly is ImgH, the following condition is satisfied: $3.00<TL/ImgH<5.00$. Therefore, it is favorable for obtaining the balance between compressing the total track length and enlarging the image surface, and enlarging field of view.

When a maximum distance between an optical effective region of the object-side surface of the first lens element and an optical axis is Y11, and a maximum distance between an optical effective region of the image-side surface of the sixth lens element and the optical axis is Y62, the following condition is satisfied: $2.00<Y62/Y11<3.50$. Therefore, the effective radii of the first lens element and the sixth lens element can be adjusted so as to ensure the imaging system lens assembly with smaller opening, which is favorable for designing the appearance of the electronic device. Further, the following condition can be satisfied: $2.00<Y62/Y11<4.0$.

When the focal length of the imaging system lens assembly is f, the central thickness of the first lens element is CT1, and the central thickness of the second lens element is CT2, the following condition is satisfied: $2.30<f/(CT1+CT2)<5.20$. Therefore, it is favorable for the compactness of the electronic device by adjusting the thicknesses of the lens elements in the imaging system lens assembly. Further, the following condition can be satisfied: $1.50<f/(CT1+CT2)<5.20$.

When the focal length of the imaging system lens assembly is f, the axial distance between the third lens element and the fourth lens element is T34, and the axial distance between the fifth lens element and the sixth lens element is T56, the following condition is satisfied: $0.01<(T34+T56)/f<0.15$. Therefore, it is favorable for balancing the volume arrangement of the imaging system lens assembly by adjusting the arrangement of the lens elements.

When a maximum distance between an optical effective region of the image-side surface of the second lens element and an optical axis is Y22, and the maximum distance between an optical effective region of the image-side surface of the sixth lens element and the optical axis is Y62, the following condition is satisfied: $2.00<Y621Y22<3.50$. Therefore, the effective radii of the second lens element and the sixth lens element can be adjusted so as to compress the volume of the imaging system lens assembly, which is favorable for the compactness of the electronic device. Further, the following condition can be satisfied: $1.70<Y62/Y22<3.50$.

When the axial distance between the first lens element and the second lens element is T12, the axial distance between the second lens element and the third lens element is T23, the axial distance between the third lens element and the fourth lens element is T34, an axial distance between the fourth lens element and the fifth lens element is T45, the axial distance between the fifth lens element and the sixth lens element is T56, a maximum among T12, T23, T34, T45, T56 is ATmax, and the focal length of the imaging system lens assembly is f, the following condition is satisfied: $0.85<ATmax/f<5.0$. Therefore, it is favorable for the arrangement of the mechanism by arranging other optical elements in the imaging system lens assembly so as to enhance the flexibility of the product application. Further, the following condition can be satisfied: $0.85<ATmax/f<1.90$; or $1.0<ATmax/f<3.0$. Furthermore, the following condition can be satisfied: $0.95<ATmax/f<1.70$.

The imaging system lens assembly can further include an aperture stop, wherein when an axial distance between the aperture stop and the image surface is SL, and the axial distance between the object-side surface of the first lens element and the image surface is TL, the following condition is satisfied: $0.90\leq SL/TL<1.50$. Therefore, it is favorable for reducing the opening of the imaging system lens assembly and maintaining the image size by adjusting the ratio of the location of the aperture and the total track length of the imaging system lens assembly. Further, the following condition can be satisfied: $1.0\leq SL/TL<1.20$. Furthermore, the following condition can be satisfied: $0.93\leq SL/TL<1.30$.

When the focal length of the imaging system lens assembly is f, and the curvature radius of the object-side surface of the fourth lens element is R7, the following condition is satisfied: $0.0<f/R7<5.0$. Therefore, it is favorable for reducing spherical aberration of the central field of view by adjusting the refractive power of the imaging system lens assembly and the surface shape of the fourth lens element. Further, the following condition can be satisfied: $0.25<f/R7<3.5$. Furthermore, the following condition can be satisfied: $0.50<f/R7<3.5$.

From the mechanism perspective, an imaging system lens assembly includes, in order from an object side to an image side along an optical path, a first lens containing mechanism and a second lens containing mechanism. The first lens containing mechanism includes a first lens group, the first lens group includes at least one lens element, the at least one lens element of the first lens group has an object-side surface towards the object side and an image-side surface towards the image side. The second lens containing mechanism includes a prism and a second lens group, the second lens group includes at least one lens element, each of the prism and the at least one lens element of the second lens group has an object-side surface towards the object side and an image-side surface towards the image side. An optical axis of the first lens group is a first optical axis; an optical axis of the second lens group is a second optical axis.

The imaging system lens assembly can further include a light blocking element. The light blocking element includes a light blocking portion and an aperture portion, wherein the light blocking portion is a portion of the light blocking element which a light cannot pass through; the aperture portion is a portion of the light blocking element which the light can pass through, and the aperture portion can define a circumscribed circle and an inscribed circle. The circumscribed circle is a largest aperture of the aperture portion, a radius of the circumscribed circle of the largest aperture of the aperture portion of the light blocking element is D1; the inscribed circle is a largest aperture without covering the light blocking portion, a radius of the inscribed circle of the largest aperture without covering the light blocking portion of the light blocking element is D2, and the following condition is satisfied: $0.5<D2/D1<1.0$, wherein D1 is unequal to D2. Therefore, the appearance of the element with light blocking function can be adjusted, which can be cooperated with other elements in the electronic device so as to increase the using efficiency of the inner space therein. Further, the following condition can be satisfied: $0.5<D2/D1<0.8$. It should be mentioned that, the light blocking element is an element with light blocking function, which can be a light blocking sheet, a spacer or a lens element with surface coating, etc., but the present disclosure is not limited thereto.

When a shortest distance along the second optical axis between an intersection of the object-side surface of the prism and the first optical axis and the second lens containing mechanism is PD1, and the maximum image height of the imaging system lens assembly is ImgH, the following condition is satisfied: $0.20<PD1/ImgH<0.60$. Therefore, the geometrical size of the prism can be adjusted for increasing the size of the position which the prism can be received so as to enhance the assembling stability of products. Further, the following condition can be satisfied: $0.30<PD1/ImgH<0.50$.

When an axial distance between a most object-side lens element surface and a most image-side lens element surface of the first lens group is TD1, an axial distance between a most object-side lens element surface and a most image-side lens element surface of the second lens group is TD2, a length of the first optical axis in the prism is THP1, and a length of the second optical axis in the prism is THP2, the following condition is satisfied: $0.85<(TD1+TD2)/(THP1+THP2)<1.50$. Therefore, the ratio of the sum of the distance from the most object side to the most image side of the first lens group and the distance from the most object side to the most image side of the second lens group and the sum of the length of the first optical axis in the prism and the length of the second optical axis in the prism can be adjusted so as to reduce the total track length and the difficulty of assembling. Further, the following condition can be satisfied: $0.95<(TD1+TD2)/(THP1+THP2)<1.40$.

One of the at least one lens element in the first lens group closest to the object side is a first lens element, when a maximum effective radius of the object-side surface of the first lens element is Y1R1, and the maximum image height of the imaging system lens assembly is ImgH, the following condition is satisfied: $0.10<Y1R1/ImgH<0.60$. Therefore, the ratio of the effective radius of the object-side surface of the first lens element and the image height can be adjusted, which is favorable for compressing the effective radius of the first lens element so as to reduce the volume of the first lens containing mechanism and increase the flexibility for arranging the imaging system lens assembly. Further, the following condition can be satisfied: $0.20<Y1R1/ImgH<0.55$.

When a height of the second lens containing mechanism along the first optical axis is RBH, and the maximum image height of the imaging system lens assembly is ImgH, the following condition is satisfied: $1.40<RBH/ImgH<2.20$. Therefore, the height of the lens containing space on the second optical axis along the first optical axis can be adjusted, which is favorable for increasing the flexibility for arranging the imaging system lens assembly so as to decrease the interference with other elements in the electronic device. Further, the following condition can be satisfied: $1.50<RBH/ImgH<2.10$.

When the length of the first optical axis in the prism is THP1, the length of the second optical axis in the prism is THP2, and the maximum image height of the imaging system lens assembly is ImgH, the following condition is satisfied: $0.80<(THP1+THP2)/ImgH<1.30$. Therefore, the ratio of the sum of the distance from the most object side to the most image side of the first lens group and the distance from the most object side to the most image side of the second lens group and the image height can be adjusted, which is favorable for arranging the lens elements and decreasing the entire mechanism size. Further, the following condition can be satisfied: $0.85<(THP1+THP2)/ImgH<1.25$. Furthermore, the following condition can be satisfied: $0.90<(THP1+THP2)/ImgH<1.15$.

At least one surface of the lens elements has a subwavelength structure. In detail, the subwavelength structure is fine structure on the surface of object. The fine structure gap is smaller than the wavelength of light, the shape of the fine structure can be columnar structure or cone-shaped structure etc., but is not limited thereto. Therefore, the reflection of light on the surface of the lens element can be reduced.

The second lens containing mechanism can be separated into a prism containing space and a lens containing space. When a minimum height difference along the first optical axis between an opening surface closest to the object side of the imaging system lens assembly and the second lens containing mechanism is DH, the following condition is satisfied: $0.50\text{ mm}<DH<0.95\text{ mm}$. Therefore, the height difference between the opening and the second lens containing mechanism can be adjusted, which is favorable for containing the screen in the mechanism space so as to increase the compactness. Further, the following condition can be satisfied: $0.60\text{ mm}<DH<0.90\text{ mm}$. Furthermore, the following condition can be satisfied: $0.60\text{ mm}<DH<0.85\text{ mm}$.

When a distance parallel to the second optical axis between the image-side surface of the prism and a position of a maximum effective radius of an adjacent lens surface is PG2, the following condition is satisfied: $0.15\text{ mm}<PG2<0.55\text{ mm}$. Therefore, it is favorable for obtaining the balance between the reduction of volume and increase of the assembling stability by adjusting the parallel distance of the most outside effective light path from the object-side surface of the prism to the object-side surface of the lens element of the second lens group closest to the prism. Further, the following condition can be satisfied: $0.20\text{ mm}<PG2<0.50\text{ mm}$. Furthermore, the following condition can be satisfied: $0.20\text{ mm}<PG2<0.45\text{ mm}$.

The aperture portion can have a plurality of protrusions, a number of the protrusions is 5 to 50. Therefore, the light blocking portion of the light blocking element can have the geometrical variation, which is favorable for blocking the stray light in the lens assembly so as to reduce the reflected stray light on the image surface. Further, the number of the protrusions can be 20 to 180. Furthermore, the number of the protrusions can be 10 to 45 or 30 to 150.

An opening closest to the object side of the imaging system lens assembly can define a circumscribed circle, the circumscribed circle covers a smallest circle of the opening, when a radius of the circumscribed circle covering the opening is SDB1, and the maximum image height of the imaging system lens assembly is ImgH, the following condition is satisfied: $0.50<SDB1/ImgH<1.00$. Therefore, the ratio of the curvature radius of the largest aperture of the opening and the image height can be adjusted so as to increase the screen ratio. Further, the following condition can be satisfied: $0.65<SDB1/ImgH<1.00$.

An opening closest to the object side of the imaging system lens assembly can further define an inscribed circle, the circumscribed circle covers a smallest circle of the opening, the radius of the circumscribed circle covering the opening is SDB1, the inscribed circle is a largest circle without covering the first lens containing mechanism, a radius of the inscribed circle without covering the first lens containing mechanism is SDB2, and the following condition is satisfied: $0.50<SDB2/SDB1<1.00$. Therefore, the ratio of the curvature radius of the largest aperture of the opening and the largest aperture without covering the first lens containing mechanism can be adjusted so as to increase the screen ratio. Further, the following condition can be satisfied: $0.40<SDB2/SDB1<0.90$. Furthermore, the following condition can be satisfied: $0.45<SDB2/SDB1<0.80$.

At least one of the lens elements has an effective diameter being non-circular, which is favorable for adjusting the geometrical appearance with flexibility so as to enhance the match with mechanism and increase the compactness of the electronic device.

When a shortest distance along the first optical axis between an intersection of an image-side surface of the prism and the second optical axis and the second lens containing mechanism is PD2, and the maximum image height of the imaging system lens assembly is ImgH, the following condition is satisfied: $0.35<PD2/ImgH<0.65$. Therefore, the geometrical size of the prism can be adjusted, which is favorable for reducing the mechanical size so as to reduce the entire mechanical volume. Further, the following condition can be satisfied: $0.45<PD2/ImgH<0.55$.

When a distance parallel to the first optical axis between an object-side surface of the prism and a position of a maximum effective radius of an adjacent lens surface is PG1, the following condition is satisfied: 0.20 mm<PG1<0.75 mm. Therefore, the parallel distance of the most outside effective light path from the image-side surface of the lens element of the first lens group closest to the prism to the object-side surface of the prism can be adjusted, which is favorable for reducing the volume and avoiding the interference during the assembling of the lens elements and the mechanism. Further, the following condition can be satisfied: 0.25 mm<PG1<0.70 mm.

A receiving surface parallel to the first optical axis is located between the prism and the second lens containing mechanism. When a length alone the first optical axis of the receiving surface is D, the following condition is satisfied: 0.10 mm<D<0.70 mm. Therefore, it is favorable for receiving the prism so as to enhance the stability of the imaging system lens assembly, reduce the size of the imaging system lens assembly, and achieve the requirement of compactness and high quality. Further, the following condition can be satisfied: 0.15 mm<D<0.50 mm.

Each of the aforementioned features of the imaging system lens assembly can be utilized in various combinations for achieving the corresponding effects.

According to the imaging system lens assembly of the present disclosure, the lens elements thereof can be made of glass or plastic materials. When the lens elements are made of glass materials, the distribution of the refractive power of the imaging system lens assembly may be more flexible to design. The glass lens element can either be made by grinding or molding. When the lens elements are made of plastic materials, manufacturing costs can be effectively reduced. Furthermore, surfaces of each lens element can be arranged to be aspheric (ASP), since the aspheric surface of the lens element is easy to form a shape other than a spherical surface so as to have more controllable variables for eliminating aberrations thereof, and to further decrease the required amount of lens elements in the imaging system lens assembly. Therefore, the total track length of the imaging system lens assembly can also be reduced. The aspheric surfaces may be formed by a plastic injection molding method, a glass molding method or other manufacturing methods.

According to the imaging system lens assembly of the present disclosure, additives can be selectively added into any one (or more) material of the lens elements so as to change the transmittance of the lens element in a particular wavelength range. Therefore, the stray light and chromatic aberration can be reduced. For example, the additives can have the absorption ability for lights in a wavelength range of 600 nm-800 nm in the imaging system lens assembly so as to reduce extra red light or infrared lights, or the additives can have the absorption ability for lights in a wavelength range of 350 nm-450 nm in the imaging system lens assembly so as to reduce blue light or ultraviolet lights. Therefore, additives can prevent the image from interfering by lights in a particular wavelength range. Furthermore, the additives can be homogeneously mixed with the plastic material, and the lens elements can be made by the injection molding method. Moreover, the additives can be coated on the lens surfaces to provide the aforementioned effects.

According to the imaging system lens assembly of the present disclosure, when a surface of the lens element is aspheric, it indicates that entire optical effective region of the surface of the lens element or a part thereof is aspheric.

According to the imaging system lens assembly of the present disclosure, when the lens elements have surfaces being convex and the convex surface position is not defined, it indicates that the aforementioned surfaces of the lens elements can be convex in the paraxial region thereof. When the lens elements have surfaces being concave and the concave surface position is not been defined, it indicates that the aforementioned surfaces of the lens elements can be concave in the paraxial region thereof. In the imaging system lens assembly of the present disclosure, if the lens element has positive refractive power or negative refractive power, or the focal length of the lens element, all can be referred to the refractive power, or the focal length, in the paraxial region of the lens element.

According to the imaging system lens assembly of the present disclosure, a critical point is a non-axial point of the lens surface where its tangent is perpendicular to the optical axis; an inflection point is a point on a lens surface with a curvature changing from positive to negative or from negative to positive.

According to the imaging system lens assembly of the present disclosure, the image surface thereof, based on the corresponding image sensor, can be flat or curved. In particular, the image surface can be a concave curved surface facing towards the object side. Furthermore, the imaging system lens assembly of the present disclosure can selectively include at least one image correcting element (such as a field flattener) inserted between the lens element closest to the image surface and the image surface, thus the effect of correcting image aberrations (such as field curvature) can be achieved. The optical properties of the aforementioned image correcting element, such as curvature, thickness, refractive index, position, surface shape (convex or concave, spherical or aspheric, diffraction surface and Fresnel surface, etc.) can be adjusted corresponding to the demands of the imaging apparatus. Generally, a preferred configuration of the image correcting element is to dispose a thin plano-concave element having a concave surface toward the object side on the position closed to the image surface.

Figure 35A:
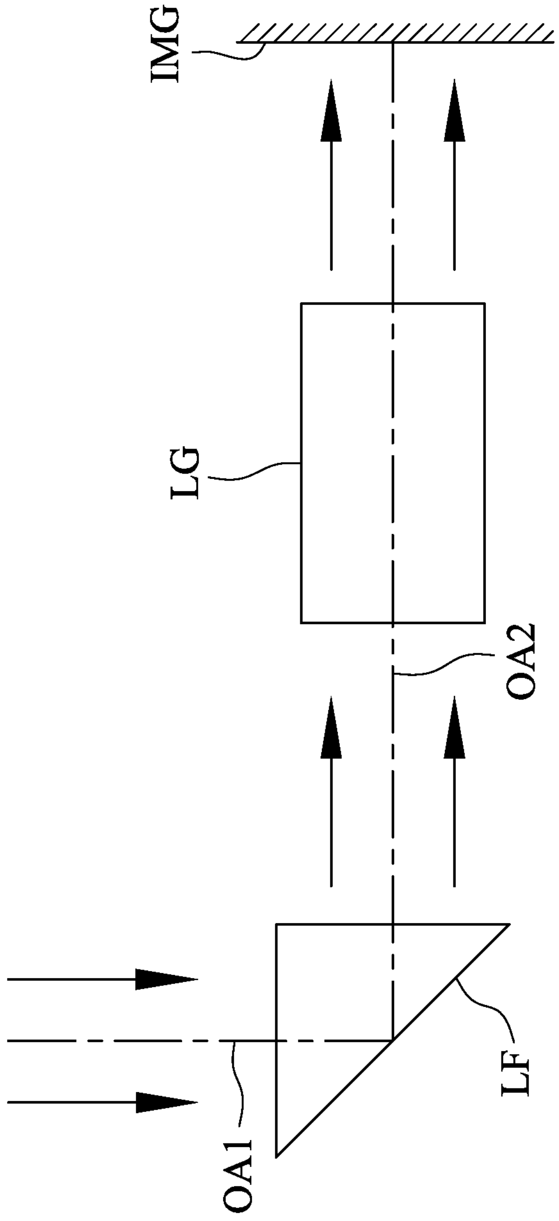
FIG. 35A is a schematic view of an arrangement of a light path folding element in the imaging system lens assembly of the present disclosure.
Figure 35B:
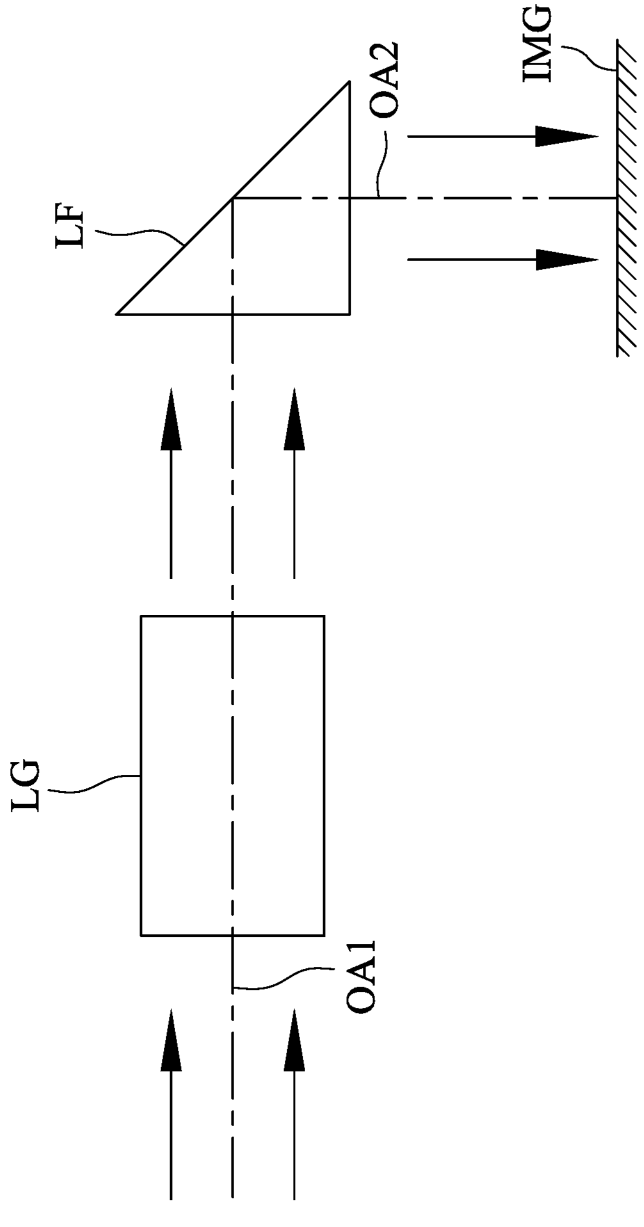
FIG. 35B is a schematic view of another arrangement of the light path folding element in the imaging system lens assembly of the present disclosure.
Figure 35C:
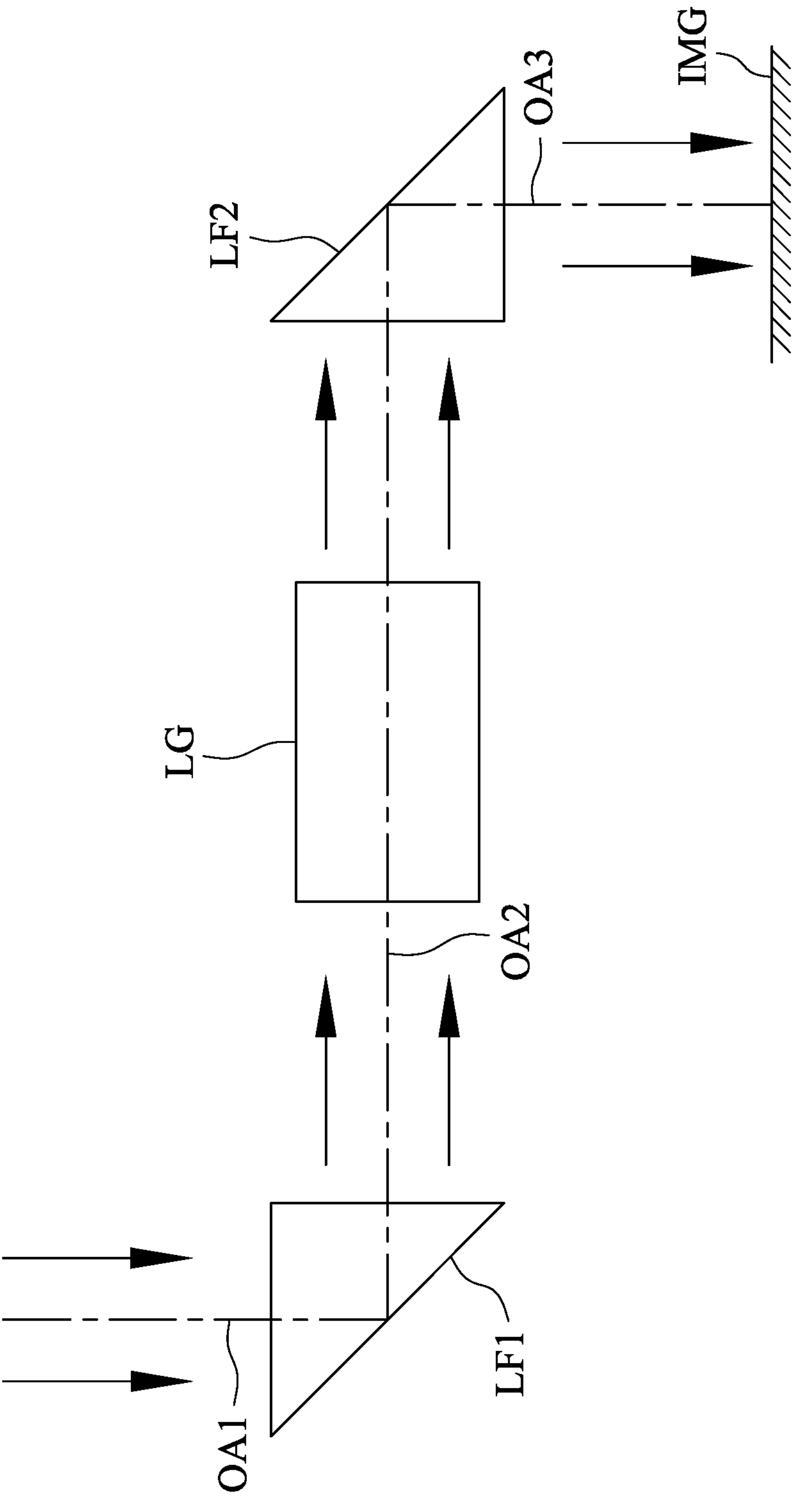
FIG. 35C is a schematic view of an arrangement of two light path folding elements in the imaging system lens assembly of the present disclosure.

According to the imaging system lens assembly of the present disclosure, at least one element with light path folding function can be selectively disposed between the imaged object and the image surface, such as a prism or a mirror, etc. Therefore it is favorable for providing high flexible space arrangement of the imaging system lens assembly, so that the compactness of the electronic device would not be restricted by the optical total track length of the imaging system lens assembly. FIG. 35A is a schematic view of an arrangement of a light path folding element LF in the imaging system lens assembly of the present disclosure. FIG. 35B is a schematic view of another arrangement of the light path folding element LF in the imaging system lens assembly of the present disclosure. As shown in FIGS. 35A and 35B, the imaging system lens assembly includes, in order from an imaged object (not shown in drawings) to an image surface IMG, a first optical axis OA1, the light path folding element LF and a second optical axis OA2, wherein the light path folding element LF can be disposed between the imaged object and a lens group LG of the imaging system lens assembly as shown in FIG. 35A, or can be disposed between the lens group LG of the imaging system lens assembly and the image surface IMG as shown in FIG. 35B. Moreover, FIG. 35C is a schematic view of an arrangement of two light path folding elements LF1, LF2 in the imaging system lens assembly of the present disclosure. As shown in FIG. 35C, the imaging system lens assembly includes, in order from an imaged object (not shown in drawings) to an image surface IM, a first optical axis OA1, the light path folding element LF1, a second optical axis OA2, the light path folding element LF2 and a third optical axis OA3, wherein the light path folding element LF1 is disposed between the imaged object and a lens group LG of the imaging system lens assembly, and the light path folding element LF2 is disposed between the lens group LG of the imaging system lens assembly and the image surface IMG. The imaging system lens assembly can also be selectively disposed with three or more light path folding element, the type, amount and location of the light path folding element will not be limited to the present disclosure.

Furthermore, according to the imaging system lens assembly of the present disclosure, the imaging system lens assembly can include at least one stop, such as an aperture stop, a glare stop or a field stop, for eliminating stray light and thereby improving image resolution thereof.

According to the imaging system lens assembly of the present disclosure, the aperture stop can be configured as a front stop or a middle stop, wherein the front stop indicates that the aperture stop is disposed between an object and the first lens element, and the middle stop indicates that the aperture stop is disposed between the first lens element and the image surface. When the aperture stop is a front stop, a longer distance between an exit pupil of the imaging system lens assembly and the image surface can be obtained, and thereby obtains a telecentric effect and improves the image-sensing efficiency of the image sensor, such as CCD or CMOS. The middle stop is favorable for enlarging the field of view of the imaging system lens assembly and thereby provides a wider field of view for the same.

According to the imaging system lens assembly of the present disclosure, an aperture control unit can be properly configured. The aperture control unit can be a mechanical element or a light controlling element, and the dimension and the shape of the aperture control unit can be electrically controlled. The mechanical element can include a moveable component such a blade group or a shielding plate. The light controlling element can include a screen component such as a light filter, an electrochromic material, a liquid crystal layer or the like. The amount of incoming light or the exposure time of the image can be controlled by the aperture control unit to enhance the image moderation ability. In addition, the aperture control unit can be the aperture stop of the imaging system lens assembly according to the present disclosure, so as to moderate the image quality by changing f-number such as changing the depth of field or the exposure speed.

According to the imaging system lens assembly of the present disclosure, the imaging system lens assembly of the present disclosure can be applied to 3D (three-dimensional) image capturing applications, in products such as digital cameras, mobile devices, digital tablets, smart TVs, surveillance systems, motion sensing input devices, driving recording systems, rearview camera systems, wearable devices, unmanned aerial vehicles, and other electronic imaging products.

According to the present disclosure, an imaging apparatus including the aforementioned imaging system lens assembly and an image sensor is provided, wherein the image sensor is disposed on the image surface of the imaging system lens assembly. By arranging refractive power and surface shapes of the third lens element, it is favorable for correcting spherical aberration and balancing the arrangement of the volume of the imaging system lens assembly. Moreover, the imaging apparatus can further include a barrel member, a holder member or a combination thereof.

According to the present disclosure, an electronic device including the aforementioned imaging apparatus is provided. Therefore, the image quality can be increased. Moreover, the electronic device can further include a control unit, a display, a storage unit, a random-access memory unit (RAM) or a combination thereof.

According to the above description of the present disclosure, the following specific embodiments are provided for further explanation.

1st Embodiment

Figure 2:
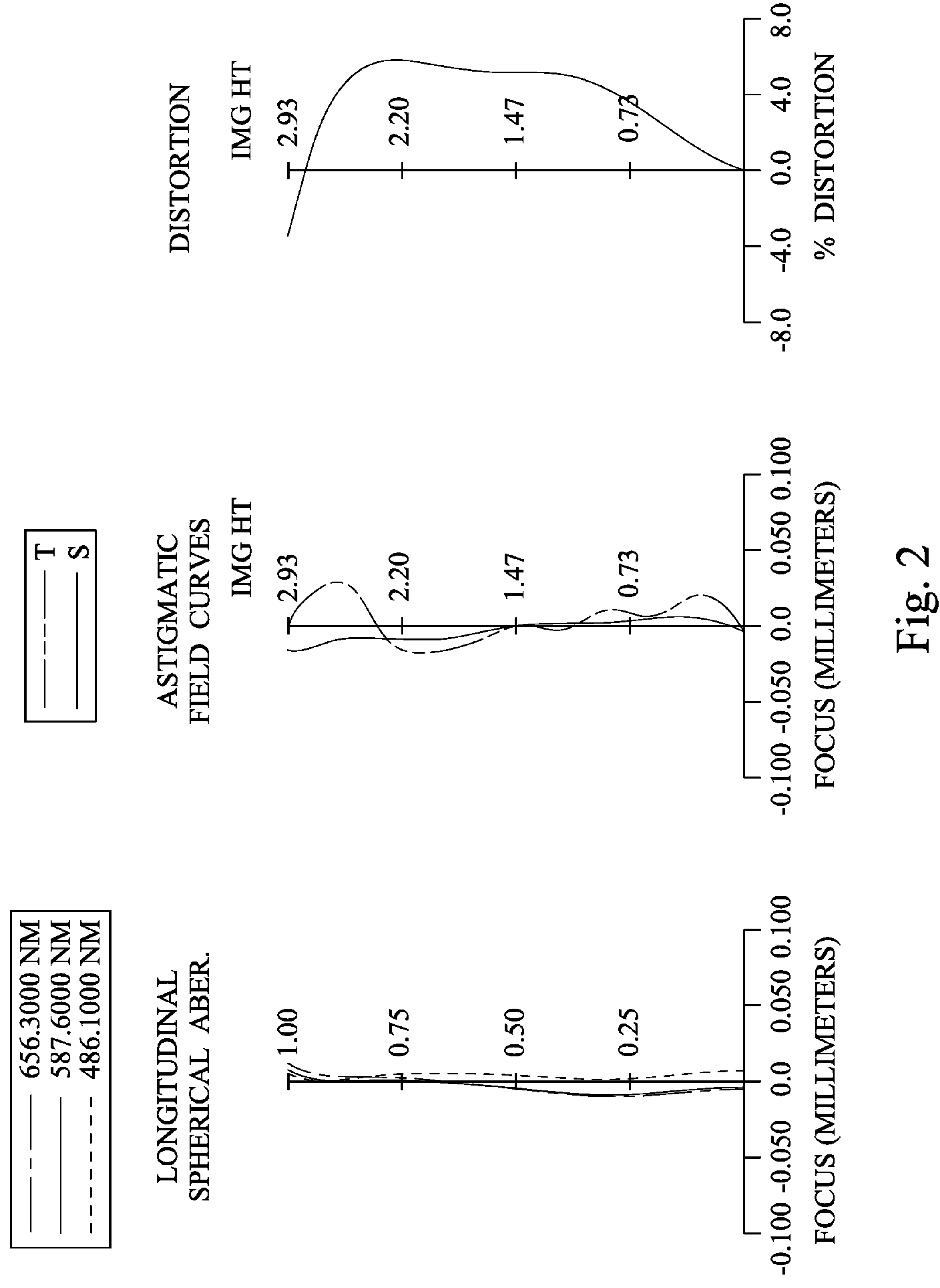
FIG. 2 shows spherical aberration curves, astigmatic field curves and a distortion curve of the imaging apparatus according to the 1st embodiment.

FIG. 1A is a schematic view of an imaging apparatus 1 according to the 1st embodiment of the present disclosure. FIG. 2 shows spherical aberration curves, astigmatic field curves and a distortion curve of the imaging apparatus 1 according to the 1st embodiment. In FIG. 1A, the imaging apparatus 1 includes an imaging system lens assembly (its reference numeral is omitted) and an image sensor IS. The imaging system lens assembly includes, in order from an object side to an image side along an optical path, a first lens element E1, an aperture stop ST, a second lens element E2, a reflective element E8, a third lens element E3, a fourth lens element E4, a stop S1, a fifth lens element E5, a sixth lens element E6, a filter E7 and an image surface IMG, wherein the image sensor IS is disposed on the image surface IMG of the imaging system lens assembly. The imaging system lens assembly includes six lens elements (E1, E2, E3, E4, E5, E6) without additional one or more lens elements inserted between the first lens element E1 and the sixth lens element E6.

Figure 27A:
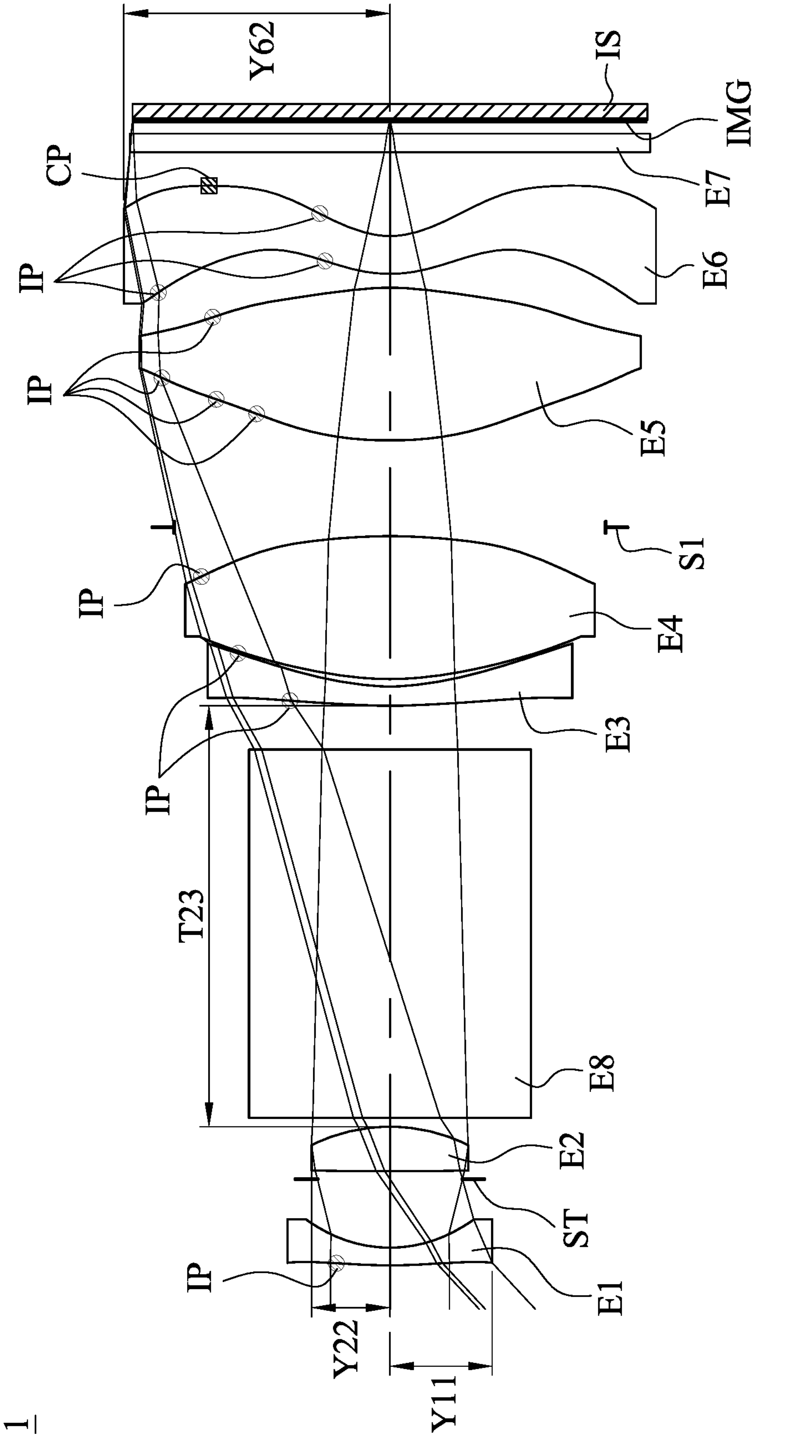
FIG. 27A is a schematic view of partial parameters, the inflection points of each lens element and the critical points according to the 1st embodiment in FIG. 1A.

The first lens element E1 with negative refractive power has an object-side surface being convex in a paraxial region thereof and an image-side surface being concave in a paraxial region thereof. The first lens element E1 is made of a plastic material, and has the object-side surface and the image-side surface being both aspheric. Furthermore, FIG. 27A is a schematic view of partial parameters, the inflection points IP of each lens element and the critical points CP according to the 1st embodiment. In FIG. 27A, the object-side surface of the first lens element E1 includes one inflection point IP.

The second lens element E2 with positive refractive power has an object-side surface being convex in a paraxial region thereof and an image-side surface being convex in a paraxial region thereof. The second lens element E2 is made of a plastic material, and has the object-side surface and the image-side surface being both aspheric.

The third lens element E3 with negative refractive power has an object-side surface being convex in a paraxial region thereof and an image-side surface being concave in a paraxial region thereof. The third lens element E3 is made of a plastic material, and has the object-side surface and the image-side surface being both aspheric. Furthermore, the object-side surface of the third lens element E3 includes one inflection point IP (as shown in FIG. 27A), and the image-side surface of the third lens element E3 includes one inflection point IP (as shown in FIG. 27A).

The fourth lens element E4 with positive refractive power has an object-side surface being convex in a paraxial region thereof and an image-side surface being convex in a paraxial region thereof. The fourth lens element E4 is made of a plastic material, and has the object-side surface and the image-side surface being both aspheric. Furthermore, the image-side surface of the fourth lens element E4 includes one inflection point IP (as shown in FIG. 27A).

The fifth lens element E5 with positive refractive power has an object-side surface being convex in a paraxial region thereof and an image-side surface being convex in a paraxial region thereof. The fifth lens element E5 is made of a plastic material, and has the object-side surface and the image-side surface being both aspheric. Furthermore, the object-side surface of the fifth lens element E5 includes three inflection points IP (as shown in FIG. 27A), and the image-side surface of the fifth lens element E5 includes one inflection point IP (as shown in FIG. 27A).

The sixth lens element E6 with negative refractive power has an object-side surface being convex in a paraxial region thereof and an image-side surface being concave in a paraxial region thereof. The sixth lens element E6 is made of a plastic material, and has the object-side surface and the image-side surface being both aspheric. Furthermore, the object-side surface of the sixth lens element E6 includes two inflection points IP (as shown in FIG. 27A), and the image-side surface of the sixth lens element E6 includes one inflection point IP (as shown in FIG. 27A) and includes one critical point CP (as shown in FIG. 27A) in an off-axis region thereof.

According to the 1st embodiment, the reflective element E8 is a prism, which is made of glass material and disposed between the second lens element E2 and the third lens element E3.

The filter E7 is made of a glass material, which is located between the sixth lens element E6 and the image surface IMG in order, and will not affect the focal length of the imaging system lens assembly.

The equation of the aspheric surface profiles of the aforementioned lens elements of the 1st embodiment is expressed as follows:

$$X(Y) = (Y^2/R)/(1 + sqrt(1 - (1+k)\times(Y/R)^2)) + \sum_i (Ai)\times(Y^i),$$

where,

X is the displacement in parallel with an optical axis from the intersection point of the aspheric surface and the optical axis to a point at a distance of Y from the optical axis on the aspheric surface;

Y is the vertical distance from the point on the aspheric surface to the optical axis;

R is the curvature radius;

k is the conic coefficient; and

Ai is the i-th aspheric coefficient.

In the imaging system lens assembly according to the 1st embodiment, when a focal length of the imaging system lens assembly is f, an f-number of the imaging system lens assembly is Fno, and half of a maximum field of view of the imaging system lens assembly is HFOV, these parameters have the following values: f=3.26 mm; Fno=2.41; and HFOV=42.9 degrees.

In the imaging system lens assembly according to the 1st embodiment, when a refractive index of the third lens element E3 is N3, and a refractive index of the sixth lens element E6 is N6, the following condition is satisfied: (N3+N6)/2=1.69.

In the imaging system lens assembly according to the 1st embodiment, when an Abbe number of the third lens element E3 is V3, an Abbe number of the fourth lens element E4 is V4, an Abbe number of the fifth lens element E5 is V5, and an Abbe number of the sixth lens element E6 is V6, the following condition is satisfied: (V4+V5)/(V3+V6)=3.05.

In the imaging system lens assembly according to the 1st embodiment, when the focal length of the imaging system lens assembly is f, a central thickness of the first lens element E1 is CT1, a central thickness of the second lens element E2 is CT2, and an axial distance between the first lens element E1 and the second lens element E2 is T12, the following condition is satisfied: (CT1+T12+CT2)/f=0.48.

In the imaging system lens assembly according to the 1st embodiment, when an axial distance between the second lens element E2 and the third lens E3 element is T23, the focal length of the imaging system lens assembly is f, and a maximum image height of the imaging system lens assembly is ImgH, the following conditions are satisfied: T23/f=1.47; and T23/ImgH=1.64.

In the imaging system lens assembly according to the 1st embodiment, when the focal length of the imaging system lens assembly is f, an axial distance between the first lens element E1 and the second lens element E2 is T12, the axial distance between the second lens element E2 and the third lens element E3 is T23, an axial distance between the third lens element E3 and the fourth lens E4 element is T34, an axial distance between the fourth lens element E4 and the fifth lens element E5 is T45, an axial distance between the fifth lens element E5 and the sixth lens element E6 is T56, and a sum of all axial distances between adjacent lens elements of the imaging system lens assembly is ΣAT, the following condition is satisfied: (T34+T56)/f=0.08; and (T34+T56)/ΣAT=0.03; according to the 1st embodiment, an axial distance between two adjacent lens elements indicates a distance along the optical axis between two adjacent lens surfaces of the adjacent lens elements; ΣAT=T12+T23+T34+T45+T56.

In the imaging system lens assembly according to the 1st embodiment, when a curvature radius of the object-side surface of the second lens element E2 is R3, and a curvature radius of the image-side surface of the second lens element E2 is R4, the following condition is satisfied: (R3−R4)/(R3+R4)=1.04.

In the imaging system lens assembly according to the 1st embodiment, when a curvature radius of the image-side surface of the third lens element E3 is R6, and a curvature radius of the object-side surface of the fourth lens element E4 is R7, the following condition is satisfied: (R6−R7)/(R6+R7)=−0.22.

In the imaging system lens assembly according to the 1st embodiment, when a curvature radius of the object-side surface of the sixth lens element E6 is R11, and a curvature radius of the image-side surface of the sixth lens element E6 is R12, the following condition is satisfied: (R11−R12)/(R11+R12)=0.22.

In the imaging system lens assembly according to the 1st embodiment, when the focal length of the imaging system lens assembly is f, the central thickness of the first lens element E1 is CT1, and the central thickness of the second lens element E2 is CT2, the following condition is satisfied: f/(CT1+CT2)=4.61.

In the imaging system lens assembly according to the 1st embodiment, when a focal length of the first lens element E1 is f1, and a focal length of the second lens element E2 is f2, the following condition is satisfied: f2/f1=−1.02.

In the imaging system lens assembly according to the 1st embodiment, when the focal length of the imaging system lens assembly is f, a curvature radius of the object-side surface of the first lens element E1 is R1, the following condition is satisfied: f/R1=0.39.

In the imaging system lens assembly according to the 1st embodiment, when the focal length of the imaging system lens assembly is f, and the curvature radius of the object-side surface of the fourth lens element E4 is R7, the following condition is satisfied: f/R7=0.86.

In the imaging system lens assembly according to the 1st embodiment, when the focal length of the imaging system lens assembly is f, a composite focal length of the first lens element E1 and the second lens element E2 is f12, a composite focal length of the third lens element E3, the fourth lens element E4, the fifth lens element E5 and the sixth lens element E6 is f3456, and the curvature radius of the image-side surface of the second lens element E2 is R4, the following conditions are satisfied: f/f12=0.26; f/f3456=0.76; and f12/R4=−6.22.

In the imaging system lens assembly according to the 1st embodiment, when the focal length of the imaging system lens assembly is f, the focal length of the second lens element E2 is f2, a composite focal length of the fifth lens element E5 and the sixth lens element E6 is f56, and the curvature radius of the image-side surface of the second lens element E2 is R4, the following conditions are satisfied: f2/f56=0.59; f2/R4=−1.84; and f56/f=1.95.

In the imaging system lens assembly according to the 1st embodiment, when the focal length of the imaging system lens assembly is f, a focal length of the fifth lens element E5 is f5, a focal length of the sixth lens element E6 is f6, the curvature radius of the object-side surface of the sixth lens element E6 is R11, and the curvature radius of the image-side surface of the sixth lens element E6 is R12, the following conditions are satisfied: f5×f6/(f×f)=−2.23; and f6/R11+f6/R12=−9.56.

In the imaging system lens assembly according to the 1st embodiment, when the curvature radius of the image-side surface of the third lens element E3 is R6, and the curvature radius of the object-side surface of the fourth lens element E4 is R7, the following condition is satisfied: R6/R7=0.64.

In the imaging system lens assembly according to the 1st embodiment, when a maximum distance between an optical effective region of the object-side surface of the first lens element E1 and the optical axis is Y11, a maximum distance between an optical effective region of the image-side surface of the second lens element E2 and the optical axis is Y22, and a maximum distance between an optical effective region of the image-side surface of the sixth lens element E6 and the optical axis is Y62, the following conditions are satisfied: Y62/Y11=2.60; and Y62/Y22=3.40.

Figure 28:
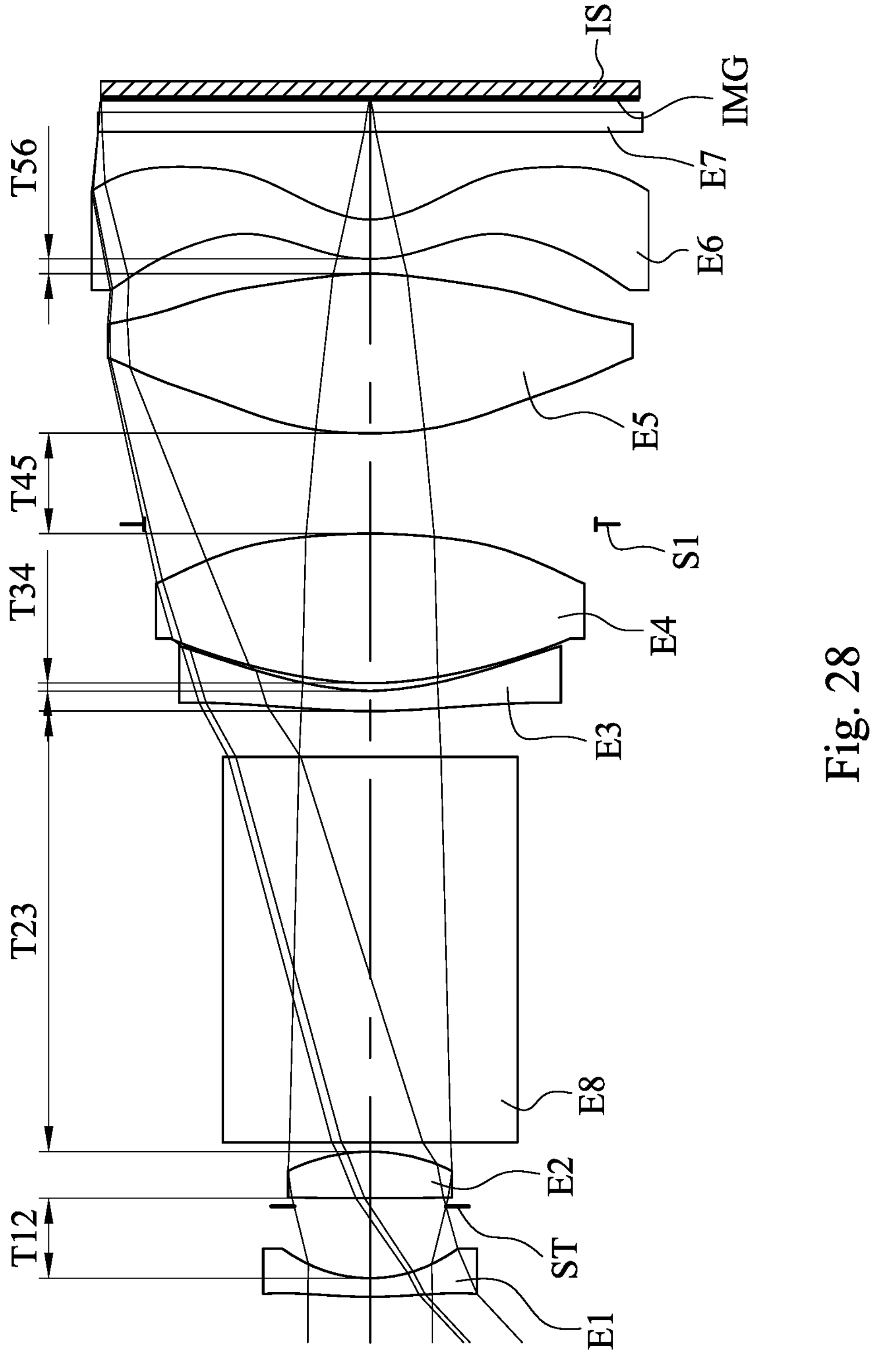
FIG. 28 is a schematic view of partial parameters according to the 1st embodiment.

In the imaging system lens assembly according to the 1st embodiment, when the axial distance between the first lens element E1 and the second lens element E2 is T12, the axial distance between the second lens element E2 and the third lens element E3 is T23, the axial distance between the third lens element E3 and the fourth lens element E4 is T34, the axial distance between the fourth lens element E4 and the fifth lens element E5 is T45, the axial distance between the fifth lens element E5 and the sixth lens element E6 is T56, a maximum among T12, T23, T34, T45, T56 is ATmax, and the focal length of the imaging system lens assembly is f, the following condition is satisfied: ATmax/f=1.47. In FIG. 28, which is a schematic view of partial parameters according to the 1st embodiment, in the 1st embodiment, ATmax=T23.

In the imaging system lens assembly according to the 1st embodiment, when an axial distance between the aperture stop ST and the image surface IMG is SL, and an axial distance between the object-side surface of the first lens element E1 and the image surface IMG is TL, the following condition is satisfied: SL/TL=0.92.

In the imaging system lens assembly according to the 1st embodiment, when the axial distance between the object-side surface of the first lens element E1 and the image surface IMG is TL, the maximum image height of the imaging system lens assembly is ImgH, and an entrance pupil diameter of the imaging system lens assembly is EPD, the following conditions are satisfied: TL/ImgH=4.45; and TL/EPD=9.62.

In the imaging system lens assembly according to the 1st embodiment, when a maximum field of view of the imaging system lens assembly is FOV, the following condition is satisfied: FOV=85.8 degrees.

The detailed optical data of the 1st embodiment are shown in Table 1A and the aspheric surface data are shown in Table 1B below.

TABLE 1A

| 1st Embodiment<br>f = 3.26 mm, Fno = 2.41, HFOV = 42.9 deg. | | | | | | | | |
|---|---|---|---|---|---|---|---|---|
| Surface # | | Curvature Radius | | Thickness | Material | Index | Abbe # | Focal Length |
| 0 | Object | Plano | | Infinity | | | | |
| 1 | Lens 1 | 8.3333 | ASP | 0.200 | Plastic | 1.545 | 56.1 | −3.66 |
| 2 | | 1.5961 | ASP | 0.782 | | | | |
| 3 | Ape. Stop | Plano | | 0.089 | | | | |
| 4 | Lens 2 | 111.6549 | ASP | 0.508 | Plastic | 1.534 | 55.9 | 3.74 |
| 5 | | −2.0307 | ASP | 0.100 | | | | |
| 6 | Prism | Plano | | 4.200 | Glass | 1.829 | 34.9 | — |
| 7 | | Plano | | 0.500 | | | | |
| 8 | Lens 3 | 6.1271 | ASP | 0.220 | Plastic | 1.686 | 18.4 | −6.07 |
| 9 | | 2.4433 | ASP | 0.085 | | | | |
| 10 | Lens 4 | 3.8026 | ASP | 1.630 | Plastic | 1.544 | 56.0 | 4.52 |
| 11 | | −5.8928 | ASP | 0.100 | | | | |
| 12 | Stop | Plano | | 0.992 | | | | |
| 13 | Lens 5 | 5.1119 | ASP | 1.740 | Plastic | 1.544 | 56.0 | 3.94 |
| 14 | | −3.2476 | ASP | 0.160 | | | | |
| 15 | Lens 6 | 1.6125 | ASP | 0.430 | Plastic | 1.686 | 18.4 | −6.02 |
| 16 | | 1.0339 | ASP | 0.957 | | | | |
| 17 | Filter | Plano | | 0.210 | Glass | 1.517 | 64.2 | — |
| 18 | | Plano | | 0.154 | | | | |
| 19 | Image | Plano | | — | | | | |

Reference wavelength is 587.6 nm (d-line).
Effective radius of Surface 12 (stop S1) is 2.460 mm.

TABLE 1B

| Aspheric Coefficients | | | | |
|---|---|---|---|---|
| Surface# | 1 | 2 | 4 | 5 |
| k = | −3.0891600E+01 | −4.1768700E+00 | −3.0000000E−09 | −2.8656800E−01 |
| A4 = | 2.8888215E−02 | 1.7521274E−01 | 1.8432775E−02 | −6.9274580E−03 |
| A6 = | −7.6055978E−02 | −6.3268869E−02 | −6.0825284E−02 | −1.0484617E−02 |
| A8 = | 2.4831432E−02 | −2.5353143E−01 | 3.1615700E−01 | 3.2731199E−02 |
| A10 = | 3.4675841E−02 | 7.3727805E−01 | −9.5193264E−01 | −8.4255791E−02 |
| A12 = | −5.1473829E−02 | −9.3789552E−01 | 1.6461067E+00 | 9.8269293E−02 |
| A14 = | 2.7060015E−02 | 5.9258094E−01 | −1.6269729E+00 | −5.3933931E−02 |
| A16 = | −5.1791716E−03 | −1.4563788E−01 | 8.5038304E−01 | 1.0193941E−02 |
| A18 = | | | −1.8219217E−01 | |
| Surface # | 8 | 9 | 10 | 11 |
| k = | −9.0000000E+01 | −8.8143000E+00 | −1.2663300E+01 | 1.6342400E+00 |
| A4 = | −3.5689437E−02 | −4.0575567E−02 | 2.4299197E−02 | 3.6611443E−02 |
| A6 = | 4.5556723E−02 | 5.9574699E−02 | −3.3241909E−02 | −3.1644870E−02 |
| A8 = | −1.9597207E−02 | −4.3825740E−02 | 2.5913032E−02 | 9.8392224E−03 |
| A10 = | −9.3252860E−03 | 2.1495131E−02 | −1.2446136E−02 | −4.5608043E−04 |
| A12 = | 1.7287610E−02 | −7.6419026E−03 | 4.1420307E−03 | −7.5398157E−04 |
| A14 = | −1.1290649E−02 | 1.9768804E−03 | −9.9845953E−04 | 3.0665784E−04 |
| A16 = | 4.3860980E−03 | −3.5912668E−04 | 1.7129960E−04 | −5.8048527E−05 |
| A18 = | −1.0865080E−03 | 4.2965167E−05 | −1.9591461E−05 | 5.5803428E−06 |
| A20 = | 1.6823800E−04 | −3.0209908E−06 | 1.3237226E−06 | −2.1639684E−07 |
| A22 = | −1.4846622E−05 | 9.4104638E−08 | −3.9695655E−08 | |
| A24 = | 5.6976026E−07 | | | |
| Surface # | 13 | 14 | 15 | 16 |
| k = | −3.9719800E+01 | −3.9913300E+00 | −1.7980500E+00 | −1.6211500E+00 |
| A4 = | 8.2646976E−02 | 6.2900325E−02 | −5.6190602E−02 | −6.1276720E−02 |
| A6 = | −4.6391842E−02 | −2.3784716E−02 | −6.6641189E−03 | −2.4529522E−02 |
| A8 = | 1.8762565E−02 | 1.2651265E−03 | −1.0731058E−02 | 1.6949380E−02 |
| A10 = | −6.0506708E−03 | 1.5206918E−03 | 1.0858548E−02 | −4.1857323E−03 |
| A12 = | 1.3770157E−03 | −6.1488488E−04 | −3.8862549E−03 | 5.6353063E−04 |
| A14 = | −2.0205120E−04 | 1.3409785E−04 | 7.6020160E−04 | −4.4132811E−05 |
| A16 = | 1.8074887E−05 | −1.8486825E−05 | −8.9827069E−05 | 1.8963953E−06 |
| A18 = | −8.9854381E−07 | 1.5584950E−06 | 6.4319516E−06 | −3.4552925E−08 |
| A20 = | 1.9055426E−08 | −7.2328088E−08 | −2.5783913E−07 | |
| A22 = | | 1.4060425E−09 | 4.4463263E−09 | |

In Table 1A, according to the 1st embodiment of FIG. 1A, the curvature radius, the thickness and the focal length are shown in millimeters (mm). Surface numbers 0-19 represent the surfaces sequentially arranged from the object side to the image side along the optical axis. In Table 1B, according to the 1st embodiment of FIG. 1A, k represents the conic coefficient of the equation of the aspheric surface profiles. A4-A24 represent the aspheric coefficients ranging from the 4th order to the 24th order. The tables presented below for each embodiment correspond to schematic parameter and aberration curves of each embodiment, and term definitions of the tables are the same as those in Table 1A and Table 1B of the 1st embodiment. Therefore, an explanation in this regard will not be provided again.

Figure 1B:
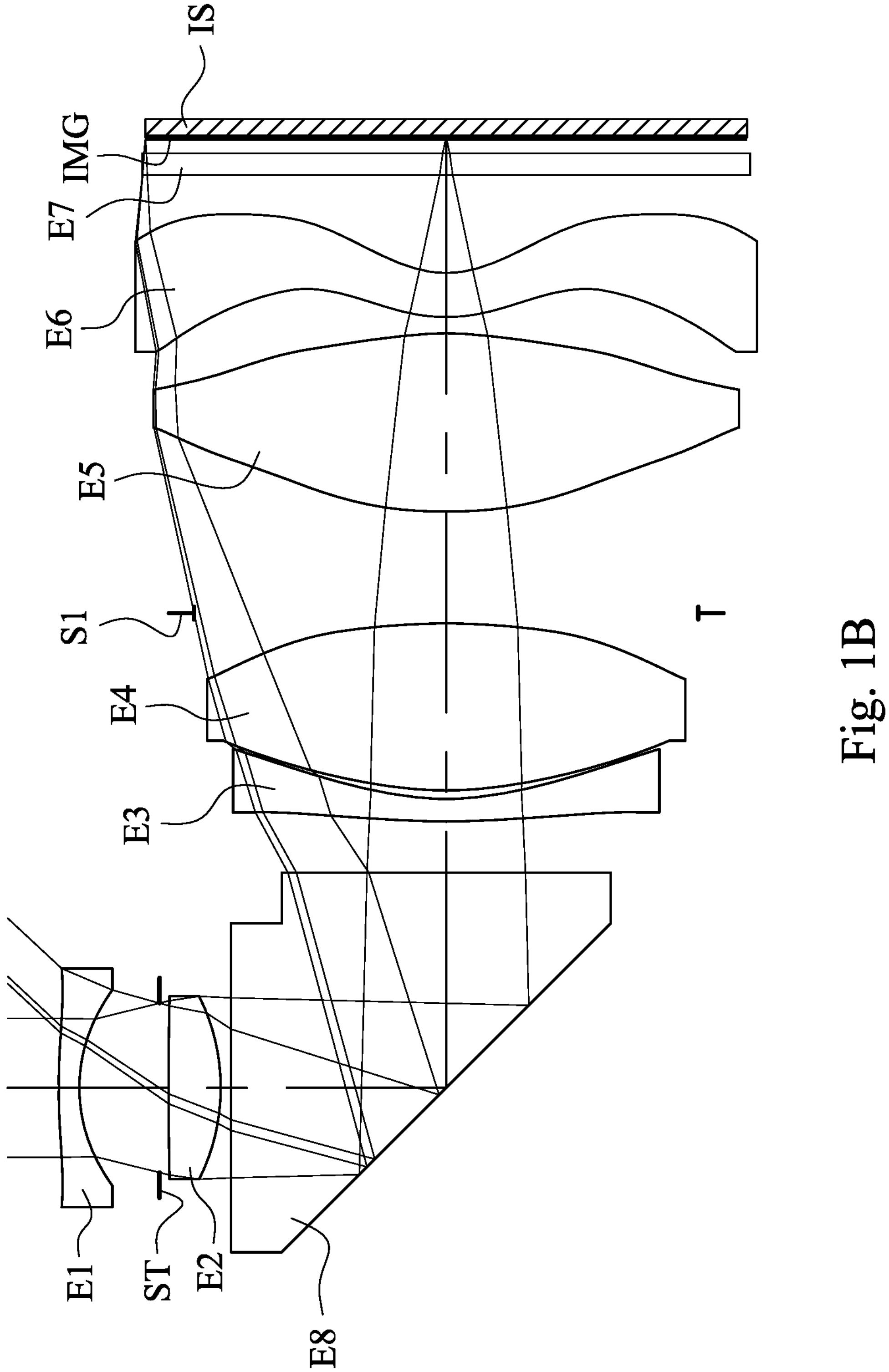
FIG. 1B is a schematic view of the imaging apparatus according to the 1st embodiment with another reflective element.
Figure 27B:
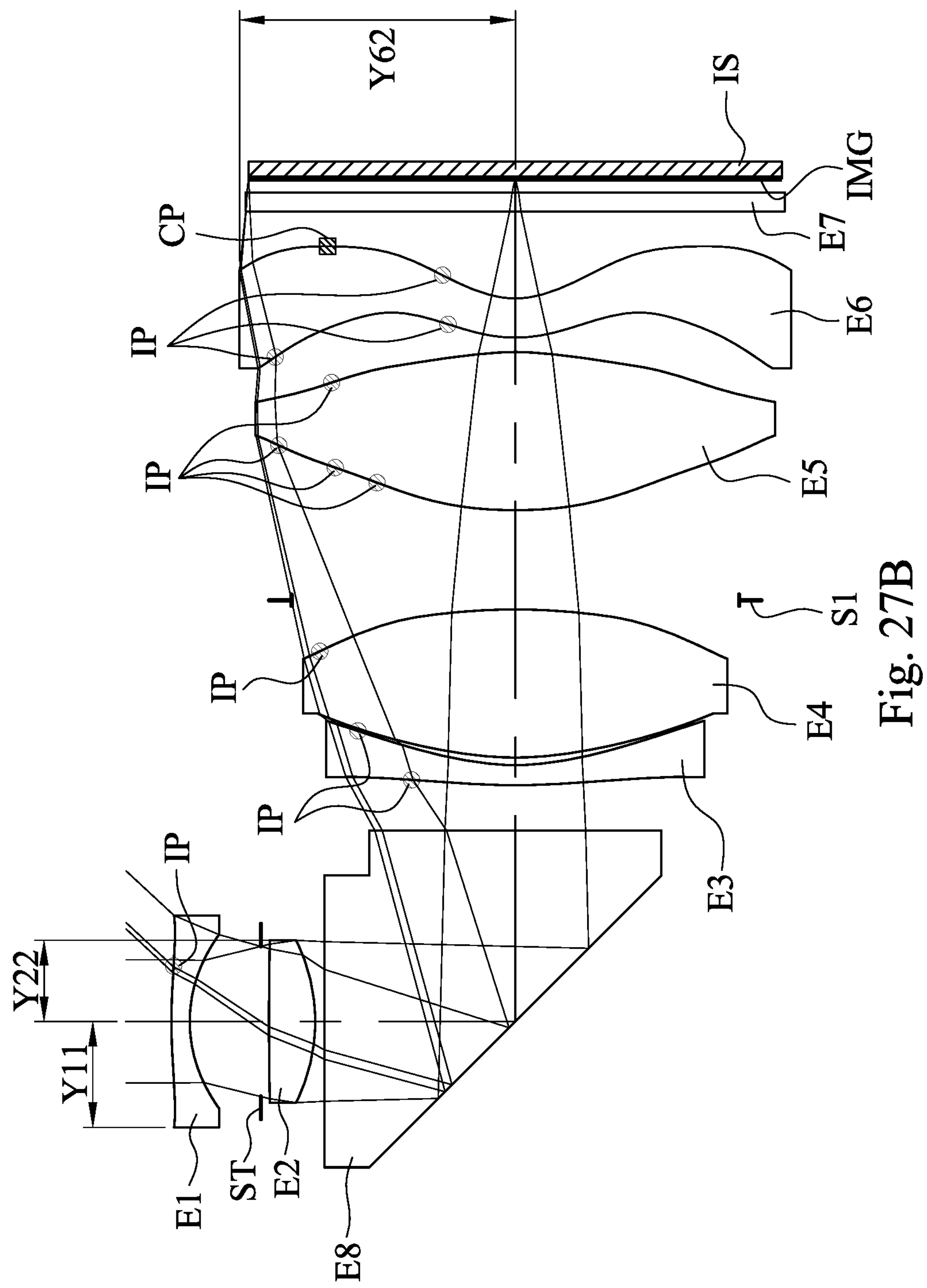
FIG. 27B is a schematic view of partial parameters, the inflection points of each lens element and the critical points according to the 1st embodiment in FIG. 1B.

FIG. 1B is a schematic view of the imaging apparatus 1 according to the 1st embodiment with another reflective element E8. FIG. 27B is a schematic view of partial parameters, the inflection points IP of each lens element and the critical points CP according to the 1st embodiment in FIG. 1B. The difference between FIGS. 1B, 27B and FIGS. 1A, 27A is the reflective element E8 in FIGS. 1B, 27B can fold the direction of the optical direction, which is favorable for being applied to electronic devices for different requirements.

Figure 29A:
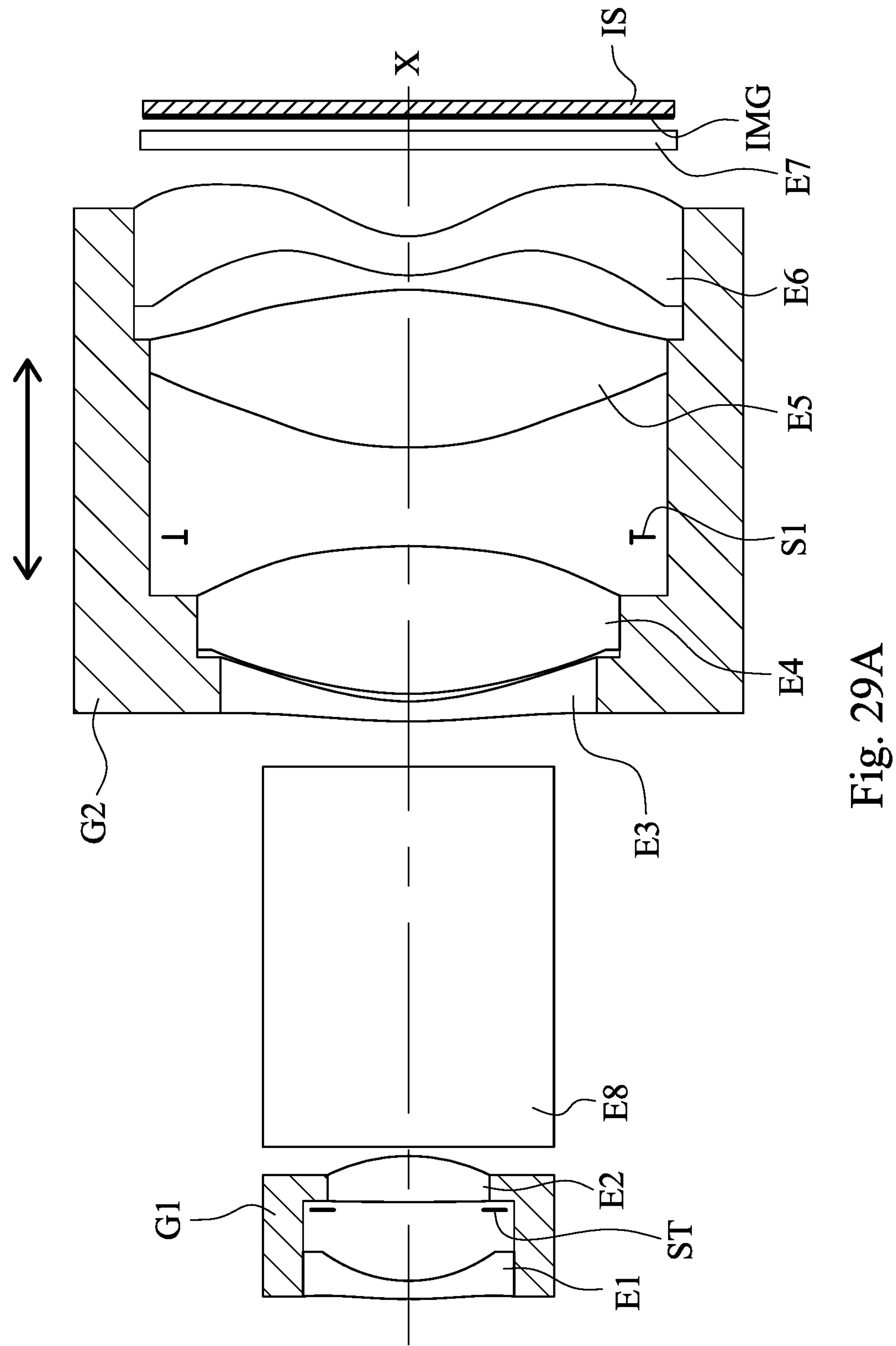
FIG. 29A is a schematic view of the imaging system lens assembly according to the 1st embodiment in FIG. 1A with lens barrels.
Figure 29B:
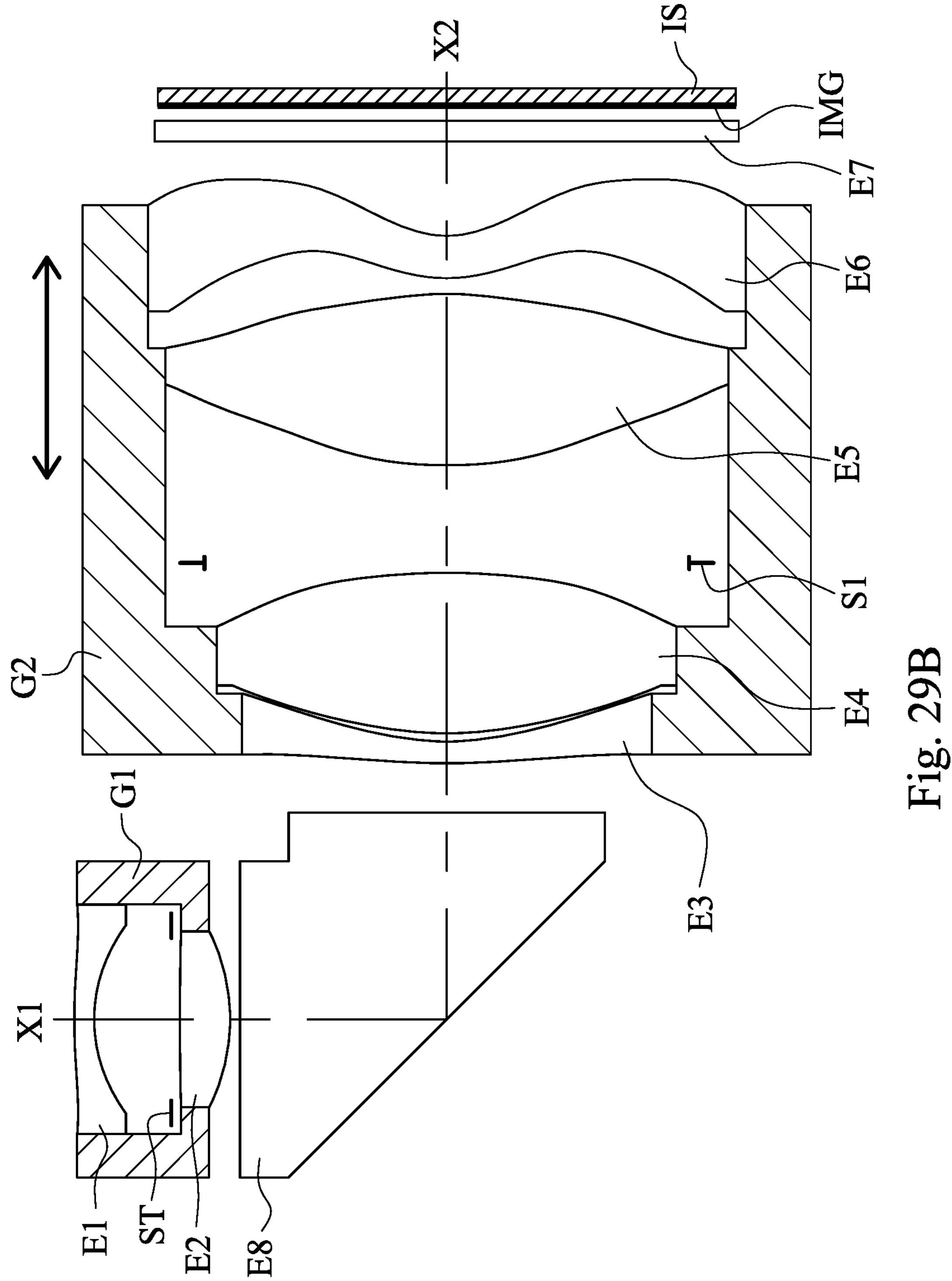
FIG. 29B is a schematic view of the imaging system lens assembly according to the 1st embodiment in FIG. 1B with lens barrels.

Further, FIG. 29A is a schematic view of the imaging system lens assembly according to the 1st embodiment in FIG. 1A with lens barrels G1, G2. FIG. 29B is a schematic view of the imaging system lens assembly according to the 1st embodiment in FIG. 1B with lens barrels G1, G2. In FIG. 29A and FIG. 29B, the first lens element E1 and the second lens element E2 are disposed in the lens barrel G1, which is a front lens group; the third lens element E3, the fourth lens element E4, the fifth lens element E5 and the sixth lens element E6 are disposed in the lens barrel G2, which is a rear lens group, the rear lens group is movable relative to the front lens group. In detail, in FIG. 29A, the rear lens group is movable relative to the front lens group along the optical axis X. In FIG. 29B, the rear lens group is movable relative to the front lens group along the second optical axis X2 due to the reflective element E8 folds the optical axis of the imaging system lens assembly from the first optical axis X1 into the second optical axis X2; that is, the rear lens group is movable relative to the front lens group along the direction perpendicular to the first optical axis.

2nd Embodiment

Figure 3A:
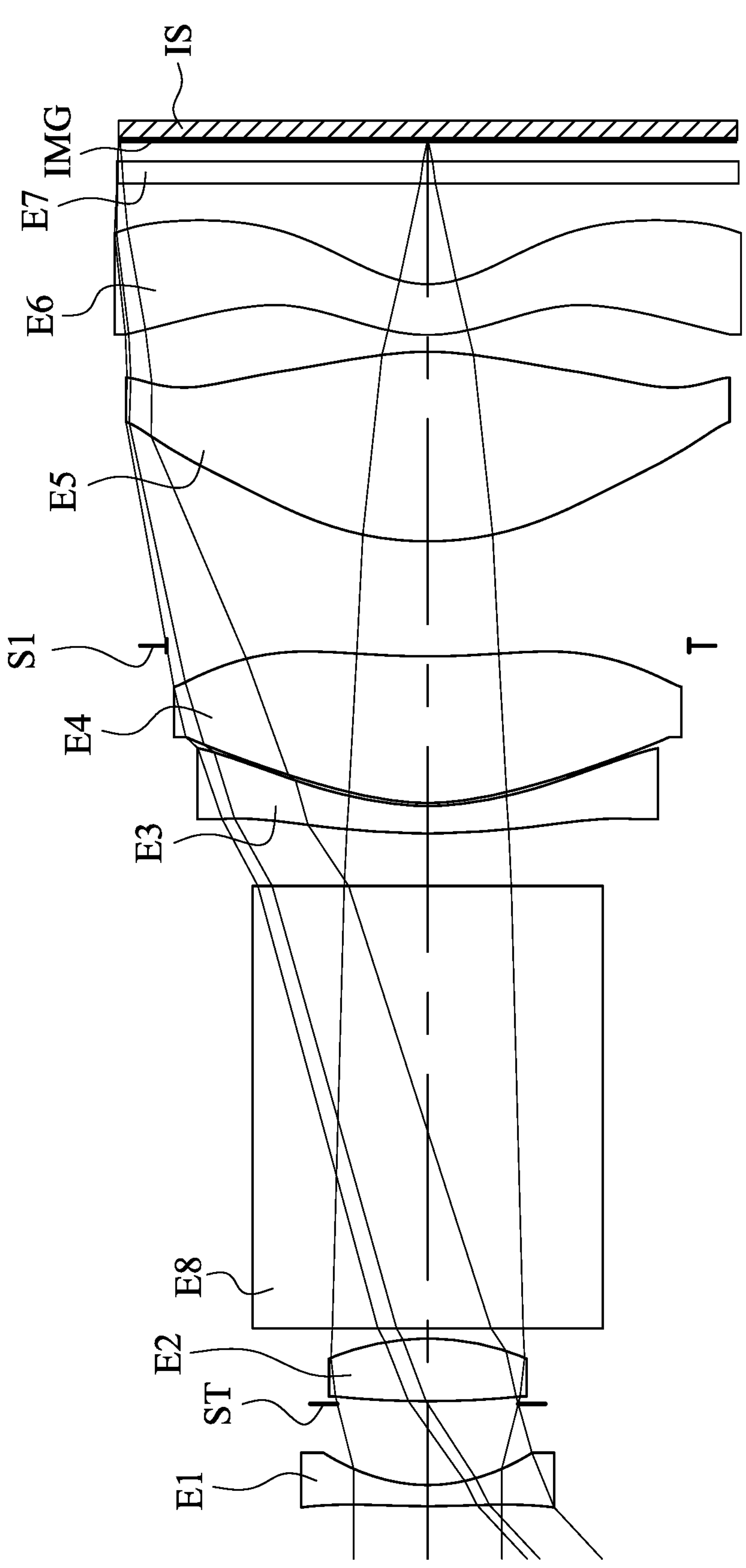
FIG. 3A is a schematic view of an imaging apparatus according to the 2nd embodiment of the present disclosure.
Figure 4:
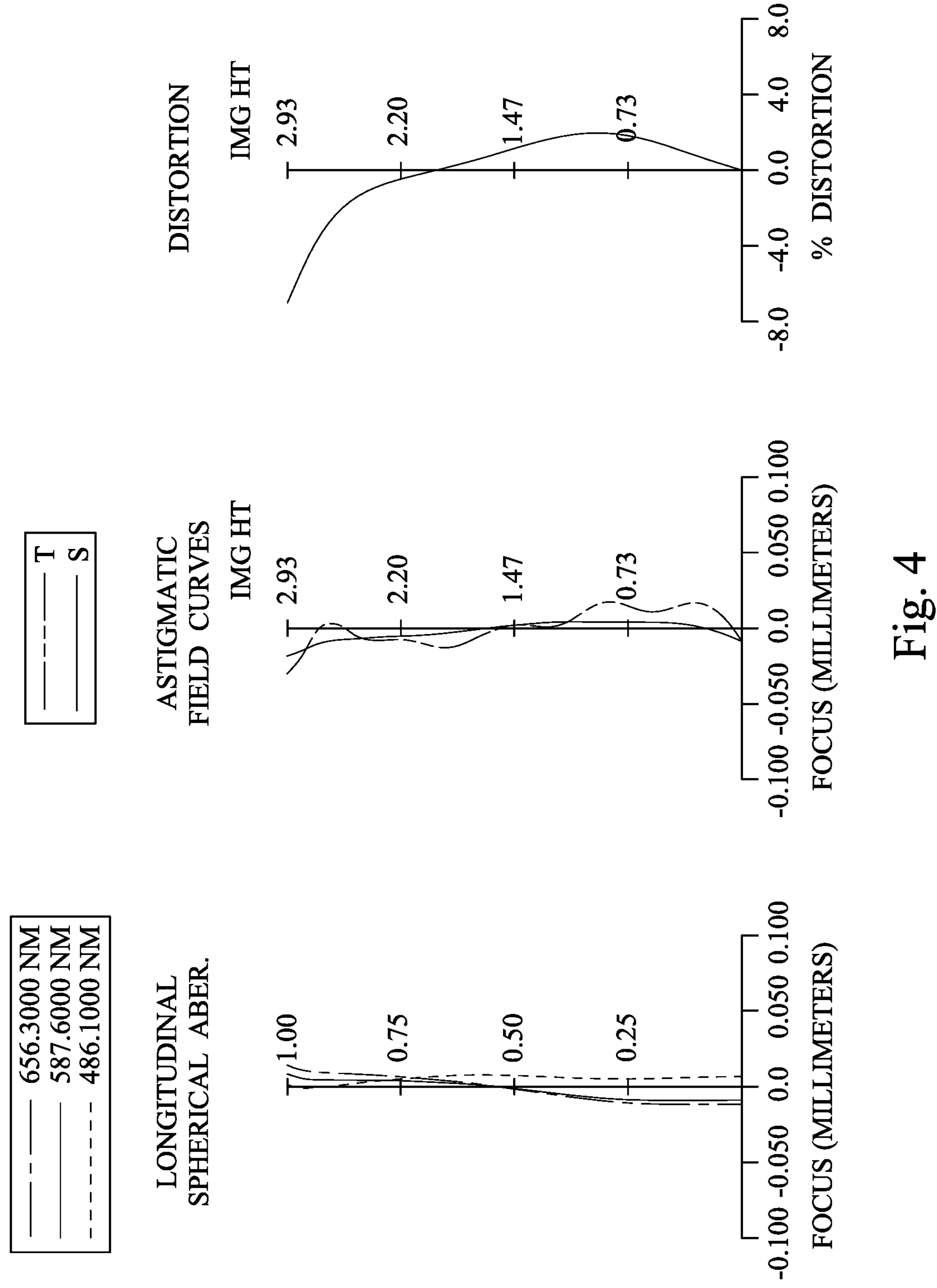
FIG. 4 shows spherical aberration curves, astigmatic field curves and a distortion curve of the imaging apparatus according to the 2nd embodiment.

FIG. 3A is a schematic view of an imaging apparatus 2 according to the 2nd embodiment of the present disclosure. FIG. 4 shows spherical aberration curves, astigmatic field curves and a distortion curve of the imaging apparatus 2 according to the 2nd embodiment. In FIG. 3A, the imaging apparatus 2 includes an imaging system lens assembly (its reference numeral is omitted) and an image sensor IS. The imaging system lens assembly includes, in order from an object side to an image side along an optical path, a first lens element E1, an aperture stop ST, a second lens element E2, a reflective element E8, a third lens element E3, a fourth lens element E4, a stop S1, a fifth lens element E5, a sixth lens element E6, a filter E7 and an image surface IMG, wherein the image sensor IS is disposed on the image surface IMG of the imaging system lens assembly. The imaging system lens assembly includes six lens elements (E1, E2, E3, E4, E5, E6) without additional one or more lens elements inserted between the first lens element E1 and the sixth lens element E6.

The first lens element E1 with negative refractive power has an object-side surface being convex in a paraxial region thereof and an image-side surface being concave in a paraxial region thereof. The first lens element E1 is made of a plastic material, and has the object-side surface and the image-side surface being both aspheric. Furthermore, the object-side surface of the first lens element E1 includes one inflection point.

The second lens element E2 with positive refractive power has an object-side surface being convex in a paraxial region thereof and an image-side surface being convex in a paraxial region thereof. The second lens element E2 is made of a plastic material, and has the object-side surface and the image-side surface being both aspheric.

The third lens element E3 with negative refractive power has an object-side surface being convex in a paraxial region thereof and an image-side surface being concave in a paraxial region thereof. The third lens element E3 is made of a plastic material, and has the object-side surface and the image-side surface being both aspheric. Furthermore, the object-side surface of the third lens element E3 includes one inflection point, and the image-side surface of the third lens element E3 includes one inflection point.

The fourth lens element E4 with positive refractive power has an object-side surface being convex in a paraxial region thereof and an image-side surface being concave in a paraxial region thereof. The fourth lens element E4 is made of a plastic material, and has the object-side surface and the image-side surface being both aspheric. Furthermore, the image-side surface of the fourth lens element E4 includes two inflection points.

The fifth lens element E5 with positive refractive power has an object-side surface being convex in a paraxial region thereof and an image-side surface being convex in a paraxial region thereof. The fifth lens element E5 is made of a plastic material, and has the object-side surface and the image-side surface being both aspheric. Furthermore, the object-side surface of the fifth lens element E5 includes three inflection points, and the image-side surface of the fifth lens element E5 includes four inflection points.

The sixth lens element E6 with negative refractive power has an object-side surface being convex in a paraxial region thereof and an image-side surface being concave in a paraxial region thereof. The sixth lens element E6 is made of a plastic material, and has the object-side surface and the image-side surface being both aspheric. Furthermore, the object-side surface of the sixth lens element E6 includes two inflection points, and the image-side surface of the sixth lens element E6 includes two inflection points and includes one critical point in an off-axis region thereof.

According to the 2nd embodiment, the reflective element E8 is a prism, which is made of glass material and disposed between the second lens element E2 and the third lens element E3.

The filter E7 is made of a glass material, which is located between the sixth lens element E6 and the image surface IMG in order, and will not affect the focal length of the imaging system lens assembly.

The detailed optical data of the 2nd embodiment are shown in Table 2A and the aspheric surface data are shown in Table 2B below.

TABLE 2A

2nd Embodiment
f = 3.38 mm, Fno = 2.40, HFOV = 43.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 8.3333 | ASP | 0.200 | Plastic | 1.545 | 56.1 | −3.52 |
| 2 | | 1.5457 | ASP | 0.771 | | | | |
| 3 | Ape. Stop | Plano | | 0.026 | | | | |
| 4 | Lens 2 | 9.0909 | ASP | 0.593 | Plastic | 1.544 | 56.0 | 3.66 |
| 5 | | −2.4875 | ASP | 0.100 | | | | |
| 6 | Prism | Plano | | 4.200 | Glass | 1.803 | 46.8 | — |
| 7 | | Plano | | 0.500 | | | | |
| 8 | Lens 3 | 5.8904 | ASP | 0.260 | Plastic | 1.686 | 18.4 | −5.85 |
| 9 | | 2.3443 | ASP | 0.030 | | | | |
| 10 | Lens 4 | 2.3817 | ASP | 1.393 | Plastic | 1.544 | 56.0 | 5.46 |
| 11 | | 9.5238 | ASP | 0.100 | | | | |
| 12 | Stop | Plano | | 0.992 | | | | |
| 13 | Lens 5 | 3.2436 | ASP | 1.800 | Plastic | 1.544 | 56.0 | 3.21 |
| 14 | | −3.0430 | ASP | 0.160 | | | | |
| 15 | Lens 6 | 1.5746 | ASP | 0.482 | Plastic | 1.686 | 18.4 | −5.50 |
| 16 | | 0.9725 | ASP | 0.957 | | | | |
| 17 | Filter | Plano | | 0.210 | Glass | 1.517 | 64.2 | — |
| 18 | | Plano | | 0.201 | | | | |
| 19 | Image | Plano | | — | | | | |

Reference wavelength is 587.6 nm (d-line).

Effective radius of Surface 12 (stop S1) is 2.480 mm.

TABLE 2B

| Aspheric Coefficients | | | | |
|---|---|---|---|---|
| Surface # | 1 | 2 | 4 | 5 |
| k = | −9.0000000E+01 | −6.3976000E+00 | 3.7095300E+01 | −7.6165400E−01 |
| A4 = | −6.6228593E−02 | 1.2651691E−01 | −1.9039611E−03 | −1.7067005E−02 |
| A6 = | 6.6603030E−02 | −8.0597327E−02 | −1.6595350E−03 | 1.2440428E−02 |
| A8 = | −9.3475454E−02 | 1.8113552E−02 | −3.3302260E−03 | −4.6873122E−02 |
| A10 = | 9.8817744E−02 | 9.8102967E−02 | 2.1667379E−02 | 8.9855546E−02 |
| A12 = | −6.9380249E−02 | −1.7110685E−01 | −4.9906122E−02 | −1.0231636E−01 |
| A14 = | 2.8150595E−02 | 1.3084860E−01 | 5.6363118E−02 | 6.4202772E−02 |
| A16 = | −4.9336209E−03 | −3.8360603E−02 | −2.2858352E−02 | −1.6084886E−02 |
| Surface # | 8 | 9 | 10 | 11 |
| k = | −2.7603000E+01 | −7.1742600E+00 | −9.7719700E+00 | −9.0000000E+01 |
| A4 = | −6.2593476E−02 | −8.5247060E−02 | 1.1498740E−02 | 3.4473282E−02 |
| A6 = | 1.2700725E−01 | 1.7002233E−01 | −7.8184184E−04 | −5.6715852E−02 |
| A8 = | −1.2168303E−01 | −1.6445842E−01 | −1.3267935E−02 | 2.9527151E−02 |
| A10 = | 6.6047049E−02 | 9.8917369E−02 | 1.5020615E−02 | −9.2406806E−03 |
| A12 = | −2.0032438E−02 | −3.9729754E−02 | −8.0272904E−03 | 1.8487963E−03 |
| A14 = | 1.7865200E−03 | 1.0831570E−02 | 2.5056533E−03 | −2.2222492E−04 |
| A16 = | 1.0847965E−03 | −1.9800636E−03 | −4.8384285E−04 | 1.2261558E−05 |
| A18 = | −4.9366001E−04 | 2.3241360E−04 | 5.7276652E−05 | 1.5210025E−07 |
| A20 = | 9.6153848E−05 | −1.5837645E−05 | −3.8283814E−06 | −3.4027586E−08 |
| A22 = | −9.5383318E−06 | 4.7647075E−07 | 1.1106928E−07 | |
| A24 = | 3.9205515E−07 | | | |
| Surface # | 13 | 14 | 15 | 16 |
| k = | −9.0681500E+00 | −5.4765900E+00 | −1.4598100E+00 | −1.6762800E+00 |
| A4 = | 5.8640775E−02 | 2.7989837E−02 | −9.9132813E−02 | −1.0759804E−01 |
| A6 = | −2.8348061E−02 | 5.7515836E−03 | 2.0928582E−02 | 1.6299444E−02 |
| A8 = | 1.1132100E−02 | −9.0678307E−03 | −1.3366178E−02 | 2.9196927E−03 |
| A10 = | −3.8473130E−03 | 2.8615510E−03 | 8.0458026E−03 | −1.7967984E−03 |
| A12 = | 9.5001095E−04 | −3.0472972E−04 | −2.6387959E−03 | 3.6470679E−04 |
| A14 = | −1.5021748E−04 | −3.4342480E−05 | 5.1013670E−04 | −3.8753819E−05 |
| A16 = | 1.4496648E−05 | 1.4396791E−05 | −6.0618335E−05 | 2.1304413E−06 |
| A18 = | −7.8151669E−07 | −1.8296425E−06 | 4.3608919E−06 | −4.7496774E−08 |
| A20 = | 1.8021255E−08 | 1.0913454E−07 | −1.7423134E−07 | |
| A22 = | | −2.5652794E−09 | 2.9639857E−09 | |

In the 2nd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 2nd embodiment, so an explanation in this regard will not be provided again.

Moreover, these parameters can be calculated from Table 2A and Table 2B as the values and satisfy the conditions in Table 2C:

TABLE 2C

| 2nd Embodiment | | | |
|---|---|---|---|
| f [mm] | 3.38 | f/f12 | 0.25 |
| Fno | 2.40 | f/f3456 | 0.76 |
| HFOV [degrees] | 43.0 | f12/R4 | −5.52 |
| (N3 + N6)/2 | 1.69 | f2/f56 | 0.87 |
| (V4 + V5)/(V3 + V6) | 3.05 | f2/R4 | −1.47 |
| (CT1 + T12 + CT2)/f | 0.47 | f56/f | 1.25 |
| T23/f | 1.42 | f5 × f6/(f × f) | −1.54 |
| T23/ImgH | 1.64 | f6/R11 + f6/R12 | −9.14 |
| (T34 + T56)/f | 0.06 | R6/R7 | 0.98 |
| (T34 + T56)/ΣAT | 0.03 | Y62/Y11 | 2.48 |
| (R3 − R4)/(R3 + R4) | 1.75 | Y62/Y22 | 3.17 |
| (R6 − R7)/(R6 + R7) | −0.01 | ATmax/f | 1.42 |
| (R11 − R12)/(R11 + R12) | 0.24 | SL/TL | 0.93 |
| f/(CT1 + CT2) | 4.27 | TL/ImgH | 4.42 |
| f2/f1 | −1.04 | TL/EPD | 9.22 |
| f/R1 | 0.41 | FOV [degrees] | 86.0 |
| f/R7 | 1.42 | | |

Figure 3B:
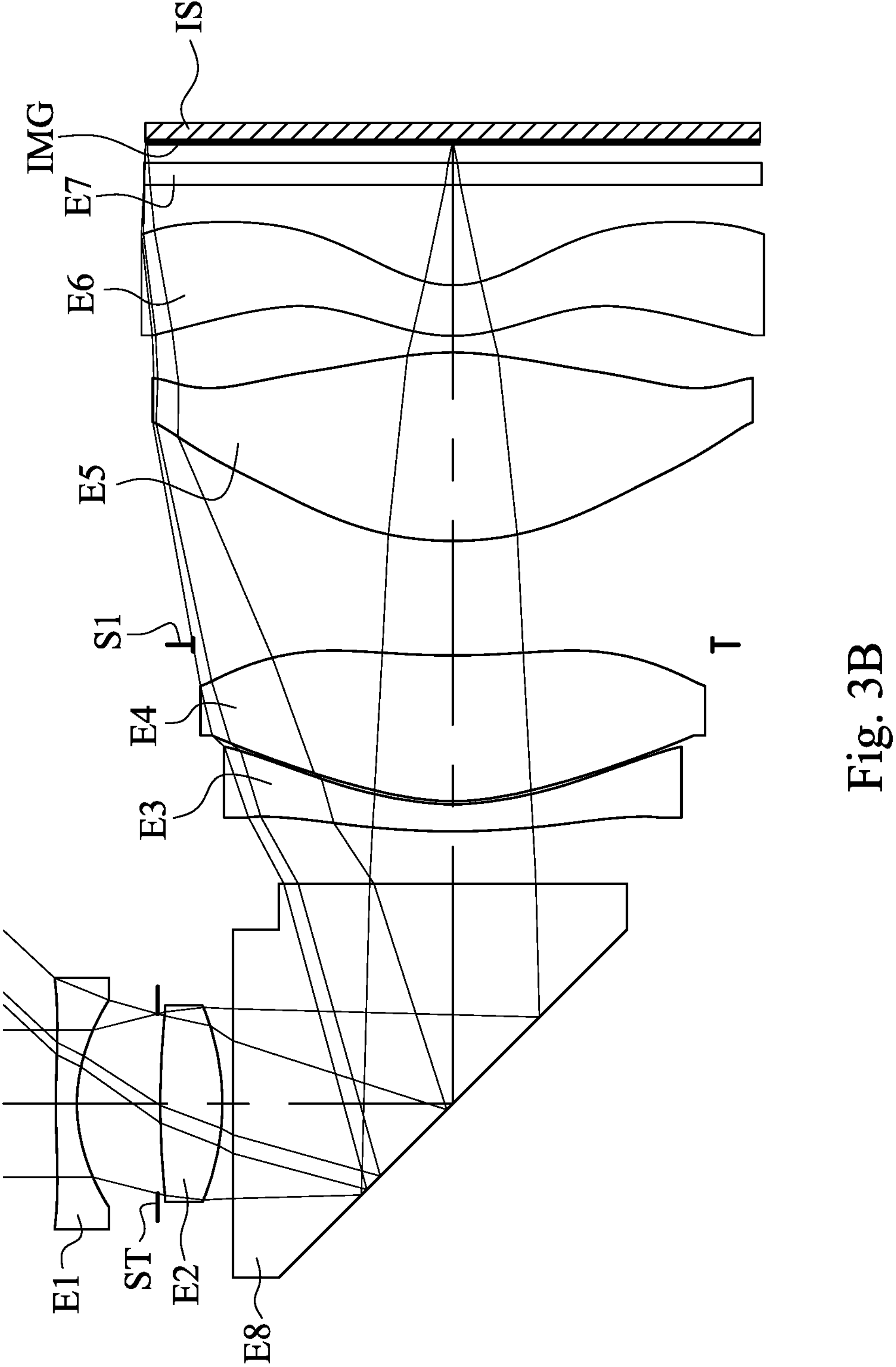
FIG. 3B is a schematic view of the imaging apparatus according to the 2nd embodiment with another reflective element.

FIG. 3B is a schematic view of the imaging apparatus 2 according to the 2nd embodiment with another reflective element E8. The difference between FIG. 3B and FIG. 3A is the reflective element E8 in FIG. 3B can fold the direction of the optical direction, which is favorable for being applied to electronic devices for different requirements.

3rd Embodiment

Figure 5A:
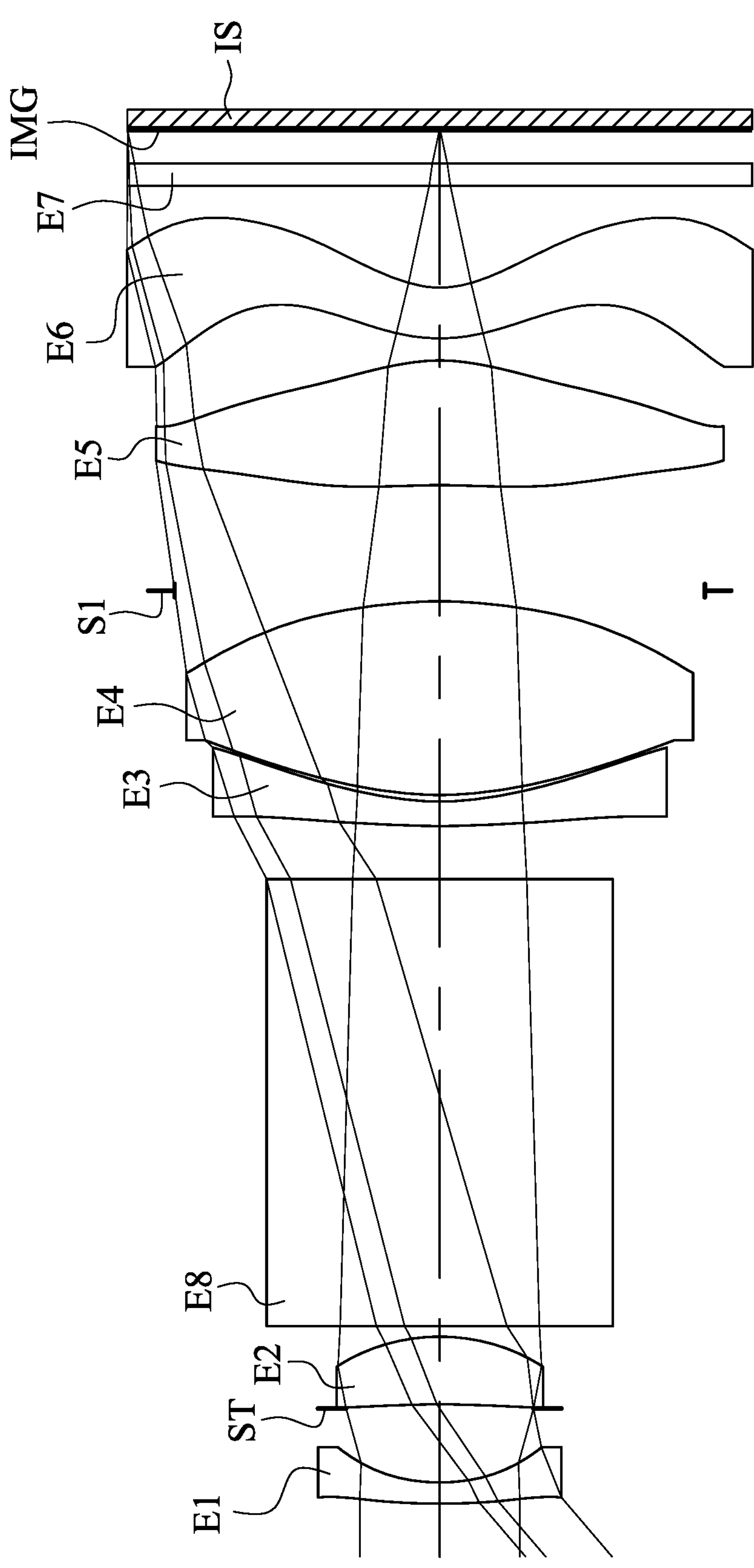
FIG. 5A is a schematic view of an imaging apparatus according to the 3rd embodiment of the present disclosure.
Figure 6:
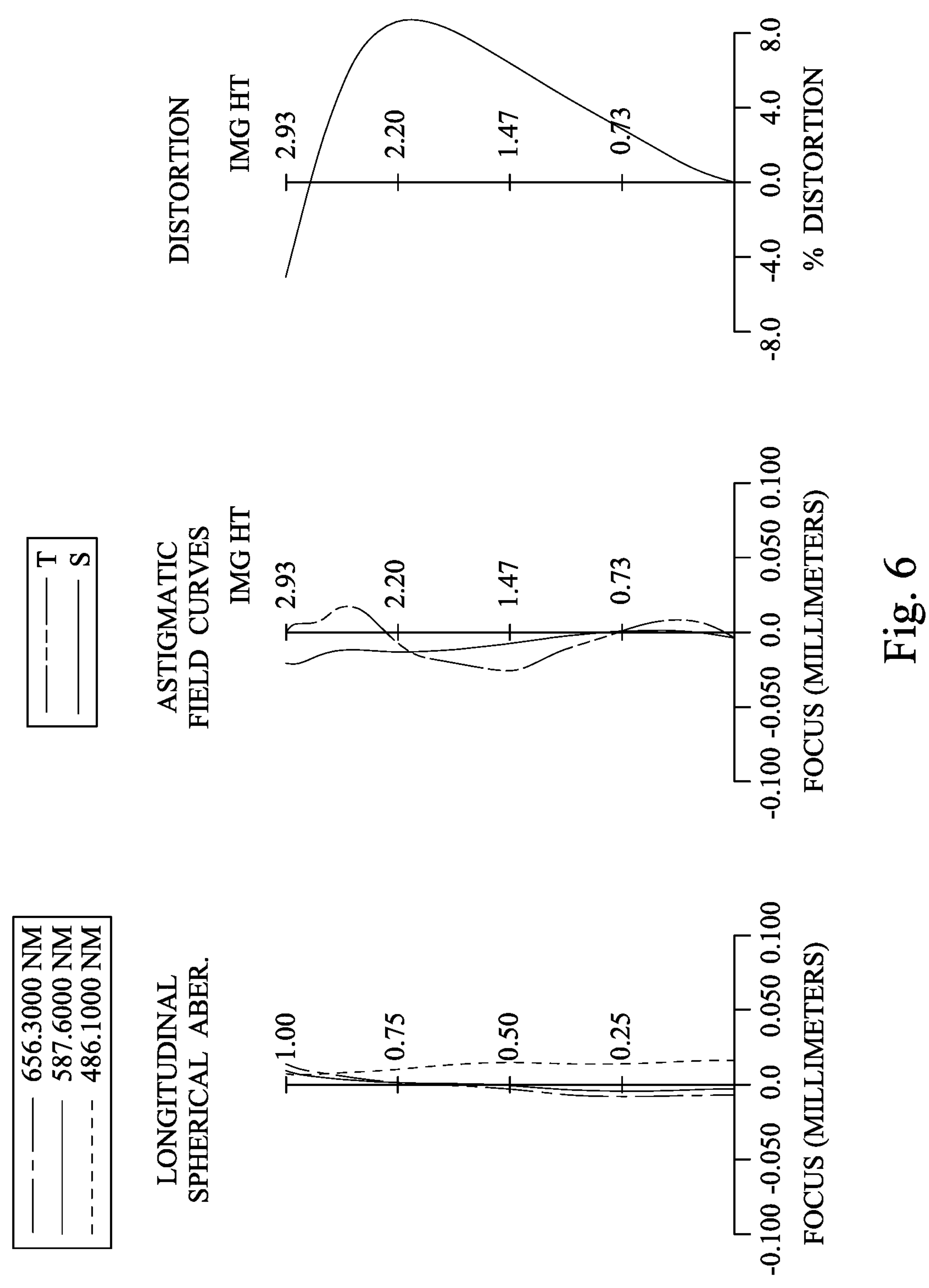
FIG. 6 shows spherical aberration curves, astigmatic field curves and a distortion curve of the imaging apparatus according to the 3rd embodiment.

FIG. 5A is a schematic view of an imaging apparatus 3 according to the 3rd embodiment of the present disclosure. FIG. 6 shows spherical aberration curves, astigmatic field curves and a distortion curve of the imaging apparatus 3 according to the 3rd embodiment. In FIG. 5A, the imaging apparatus 3 includes an imaging system lens assembly (its reference numeral is omitted) and an image sensor IS. The imaging system lens assembly includes, in order from an object side to an image side along an optical path, a first lens element E1, an aperture stop ST, a second lens element E2, a reflective element E8, a third lens element E3, a fourth lens element E4, a stop S1, a fifth lens element E5, a sixth lens element E6, a filter E7 and an image surface IMG, wherein the image sensor IS is disposed on the image surface IMG of the imaging system lens assembly. The imaging system lens assembly includes six lens elements (E1, E2, E3, E4, E5, E6) without additional one or more lens elements inserted between the first lens element E1 and the sixth lens element E6.

The first lens element E1 with negative refractive power has an object-side surface being convex in a paraxial region thereof and an image-side surface being concave in a paraxial region thereof. The first lens element E1 is made of a plastic material, and has the object-side surface and the image-side surface being both aspheric. Furthermore, the object-side surface of the first lens element E1 includes one inflection point.

The second lens element E2 with positive refractive power has an object-side surface being concave in a paraxial region thereof and an image-side surface being convex in a paraxial region thereof. The second lens element E2 is made of a plastic material, and has the object-side surface and the image-side surface being both aspheric. Furthermore, the object-side surface of the second lens element E2 includes one inflection point.

The third lens element E3 with negative refractive power has an object-side surface being convex in a paraxial region thereof and an image-side surface being concave in a paraxial region thereof. The third lens element E3 is made of a plastic material, and has the object-side surface and the image-side surface being both aspheric. Furthermore, the object-side surface of the third lens element E3 includes one inflection point, and the image-side surface of the third lens element E3 includes one inflection point.

The fourth lens element E4 with positive refractive power has an object-side surface being convex in a paraxial region thereof and an image-side surface being convex in a paraxial region thereof. The fourth lens element E4 is made of a plastic material, and has the object-side surface and the image-side surface being both aspheric. Furthermore, the image-side surface of the fourth lens element E4 includes one inflection point.

The fifth lens element E5 with positive refractive power has an object-side surface being concave in a paraxial region thereof and an image-side surface being convex in a paraxial region thereof. The fifth lens element E5 is made of a plastic material, and has the object-side surface and the image-side surface being both aspheric. Furthermore, the object-side surface of the fifth lens element E5 includes three inflection points, and the image-side surface of the fifth lens element E5 includes three inflection points.

The sixth lens element E6 with negative refractive power has an object-side surface being convex in a paraxial region thereof and an image-side surface being concave in a paraxial region thereof. The sixth lens element E6 is made of a plastic material, and has the object-side surface and the image-side surface being both aspheric. Furthermore, the object-side surface of the sixth lens element E6 includes two inflection points, and the image-side surface of the sixth lens element E6 includes two inflection points and includes one critical point in an off-axis region thereof.

According to the 3rd embodiment, the reflective element E8 is a prism, which is made of glass material and disposed between the second lens element E2 and the third lens element E3.

The filter E7 is made of a glass material, which is located between the sixth lens element E6 and the image surface IMG in order, and will not affect the focal length of the imaging system lens assembly.

The detailed optical data of the 3rd embodiment are shown in Table 3A and the aspheric surface data are shown in Table 3B below.

TABLE 3A

| 3rd Embodiment<br>f = 3.61 mm, Fno = 2.40, HFOV = 40.5 deg. | | | | | | | | |
|---|---|---|---|---|---|---|---|---|
| Surface # | | Curvature Radius | | Thickness | Material | Index | Abbe# | Focal Length |
| 0 | Object | Plano | | Infinity | | | | |
| 1 | Lens 1 | 8.3333 | ASP | 0.200 | Plastic | 1.545 | 56.1 | −4.50 |
| 2 | | 1.8795 | ASP | 0.694 | | | | |
| 3 | Ape. Stop | Plano | | 0.040 | | | | |
| 4 | Lens 2 | −9.0909 | ASP | 0.636 | Plastic | 1.544 | 56.0 | 4.10 |
| 5 | | −1.8342 | ASP | 0.100 | | | | |
| 6 | Prism | Plano | | 4.200 | Glass | 1.933 | 18.8 | — |
| 7 | | Plano | | 0.500 | | | | |
| 8 | Lens 3 | 7.6336 | ASP | 0.230 | Plastic | 1.686 | 18.4 | −5.88 |
| 9 | | 2.6073 | ASP | 0.062 | | | | |
| 10 | Lens 4 | 3.5414 | ASP | 1.820 | Plastic | 1.544 | 56.0 | 3.83 |
| 11 | | −4.1417 | ASP | 0.100 | | | | |
| 12 | Stop | Plano | | 0.992 | | | | |
| 13 | Lens 5 | −7.4074 | ASP | 1.172 | Plastic | 1.544 | 56.0 | 4.09 |
| 14 | | −1.8076 | ASP | 0.208 | | | | |
| 15 | Lens 6 | 1.6351 | ASP | 0.477 | Plastic | 1.686 | 18.4 | −4.84 |
| 16 | | 0.9654 | ASP | 0.957 | | | | |
| 17 | Filter | Plano | | 0.210 | Glass | 1.517 | 64.2 | — |
| 18 | | Plano | | 0.321 | | | | |
| 19 | Image | Plano | | — | | | | |

Reference wavelength is 587.6 nm (d-line).
Effective radius of Surface 12 (stop S1) is 2.490 mm.

TABLE 3B

| Aspheric Coefficients | | | | |
|---|---|---|---|---|
| Surface # | 1 | 2 | 4 | 5 |
| k = | 1.9466200E+01 | −2.3168700E+00 | −8.8812900E+01 | −3.2918600E−01 |
| A4 = | 9.9010126E−02 | 2.0802549E−01 | 7.5042457E−03 | −8.0382018E−03 |

TABLE 3B-continued

| Aspheric Coefficients | | | | |
|---|---|---|---|---|
| A6 = | −1.8264831E−01 | −1.3218043E−01 | 2.3109616E−03 | −6.2260301E−03 |
| A8 = | 1.5815657E−01 | −5.2990846E−02 | 1.9238736E−02 | 4.8885025E−03 |
| A10 = | −1.3357550E−01 | 3.7965958E−01 | −5.2915641E−02 | −2.9467701E−02 |
| A12 = | 8.2886832E−02 | −6.1248411E−01 | 6.6517981E−02 | 4.6829322E−02 |
| A14 = | −3.0324354E−02 | 4.6530871E−01 | −3.9124476E−02 | −3.6495265E−02 |
| A16 = | 4.7758492E−03 | −1.3320007E−01 | 9.8277122E−03 | 1.1316079E−02 |
| Surface # | 8 | 9 | 10 | 11 |
| k = | −8.0265800E+01 | −7.6390000E+00 | −1.0283900E+01 | 4.0948100E−01 |
| A4 = | −4.6586578E−02 | −4.2988207E−02 | 2.0835139E−02 | 3.5841017E−02 |
| A6 = | 8.3946692E−02 | 7.9109498E−02 | −2.5266381E−02 | −1.8393170E−02 |
| A8 = | −7.6690073E−02 | −7.3714993E−02 | 2.0685937E−02 | 2.8628757E−04 |
| A10 = | 3.8432239E−02 | 4.3131792E−02 | −1.1347836E−02 | 3.4430311E−03 |
| A12 = | −8.1285827E−03 | −1.6825955E−02 | 4.3933658E−03 | −1.6604550E−03 |
| A14 = | −2.0479434E−03 | 4.4661944E−03 | −1.1976357E−03 | 3.9512760E−04 |
| A16 = | 2.0190599E−03 | −8.0363646E−04 | 2.2151549E−04 | −5.2974582E−05 |
| A18 = | −6.6450249E−04 | 9.4523732E−05 | −2.6147871E−05 | 3.7979191E−06 |
| A20 = | 1.1876546E−04 | −6.5936747E−06 | 1.7642709E−06 | −1.1184964E−07 |
| A22 = | −1.1472089E−05 | 2.0713784E−07 | −5.1568763E−08 | |
| A24 = | 4.7027283E−07 | | | |
| Surface # | 13 | 14 | 15 | 16 |
| k = | −8.4835300E+01 | −6.9784300E+00 | −1.7454000E+00 | −2.0425900E+00 |
| A4 = | 6.4731713E−02 | 6.9699567E−03 | −5.2964280E−02 | −8.1309228E−02 |
| A6 = | −1.9067262E−02 | 3.3713967E−02 | −9.6892009E−03 | 1.9317342E−02 |
| A8 = | −8.8259187E−04 | −3.2402847E−02 | 5.3732754E−03 | −3.0905900E−03 |
| A10 = | 2.0494220E−03 | 1.4792643E−02 | −1.0635739E−03 | 4.3886179E−04 |
| A12 = | −6.1067698E−04 | −4.1846287E−03 | 1.3882579E−04 | −6.7123050E−05 |
| A14 = | 9.0921009E−05 | 7.8704950E−04 | −2.1023956E−05 | 7.3398081E−06 |
| A16 = | −7.3130405E−06 | −9.9387095E−05 | 3.5784678E−06 | −4.2003635E−07 |
| A18 = | 2.9327355E−07 | 8.1359568E−06 | −3.9120314E−07 | 9.4935076E−09 |
| A20 = | −4.3398119E−09 | −3.8936029E−07 | 2.1758031E−08 | |
| A22 = | | 8.2125058E−09 | −4.7602436E−10 | |

In the 3rd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 3rd embodiment, so an explanation in this regard will not be provided again.

Moreover, these parameters can be calculated from Table 3A and Table 3B as the values and satisfy the conditions in Table 3C:

TABLE 3C

| 3rd Embodiment | | | |
|---|---|---|---|
| f [mm] | 3.61 | f/f12 | 0.31 |
| Fno | 2.40 | f/f3456 | 0.75 |
| HFOV [degrees] | 40.5 | f12/R4 | −6.28 |
| (N3 + N6)/2 | 1.69 | f2/f56 | 0.35 |
| (V4 + V5)/(V3 + V6) | 3.05 | f2/R4 | −2.23 |
| (CT1 + T12 + CT2)/f | 0.43 | f56/f | 3.23 |
| T23/f | 1.33 | f5 × f6/(f × f) | −1.52 |
| T23/ImgH | 1.64 | f6/R11 + f6/R12 | −7.97 |
| (T34 + T56)/f | 0.07 | R6/R7 | 0.74 |
| (T34 + T56)/ΣAT | 0.04 | Y62/Y11 | 2.57 |
| (R3 − R4)/(R3 + R4) | 0.66 | Y62/Y22 | 3.03 |
| (R6 − R7)/(R6 + R7) | −0.15 | ATmax/f | 1.33 |
| (R11 − R12)/(R11 + R12) | 0.26 | SL/TL | 0.93 |
| f/(CT1 + CT2) | 4.32 | TL/ImgH | 4.40 |
| f2/f1 | −0.91 | TL/EPD | 8.60 |
| f/R1 | 0.43 | FOV [degrees] | 81.0 |
| f/R7 | 1.02 | | |

Figure 5B:
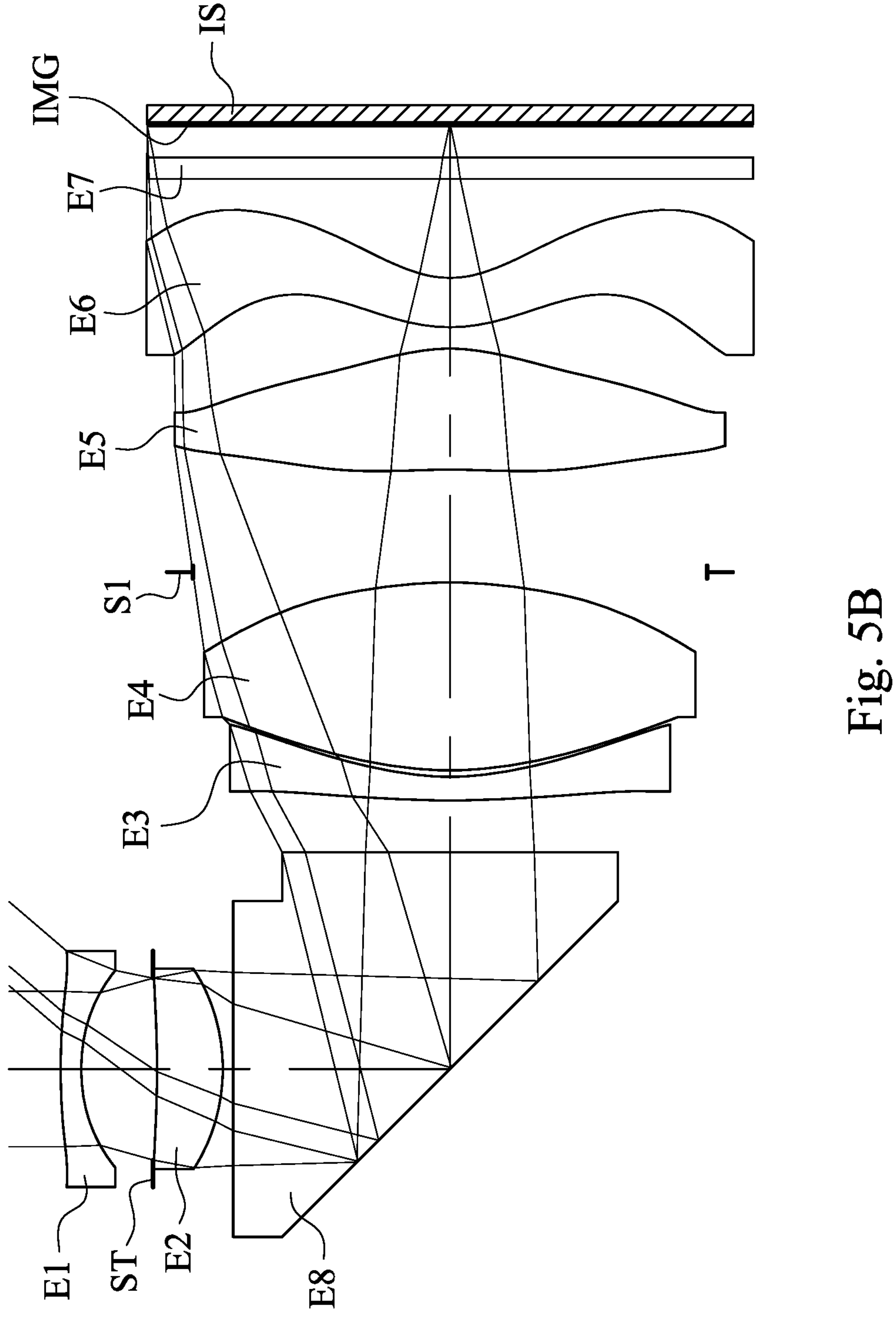
FIG. 5B is a schematic view of the imaging apparatus according to the 3rd embodiment with another reflective element.

FIG. 5B is a schematic view of the imaging apparatus 3 according to the 3rd embodiment with another reflective element E8. The difference between FIG. 5B and FIG. 5A is the reflective element E8 in FIG. 5B can fold the direction of the optical direction, which is favorable for being applied to electronic devices for different requirements.

4th Embodiment

Figure 7A:
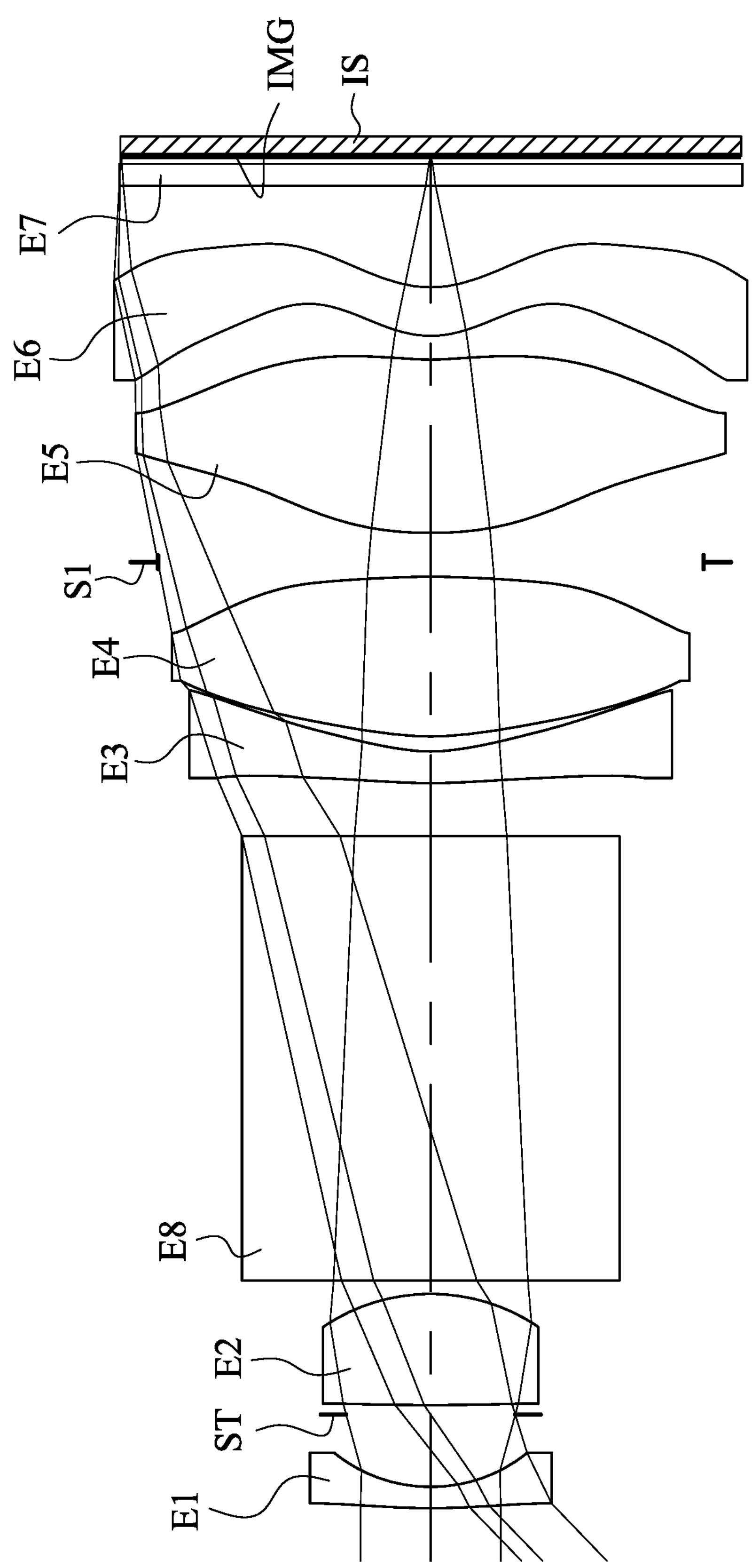
FIG. 7A is a schematic view of an imaging apparatus according to the 4th embodiment of the present disclosure.
Figure 8:
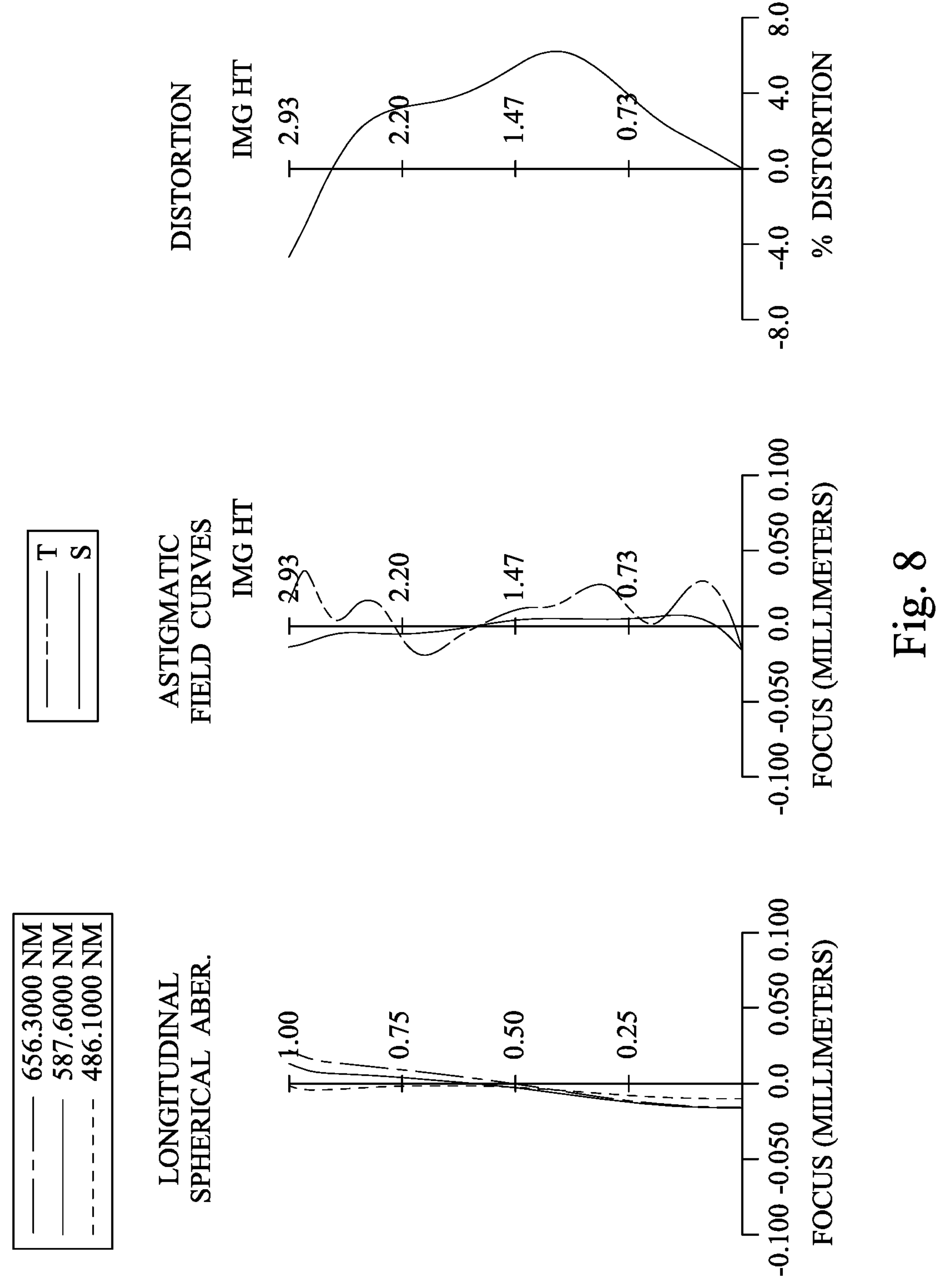
FIG. 8 shows spherical aberration curves, astigmatic field curves and a distortion curve of the imaging apparatus according to the 4th embodiment.

FIG. 7A is a schematic view of an imaging apparatus 4 according to the 4th embodiment of the present disclosure. FIG. 8 shows spherical aberration curves, astigmatic field curves and a distortion curve of the imaging apparatus 4 according to the 4th embodiment. In FIG. 7A, the imaging apparatus 4 includes an imaging system lens assembly (its reference numeral is omitted) and an image sensor IS. The imaging system lens assembly includes, in order from an object side to an image side along an optical path, a first lens element E1, an aperture stop ST, a second lens element E2, a reflective element E8, a third lens element E3, a fourth lens element E4, a stop S1, a fifth lens element E5, a sixth lens element E6, a filter E7 and an image surface IMG, wherein the image sensor IS is disposed on the image surface IMG of the imaging system lens assembly. The imaging system lens assembly includes six lens elements (E1, E2, E3, E4, E5, E6) without additional one or more lens elements inserted between the first lens element E1 and the sixth lens element E6.

The first lens element E1 with negative refractive power has an object-side surface being convex in a paraxial region thereof and an image-side surface being concave in a paraxial region thereof. The first lens element E1 is made of a plastic material, and has the object-side surface and the image-side surface being both aspheric. Furthermore, the object-side surface of the first lens element E1 includes one inflection point.

The second lens element E2 with positive refractive power has an object-side surface being convex in a paraxial region thereof and an image-side surface being convex in a paraxial region thereof. The second lens element E2 is made of a plastic material, and has the object-side surface and the image-side surface being both aspheric.

The third lens element E3 with negative refractive power has an object-side surface being convex in a paraxial region thereof and an image-side surface being concave in a paraxial region thereof. The third lens element E3 is made of a plastic material, and has the object-side surface and the image-side surface being both aspheric. Furthermore, the object-side surface of the third lens element E3 includes three inflection points, and the image-side surface of the third lens element E3 includes one inflection point.

The fourth lens element E4 with positive refractive power has an object-side surface being convex in a paraxial region thereof and an image-side surface being convex in a paraxial region thereof. The fourth lens element E4 is made of a plastic material, and has the object-side surface and the image-side surface being both aspheric. Furthermore, the image-side surface of the fourth lens element E4 includes one inflection point.

The fifth lens element E5 with negative refractive power has an object-side surface being convex in a paraxial region thereof and an image-side surface being concave in a paraxial region thereof. The fifth lens element E5 is made of a plastic material, and has the object-side surface and the image-side surface being both aspheric. Furthermore, the object-side surface of the fifth lens element E5 includes three inflection points, and the image-side surface of the fifth lens element E5 includes two inflection points.

The sixth lens element E6 with positive refractive power has an object-side surface being convex in a paraxial region thereof and an image-side surface being concave in a paraxial region thereof. The sixth lens element E6 is made of a plastic material, and has the object-side surface and the image-side surface being both aspheric. Furthermore, the object-side surface of the sixth lens element E6 includes two inflection points, and the image-side surface of the sixth lens element E6 includes four inflection points and includes one critical point in an off-axis region thereof.

According to the 4th embodiment, the reflective element E8 is a prism, which is made of glass material and disposed between the second lens element E2 and the third lens element E3.

The filter E7 is made of a glass material, which is located between the sixth lens element E6 and the image surface IMG in order, and will not affect the focal length of the imaging system lens assembly.

The detailed optical data of the 4th embodiment are shown in Table 4A and the aspheric surface data are shown in Table 4B below.

TABLE 4A

| 4th Embodiment . f = 3.19 mm, Fno = 2.41, HFOV = 44.0 deg. | | | | | | | | |
|---|---|---|---|---|---|---|---|---|
| Surface # | | Curvature Radius | | Thickness | Material | Index | Abbe # | Focal Length |
| 0 | Object | Plano | | Infinity | | | | |
| 1 | Lens 1 | 8.3331 | ASP | 0.200 | Plastic | 1.562 | 44.6 | −3.30 |
| 2 | | 1.5024 | ASP | 0.683 | | | | |
| 3 | Ape. Stop | Plano | | 0.090 | | | | |
| 4 | Lens 2 | 27.6761 | ASP | 1.050 | Plastic | 1.544 | 56.0 | 3.22 |
| 5 | | −1.8455 | ASP | 0.127 | | | | |
| 6 | Prism | Plano | | 4.200 | Glass | 1.803 | 46.6 | — |
| 7 | | Plano | | 0.500 | | | | |
| 8 | Lens 3 | 4.8269 | ASP | 0.300 | Plastic | 1.686 | 18.4 | −3.82 |
| 9 | | 1.6561 | ASP | 0.142 | | | | |
| 10 | Lens 4 | 2.6204 | ASP | 1.510 | Plastic | 1.544 | 56.0 | 3.70 |
| 11 | | −6.9043 | ASP | 0.137 | | | | |
| 12 | Stop | Plano | | 0.277 | | | | |
| 13 | Lens 5 | 4.1905 | ASP | 1.637 | Plastic | 1.544 | 56.0 | −31.17 |
| 14 | | 2.8976 | ASP | 0.224 | | | | |
| 15 | Lens 6 | 0.9313 | ASP | 0.460 | Plastic | 1.686 | 18.4 | 4.07 |
| 16 | | 1.1168 | ASP | 0.957 | | | | |
| 17 | Filter | Plano | | 0.210 | Glass | 1.517 | 64.2 | — |
| 18 | | Plano | | 0.073 | | | | |
| 19 | Image | Plano | | — | | | | |

Reference wavelength is 587.6 nm (d-line).
Effective radius of Surface 12 (stop S1) is 2.580 mm.

TABLE 4B

| Aspheric Coefficients | | | | |
|---|---|---|---|---|
| Surface # | 1 | 2 | 4 | 5 |
| k = | 1.0006200E+01 | −3.1768900E+00 | −3.6326800E+01 | −4.1745900E−01 |
| A4 = | 1.0626490E−02 | 1.5400571E−01 | 5.6352970E−03 | −1.0160797E−02 |
| A6 = | −5.6390429E−02 | −5.1720362E−02 | −4.1761355E−02 | −1.0797198E−02 |
| A8 = | 3.4407491E−02 | −8.4638647E−02 | 1.6997552E−01 | 1.7956477E−02 |
| A10 = | 2.9247021E−03 | 3.4760455E−01 | −4.0910624E−01 | −3.2918203E−02 |
| A12 = | −2.4177892E−02 | −5.2859135E−01 | 5.6207304E−01 | 3.0858444E−02 |

TABLE 4B-continued

| Aspheric Coefficients | | | | |
|---|---|---|---|---|
| A14 = | 1.7601051E−02 | 4.3599173E−01 | −4.0227137E−01 | −1.5097824E−02 |
| A16 = | −4.3820687E−03 | −1.4509441E−01 | 1.1682698E−01 | 3.0573792E−03 |
| Surface # | 8 | 9 | 10 | 11 |
| k = | −9.0000000E+01 | −1.1341700E+01 | −3.0359600E+01 | 2.8543500E+00 |
| A4 = | −3.3880568E−02 | −2.6710860E−02 | 7.7942252E−03 | 4.9529556E−02 |
| A6 = | 2.1347537E−03 | 2.1121177E−02 | 1.6552384E−02 | −2.1118893E−02 |
| A8 = | 4.5722347E−02 | −2.8487300E−03 | −3.4587197E−02 | −9.6658209E−03 |
| A10 = | −5.8272868E−02 | −3.2171235E−03 | 2.7602919E−02 | 1.0447965E−02 |
| A12 = | 3.9131463E−02 | 2.1556727E−03 | −1.1997343E−02 | −4.1202554E−03 |
| A14 = | −1.7129993E−02 | −7.0394481E−04 | 3.1665662E−03 | 9.5179773E−04 |
| A16 = | 5.1549601E−03 | 1.4448016E−04 | −5.2388019E−04 | −1.3509349E−04 |
| A18 = | −1.0606509E−03 | −1.8941480E−05 | 5.3263375E−05 | 1.0846049E−05 |
| A20 = | 1.4230186E−04 | 1.4484789E−06 | −3.0472502E−06 | −3.7335109E−07 |
| A22 = | −1.1180578E−05 | −4.9112128E−08 | 7.5090305E−08 | |
| A24 = | 3.8881161E−07 | | | |
| Surface # | 13 | 14 | 15 | 16 |
| k = | −4.8762800E+00 | −4.4406200E+01 | −3.4285900E+00 | −1.3431900E+00 |
| A4 = | 9.2739094E−02 | −1.4466711E−01 | 2.2221152E−02 | −1.0695925E−01 |
| A6 = | −6.9784493E−02 | 1.0962882E−01 | −1.8428264E−01 | −1.5376219E−02 |
| A8 = | 3.5484677E−02 | −5.5716508E−02 | 1.2100232E−01 | 1.6290404E−02 |
| A10 = | −1.3717093E−02 | 1.8961278E−02 | −4.1171136E−02 | −4.0601137E−03 |
| A12 = | 3.5849411E−03 | −4.5290471E−03 | 8.8097593E−03 | 5.1931941E−04 |
| A14 = | −5.9204943E−04 | 7.8395418E−04 | −1.2495591E−03 | −3.7959142E−05 |
| A16 = | 5.8883897E−05 | −9.6804017E−05 | 1.1690796E−04 | 1.5317089E−06 |
| A18 = | −3.2142096E−06 | 7.9707435E−06 | −6.8805211E−06 | −2.6797633E−08 |
| A20 = | 7.3874806E−08 | −3.8459071E−07 | 2.2865076E−07 | |
| A22 = | | 8.0999031E−09 | −3.2395882E−09 | |

In the 4th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 4th embodiment, so an explanation in this regard will not be provided again.

Moreover, these parameters can be calculated from Table 4A and Table 4B as the values and satisfy the conditions in Table 4C:

TABLE 4C

| 4th Embodiment | | | |
|---|---|---|---|
| f [mm] | 3.19 | f/f12 | 0.44 |
| Fno | 2.41 | f/f3456 | 0.70 |
| HFOV [degrees] | 44.0 | f12/R4 | −3.92 |
| (N3 + N6)/2 | 1.69 | f2/f56 | 0.57 |
| (V4 + V5)/(V3 + V6) | 3.05 | f2/R4 | −1.75 |
| (CT1 + T12 + CT2)/f | 0.63 | f56/f | 1.78 |
| T23/f | 1.51 | f5 × f6/(f × f) | −12.47 |
| T23/ImgH | 1.65 | f6/R11 + f6/R12 | 8.01 |
| (T34 + T56)/f | 0.11 | R6/R7 | 0.63 |
| (T34 + T56)/ΣAT | 0.06 | Y62/Y11 | 2.62 |
| (R3 − R4)/(R3 + R4) | 1.14 | Y62/Y22 | 2.94 |
| (R6 − R7)/(R6 + R7) | −0.23 | ATmax/f | 1.51 |
| (R11 − R12)/(R11 + R12) | −0.09 | SL/TL | 0.93 |
| f/(CT1 + CT2) | 2.55 | TL/ImgH | 4.35 |
| f2/f1 | −0.98 | TL/EPD | 9.64 |
| f/R1 | 0.38 | FOV [degrees] | 88.0 |
| f/R7 | 1.22 | | |

Figure 7B:
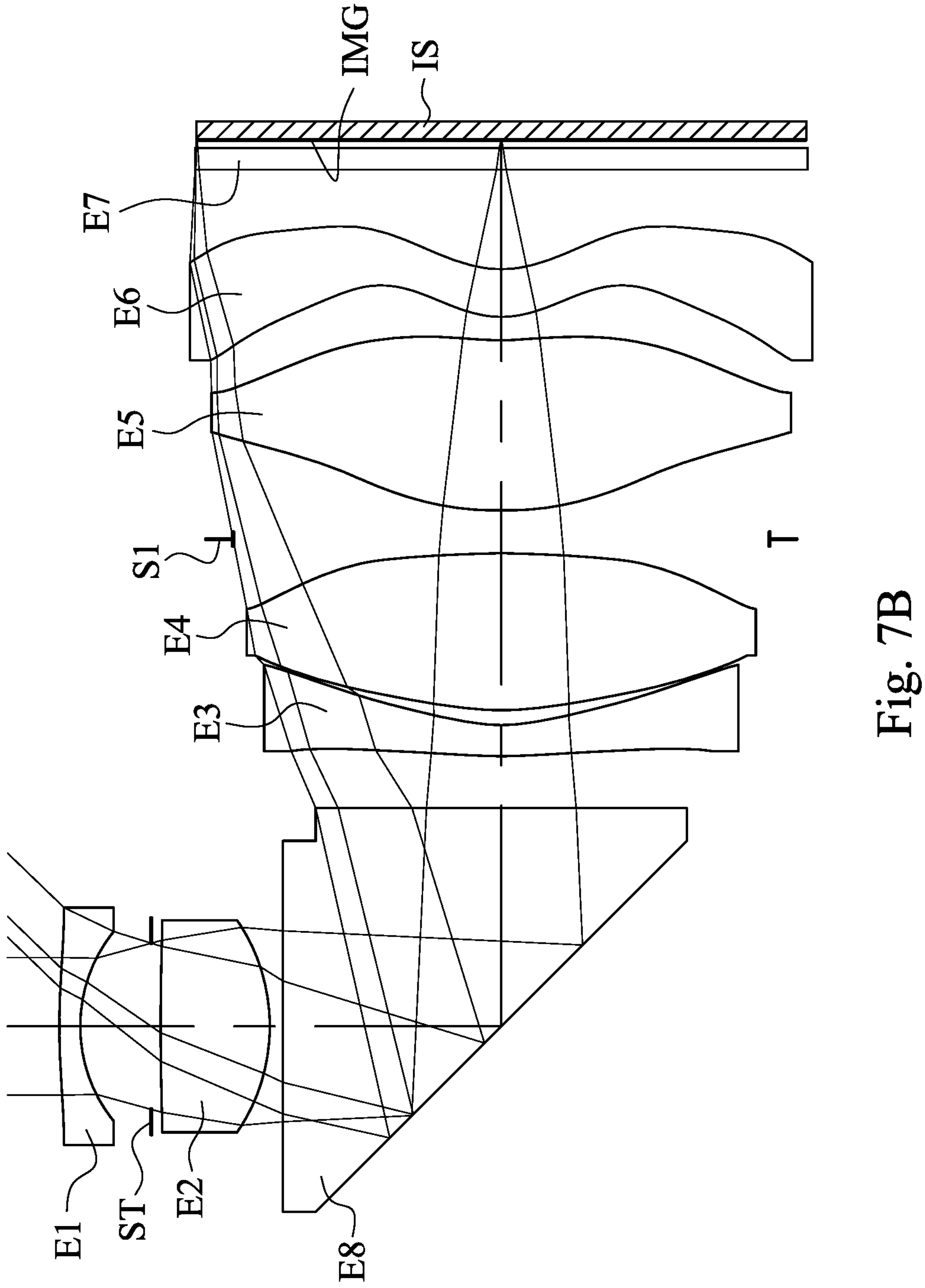
FIG. 7B is a schematic view of the imaging apparatus according to the 4th embodiment with another reflective element.

FIG. 7B is a schematic view of the imaging apparatus 4 according to the 4th embodiment with another reflective element E8. The difference between FIG. 7B and FIG. 7A is the reflective element E8 in FIG. 7B can fold the direction of the optical direction, which is favorable for being applied to electronic devices for different requirements.

5th Embodiment

Figure 9A:
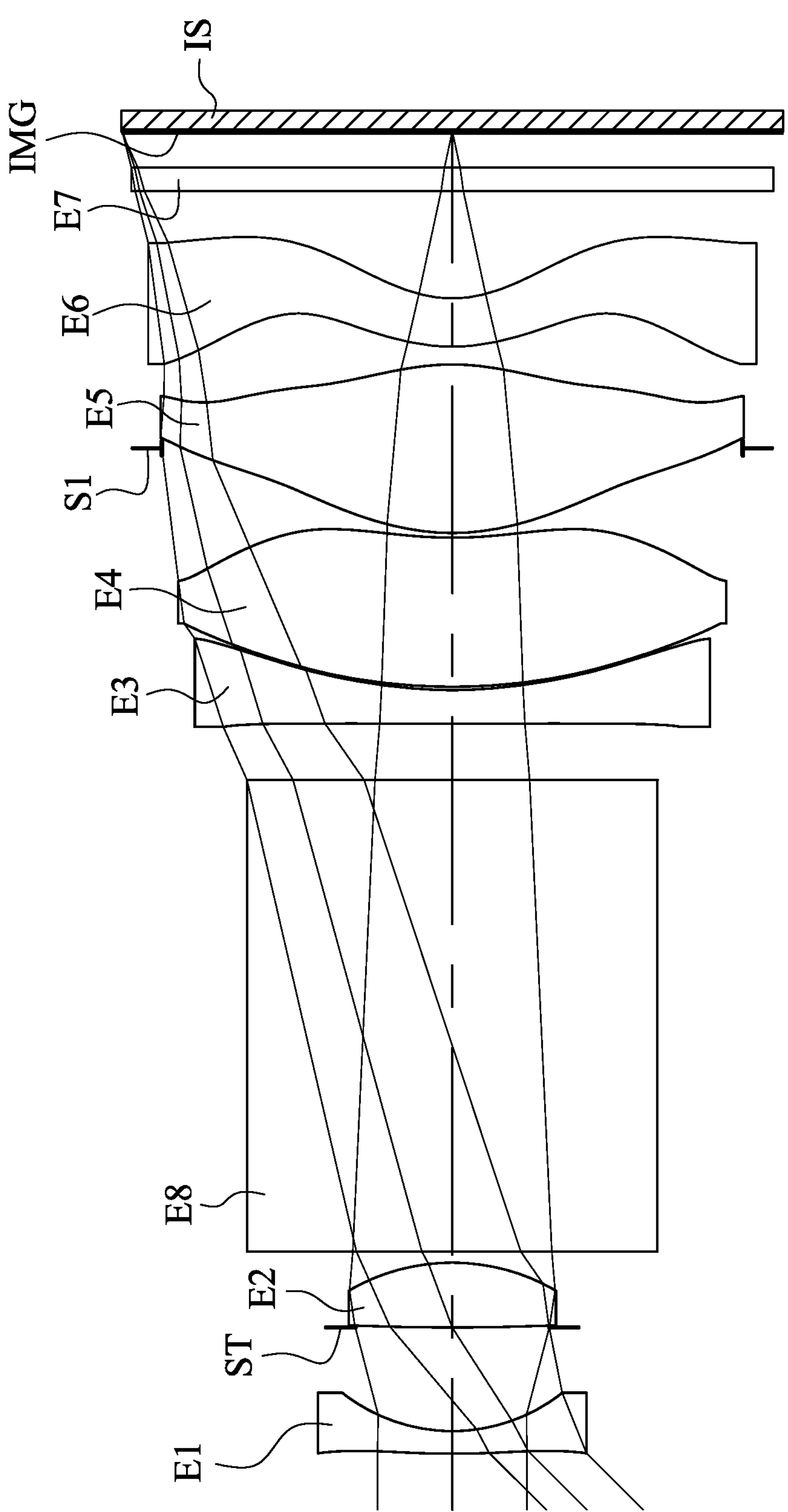
FIG. 9A is a schematic view of an imaging apparatus according to the 5th embodiment of the present disclosure.
Figure 10:
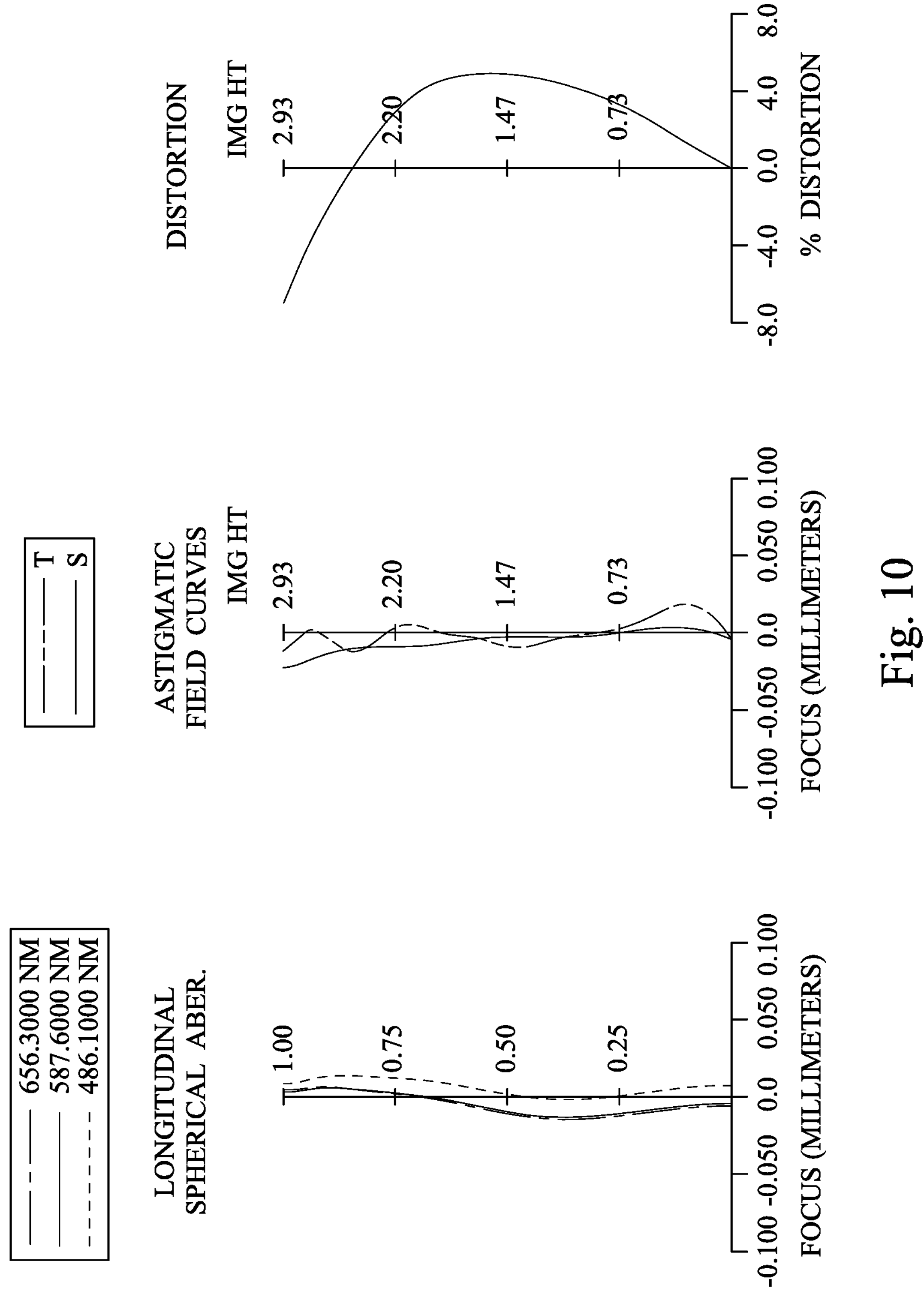
FIG. 10 shows spherical aberration curves, astigmatic field curves and a distortion curve of the imaging apparatus according to the 5th embodiment.

FIG. 9A is a schematic view of an imaging apparatus 5 according to the 5th embodiment of the present disclosure. FIG. 10 shows spherical aberration curves, astigmatic field curves and a distortion curve of the imaging apparatus 5 according to the 5th embodiment. In FIG. 9A, the imaging apparatus 5 includes an imaging system lens assembly (its reference numeral is omitted) and an image sensor IS. The imaging system lens assembly includes, in order from an object side to an image side along an optical path, a first lens element E1, an aperture stop ST, a second lens element E2, a reflective element E8, a third lens element E3, a fourth lens element E4, a stop S1, a fifth lens element E5, a sixth lens element E6, a filter E7 and an image surface IMG, wherein the image sensor IS is disposed on the image surface IMG of the imaging system lens assembly. The imaging system lens assembly includes six lens elements (E1, E2, E3, E4, E5, E6) without additional one or more lens elements inserted between the first lens element E1 and the sixth lens element E6.

The first lens element E1 with negative refractive power has an object-side surface being convex in a paraxial region thereof and an image-side surface being concave in a paraxial region thereof. The first lens element E1 is made of a plastic material, and has the object-side surface and the image-side surface being both aspheric. Furthermore, the object-side surface of the first lens element E1 includes one inflection point.

The second lens element E2 with positive refractive power has an object-side surface being convex in a paraxial region thereof and an image-side surface being convex in a paraxial region thereof. The second lens element E2 is made of a plastic material, and has the object-side surface and the image-side surface being both aspheric.

The third lens element E3 with negative refractive power has an object-side surface being convex in a paraxial region thereof and an image-side surface being concave in a paraxial region thereof. The third lens element E3 is made of a plastic material, and has the object-side surface and the image-side surface being both aspheric. Furthermore, the object-side surface of the third lens element E3 includes three inflection points, and the image-side surface of the third lens element E3 includes one inflection point.

The fourth lens element E4 with negative refractive power has an object-side surface being convex in a paraxial region thereof and an image-side surface being concave in a paraxial region thereof. The fourth lens element E4 is made of a plastic material, and has the object-side surface and the image-side surface being both aspheric. Furthermore, the image-side surface of the fourth lens element E4 includes two inflection points.

The fifth lens element E5 with positive refractive power has an object-side surface being convex in a paraxial region thereof and an image-side surface being convex in a paraxial region thereof. The fifth lens element E5 is made of a plastic material, and has the object-side surface and the image-side surface being both aspheric. Furthermore, the object-side surface of the fifth lens element E5 includes three inflection points, and the image-side surface of the fifth lens element E5 includes four inflection points.

The sixth lens element E6 with negative refractive power has an object-side surface being convex in a paraxial region thereof and an image-side surface being concave in a paraxial region thereof. The sixth lens element E6 is made of a plastic material, and has the object-side surface and the image-side surface being both aspheric. Furthermore, the object-side surface of the sixth lens element E6 includes two inflection points, and the image-side surface of the sixth lens element E6 includes two inflection points and includes two critical points in an off-axis region thereof.

According to the 5th embodiment, the reflective element E8 is a prism, which is made of glass material and disposed between the second lens element E2 and the third lens element E3.

The filter E7 is made of a glass material, which is located between the sixth lens element E6 and the image surface IMG in order, and will not affect the focal length of the imaging system lens assembly.

The detailed optical data of the 5th embodiment are shown in Table 5A and the aspheric surface data are shown in Table 5B below.

TABLE 5A

| 5th Embodiment<br>f = 3.14 mm, Fno = 2.36, HFOV = 45.1 deg. | | | | | | | | |
|---|---|---|---|---|---|---|---|---|
| Surface # | | Curvature Radius | | Thickness | Material | Index | Abbe # | Focal Length |
| 0 | Object | Plano | | Infinity | | | | |
| 1 | Lens 1 | 8.7184 | ASP | 0.200 | Plastic | 1.566 | 37.4 | −3.41 |
| 2 | | 1.5656 | ASP | 0.923 | | | | |
| 3 | Ape. Stop | Plano | | 0.000 | | | | |
| 4 | Lens 2 | 21.5263 | ASP | 0.577 | Plastic | 1.544 | 56.0 | 3.16 |
| 5 | | −1.8493 | ASP | 0.100 | | | | |
| 6 | Prism | Plano | | 4.200 | Glass | 1.803 | 46.8 | — |
| 7 | | Plano | | 0.500 | | | | |
| 8 | Lens 3 | 40.5041 | ASP | 0.300 | Plastic | 1.686 | 18.4 | −6.64 |
| 9 | | 4.0838 | ASP | 0.030 | | | | |
| 10 | Lens 4 | 5.7798 | ASP | 1.329 | Plastic | 1.544 | 56.0 | −30.23 |
| 11 | | 3.9302 | ASP | 0.795 | | | | |
| 12 | Stop | Plano | | −0.755 | | | | |
| 13 | Lens 5 | 2.0039 | ASP | 1.500 | Plastic | 1.544 | 56.0 | 2.22 |
| 14 | | −2.2278 | ASP | 0.160 | | | | |
| 15 | Lens 6 | 1.7416 | ASP | 0.430 | Plastic | 1.686 | 18.4 | −6.04 |
| 16 | | 1.1029 | ASP | 0.957 | | | | |
| 17 | Filter | Plano | | 0.210 | Glass | 1.517 | 64.2 | — |
| 18 | | Plano | | 0.319 | | | | |
| 19 | Image | Plano | | — | | | | |

Reference wavelength is 587.6 nm (d-line).
Effective radius of Surface 12 (stop S1) is 2.585 mm.

TABLE 5B

| Aspheric Coefficients | | | | |
|---|---|---|---|---|
| Surface # | 1 | 2 | 4 | 5 |
| k = | −3.2931900E+01 | −4.1469100E+00 | 1.8946800E+01 | −4.5659600E−01 |
| A4 = | −9.7509879E−03 | 1.3912160E−01 | −3.9768470E−04 | −1.3579456E−02 |
| A6 = | −4.3410797E−02 | −6.3571511E−02 | 1.9340196E−02 | 9.8472850E−03 |
| A8 = | 5.2015108E−02 | −2.8491174E−02 | −1.3821667E−01 | −5.0180652E−02 |
| A10 = | −5.8275399E−02 | 1.8027247E−01 | 4.2855966E−01 | 8.7123693E−02 |
| A12 = | 4.5475475E−02 | −2.6830046E−01 | −7.0101264E−01 | −9.0041093E−02 |
| A14 = | −1.9653132E−02 | 2.1213703E−01 | 5.8431848E−01 | 4.9225940E−02 |
| A16 = | 3.4251365E−03 | −6.5404170E−02 | −1.9367259E−01 | −1.0319229E−02 |
| Surface # | 8 | 9 | 10 | 11 |
| k = | −9.0000000E+01 | −5.9317200E+00 | −4.7576100E+00 | −8.9996900E+01 |
| A4 = | −2.6654150E−02 | −2.3194267E−02 | 2.3311389E−02 | 6.9218339E−02 |

TABLE 5B-continued

| Aspheric Coefficients | | | | |
|---|---|---|---|---|
| A6 = | 2.5865796E−02 | 3.1788965E−02 | −2.8389085E−02 | −1.0677887E−01 |
| A8 = | −7.8141747E−03 | −2.2091146E−02 | 2.7842347E−02 | 5.4570371E−02 |
| A10 = | −9.2471749E−03 | 1.0766429E−02 | −1.7342149E−02 | −1.6684337E−02 |
| A12 = | 1.3075105E−02 | −4.1093410E−03 | 6.8805911E−03 | 3.3909761E−03 |
| A14 = | −8.2060708E−03 | 1.2154343E−03 | −1.7823566E−03 | −4.4853436E−04 |
| A16 = | 3.1487003E−03 | −2.5919174E−04 | 3.0162678E−04 | 3.3469489E−05 |
| A18 = | −7.8051576E−04 | 3.6317578E−05 | −3.2206816E−05 | −8.4700815E−07 |
| A20 = | 1.2242915E−04 | −2.9444335E−06 | 1.9732032E−06 | −2.2333825E−08 |
| A22 = | −1.1071275E−05 | 1.0373436E−07 | −5.3001904E−08 | |
| A24 = | 4.3977557E−07 | | | |
| Surface # | 13 | 14 | 15 | 16 |
| k = | −1.4707900E+01 | −1.5466100E+01 | −1.5823900E+00 | −1.4178200E+00 |
| A4 = | 1.1088098E−01 | −1.0985139E−01 | −7.0861889E−02 | −5.0492094E−02 |
| A6 = | −8.1680784E−02 | 2.1108853E−01 | 8.2273836E−02 | −4.5016179E−02 |
| A8 = | 3.9091732E−02 | −1.5965752E−01 | −1.0232548E−01 | 2.8150909E−02 |
| A10 = | −1.4127835E−02 | 6.9884574E−02 | 5.6862427E−02 | −7.4749631E−03 |
| A12 = | 3.5207066E−03 | −1.9988397E−02 | −1.7813222E−02 | 1.1052455E−03 |
| A14 = | −5.5787288E−04 | 3.8561675E−03 | 3.4616328E−03 | −9.3233757E−05 |
| A16 = | 5.3141849E−05 | −4.9385008E−04 | −4.2659011E−04 | 4.1740645E−06 |
| A18 = | −2.7720431E−06 | 3.9913950E−05 | 3.2445631E−05 | −7.6726504E−08 |
| A20 = | 6.0870015E−08 | −1.8317203E−06 | −1.3885837E−06 | |
| A22 = | | 3.6233940E−08 | 2.5555759E−08 | |

In the 5th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 5th embodiment, so an explanation in this regard will not be provided again.

Moreover, these parameters can be calculated from Table 5A and Table 5B as the values and satisfy the conditions in Table 5C:

TABLE 5C

| 5th Embodiment | | | |
|---|---|---|---|
| f [mm] | 3.14 | f/f12 | 0.43 |
| Fno | 2.36 | f/f3456 | 0.70 |
| HFOV [degrees] | 45.1 | f12/R4 | −3.90 |
| (N3 + N6)/2 | 1.69 | f2/f56 | 1.30 |
| (V4 + V5)/(V3 + V6) | 3.05 | f2/R4 | −1.71 |
| (CT1 + T12 + CT2)/f | 0.54 | f56/f | 0.77 |
| T23/f | 1.53 | f5 × f6/(f × f) | −1.36 |
| T23/ImgH | 1.64 | f6/R11 + f6/R12 | −8.94 |
| (T34 + T56)/f | 0.06 | R6/R7 | 0.71 |
| (T34 + T56)/ΣAT | 0.03 | Y62/Y11 | 2.26 |
| (R3 − R4)/(R3 + R4) | 1.19 | Y62/Y22 | 2.93 |
| (R6 − R7)/(R6 + R7) | −0.17 | ATmax/f | 1.53 |
| (R11 − R12)/(R11 + R12) | 0.22 | SL/TL | 0.90 |
| f/(CT1 + CT2) | 4.04 | TL/ImgH | 4.01 |
| f2/f1 | −0.93 | TL/EPD | 8.86 |
| f/R1 | 0.36 | FOV [degrees] | 90.2 |
| f/R7 | 0.54 | | |

Figure 9B:
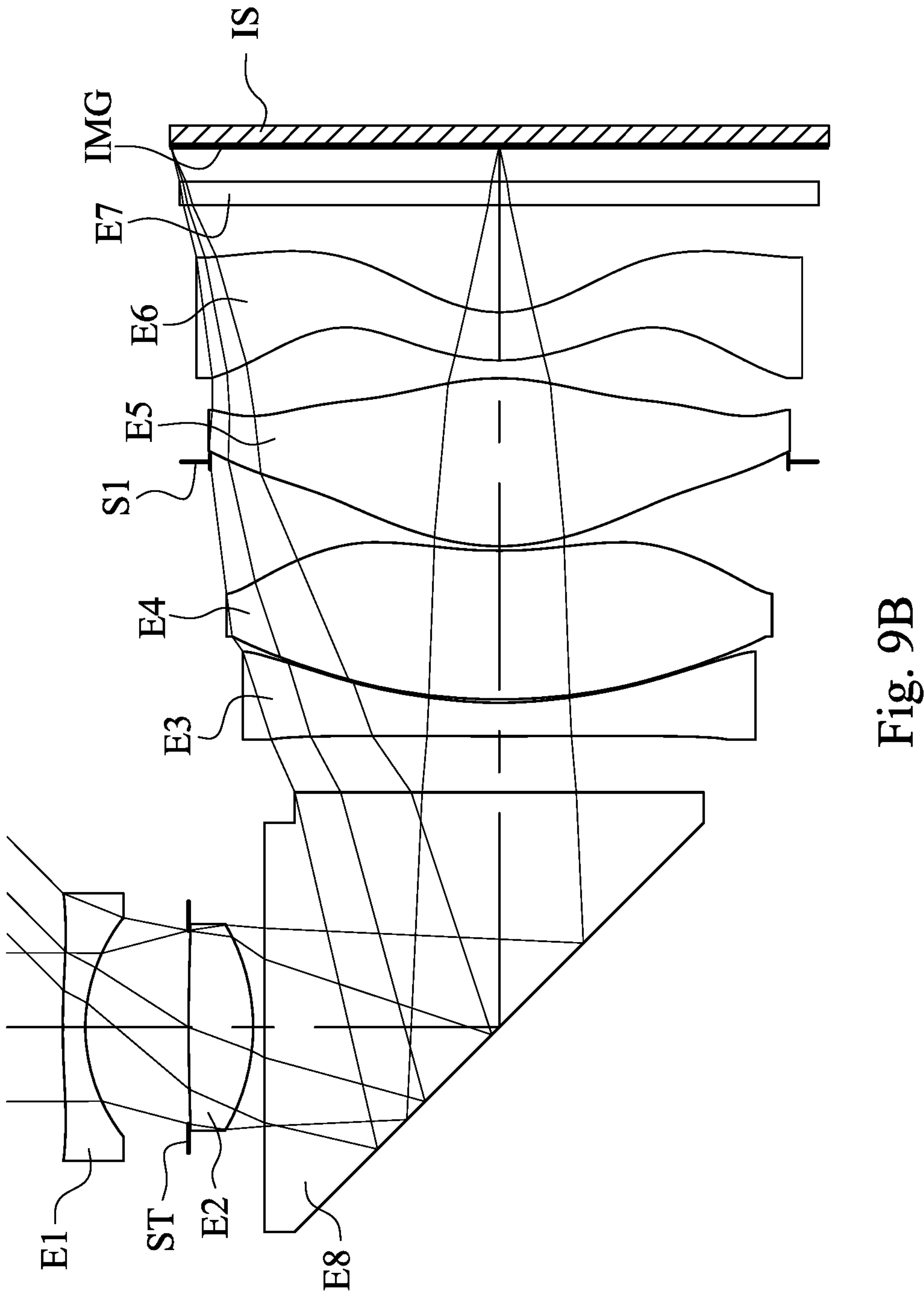
FIG. 9B is a schematic view of the imaging apparatus according to the 5th embodiment with another reflective element.

FIG. 9B is a schematic view of the imaging apparatus 5 according to the 5th embodiment with another reflective element E8. The difference between FIG. 9B and FIG. 9A is the reflective element E8 in FIG. 9B can fold the direction of the optical direction, which is favorable for being applied to electronic devices for different requirements.

6th Embodiment

Figure 11A:
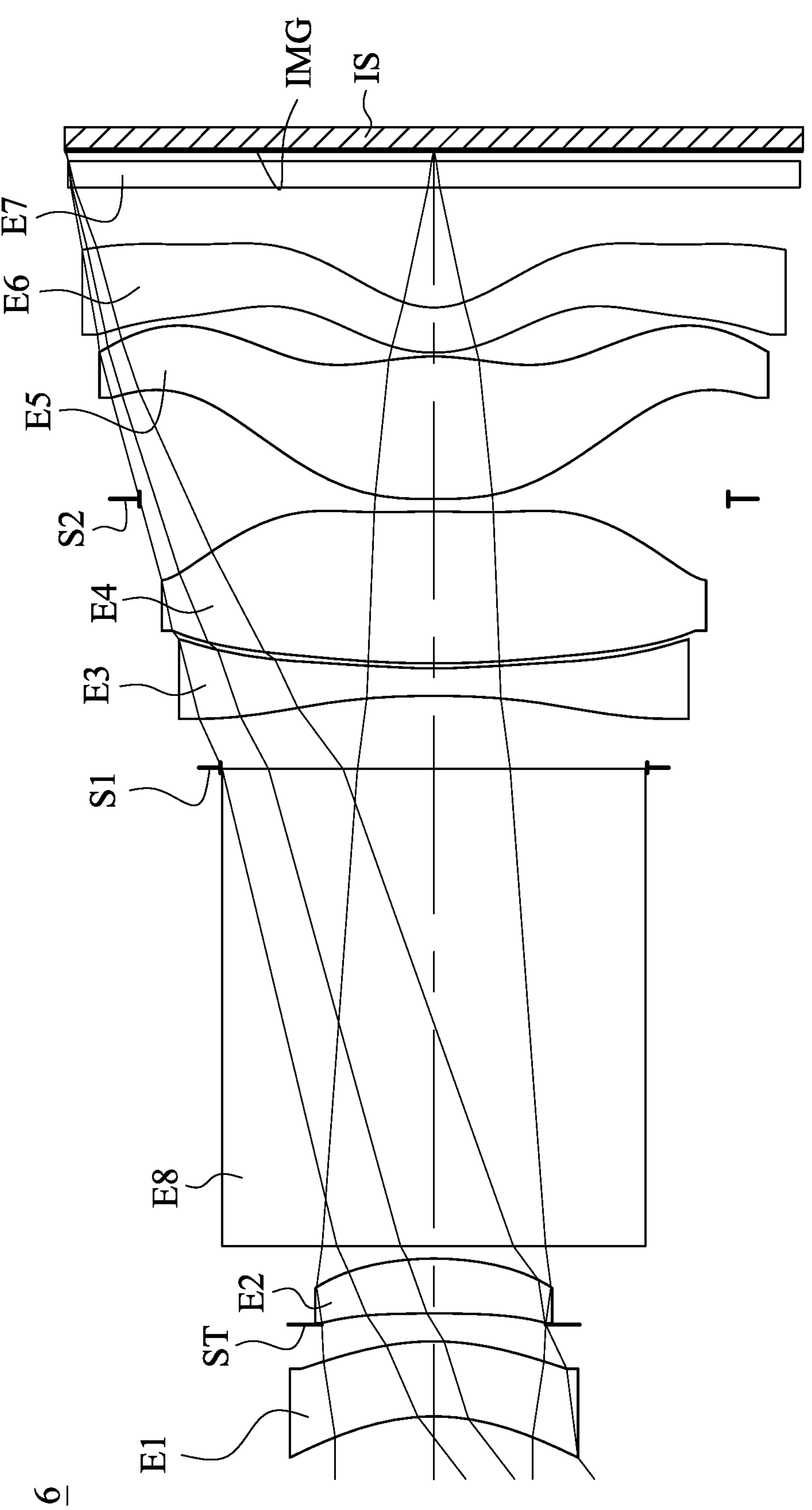
FIG. 11A is a schematic view of an imaging apparatus according to the 6th embodiment of the present disclosure.
Figure 12:
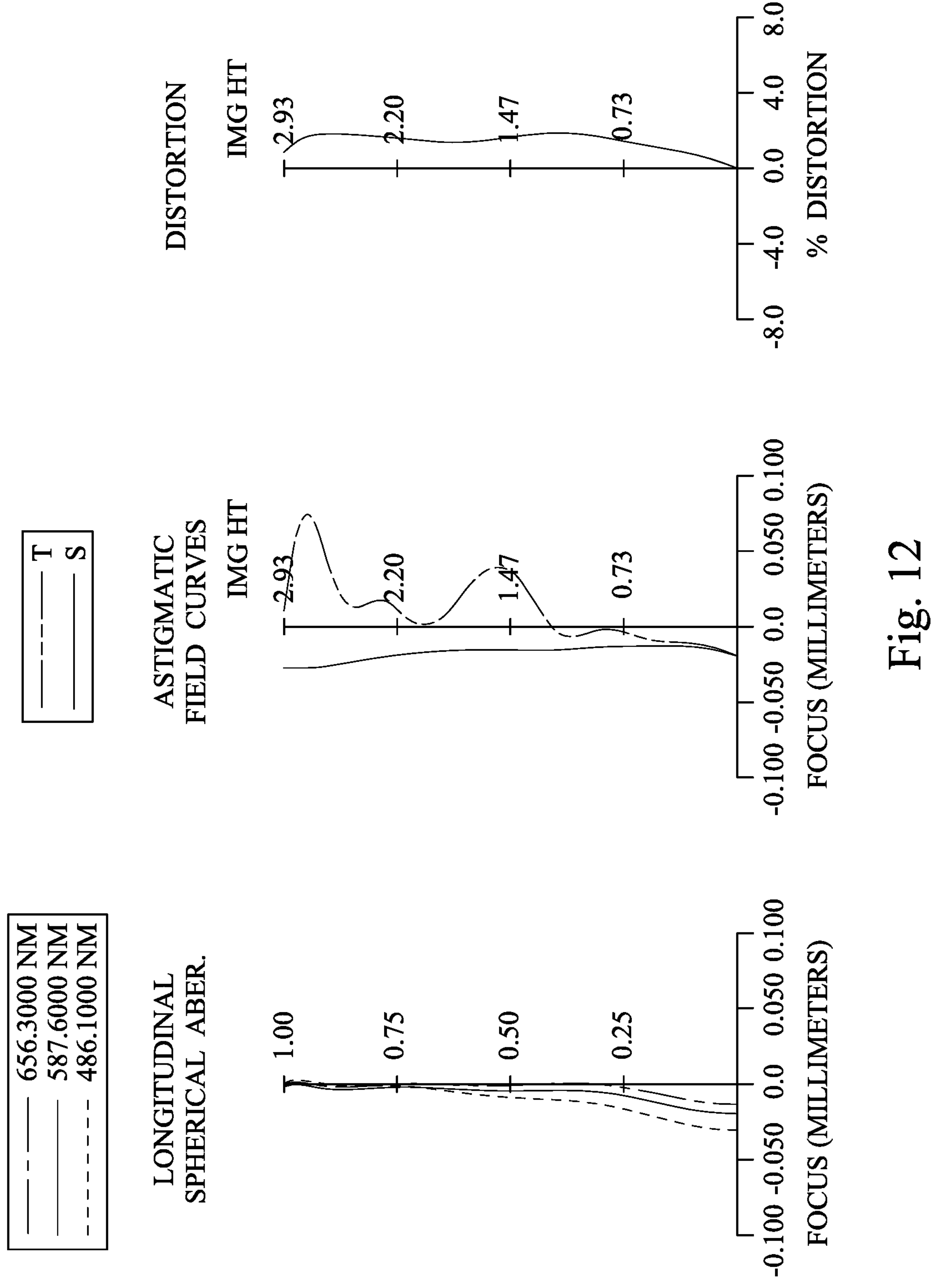
FIG. 12 shows spherical aberration curves, astigmatic field curves and a distortion curve of the imaging apparatus according to the 6th embodiment.

FIG. 11A is a schematic view of an imaging apparatus 6 according to the 6th embodiment of the present disclosure. FIG. 12 shows spherical aberration curves, astigmatic field curves and a distortion curve of the imaging apparatus 6 according to the 6th embodiment. In FIG. 11A, the imaging apparatus 6 includes an imaging system lens assembly (its reference numeral is omitted) and an image sensor IS. The imaging system lens assembly includes, in order from an object side to an image side along an optical path, a first lens element E1, an aperture stop ST, a second lens element E2, a reflective element E8, a stop S1, a third lens element E3, a fourth lens element E4, a stop S2, a fifth lens element E5, a sixth lens element E6, a filter E7 and an image surface IMG, wherein the image sensor IS is disposed on the image surface IMG of the imaging system lens assembly. The imaging system lens assembly includes six lens elements (E1, E2, E3, E4, E5, E6) without additional one or more lens elements inserted between the first lens element E1 and the sixth lens element E6.

The first lens element E1 with negative refractive power has an object-side surface being concave in a paraxial region thereof and an image-side surface being convex in a paraxial region thereof. The first lens element E1 is made of a plastic material, and has the object-side surface and the image-side surface being both aspheric. Furthermore, the image-side surface of the first lens element E1 includes one inflection point.

The second lens element E2 with positive refractive power has an object-side surface being concave in a paraxial region thereof and an image-side surface being convex in a paraxial region thereof. The second lens element E2 is made of a plastic material, and has the object-side surface and the image-side surface being both aspheric.

The third lens element E3 with negative refractive power has an object-side surface being concave in a paraxial region thereof and an image-side surface being concave in a paraxial region thereof. The third lens element E3 is made of a plastic material, and has the object-side surface and the image-side surface being both aspheric. Furthermore, the object-side surface of the third lens element E3 includes one inflection point, and the image-side surface of the third lens element E3 includes three inflection points.

The fourth lens element E4 with positive refractive power has an object-side surface being convex in a paraxial region thereof and an image-side surface being convex in a paraxial region thereof. The fourth lens element E4 is made of a plastic material, and has the object-side surface and the image-side surface being both aspheric. Furthermore, the object-side surface of the fourth lens element E4 includes two inflection points, and the image-side surface of the fourth lens element E4 includes three inflection points.

The fifth lens element E5 with positive refractive power has an object-side surface being convex in a paraxial region thereof and an image-side surface being convex in a paraxial region thereof. The fifth lens element E5 is made of a plastic material, and has the object-side surface and the image-side surface being both aspheric. Furthermore, the object-side surface of the fifth lens element E5 includes two inflection points, and the image-side surface of the fifth lens element E5 includes three inflection points.

The sixth lens element E6 with negative refractive power has an object-side surface being convex in a paraxial region thereof and an image-side surface being concave in a paraxial region thereof. The sixth lens element E6 is made of a plastic material, and has the object-side surface and the image-side surface being both aspheric. Furthermore, the object-side surface of the sixth lens element E6 includes four inflection points, and the image-side surface of the sixth lens element E6 includes three inflection points and includes three critical points in an off-axis region thereof.

According to the 6th embodiment, the reflective element E8 is a prism, which is made of glass material and disposed between the second lens element E2 and the third lens element E3.

The filter E7 is made of a glass material, which is located between the sixth lens element E6 and the image surface IMG in order, and will not affect the focal length of the imaging system lens assembly.

The detailed optical data of the 6th embodiment are shown in Table 6A and the aspheric surface data are shown in Table 6B below.

TABLE 6A

| 6th Embodiment<br>f = 3.77 mm, Fno = 2.40, HFOV = 37.6 deg. | | | | | | | | |
|---|---|---|---|---|---|---|---|---|
| Surface # | | Curvature Radius | | Thickness | Material | Index | Abbe # | Focal Length |
| 0 | Object | Plano | | Infinity | | | | |
| 1 | Lens 1 | −1.7570 | ASP | 0.598 | Plastic | 1.639 | 23.5 | −51.84 |
| 2 | | −2.1016 | ASP | 0.133 | | | | |
| 3 | Ape. Stop | Plano | | 0.090 | | | | |
| 4 | Lens 2 | −9.8681 | ASP | 0.436 | Plastic | 1.544 | 56.0 | 5.90 |
| 5 | | −2.4606 | ASP | 0.100 | | | | |
| 6 | Prism | Plano | | 3.800 | Glass | 1.772 | 49.6 | — |
| 7 | | Plano | | 0.010 | | | | |
| 8 | Stop | Plano | | 0.571 | | | | |
| 9 | Lens 3 | −11.4947 | ASP | 0.220 | Plastic | 1.686 | 18.4 | −5.30 |
| 10 | | 5.3646 | ASP | 0.041 | | | | |
| 11 | Lens 4 | 11.9901 | ASP | 1.208 | Plastic | 1.544 | 56.0 | 8.00 |
| 12 | | −6.5836 | ASP | 0.100 | | | | |
| 13 | Stop | Plano | | 0.000 | | | | |
| 14 | Lens 5 | 6.5187 | ASP | 1.135 | Plastic | 1.544 | 56.0 | 2.93 |
| 15 | | −1.9780 | ASP | 0.030 | | | | |
| 16 | Lens 6 | 1.0474 | ASP | 0.360 | Plastic | 1.686 | 18.4 | −4.38 |
| 17 | | 0.6681 | ASP | 0.957 | | | | |
| 18 | Filter | Plano | | 0.210 | Glass | 1.517 | 64.2 | — |
| 19 | | Plano | | 0.086 | | | | |
| 20 | Image | Plano | | — | | | | |

Reference wavelength is 587.6 nm (d-line).
Effective radius of Surface 8 (stop S1) is 1.700 mm.
Effective radius of Surface 13 (stop S2) is 2.345 mm.

TABLE 6B

| Aspheric Coefficients | | | | |
|---|---|---|---|---|
| Surface # | 1 | 2 | 4 | 5 |
| k = | −2.9237400E+00 | −3.8519300E+00 | 9.0000000E+01 | 3.5685000E+00 |
| A4 = | −1.4951606E−02 | 9.3517140E−03 | −1.4617771E−02 | −4.6097512E−03 |
| A6 = | 9.0095814E−03 | −1.9155051E−02 | −3.7201597E−02 | −3.6588053E−02 |
| A8 = | −1.2790110E−03 | 3.9235735E−02 | 1.9454206E−02 | 1.3177636E−01 |
| A10 = | −3,1290314E−03 | −3.7510798E−02 | −8.3203293E−03 | −2.2673754E−01 |
| A12 = | 3.4386400E−03 | 1.8519931E−02 | −2.5064471E−02 | 2.0021170E−01 |
| A14 = | −8.3674977E−04 | −2.4715221E−03 | 2.4527618E−02 | −8.0932511E−02 |
| A16 = | | | −5.4882819E−03 | 1.1793220E−02 |
| Surface# | 9 | 10 | 11 | 12 |
| k = | 4.7445700E+00 | −5.7022800E+01 | −3.9958000E+01 | 1.3001800E+00 |
| A4 = | −1.1885890E−01 | −5.7181477E−02 | 6.8780707E−02 | 3.3044620E−01 |
| A6 = | 1.3409295E−01 | 5.9495324E−02 | −1.2482548E−01 | −4.5171859E−01 |
| A8 = | 3.4708685E−02 | 5.5868889E−02 | 1.7516378E−01 | 2.7468655E−01 |
| A10 = | −3.2219199E−01 | −2.3907545E−01 | −2.2533013E−01 | −8.9801357E−02 |
| A12 = | 4.8588987E−01 | 3.0792828E−01 | 2.0904085E−01 | 1.0050536E−02 |
| A14 = | −4.0732117E−01 | −2.1992954E−01 | −1.2697587E−01 | 4.2296383E−03 |

TABLE 6B-continued

| Aspheric Coefficients | | | | |
|---|---|---|---|---|
| A16 = | 2.1984328E−01 | 9.8833812E−02 | 5.0599602E−02 | −2.2338829E−03 |
| A18 = | −8.0094978E−02 | −2.9247033E−02 | −1.3361448E−02 | 5.0100264E−04 |
| A20 = | 1.9924284E−02 | 5.7489021E−03 | 2.3199017E−03 | −6.4136065E−05 |
| A22 = | −3.3377455E−03 | −7.3472716E−04 | −2.5480785E−04 | 4.6540357E−06 |
| A24 = | 3.6016102E−04 | 5.7437591E−05 | 1.6055116E−05 | −1.5272943E−07 |
| A26 = | −2.2602549E−05 | −2.3908179E−06 | −4.4209201E−07 | |
| A28 = | 6.2659372E−07 | 3.6422863E−08 | | |
| Surface # | 14 | 15 | 16 | 17 |
| k = | 3.6502900E+00 | −1.0925400E+01 | −4.1445400E+00 | −1.7323000E+00 |
| A4 = | 3.8586338E−01 | 9.2195510E−02 | 1,7098001E−01 | −2.0442770E−01 |
| A6 = | −4.0775479E−01 | 1.5782302E−01 | −2.9428777E−01 | 6.0929946E−02 |
| A8 = | 2.8808480E−01 | −1.8910463E−01 | 1.6437976E−01 | −1.0052597E−02 |
| A10 = | −1.4197898E−01 | 9.5616557E−02 | −5.0198973E−02 | −7.2672274E−04 |
| A12 = | 4.6969810E−02 | −2.8517619E−02 | 9.5242274E−03 | 1.5915078E−03 |
| A14 = | −9.9855762E−03 | 5.4110314E−03 | −1.1626412E−03 | −6.2915553E−04 |
| A16 = | 1.1994941E−03 | −6.5997718E−04 | 8.9317005E−05 | 1.2867199E−04 |
| A18 = | −3.2230475E−05 | 5.0082819E−05 | −3.9340477E−06 | −1.5248744E−05 |
| A20 = | −1.2675231E−05 | −2.1493403E−06 | 7.5638806E−08 | 1.0496762E−06 |
| A22 = | 1.9695531E−06 | 3.9787628E−08 | | −3.8653427E−08 |
| A24 = | −1.2297973E−07 | | | 5.8043058E−10 |
| A26 = | 2.9634541E−09 | | | |

In the 6th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 6th embodiment, so an explanation in this regard will not be provided again.

Moreover, these parameters can be calculated from Table 6A and Table 6B as the values and satisfy the conditions in Table 6C:

TABLE 6C

| 6th Embodiment | | | |
|---|---|---|---|
| f [mm] | 3.77 | f/f12 | 0.66 |
| Fno | 2.40 | f/f3456 | 0.66 |
| HFOV [degrees] | 37.6 | f12/R4 | −2.33 |
| (N3 + N6)/2 | 1.69 | f2/f56 | 1.21 |
| (V4 + V5)/(V3 + V6) | 3.05 | f2/R4 | −2.40 |
| (CT1 + T12 + CT2)/f | 0.33 | f56/f | 1.30 |
| T23/f | 1.19 | f5 × f6/(f × f) | −0.90 |
| T23/ImgH | 1.53 | f6/R11 + f6/R12 | −10.74 |
| (T34 + T56)/f | 0.02 | R6/R7 | 0.45 |
| (T34 + T56)/ΣAT | 0.01 | Y62/Y11 | 2.44 |
| (R3 − R4)/(R3 + R4) | 0.60 | Y62/Y22 | 2.97 |
| (R6 − R7)/(R6 + R7) | −0.38 | ATmax/f | 1.19 |
| (R11 − R12)/(R11 + R12) | 0.22 | SL/TL | 0.93 |
| f/(CT1 + CT2) | 3.65 | TL/ImgH | 3.44 |
| f2/f1 | −0.11 | TL/EPD | 6.42 |
| f/R1 | −2.15 | FOV [degrees] | 75.2 |
| f/R7 | 0.31 | | |

Figure 11B:
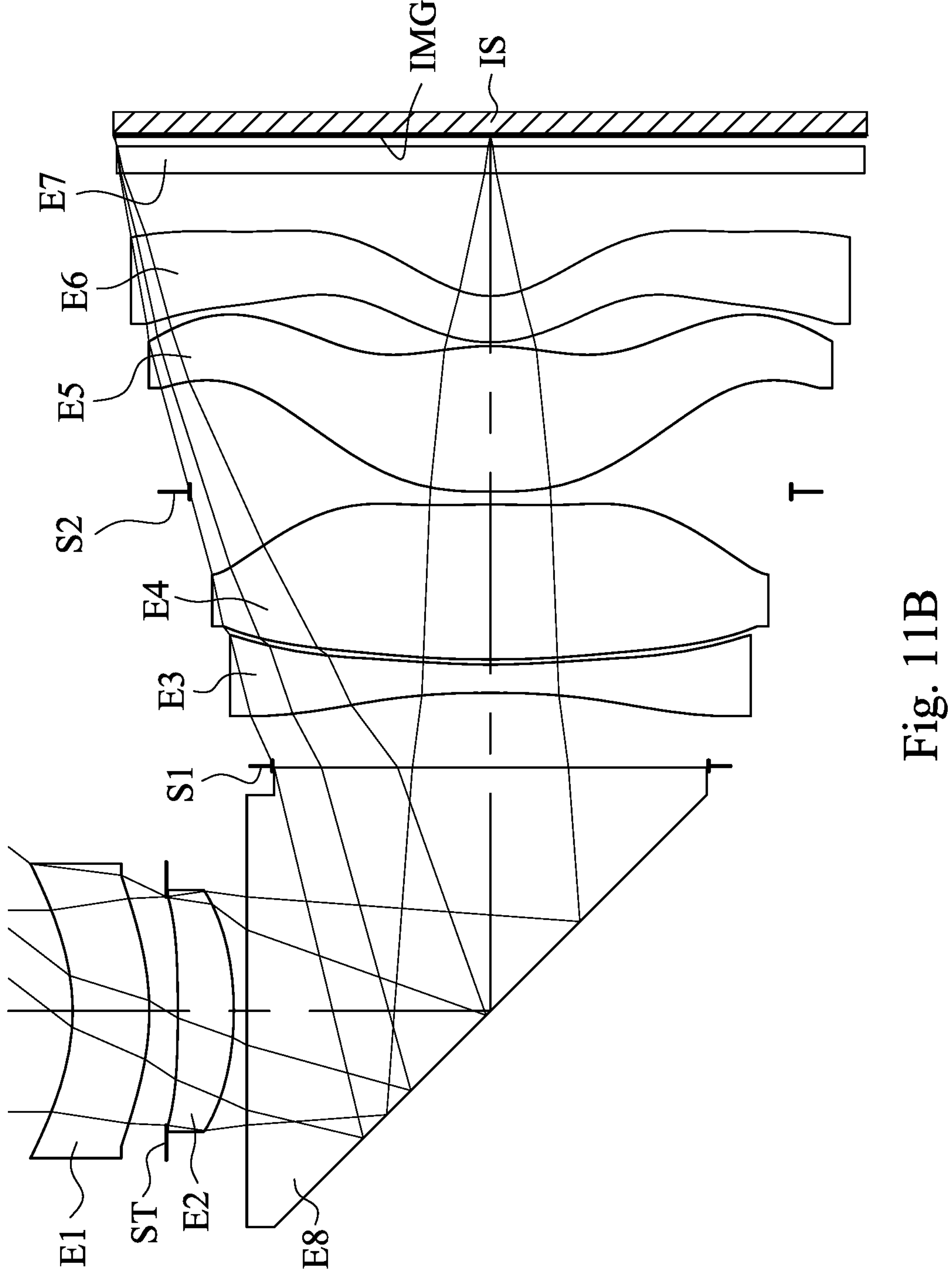
FIG. 11B is a schematic view of the imaging apparatus according to the 6th embodiment with another reflective element.

FIG. 11B is a schematic view of the imaging apparatus according to the 6th embodiment with another reflective element E8. The difference between FIG. 11B and FIG. 11A is the reflective element E8 in FIG. 11B can fold the direction of the optical direction, which is favorable for being applied to electronic devices for different requirements.

7th Embodiment

Figure 13A:
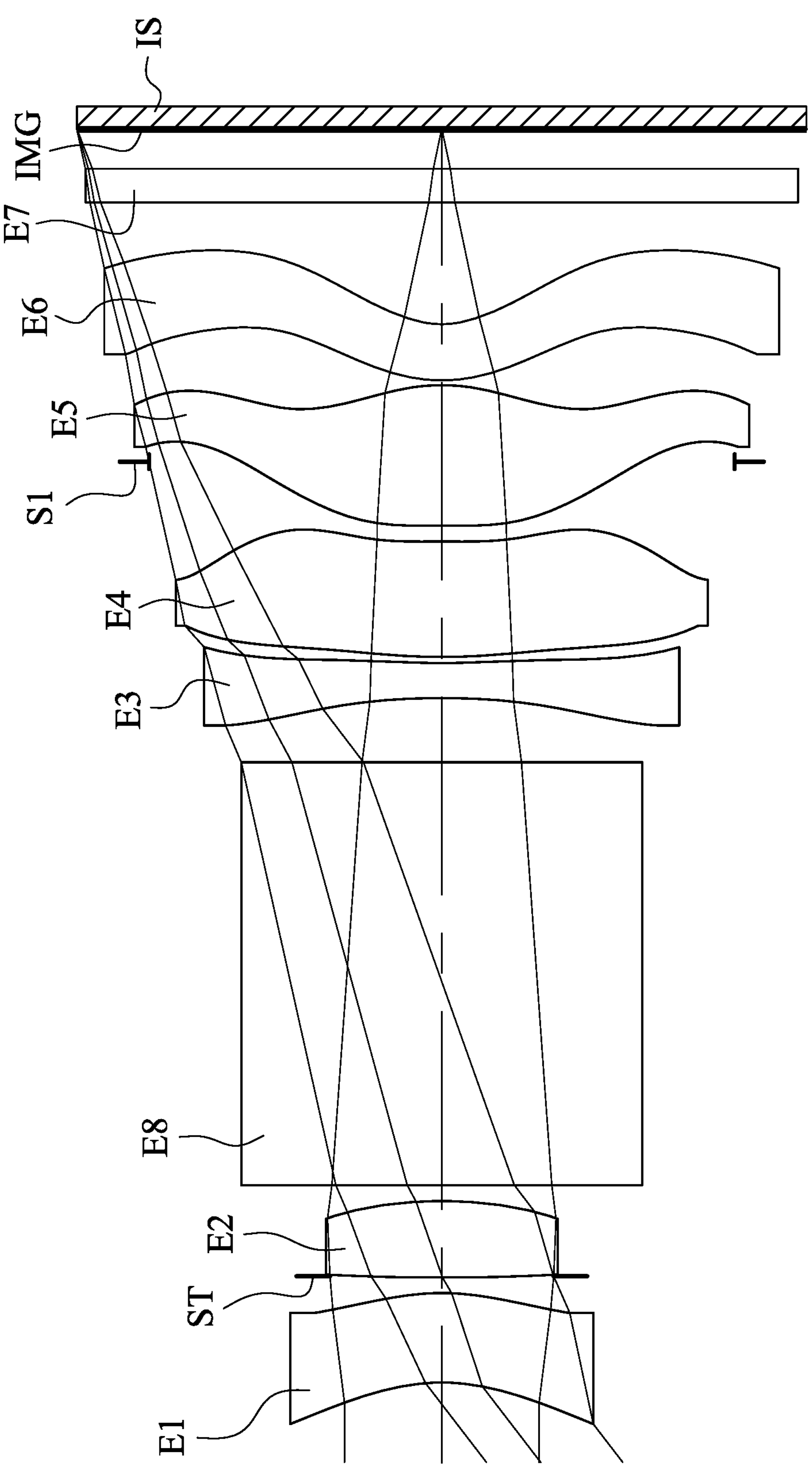
FIG. 13A is a schematic view of an imaging apparatus according to the 7th embodiment of the present disclosure.
Figure 14:
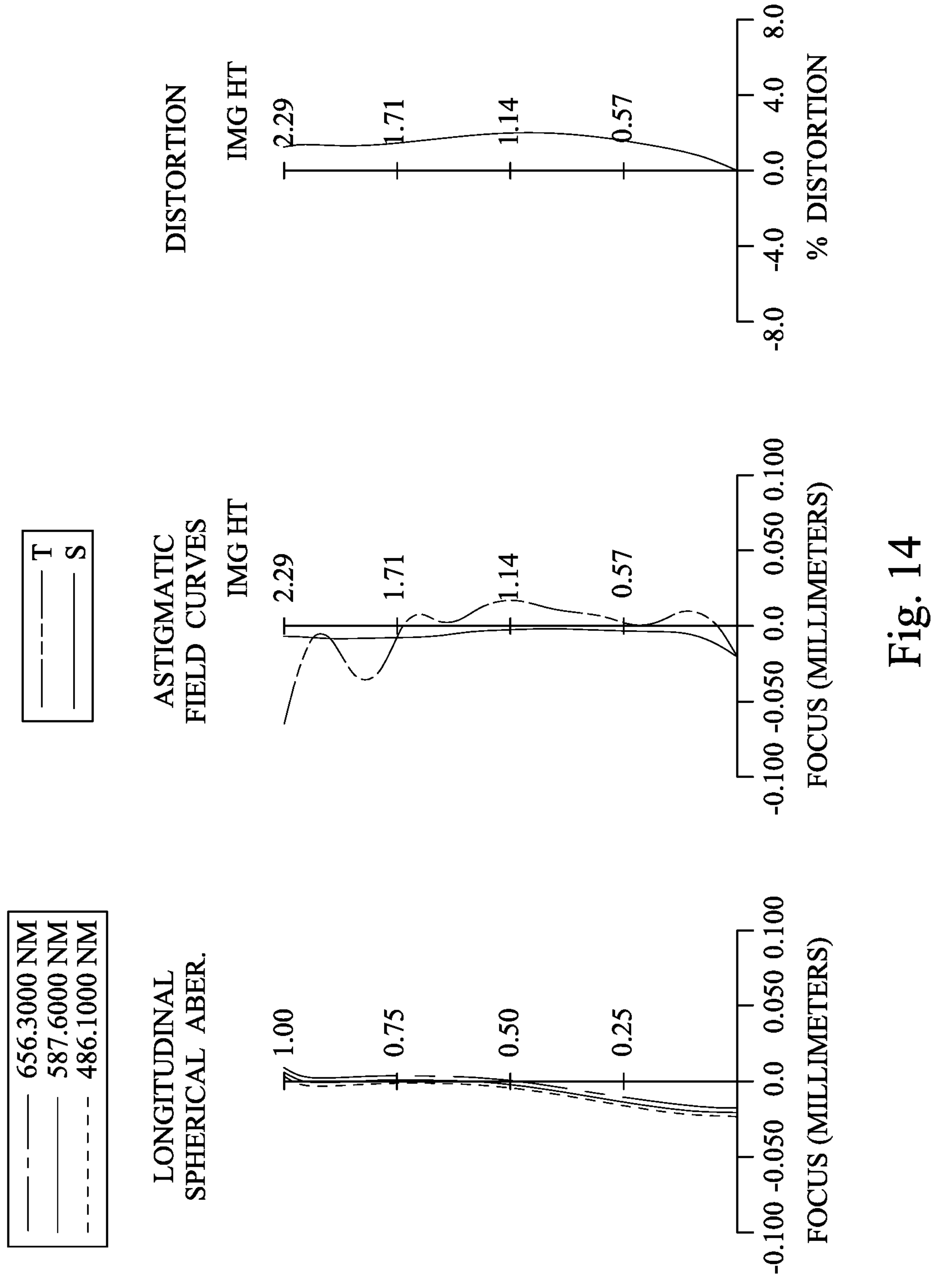
FIG. 14 shows spherical aberration curves, astigmatic field curves and a distortion curve of the imaging apparatus according to the 7th embodiment.

FIG. 13A is a schematic view of an imaging apparatus 7 according to the 7th embodiment of the present disclosure. FIG. 14 shows spherical aberration curves, astigmatic field curves and a distortion curve of the imaging apparatus 7 according to the 7th embodiment. In FIG. 13A, the imaging apparatus 7 includes an imaging system lens assembly (its reference numeral is omitted) and an image sensor IS. The imaging system lens assembly includes, in order from an object side to an image side along an optical path, a first lens element E1, an aperture stop ST, a second lens element E2, a reflective element E8, a third lens element E3, a fourth lens element E4, a stop S1, a fifth lens element E5, a sixth lens element E6, a filter E7 and an image surface IMG, wherein the image sensor IS is disposed on the image surface IMG of the imaging system lens assembly. The imaging system lens assembly includes six lens elements (E1, E2, E3, E4, E5, E6) without additional one or more lens elements inserted between the first lens element E1 and the sixth lens element E6.

The first lens element E1 with negative refractive power has an object-side surface being concave in a paraxial region thereof and an image-side surface being convex in a paraxial region thereof. The first lens element E1 is made of a plastic material, and has the object-side surface and the image-side surface being both aspheric. Furthermore, the object-side surface of the first lens element E1 includes one inflection point, and the image-side surface of the first lens element E1 includes one inflection point.

The second lens element E2 with positive refractive power has an object-side surface being concave in a paraxial region thereof and an image-side surface being convex in a paraxial region thereof. The second lens element E2 is made of a plastic material, and has the object-side surface and the image-side surface being both aspheric. Furthermore, the object-side surface of the second lens element E2 includes two inflection points.

The third lens element E3 with negative refractive power has an object-side surface being concave in a paraxial region thereof and an image-side surface being concave in a paraxial region thereof. The third lens element E3 is made of a plastic material, and has the object-side surface and the image-side surface being both aspheric. Furthermore, the object-side surface of the third lens element E3 includes one inflection point, and the image-side surface of the third lens element E3 includes two inflection points.

The fourth lens element E4 with positive refractive power has an object-side surface being convex in a paraxial region thereof and an image-side surface being convex in a paraxial region thereof. The fourth lens element E4 is made of a plastic material, and has the object-side surface and the image-side surface being both aspheric. Furthermore, the object-side surface of the fourth lens element E4 includes six inflection points, and the image-side surface of the fourth lens element E4 includes three inflection points.

The fifth lens element E5 with positive refractive power has an object-side surface being concave in a paraxial region thereof and an image-side surface being convex in a paraxial region thereof. The fifth lens element E5 is made of a plastic material, and has the object-side surface and the image-side surface being both aspheric. Furthermore, the object-side surface of the fifth lens element E5 includes two inflection points, and the image-side surface of the fifth lens element E5 includes three inflection points.

The sixth lens element E6 with negative refractive power has an object-side surface being convex in a paraxial region thereof and an image-side surface being concave in a paraxial region thereof. The sixth lens element E6 is made of a plastic material, and has the object-side surface and the image-side surface being both aspheric. Furthermore, the object-side surface of the sixth lens element E6 includes two inflection points, and the image-side surface of the sixth lens element E6 includes two inflection points and includes one critical point in an off-axis region thereof.

According to the 7th embodiment, the reflective element E8 is a prism, which is made of glass material and disposed between the second lens element E2 and the third lens element E3.

The filter E7 is made of a glass material, which is located between the sixth lens element E6 and the image surface MG in order, and will not affect the focal length of the imaging system lens assembly.

The detailed optical data of the 7th embodiment are shown in Table 7A and the aspheric surface data are shown in Table 7B below.

TABLE 7A

7th Embodiment
f = 2.93 mm, Fno = 2.40, HFOV = 37.6 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | −1.2731 | ASP | 0.561 | Plastic | 1.544 | 56.0 | −529.20 |
| 2 | | −1.4773 | ASP | 0.105 | | | | |
| 3 | Ape. Stop | Plano | | −0.007 | | | | |
| 4 | Lens 2 | −776.0480 | ASP | 0.478 | Plastic | 1.544 | 56.0 | 5.25 |
| 5 | | −2.8467 | ASP | 0.100 | | | | |
| 6 | Prism | Plano | | 2.650 | Glass | 1.804 | 46.6 | — |
| 7 | | Plano | | 0.402 | | | | |
| 8 | Lens 3 | −8.3034 | ASP | 0.220 | Plastic | 1.686 | 18.4 | −3.87 |
| 9 | | 3.9396 | ASP | 0.039 | | | | |
| 10 | Lens 4 | 4.4121 | ASP | 0.723 | Plastic | 1.544 | 56.0 | 6.16 |
| 11 | | −13.1724 | ASP | 0.500 | | | | |
| 12 | Stop | Plano | | −0.400 | | | | |
| 13 | Lens 5 | −16.9372 | ASP | 0.880 | Plastic | 1.544 | 56.0 | 2.20 |
| 14 | | −1.1395 | ASP | 0.030 | | | | |
| 15 | Lens 6 | 0.9840 | ASP | 0.352 | Plastic | 1.639 | 23.5 | −3.80 |
| 16 | | 0.6026 | ASP | 0.764 | | | | |
| 17 | Filter | Plano | | 0.210 | Glass | 1.517 | 64.2 | — |
| 18 | | Plano | | 0.247 | | | | |
| 19 | Image | Plano | | — | | | | |

Reference wavelength is 587.6 nm (d-line).
Effective radius of Surface 12 (stop S1) is 1.835 mm.

TABLE 7B

Aspheric Coefficients

| Surface # | 1 | 2 | 4 | 5 |
|---|---|---|---|---|
| k = | −4.0676300E+00 | −9.8964600E+00 | −9.0000000E+01 | 6.2455900E+00 |
| A4 = | −1.5838809E−02 | 1.0826662E−01 | 2.8421369E−01 | −2.9151125E−02 |
| A6 = | 8.8072139E−02 | −2.9412394E−01 | −1.0976888E+00 | −6.2455113E−03 |
| A8 = | −1.6684809E−01 | 7.0484402E−01 | 2.8823199E+00 | 2.1629764E−01 |
| A10 = | 1.9987011E−01 | −8.9761591E−01 | −5.6805421E+00 | −6.4697917E−01 |
| A12 = | −1.2982830E−01 | 6.1961014E−01 | 7.5747454E+00 | 1.0249832E+00 |
| A14 = | 3.5320926E−02 | −1.5439185E−01 | −5.7125604E+00 | −7.2862667E−01 |
| A16 = | | | 1.7431062E+00 | 1.7962134E−01 |

| Surface # | 8 | 9 | 10 | 11 |
|---|---|---|---|---|
| k = | 1.2545500E+01 | −9.0000000E+01 | −5.8354400E+01 | 1.8579700E+01 |
| A4 = | −4.9658424E−01 | −4.7009268E−01 | 5.2950231E−01 | 9.8154356E−01 |
| A6 = | 2.2650852E+00 | 2.4292929E+00 | 3.6674139E+00 | −2.1586697E+00 |
| A8 = | −6.8052015E+00 | −7.4313033E+00 | −1.2399687E+02 | 2.3335656E+00 |
| A10 = | 1.3913253E+01 | 1.4109203E+01 | 9.1493933E+02 | −1.5886592E+00 |
| A12 = | −1.9673219E+01 | −1.7381131E+01 | −3.5073559E+03 | 6.9197583E−01 |
| A14 = | 1.9553437E+01 | 1.4384077E+01 | 8.2684534E+03 | −2.0204868E−01 |

TABLE 7B-continued

| Aspheric Coefficients | | | | |
|---|---|---|---|---|
| A16 = | −1.3775505E+01 | −8.1412788E+00 | −1.2756390E+04 | 7.6018878E−02 |
| A18 = | 6.8787087E+00 | 3.1555688E+00 | 1.3142100E+04 | −5.2834673E−02 |
| A20 = | −2.4092699E+00 | −8.2281760E−01 | −8.9631488E+03 | 2.7010797E−02 |
| A22 = | 5.7699339E−01 | 1.3781561E−01 | 3.8822690E+03 | −7.7165488E−03 |
| A24 = | −8.9767749E−02 | −1.3377443E−02 | −9.6599092E+02 | 1.1409249E−03 |
| A26 = | 8.1591767E−03 | 5.7140874E−04 | 1.0500659E+02 | −6.8595348E−05 |
| A28 = | −3.2830124E−04 | | | |
| Surface # | 13 | 14 | 15 | 16 |
| k = | −5.6361800E+01 | −3.4484000E+00 | −4.2319000E+00 | −3.0663800E+00 |
| A4 = | 9.2106869E−01 | 1.9016944E−01 | 1.3443860E−01 | 1.4609848E−01 |
| A6 = | −1.3970559E+00 | −5.6365067E−02 | −7.5459795E−02 | −5.4264308E−01 |
| A8 = | 1.2630538E+00 | 2.4538611E−01 | −4.9085726E−01 | 5.9919693E−01 |
| A10 = | −6.5931891E−01 | −3.7377272E−01 | 8.4324447E−01 | −3.9324152E−01 |
| A12 = | 1.3358953E−01 | 2.5722078E−01 | −6.8104921E−01 | 1.7076348E−01 |
| A14 = | 5.1197305E−02 | −9.9963776E−02 | 3.3310853E−01 | −5.0138462E−02 |
| A16 = | −4.4395916E−02 | 2.3421680E−02 | −1.0514215E−01 | 9.8336957E−03 |
| A18 = | 1.4058978E−02 | −3.2842519E−03 | 2.1532822E−02 | −1.2332738E−03 |
| A20 = | −2.3442900E−03 | 2.5414127E−04 | −2.7617998E−03 | 8.9369239E−05 |
| A22 = | 1.9262332E−04 | −8.3550057E−06 | 2.0141923E−04 | −2.8429367E−06 |
| A24 = | −4.0646067E−06 | | −6.3700111E−06 | |
| A26 = | −2.4632500E−07 | | | |

In the 7th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 7th embodiment, so an explanation in this regard will not be provided again.

Moreover, these parameters can be calculated from Table 7A and Table 7B as the values and satisfy the conditions in Table 7C:

TABLE 7C

| 7th Embodiment | | | |
|---|---|---|---|
| f [mm] | 2.93 | f/f12 | 0.64 |
| Fno | 2.40 | f/f3456 | 0.67 |
| HFOV [degrees] | 37.6 | f12/R4 | −1.61 |
| (N3 + N6)/2 | 1.66 | f2/f56 | 1.54 |
| (V4 + V5)/(V3 + V6) | 2.67 | f2/R4 | −1.84 |
| (CT1 + T12 + CT2)/f | 0.39 | f56/f | 1.17 |
| T23/f | 1.08 | f5 × f6/(f × f) | −0.98 |
| T23/ImgH | 1.38 | f6/R11 + f6/R12 | −10.17 |
| (T34 + T56)/f | 0.02 | R6/R7 | 0.89 |
| (T34 + T56)/ΣAT | 0.02 | Y62/Y11 | 2.23 |
| (R3 − R4)/(R3 + R4) | 0.99 | Y62/Y22 | 2.91 |
| (R6 − R7)/(R6 + R7) | −0.06 | ATmax/f | 1.08 |
| (R11 − R12)/(R11 + R12) | 0.24 | SL/TL | 0.92 |
| f/(CT1 + CT2) | 2.82 | TL/ImgH | 3.44 |
| f2/f1 | −0.01 | TL/EPD | 6.44 |
| f/R1 | −2.30 | FOV [degrees] | 75.2 |
| f/R7 | 0.66 | | |

Figure 13B:
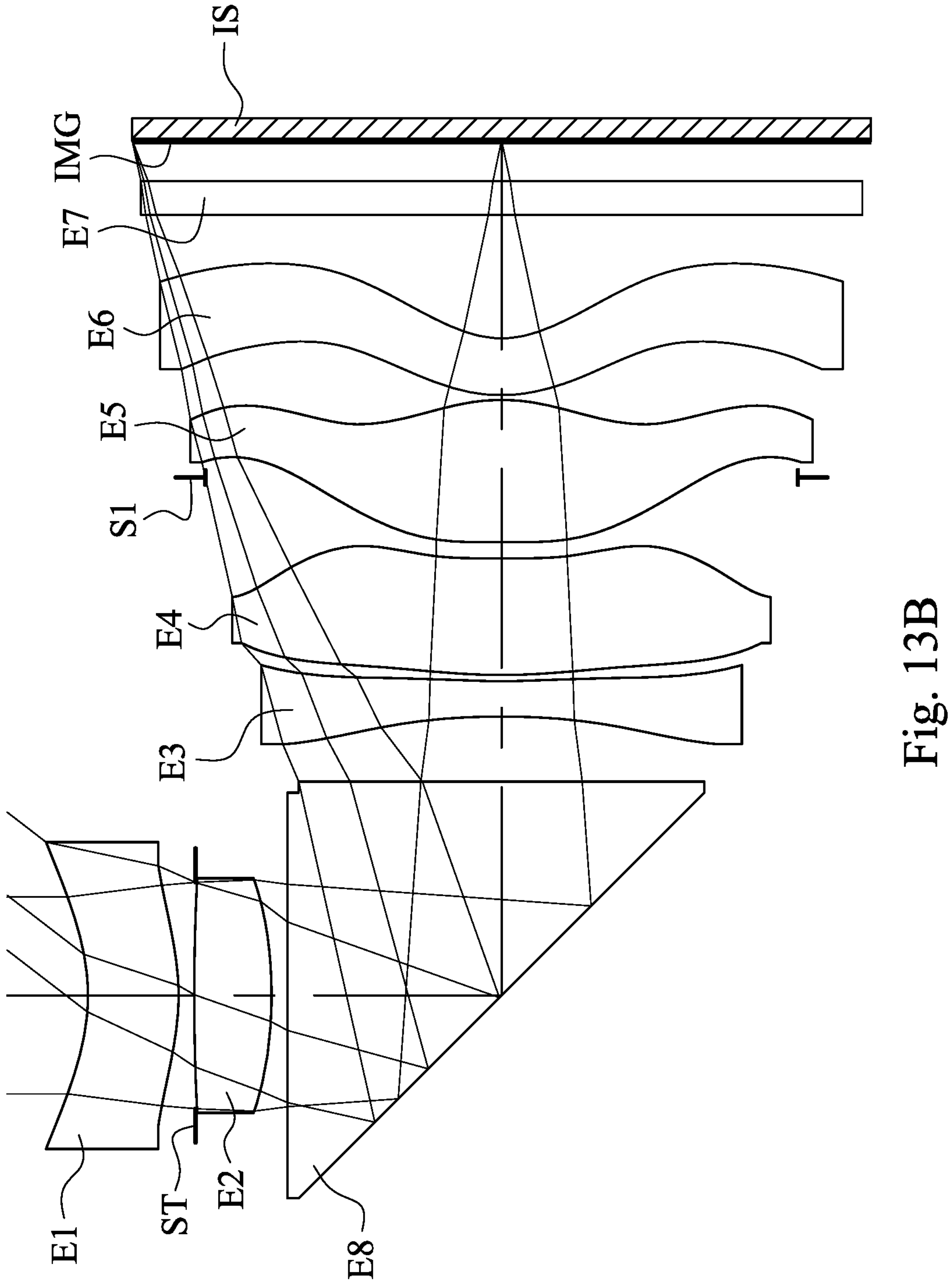
FIG. 13B is a schematic view of the imaging apparatus according to the 7th embodiment with another reflective element.

FIG. 13B is a schematic view of the imaging apparatus 7 according to the 7th embodiment with another reflective element E8. The difference between FIG. 13B and FIG. 13A is the reflective element E8 in FIG. 13B can fold the direction of the optical direction, which is favorable for being applied to electronic devices for different requirements.

8th Embodiment

Figure 15A:
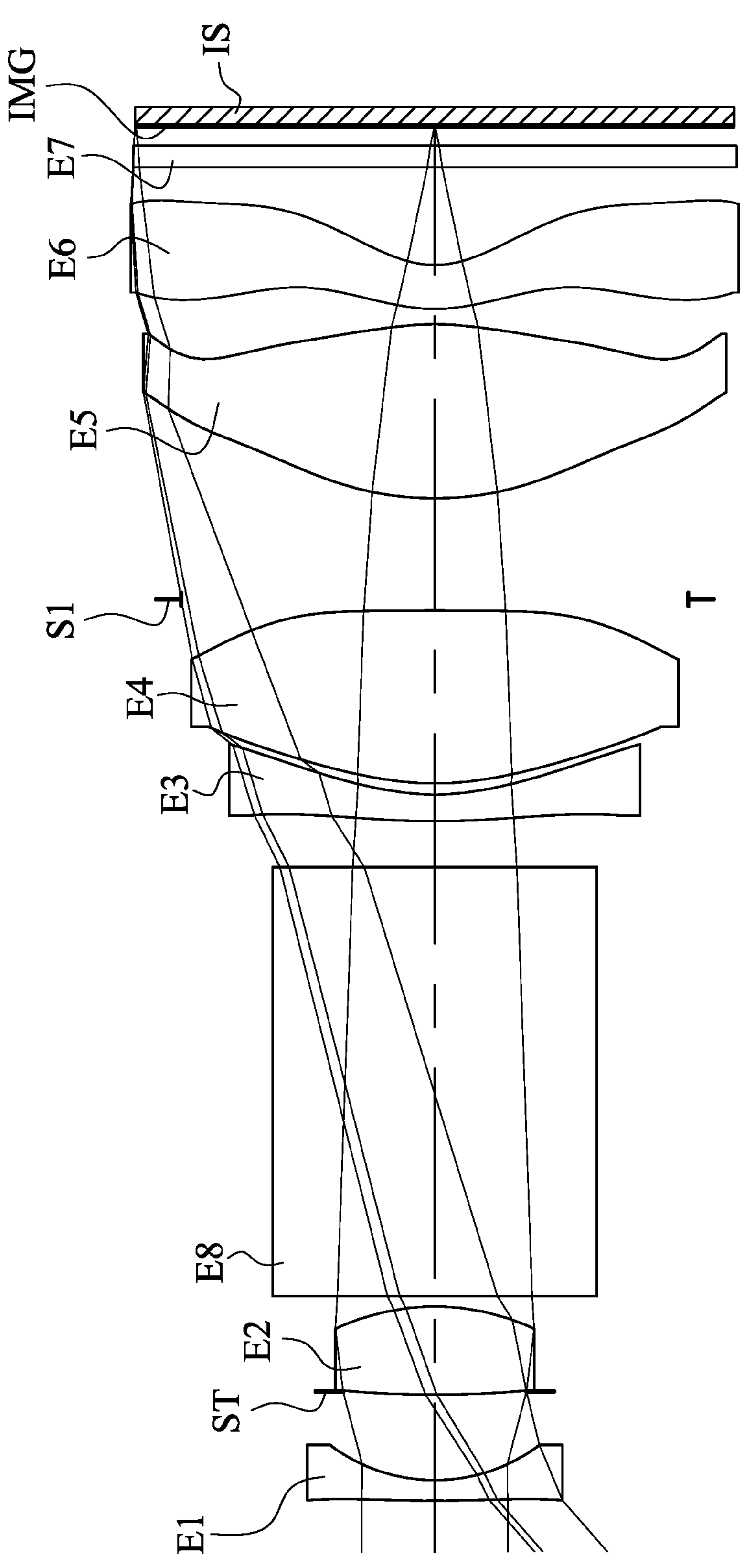
FIG. 15A is a schematic view of an imaging apparatus according to the 8th embodiment of the present disclosure.
Figure 16:
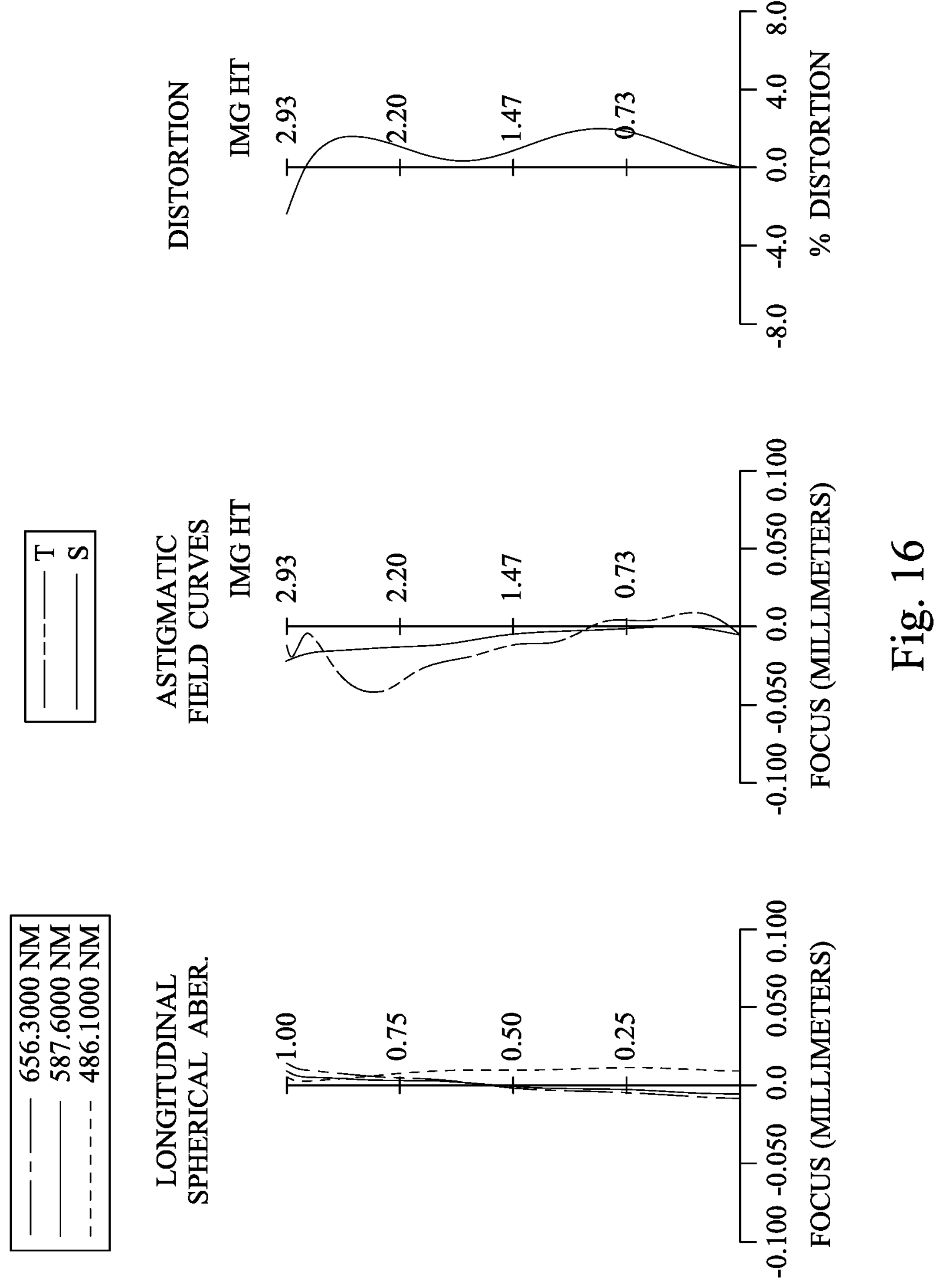
FIG. 16 shows spherical aberration curves, astigmatic field curves and a distortion curve of the imaging apparatus according to the 8th embodiment.

FIG. 15A is a schematic view of an imaging apparatus 8 according to the 8th embodiment of the present disclosure. FIG. 16 shows spherical aberration curves, astigmatic field curves and a distortion curve of the imaging apparatus 8 according to the 8th embodiment. In FIG. 15A, the imaging apparatus 8 includes an imaging system lens assembly (its reference numeral is omitted) and an image sensor IS. The imaging system lens assembly includes, in order from an object side to an image side along an optical path, a first lens element E1, an aperture stop ST, a second lens element E2, a reflective element E8, a third lens element E3, a fourth lens element E4, a stop S1, a fifth lens element E5, a sixth lens element E6, a filter E7 and an image surface IMG, wherein the image sensor IS is disposed on the image surface IMG of the imaging system lens assembly. The imaging system lens assembly includes six lens elements (E1, E2, E3, E4, E5, E6) without additional one or more lens elements inserted between the first lens element E1 and the sixth lens element E6.

The first lens element E1 with negative refractive power has an object-side surface being convex in a paraxial region thereof and an image-side surface being concave in a paraxial region thereof. The first lens element E1 is made of a plastic material, and has the object-side surface and the image-side surface being both aspheric. Furthermore, the object-side surface of the first lens element E1 includes one inflection point.

The second lens element E2 with positive refractive power has an object-side surface being convex in a paraxial region thereof and an image-side surface being convex in a paraxial region thereof. The second lens element E2 is made of a plastic material, and has the object-side surface and the image-side surface being both aspheric.

The third lens element E3 with negative refractive power has an object-side surface being convex in a paraxial region thereof and an image-side surface being concave in a paraxial region thereof. The third lens element E3 is made of a plastic material, and has the object-side surface and the image-side surface being both aspheric. Furthermore, the object-side surface of the third lens element E3 includes one inflection point, and the image-side surface of the third lens element E3 includes one inflection point.

The fourth lens element E4 with positive refractive power has an object-side surface being convex in a paraxial region thereof and an image-side surface being convex in a paraxial region thereof. The fourth lens element E4 is made of a plastic material, and has the object-side surface and the image-side surface being both aspheric. Furthermore, the image-side surface of the fourth lens element E4 includes one inflection point.

The fifth lens element E5 with positive refractive power has an object-side surface being convex in a paraxial region thereof and an image-side surface being convex in a paraxial region thereof. The fifth lens element E5 is made of a plastic material, and has the object-side surface and the image-side surface being both aspheric. Furthermore, the object-side surface of the fifth lens element E5 includes three inflection points, and the image-side surface of the fifth lens element E5 includes four inflection points.

The sixth lens element E6 with negative refractive power has an object-side surface being convex in a paraxial region thereof and an image-side surface being concave in a paraxial region thereof. The sixth lens element E6 is made of a plastic material, and has the object-side surface and the image-side surface being both aspheric. Furthermore, the object-side surface of the sixth lens element E6 includes two inflection points, and the image-side surface of the sixth lens element E6 includes three inflection points and includes one critical point in an off-axis region thereof.

According to the 8th embodiment, the reflective element E8 is a prism, which is made of glass material and disposed between the second lens element E2 and the third lens element E3.

The filter E7 is made of a glass material, which is located between the sixth lens element E6 and the image surface IMG in order, and will not affect the focal length of the imaging system lens assembly.

The detailed optical data of the 8th embodiment are shown in Table 8A and the aspheric surface data are shown in Table 8B below.

TABLE 8A

| 8th Embodiment<br>f = 3.43 mm, Fno = 2.41, HFOV = 41.2 deg. | | | | | | | | |
|---|---|---|---|---|---|---|---|---|
| Surface # | | Curvature Radius | | Thickness | Material | Index | Abbe # | Focal Length |
| 0 | Object | Plano | | Infinity | | | | |
| 1 | Lens 1 | 17.5974 | ASP | 0.200 | Plastic | 1.545 | 56.1 | −3.57 |
| 2 | | 1.7459 | ASP | 0.869 | | | | |
| 3 | Ape. Stop | Plano | | −0.032 | | | | |
| 4 | Lens 2 | 11.5329 | ASP | 0.862 | Plastic | 1.544 | 56.0 | 3.61 |
| 5 | | −2.3048 | ASP | 0.100 | | | | |
| 6 | Prism | Plano | | 4.200 | Glass | 1.803 | 46.8 | — |
| 7 | | Plano | | 0.450 | | | | |
| 8 | Lens 3 | 5.9971 | ASP | 0.260 | Plastic | 1.686 | 18.4 | −5.23 |
| 9 | | 2.2047 | ASP | 0.110 | | | | |
| 10 | Lens 4 | 2.9424 | ASP | 1.691 | Plastic | 1.544 | 56.0 | 5.11 |
| 11 | | −39.9835 | ASP | 0.108 | | | | |
| 12 | Stop | Plano | | 0.992 | | | | |
| 13 | Lens 5 | 3.3224 | ASP | 1.703 | Plastic | 1.544 | 56.0 | 3.12 |
| 14 | | −2.8481 | ASP | 0.150 | | | | |
| 15 | Lens 6 | 1.7341 | ASP | 0.430 | Plastic | 1.544 | 56.0 | −4.47 |
| 16 | | 0.9235 | ASP | 0.957 | | | | |
| 17 | Filter | Plano | | 0.210 | Glass | 1.517 | 64.2 | — |
| 18 | | Plano | | 0.194 | | | | |
| 19 | Image | Plano | | — | | | | |

Reference wavelength is 587.6 nm (d-line).

Effective radius of Surface 12 (stop S1) is 2.480 mm.

TABLE 8B

| Aspheric Coefficients | | | | |
|---|---|---|---|---|
| Surface # | 1 | 2 | 4 | 5 |
| k = | 8.9748500E+01 | −4.7721900E+00 | 6.0726000E+01 | −9.4012800E−01 |
| A4 = | 4.5039890E−03 | 1.3495494E−01 | −1.8201814E−03 | −1.3140712E−02 |
| A6 = | −3.2306454E−02 | −4.6906433E−02 | 3.0930461E−02 | −2.9717620E−03 |
| A8 = | 1.0583143E−02 | −7.9897628E−02 | −1.4296889E−01 | 9.2393820E−03 |
| A10 = | 1.2575288E−02 | 2.4679526E−01 | 3.7260584E−01 | −1.9826974E−02 |
| A12 = | −1.8091539E−02 | −2.8907687E−01 | −5.3662495E−01 | 2.1440946E−02 |
| A14 = | 9.1450746E−03 | 1.7022560E−01 | 4.0584795E−01 | −1.0901236E−02 |
| A16 = | −1.7168051E−03 | −3.9736293E−02 | −1.2466622E−01 | 2.3738990E−03 |
| Surface # | 8 | 9 | 10 | 11 |
| k = | −9.0000000E+01 | −7.5548700E+00 | −1.0035100E+01 | −9.0000000E+01 |
| A4 = | −4.9374239E−02 | −7.0874265E−02 | 1.0332830E−02 | 2.3071967E−02 |
| A6 = | 8.9067248E−02 | 1.5423997E−01 | 2.6824235E−03 | −4.4095999E−02 |
| A8 = | −7.3072334E−02 | −1.6163815E−01 | −1.2639835E−02 | 2.3097884E−02 |
| A10 = | 1.9329144E−02 | 1.0308075E−01 | 1.0788169E−02 | −7.3839159E−03 |
| A12 = | 1.3671452E−02 | −4.3236507E−02 | −4.8092918E−03 | 1.5573376E−03 |
| A14 = | −1.5475707E−02 | 1.2209165E−02 | 1.3036299E−03 | −2.0889896E−04 |
| A16 = | 7.1692900E−03 | −2.3036738E−03 | −2.2342430E−04 | 1.5916031E−05 |
| A18 = | −1.9328606E−03 | 2.7888630E−04 | 2.3796652E−05 | −5.1234466E−07 |
| A20 = | 3.1454439E−04 | −1.9613530E−05 | −1.4443100E−06 | −1.2679598E−10 |

TABLE 8B-continued

| Aspheric Coefficients | | | | |
|---|---|---|---|---|
| A22 = | −2.8777868E−05 | 6.0980843E−07 | 3.8299725E−08 | |
| A24 = | 1.1413424E−06 | | | |
| Surface # | 13 | 14 | 15 | 16 |
| k = | −1.1386400E+01 | −6.3192600E+00 | −1.3962000E+00 | −1.7823600E+00 |
| A4 = | 6.7437602E−02 | 5.4832792E−02 | −1.2566706E−01 | −1.2298843E−01 |
| A6 = | −3.7109681E−02 | −2.1088531E−02 | 3.1840275E−02 | 4.2350754E−02 |
| A8 = | 1.4944683E−02 | 2.8305062E−03 | −1.0257804E−02 | −1.3546591E−02 |
| A10 = | −5.0994306E−03 | −2.7333022E−04 | 3.9326353E−03 | 3.5350551E−03 |
| A12 = | 1.2349793E−03 | 2.1338881E−04 | −9.8867472E−04 | −6.0762633E−04 |
| A14 = | −1.8988765E−04 | −8.7622086E−05 | 1.4683487E−04 | 6.3241082E−05 |
| A16 = | 1.7641787E−05 | 1.7959069E−05 | −1.2579147E−05 | −3.6393578E−06 |
| A18 = | −9.0825763E−07 | −2.0161618E−06 | 5.6666183E−07 | 8.9063687E−08 |
| A20 = | 1.9914894E−08 | 1.1778101E−07 | −9.4162589E−09 | |
| A22 = | | −2.7905340E−09 | −6.2209496E−11 | |

In the 8th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 8th embodiment, so an explanation in this regard will not be provided again.

Moreover, these parameters can be calculated from Table 8A and Table 8B as the values and satisfy the conditions in Table 8C:

TABLE 8C

| 8th Embodiment | | | |
|---|---|---|---|
| f [mm] | 3.43 | f/f12 | 0.34 |
| Fno | 2.41 | f/f3456 | 0.72 |
| HFOV [degrees] | 41.2 | f12/R4 | −4.44 |
| (N3 + N6)/2 | 1.62 | f2/f56 | 0.72 |
| (V4 + V5)/(V3 + V6) | 1.51 | f2/R4 | −1.57 |
| (CT1 + T12 + CT2)/f | 0.55 | f56/f | 1.46 |
| T23/f | 1.38 | f5 × f6/(f × f) | −1.18 |
| T23/ImgH | 1.62 | f6/R11 + f6/R12 | −7.41 |
| (T34 + T56)/f | 0.08 | R6/R7 | 0.75 |
| (T34 + T56)/ΣAT | 0.04 | Y62/Y11 | 2.38 |
| (R3 − R4)/(R3 + R4) | 1.50 | Y62/Y22 | 3.06 |
| (R6 − R7)/(R6 + R7) | −0.14 | ATmax/f | 1.38 |
| (R11 − R12)/(R11 + R12) | 0.31 | SL/TL | 0.92 |
| f/(CT1 + CT2) | 3.23 | TL/ImgH | 4.59 |
| f2/f1 | −1.01 | TL/EPD | 9.43 |
| f/R1 | 0.19 | FOV [degrees] | 82.4 |
| f/R7 | 1.17 | | |

Figure 15B:
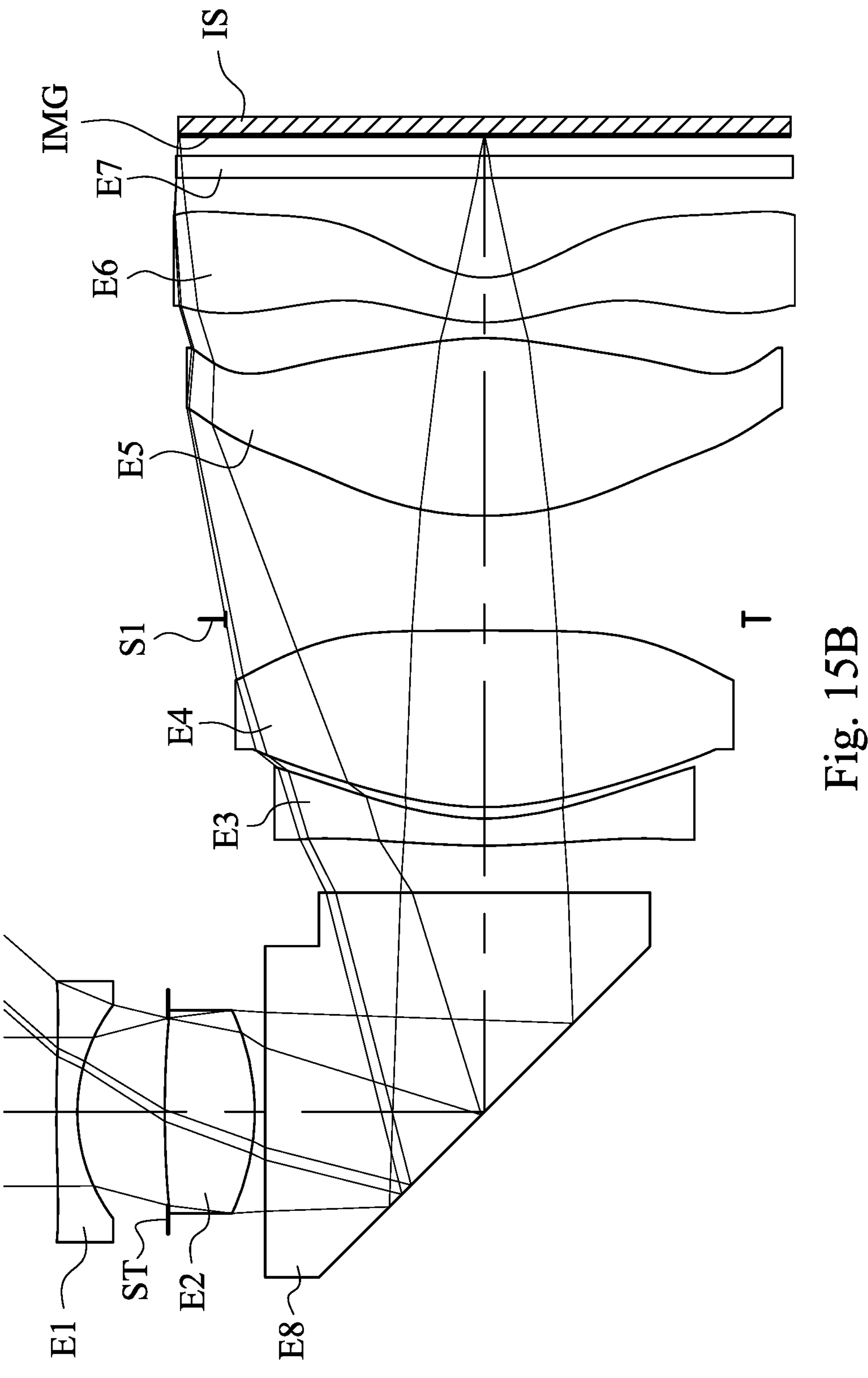
FIG. 15B is a schematic view of the imaging apparatus according to the 8th embodiment with another reflective element.

FIG. 15B is a schematic view of the imaging apparatus according to the 8th embodiment with another reflective element E8. The difference between FIG. 15B and FIG. 15A is the reflective element E8 in FIG. 15B can fold the direction of the optical direction, which is favorable for being applied to electronic devices for different requirements.

9th Embodiment

Figure 17A:
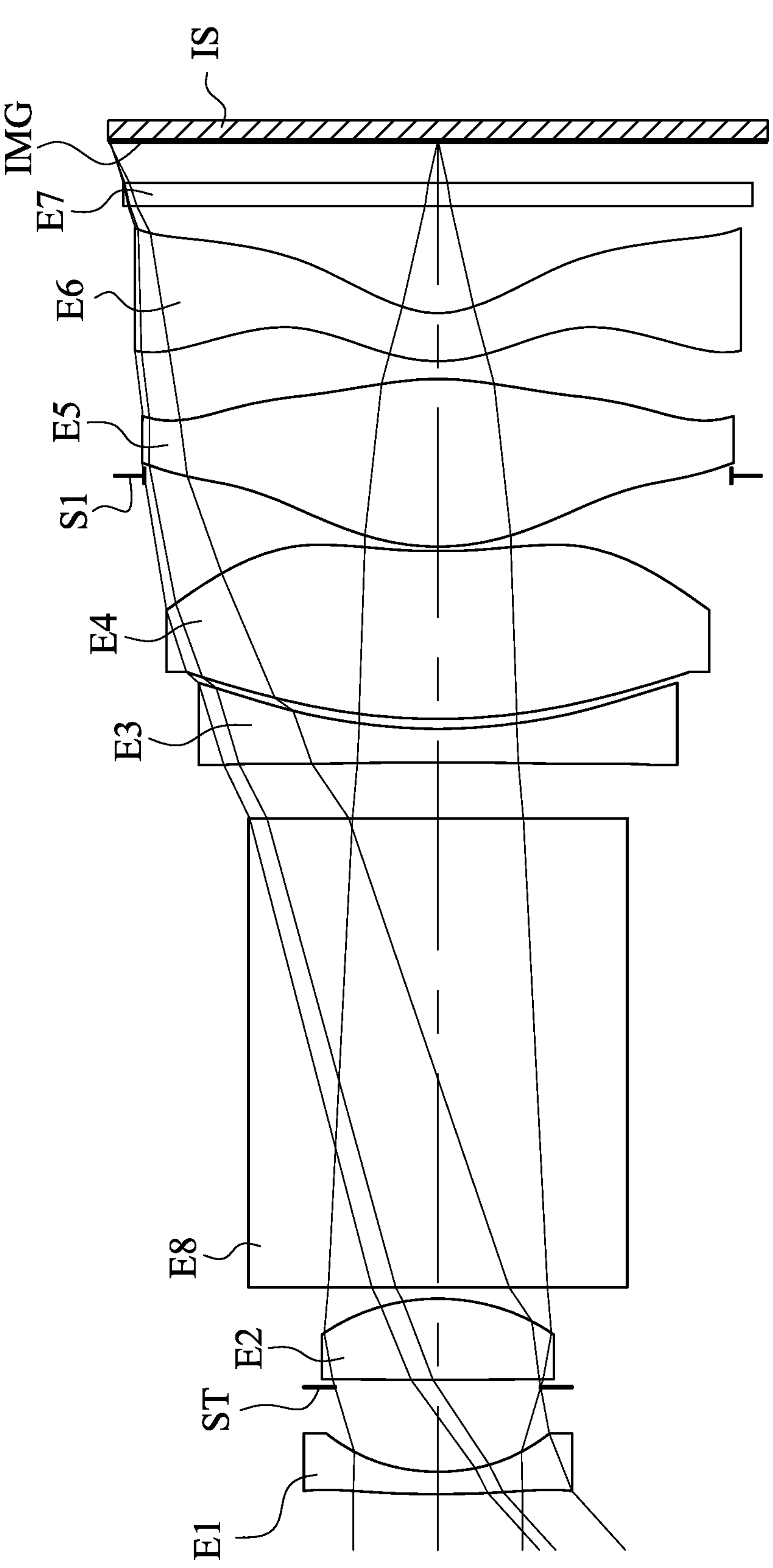
FIG. 17A is a schematic view of an imaging apparatus according to the 9th embodiment of the present disclosure.
Figure 18:
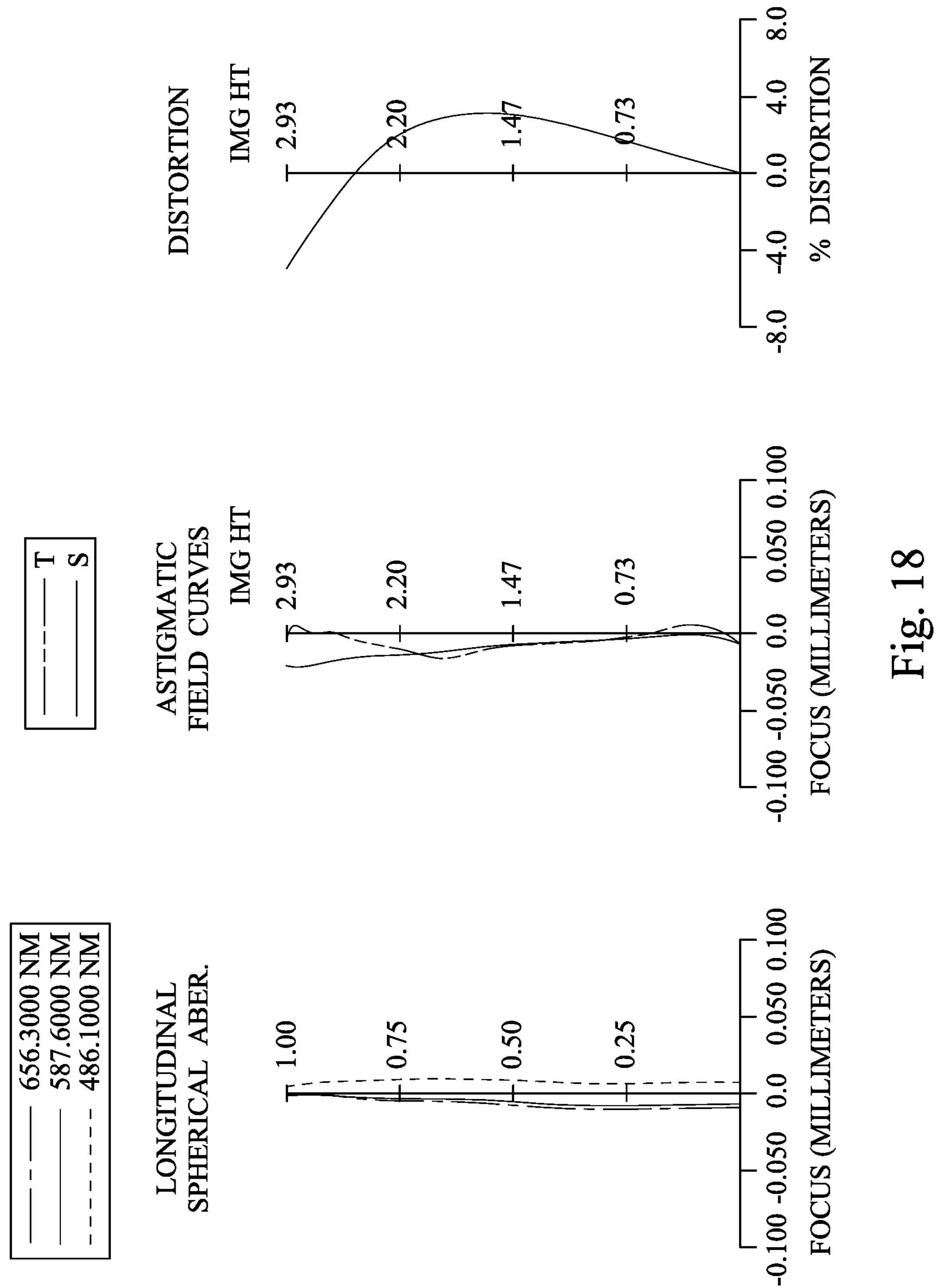
FIG. 18 shows spherical aberration curves, astigmatic field curves and a distortion curve of the imaging apparatus according to the 9th embodiment.

FIG. 17A is a schematic view of an imaging apparatus 9 according to the 9th embodiment of the present disclosure. FIG. 18 shows spherical aberration curves, astigmatic field curves and a distortion curve of the imaging apparatus 9 according to the 9th embodiment. In FIG. 17A, the imaging apparatus 9 includes an imaging system lens assembly (its reference numeral is omitted) and an image sensor IS. The imaging system lens assembly includes, in order from an object side to an image side along an optical path, a first lens element E1, an aperture stop ST, a second lens element E2, a reflective element E8, a third lens element E3, a fourth lens element E4, a stop S1, a fifth lens element E5, a sixth lens element E6, a filter E7 and an image surface IMG, wherein the image sensor IS is disposed on the image surface IMG of the imaging system lens assembly. The imaging system lens assembly includes six lens elements (E1, E2, E3, E4, E5, E6) without additional one or more lens elements inserted between the first lens element E1 and the sixth lens element E6.

The first lens element E1 with negative refractive power has an object-side surface being convex in a paraxial region thereof and an image-side surface being concave in a paraxial region thereof. The first lens element E1 is made of a plastic material, and has the object-side surface and the image-side surface being both aspheric. Furthermore, the object-side surface of the first lens element E1 includes one inflection point.

The second lens element E2 with positive refractive power has an object-side surface being convex in a paraxial region thereof and an image-side surface being convex in a paraxial region thereof. The second lens element E2 is made of a plastic material, and has the object-side surface and the image-side surface being both aspheric.

The third lens element E3 with negative refractive power has an object-side surface being concave in a paraxial region thereof and an image-side surface being concave in a paraxial region thereof. The third lens element E3 is made of a plastic material, and has the object-side surface and the image-side surface being both aspheric. Furthermore, the object-side surface of the third lens element E3 includes two inflection points, and the image-side surface of the third lens element E3 includes two inflection points.

The fourth lens element E4 with positive refractive power has an object-side surface being convex in a paraxial region thereof and an image-side surface being concave in a paraxial region thereof. The fourth lens element E4 is made of a plastic material, and has the object-side surface and the image-side surface being both aspheric. Furthermore, the image-side surface of the fourth lens element E4 includes two inflection points.

The fifth lens element E5 with positive refractive power has an object-side surface being convex in a paraxial region thereof and an image-side surface being convex in a paraxial region thereof. The fifth lens element E5 is made of a plastic material, and has the object-side surface and the image-side surface being both aspheric. Furthermore, the object-side surface of the fifth lens element E5 includes three inflection points, and the image-side surface of the fifth lens element E5 includes three inflection points.

The sixth lens element E6 with negative refractive power has an object-side surface being convex in a paraxial region thereof and an image-side surface being concave in a paraxial region thereof. The sixth lens element E6 is made of a plastic material, and has the object-side surface and the image-side surface being both aspheric. Furthermore, the object-side surface of the sixth lens element E6 includes two inflection points, and the image-side surface of the sixth lens element E6 includes two inflection points.

According to the 9th embodiment, the reflective element E8 is a prism, which is made of plastic material and disposed between the second lens element E2 and the third lens element E3.

The filter E7 is made of a glass material, which is located between the sixth lens element E6 and the image surface IMG in order, and will not affect the focal length of the imaging system lens assembly.

The detailed optical data of the 9th embodiment are shown in Table 9A and the aspheric surface data are shown in Table 9B below.

TABLE 9A

| 9th Embodiment<br>f = 3.41 mm, Fno = 2.26, HFOV = 42.1 deg. | | | | | | | | |
|---|---|---|---|---|---|---|---|---|
| Surface # | | Curvature Radius | | Thickness | Material | Index | Abbe # | Focal Length |
| 0 | Object | Plano | | Infinity | | | | |
| 1 | Lens 1 | 13.7504 | ASP | 0.200 | Plastic | 1.566 | 37.4 | −3.88 |
| 2 | | 1.8826 | ASP | 0.757 | | | | |
| 3 | Ape. Stop | Plano | | 0.067 | | | | |
| 4 | Lens 2 | 371.3600 | ASP | 0.726 | Plastic | 1.544 | 56.0 | 3.40 |
| 5 | | −1.8601 | ASP | 0.100 | | | | |
| 6 | Prism | Plano | | 4.200 | Plastic | 1.729 | 54.7 | — |
| 7 | | Plano | | 0.500 | | | | |
| 8 | Lens 3 | −74.8374 | ASP | 0.300 | Plastic | 1.686 | 18.4 | −6.30 |
| 9 | | 4.5916 | ASP | 0.090 | | | | |
| 10 | Lens 4 | 6.1367 | ASP | 1.502 | Plastic | 1.544 | 56.0 | 422.20 |
| 11 | | 5.7614 | ASP | 0.673 | | | | |
| 12 | Stop | Plano | | −0.633 | | | | |
| 13 | Lens 5 | 2.1497 | ASP | 1.500 | Plastic | 1.544 | 56.0 | 2.44 |
| 14 | | −2.6179 | ASP | 0.160 | | | | |
| 15 | Lens 6 | 1.3798 | ASP | 0.430 | Plastic | 1.686 | 18.4 | −5.38 |
| 16 | | 0.8768 | ASP | 0.957 | | | | |
| 17 | Filter | Plano | | 0.210 | Glass | 1.517 | 64.2 | — |
| 18 | | Plano | | 0.377 | | | | |
| 19 | Image | Plano | | — | | | | |

Reference wavelength is 587.6 nm (d-line).

Effective radius of Surface 12 (stop S1) is 2.620 mm.

TABLE 9B

| Aspheric Coefficients | | | | |
|---|---|---|---|---|
| Surface # | 1 | 2 | 4 | 5 |
| k = | 9.0000000E+01 | −3.3484100E+00 | −9.0000000E+01 | −4.1005400E−01 |
| A4 = | 7.7852534E−02 | 1.9328980E−01 | 9.8448621E−03 | −8.7059974E−03 |
| A6 = | −1.5779456E−01 | −1.4096670E−01 | −5.6893162E−03 | −7.1795272E−03 |
| A8 = | 1.4142293E−01 | 1.6147540E−02 | −3.1307483E−03 | 7.8531216E−03 |
| A10 = | −1.0453517E−01 | 2.1149218E−01 | 2.6300721E−02 | −2.1922065E−02 |
| A12 = | 5.3842310E−02 | −3.5919183E−01 | −5.3831927E−02 | 2.4916164E−02 |
| A14 = | −1.6475087E−02 | 2.6572559E−01 | 4.6336928E−02 | −1.5176146E−02 |
| A16 = | 2.1463741E−03 | −7.2875741E−02 | −1.4211314E−02 | 3.8192815E−03 |
| Surface # | 8 | 9 | 10 | 11 |
| k = | 9.0000000E+01 | −5.5338700E+00 | −8.7105000E+00 | −7.6642600E+01 |
| A4 = | −2.7778367E−02 | −6.3128100E−01 | 2.8916065E−02 | 4.4426530E−02 |
| A6 = | 4.8567877E−02 | 4.1293425E+00 | −3.3278417E−02 | −7.4451870E−02 |
| A8 = | −4.1592773E−02 | −1.3979870E+01 | 2.4848814E−02 | 3.0442203E−02 |
| A10 = | 2.4379140E−02 | 3.6287114E+01 | −1.2278365E−02 | −5.2559385E−03 |
| A12 = | −1.0117090E−02 | −7.5081338E+01 | 4.1577977E−03 | −2.0719716E−04 |
| A14 = | 2.7523141E−03 | 1.1266092E+02 | −9.7032382E−04 | 2.8445724E−04 |
| A16 = | −4.1004643E−04 | −1.1350816E+02 | 1.5185732E−04 | −5.6816129E−05 |
| A18 = | 7.6384515E−06 | 7.2025924E+01 | −1.5022554E−05 | 5.0946563E−06 |
| A20 = | 8.0282958E−06 | −2.5987602E+01 | 8.3837819E−07 | −1.7753096E−07 |
| A22 = | −1.2455137E−06 | 4.0602089E+00 | −1.9846983E−08 | |
| A24 = | 6.1772741E−08 | | | |
| Surface # | 13 | 14 | 15 | 16 |
| k = | −6.7230300E+00 | −1.8209100E+01 | −1.6867300E+00 | −1.5057500E+00 |
| A4 = | 8.5050450E−02 | −3.2050515E−02 | −8.9684746E−02 | −1.6989789E−01 |
| A6 = | −6.7345602E−02 | 9.1063394E−02 | 9.3492478E−03 | 5.8319264E−02 |

TABLE 9B-continued

| Aspheric Coefficients | | | | |
|---|---|---|---|---|
| A8 = | 3.4042773E−02 | −7.2284378E−02 | −1.5547228E−02 | −1.5293688E−02 |
| A10 = | −1.3704593E−02 | 3.0156905E−02 | 1.3030011E−02 | 3.7640222E−03 |
| A12 = | 3.8552027E−03 | −7.8652859E−03 | −4.8145894E−03 | −7.7451398E−04 |
| A14 = | −7.0398794E−04 | 1.3548184E−03 | 1.0002499E−03 | 1.1162001E−04 |
| A16 = | 8.1403328E−05 | −1.5376281E−04 | −1.2568831E−04 | −1.0181713E−05 |
| A18 = | −5.7331880E−06 | 1.1027169E−05 | 9.5163384E−06 | 5.3496456E−07 |
| A20 = | 2.2267506E−07 | −4.5222355E−07 | −4.0077475E−07 | −1.2564265E−08 |
| A22 = | −3.6052002E−09 | 8.0791992E−09 | 7.2232468E−09 | |

In the 9th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 9th embodiment, so an explanation in this regard will not be provided again.

Moreover, these parameters can be calculated from Table 9A and Table 9B as the values and satisfy the conditions in Table 90:

TABLE 9C

| 9th Embodiment | | | |
|---|---|---|---|
| f [mm] | 3.41 | f/f12 | 0.45 |
| Fno | 2.26 | f/f3456 | 0.67 |
| HFOV [degrees] | 42.1 | f12/R4 | −4.07 |
| (N3 + N6)/2 | 1.69 | f2/f56 | 1.24 |
| (V4 + V5)/(V3 + V6) | 3.05 | f2/R4 | −1.83 |
| (CT1 + T12 + CT2)/f | 0.51 | f56/f | 0.81 |
| T23/f | 1.41 | f5 × f6/(f × f) | −1.13 |
| T23/ImgH | 1.64 | f6/R11 + f6/R12 | −10.03 |
| (T34 + T56)/f | 0.07 | R6/R7 | 0.75 |
| (T34 + T56)/ΣAT | 0.04 | Y62/Y11 | 2.25 |
| (R3 − R4)/(R3 + R4) | 1.01 | Y62/Y22 | 2.60 |
| (R6 − R7)/(R6 + R7) | −0.14 | ATmax/f | 1.41 |
| (R11 − R12)/(R11 + R12) | 0.22 | SL/TL | 0.92 |
| f/(CT1 + CT2) | 3.68 | TL/ImgH | 4.13 |
| f2/f1 | −0.88 | TL/EPD | 8.02 |
| f/R1 | 0.25 | FOV [degrees] | 84.2 |
| f/R7 | 0.56 | | |

Figure 17B:
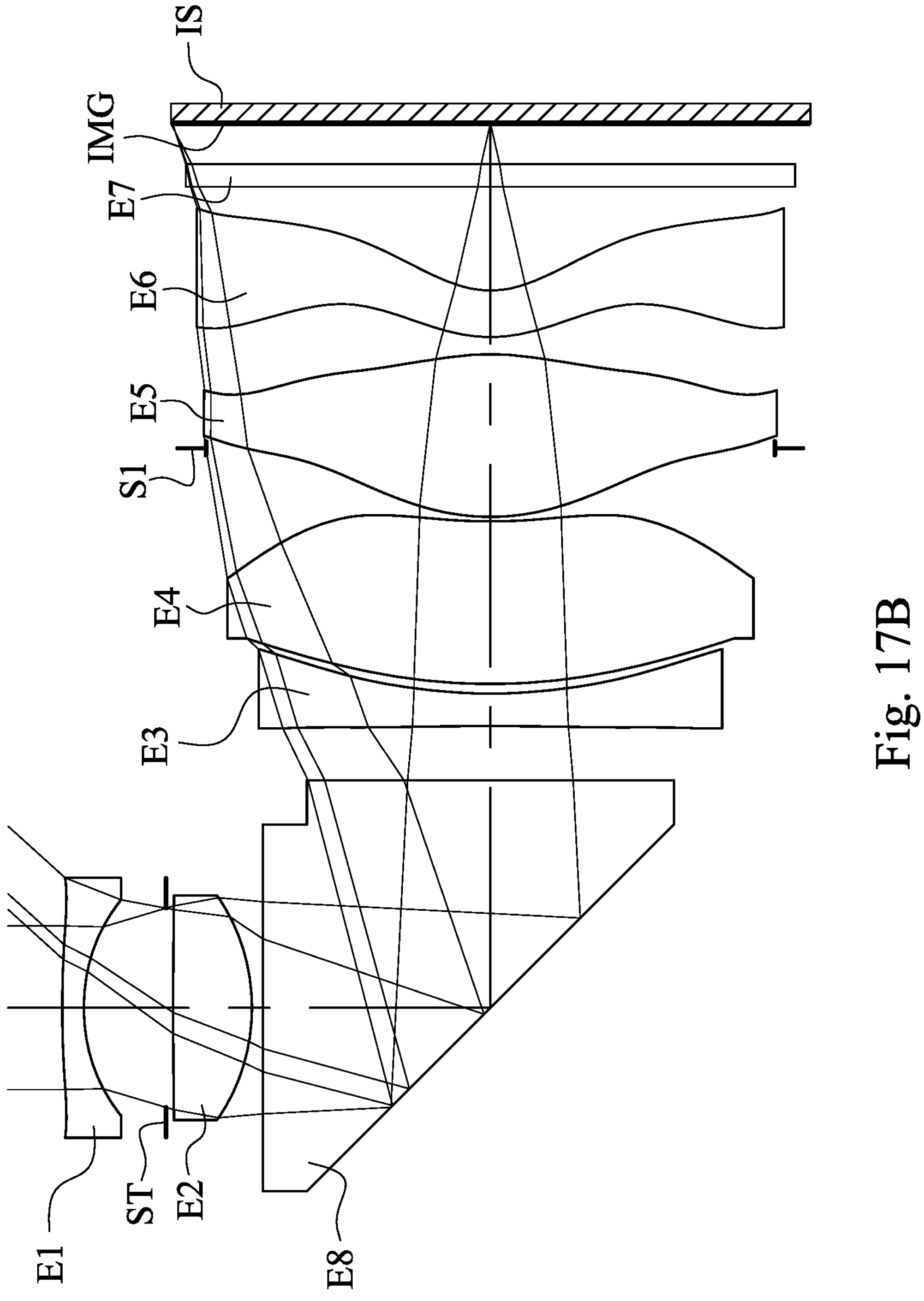
FIG. 17B is a schematic view of the imaging apparatus according to the 9th embodiment with another reflective element.

FIG. 17B is a schematic view of the imaging apparatus 9 according to the 9th embodiment with another reflective element E8. The difference between FIG. 17B and FIG. 17A is the reflective element E8 in FIG. 17B can fold the direction of the optical direction, which is favorable for being applied to electronic devices for different requirements.

10th Embodiment

Figure 19A:
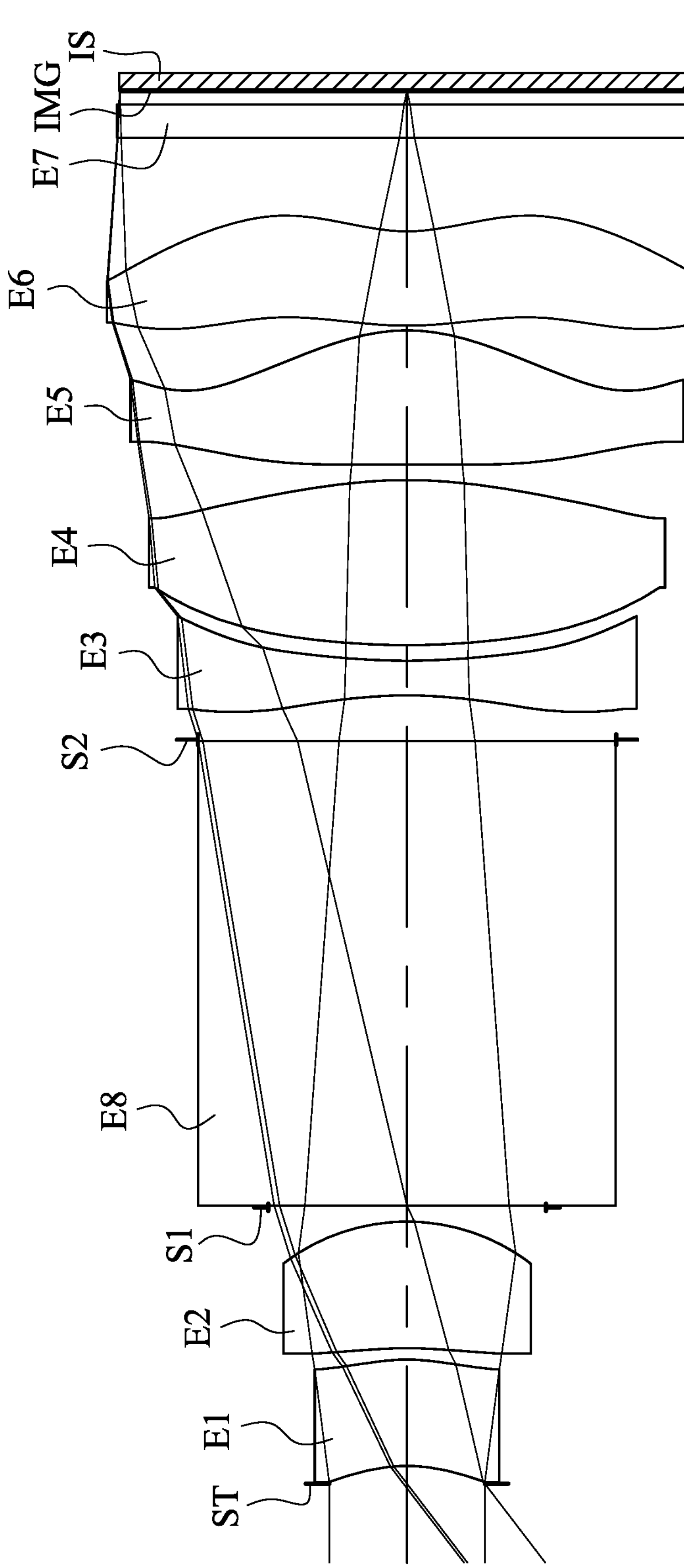
FIG. 19A is a schematic view of an imaging apparatus according to the 10th embodiment of the present disclosure.
Figure 20:
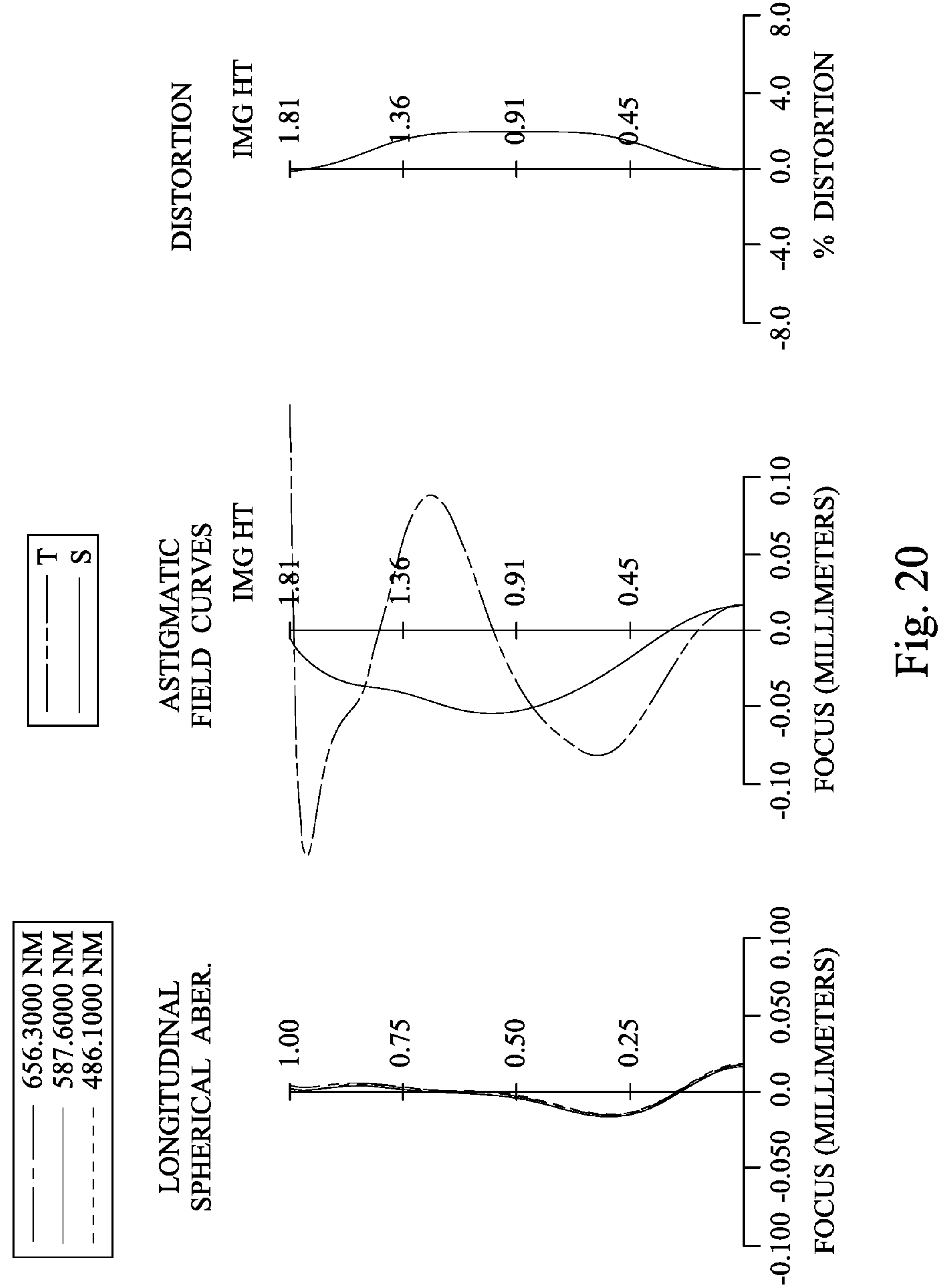
FIG. 20 shows spherical aberration curves, astigmatic field curves and a distortion curve of the imaging apparatus according to the 10th embodiment.

FIG. 19A is a schematic view of an imaging apparatus 10 according to the 10th embodiment of the present disclosure. FIG. 20 shows spherical aberration curves, astigmatic field curves and a distortion curve of the imaging apparatus 10 according to the 10th embodiment. In FIG. 19A, the imaging apparatus 10 includes an imaging system lens assembly (its reference numeral is omitted) and an image sensor IS. The imaging system lens assembly includes, in order from an object side to an image side along an optical path, an aperture stop ST, a first lens element E1, a second lens element E2, a stop S1, a reflective element E8, a stop S2, a third lens element E3, a fourth lens element E4, a fifth lens element E5, a sixth lens element E6, a filter E7 and an image surface IMG, wherein the image sensor IS is disposed on the image surface IMG of the imaging system lens assembly. The imaging system lens assembly includes six lens elements (E1, E2, E3, E4, E5, E6) without additional one or more lens elements inserted between the first lens element E1 and the sixth lens element E6.

The first lens element E1 with positive refractive power has an object-side surface being concave in a paraxial region thereof and an image-side surface being convex in a paraxial region thereof. The first lens element E1 is made of a plastic material, and has the object-side surface and the image-side surface being both aspheric. Furthermore, the image-side surface of the first lens element E1 includes one inflection point.

The second lens element E2 with positive refractive power has an object-side surface being concave in a paraxial region thereof and an image-side surface being convex in a paraxial region thereof. The second lens element E2 is made of a plastic material, and has the object-side surface and the image-side surface being both aspheric. Furthermore, the object-side surface of the second lens element E2 includes two inflection points.

The third lens element E3 with negative refractive power has an object-side surface being concave in a paraxial region thereof and an image-side surface being concave in a paraxial region thereof. The third lens element E3 is made of a plastic material, and has the object-side surface and the image-side surface being both aspheric. Furthermore, the object-side surface of the third lens element E3 includes one inflection point, and the image-side surface of the third lens element E3 includes one inflection point.

The fourth lens element E4 with positive refractive power has an object-side surface being convex in a paraxial region thereof and an image-side surface being convex in a paraxial region thereof. The fourth lens element E4 is made of a plastic material, and has the object-side surface and the image-side surface being both aspheric. Furthermore, the image-side surface of the fourth lens element E4 includes one inflection point.

The fifth lens element E5 with positive refractive power has an object-side surface being concave in a paraxial region thereof and an image-side surface being convex in a paraxial region thereof. The fifth lens element E5 is made of a plastic material, and has the object-side surface and the image-side surface being both aspheric. Furthermore, the object-side surface of the fifth lens element E5 includes two inflection points, and the image-side surface of the fifth lens element E5 includes two inflection points.

The sixth lens element E6 with negative refractive power has an object-side surface being convex in a paraxial region thereof and an image-side surface being concave in a paraxial region thereof. The sixth lens element E6 is made of a plastic material, and has the object-side surface and the image-side surface being both aspheric. Furthermore, the object-side surface of the sixth lens element E6 includes three inflection points, and the image-side surface of the sixth lens element E6 includes two inflection points and includes one critical point in an off-axis region thereof.

According to the 10th embodiment, the reflective element E8 is a prism, which is made of glass material and disposed between the second lens element E2 and the third lens element E3.

The filter E7 is made of a glass material, which is located between the sixth lens element E6 and the image surface IMG in order, and will not affect the focal length of the imaging system lens assembly.

The detailed optical data of the 10th embodiment are shown in Table 10A and the aspheric surface data are shown in Table 10B below.

TABLE 10A

| 10th Embodiment<br>f = 2.37 mm, Fno = 2.41, HFOV = 37.4 deg. | | | | | | | | |
|---|---|---|---|---|---|---|---|---|
| Surface # | | Curvature Radius | | Thickness | Material | Index | Abbe # | Focal Length |
| 0 | Object | Plano | | Infinity | | | | |
| 1 | Ape. Stop | Plano | | 0.113 | | | | |
| 2 | Lens 1 | −1.0472 | ASP | 0.673 | Plastic | 1.545 | 56.1 | 37.59 |
| 3 | | −1.2221 | ASP | 0.073 | | | | |
| 4 | Lens 2 | −2.0904 | ASP | 0.800 | Plastic | 1.544 | 56.0 | 4.48 |
| 5 | | −1.2765 | ASP | 0.090 | | | | |
| 6 | Stop | Plano | | 0.010 | | | | |
| 7 | Prism | Plano | | 2.940 | Glass | 1.835 | 42.7 | — |
| 8 | | Plano | | 0.010 | | | | |
| 9 | Stop | Plano | | 0.279 | | | | |
| 10 | Lens 3 | −3.2483 | ASP | 0.220 | Plastic | 1.686 | 18.4 | −2.71 |
| 11 | | 4.4694 | ASP | 0.099 | | | | |
| 12 | Lens 4 | 5.4759 | ASP | 1.044 | Plastic | 1.544 | 56.0 | 3.91 |
| 13 | | −3.2501 | ASP | 0.100 | | | | |
| 14 | Lens 5 | −16.7187 | ASP | 0.847 | Plastic | 1.544 | 56.0 | 2.33 |
| 15 | | −1.2008 | ASP | 0.030 | | | | |
| 16 | Lens 6 | 2.2947 | ASP | 0.597 | Plastic | 1.534 | 55.9 | −5.17 |
| 17 | | 1.1400 | ASP | 0.592 | | | | |
| 18 | Filter | Plano | | 0.210 | Glass | 1.517 | 64.2 | — |
| 19 | | Plano | | 0.087 | | | | |
| 20 | Image | Plano | | — | | | | |

Reference wavelength is 587.6 nm (d-line).
Effective radius of Surface 6 (stop S1) is 0.879 mm.
Effective radius of Surface 9 (stop S2) is 1.323 mm.

TABLE 10B

| Aspheric Coefficients | | | | |
|---|---|---|---|---|
| Surface # | 2 | 3 | 4 | 5 |
| k = | −3.4061700E+00 | −8.9741200E+00 | −6.9363200E+01 | 2.1818000E−01 |
| A4 = | −1.4028380E−01 | 5.1510054E−01 | 1.7492311E−01 | 4.5328209E−02 |
| A6 = | 2.5641056E+00 | −5.5796486E−01 | −7.6061001E−02 | −1.4702397E−01 |
| A8 = | −1.9159390E+01 | 5.4370894E−01 | 2.1841895E−01 | 5.7304092E−01 |
| A10 = | 7.5382612E+01 | −1.2053294E+00 | −4.3569172E+00 | −1.1474699E+00 |
| A12 = | −1.4550756E+02 | 1.1068161E+00 | 1.0599514E+01 | 1.1415094E+00 |
| A14 = | 1.0550909E+02 | −3.7491723E−01 | −9.1178826E+00 | −4.9977905E−01 |
| Surface # | 10 | 11 | 12 | 13 |
| k = | −1.4834800E+01 | −1.6016300E+00 | −4.7229300E+00 | −1.2076500E+00 |
| A4 = | −4.2882223E−02 | −1.9936306E−02 | 4.0122870E−02 | 2.4621764E−02 |
| A6 = | 1.8935300E−02 | −5.6930878E−02 | −8.1622041E−02 | 9.7443875E−03 |
| A8 = | 2.0207189E−01 | 1.2856931E−01 | 1.0100880E−01 | −1.0490761E−03 |
| A10 = | −3.1144535E−01 | −6.6761576E−02 | −5.6924297E−02 | −9.2135965E−03 |
| A12 = | 2.2980556E−01 | 2.4418460E−03 | 1.6143591E−02 | 4.8268465E−03 |
| A14 = | −9.9563389E−02 | 6.6455393E−03 | −2.1244427E−03 | −6.6442727E−04 |
| A16 = | 2.4585514E−02 | −1.3637565E−03 | 8.8163231E−05 | |
| A18 = | −2.6780496E−03 | | | |
| Surface # | 14 | 15 | 16 | 17 |
| k = | −9.0000000E+01 | −2.8925100E+00 | −4.8007700E−01 | −5.7430300E+00 |
| A4 = | 7.9769202E−02 | 6.4735111E−03 | −2.6834360E−01 | −3.3646448E−01 |
| A6 = | 4.9274195E−02 | 1.0524632E−01 | 5.9272735E−02 | 1.5879557E−01 |
| A8 = | −1.3835860E−01 | −1.3069146E−01 | 4.8194056E−02 | −1.2937976E−02 |
| A10 = | 1.1714588E−01 | 8.1499735E−02 | −3.6143959E−02 | −2.1518400E−02 |
| A12 = | −5.3127334E−02 | −2.4728699E−02 | 1.0623172E−02 | 1.1370039E−02 |

TABLE 10B-continued

| Aspheric Coefficients | | | | |
|---|---|---|---|---|
| A14 = | 1.3597877E−02 | 3.2365981E−03 | −1.5262554E−03 | −2.7198137E−03 |
| A16 = | −1.8555862E−03 | −6.9557355E−05 | 8.7373344E−05 | 3.3556734E−04 |
| A18 = | 1.0527554E−04 | −1.2918826E−05 | | −1.7175834E−05 |

In the 10th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 10th embodiment, so an explanation in this regard will not be provided again.

Moreover, these parameters can be calculated from Table 10A and Table 10B as the values and satisfy the conditions in Table 10C:

TABLE 10C

| 10th Embodiment | | | |
|---|---|---|---|
| f [mm] | 2.37 | f/f12 | 0.70 |
| Fno | 2.41 | f/f3456 | 0.79 |
| HFOV [degrees] | 37.4 | f12/R4 | −2.66 |
| (N3 + N6)/2 | 1.61 | f2/f56 | 1.40 |
| (V4 + V5)/(V3 + V6) | 1.51 | f2/R4 | −3.51 |
| (CT1 + T12 + CT2)/f | 0.65 | f56/f | 1.35 |
| T23/f | 1.40 | f5 × f6/(f × f) | −2.15 |
| T23/ImgH | 1.84 | f6/R11 + f6/R12 | −6.79 |
| (T34 + T56)/f | 0.05 | R6/R7 | 0.82 |
| (T34 + T56)/ΣAT | 0.04 | Y62/Y11 | 3.85 |
| (R3 − R4)/(R3 + R4) | 0.24 | Y62/Y22 | 2.43 |
| (R6 − R7)/(R6 + R7) | −0.10 | ATmax/f | 1.40 |
| (R11 − R12)/(R11 + R12) | 0.34 | SL/TL | 1.01 |
| f/(CT1 + CT2) | 1.61 | TL/ImgH | 4.80 |
| f2/f1 | 0.12 | TL/EPD | 8.83 |
| f/R1 | −2.26 | FOV [degrees] | 74.9 |
| f/R7 | 0.43 | | |

Figure 19B:
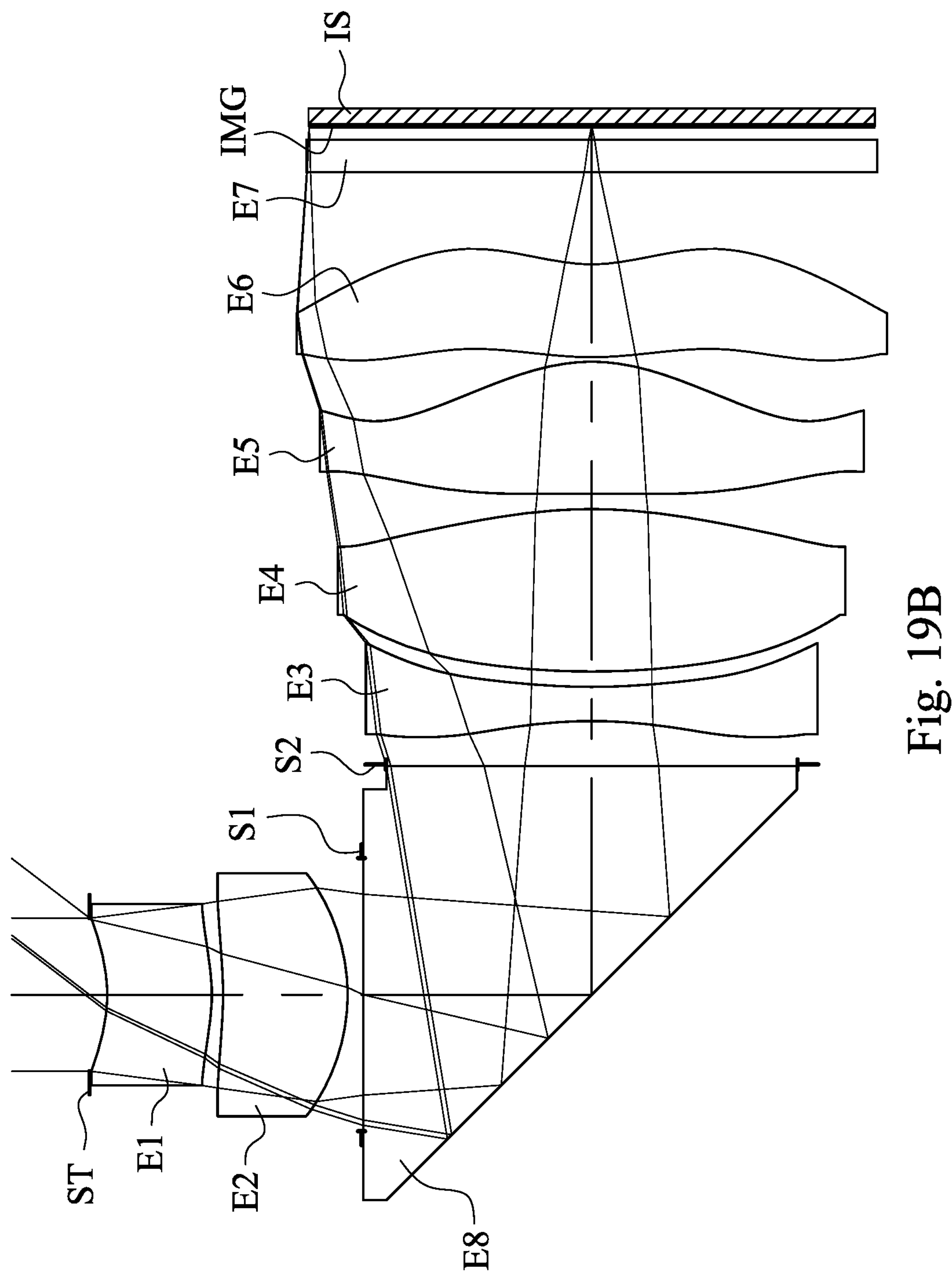
FIG. 19B is a schematic view of the imaging apparatus according to the 10th embodiment with another reflective element.

FIG. 19B is a schematic view of the imaging apparatus 10 according to the 10th embodiment with another reflective element E8. The difference between FIG. 19B and FIG. 19A is the reflective element E8 in FIG. 19B can fold the direction of the optical direction, which is favorable for being applied to electronic devices for different requirements.

11th Embodiment

Figure 21A:
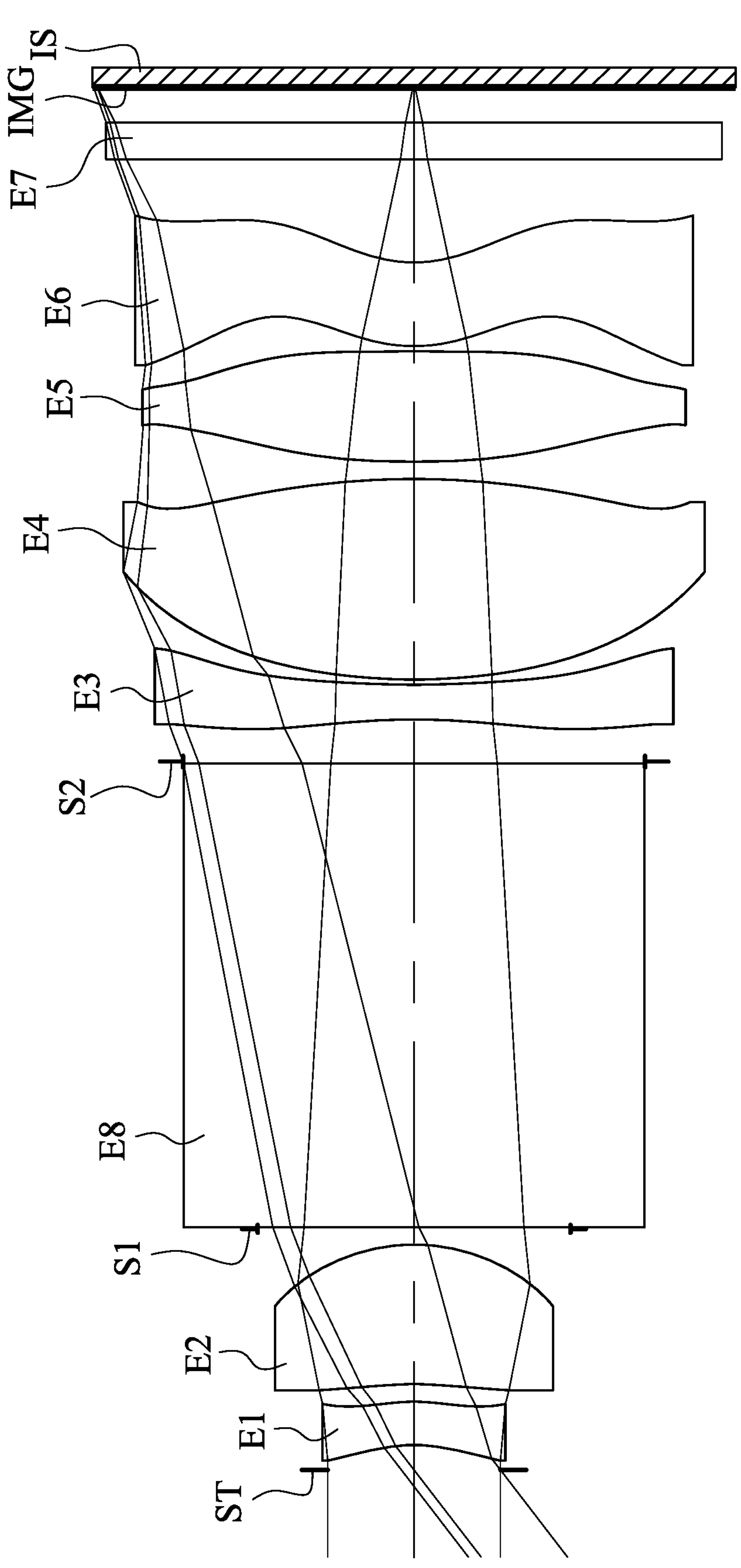
FIG. 21A is a schematic view of an imaging apparatus according to the 11th embodiment of the present disclosure.
Figure 22:
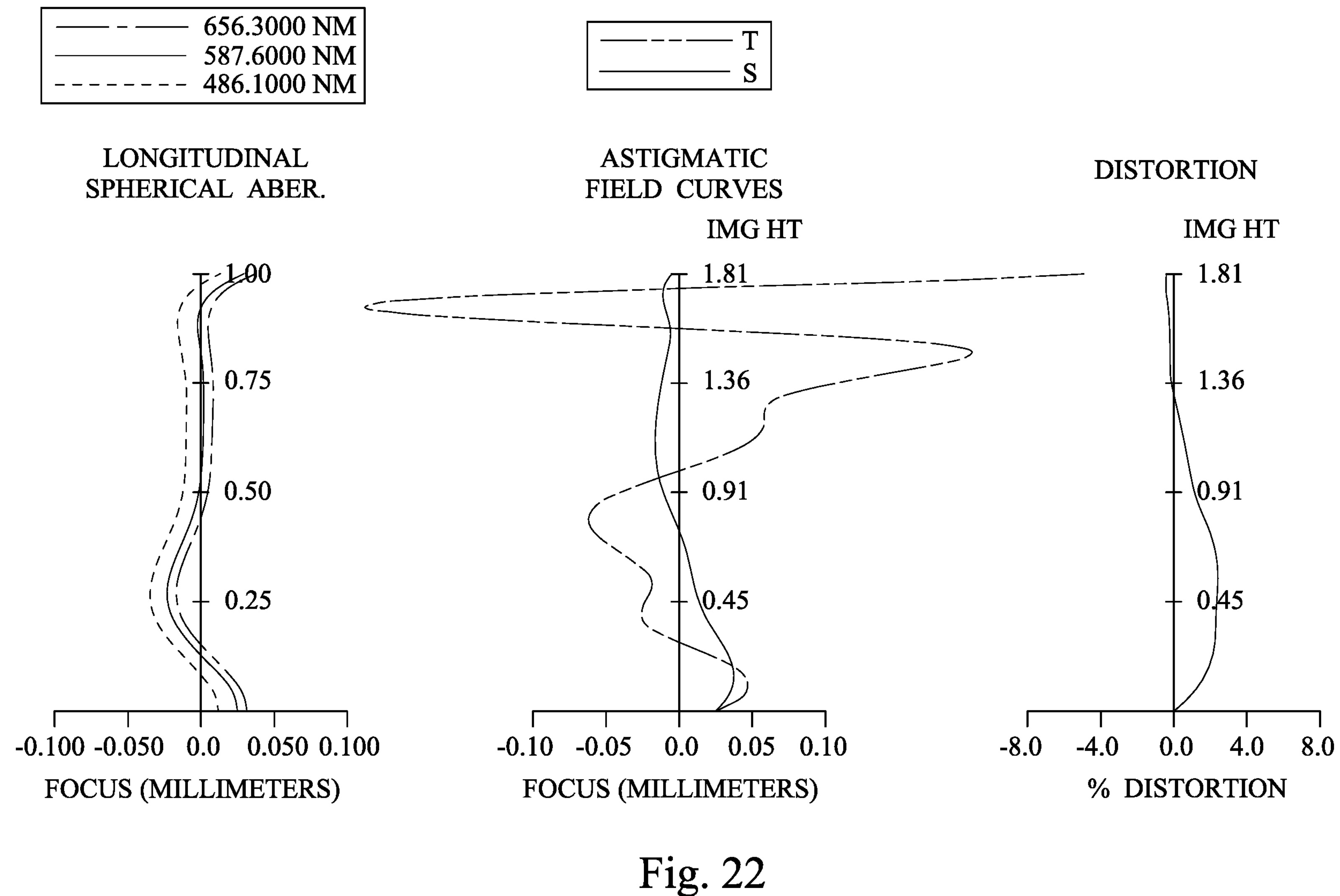
FIG. 22 shows spherical aberration curves, astigmatic field curves and a distortion curve of the imaging apparatus according to the 11th embodiment.

FIG. 21A is a schematic view of an imaging apparatus 11 according to the 11th embodiment of the present disclosure. FIG. 22 shows spherical aberration curves, astigmatic field curves and a distortion curve of the imaging apparatus 11 according to the 11th embodiment. In FIG. 21A, the imaging apparatus 11 includes an imaging system lens assembly (its reference numeral is omitted) and an image sensor IS. The imaging system lens assembly includes, in order from an object side to an image side along an optical path, an aperture stop ST, a first lens element E1, a second lens element E2, a stop S1, a reflective element E8, a stop S2, a third lens element E3, a fourth lens element E4, a fifth lens element E5, a sixth lens element E6, a filter E7 and an image surface IMG, wherein the image sensor IS is disposed on the image surface IMG of the imaging system lens assembly. The imaging system lens assembly includes six lens elements (E1, E2, E3, E4, E5, E6) without additional one or more lens elements inserted between the first lens element E1 and the sixth lens element E6.

The first lens element E1 with negative refractive power has an object-side surface being concave in a paraxial region thereof and an image-side surface being convex in a paraxial region thereof. The first lens element E1 is made of a plastic material, and has the object-side surface and the image-side surface being both aspheric. Furthermore, the image-side surface of the first lens element E1 includes one inflection point.

The second lens element E2 with positive refractive power has an object-side surface being concave in a paraxial region thereof and an image-side surface being convex in a paraxial region thereof. The second lens element E2 is made of a plastic material, and has the object-side surface and the image-side surface being both aspheric. Furthermore, the object-side surface of the second lens element E2 includes two inflection points.

The third lens element E3 with negative refractive power has an object-side surface being concave in a paraxial region thereof and an image-side surface being concave in a paraxial region thereof. The third lens element E3 is made of a plastic material, and has the object-side surface and the image-side surface being both aspheric. Furthermore, the object-side surface of the third lens element E3 includes two inflection points, and the image-side surface of the third lens element E3 includes one inflection point.

The fourth lens element E4 with positive refractive power has an object-side surface being convex in a paraxial region thereof and an image-side surface being convex in a paraxial region thereof. The fourth lens element E4 is made of a plastic material, and has the object-side surface and the image-side surface being both aspheric. Furthermore, the image-side surface of the fourth lens element E4 includes one inflection point.

The fifth lens element E5 with positive refractive power has an object-side surface being convex in a paraxial region thereof and an image-side surface being convex in a paraxial region thereof. The fifth lens element E5 is made of a plastic material, and has the object-side surface and the image-side surface being both aspheric. Furthermore, the object-side surface of the fifth lens element E5 includes one inflection point, and the image-side surface of the fifth lens element E5 includes four inflection points.

The sixth lens element E6 with positive refractive power has an object-side surface being convex in a paraxial region thereof and an image-side surface being concave in a paraxial region thereof. The sixth lens element E6 is made of a plastic material, and has the object-side surface and the image-side surface being both aspheric. Furthermore, the object-side surface of the sixth lens element E6 includes two inflection points, and the image-side surface of the sixth lens element E6 includes two inflection points and includes two critical points in an off-axis region thereof.

According to the 11th embodiment, the reflective element E8 is a prism, which is made of glass material and disposed between the second lens element E2 and the third lens element E3.

The filter E7 is made of a glass material, which is located between the sixth lens element E6 and the image surface IMG in order, and will not affect the focal length of the imaging system lens assembly.

The detailed optical data of the 11th embodiment are shown in Table 11A and the aspheric surface data are shown in Table 11B below.

TABLE 11A

| 11th Embodiment<br>f = 2.38 mm, Fno = 2.41, HFOV = 37.5 deg. | | | | | | | | |
|---|---|---|---|---|---|---|---|---|
| Surface # | | Curvature Radius | | Thickness | Material | Index | Abbe # | Focal Length |
| 0 | Object | Plano | | Infinity | | | | |
| 1 | Ape. Stop | Plano | | 0.143 | | | | |
| 2 | Lens 1 | −0.8607 | ASP | 0.248 | Plastic | 1.545 | 56.1 | −13.24 |
| 3 | | −1.0766 | ASP | 0.101 | | | | |
| 4 | Lens 2 | −1.7216 | ASP | 0.800 | Plastic | 1.544 | 56.0 | 3.64 |
| 5 | | −1.0711 | ASP | 0.090 | | | | |
| 6 | Stop | Plano | | 0.010 | | | | |
| 7 | Prism | Plano | | 2.660 | Glass | 1.835 | 42.7 | — |
| 8 | | Plano | | 0.010 | | | | |
| 9 | Stop | Plano | | 0.240 | | | | |
| 10 | Lens 3 | −4.7995 | ASP | 0.200 | Plastic | 1.686 | 18.4 | −3.61 |
| 11 | | 5.2130 | ASP | 0.030 | | | | |
| 12 | Lens 4 | 3.5523 | ASP | 1.150 | Plastic | 1.544 | 56.0 | 3.91 |
| 13 | | −4.6879 | ASP | 0.100 | | | | |
| 14 | Lens 5 | 10.3209 | ASP | 0.632 | Plastic | 1.548 | 52.5 | 9.54 |
| 15 | | −10.3578 | ASP | 0.030 | | | | |
| 16 | Lens 6 | 0.9262 | ASP | 0.480 | Plastic | 1.686 | 18.4 | 14.07 |
| 17 | | 0.8085 | ASP | 0.592 | | | | |
| 18 | Filter | Plano | | 0.210 | Glass | 1.517 | 64.2 | — |
| 19 | | Plano | | 0.201 | | | | |
| 20 | Image | Plano | | — | | | | |

Reference wavelength is 587.6 nm (d-line).
Effective radius of Surface 6 (stop S1) is 0.896 mm.
Effective radius of Surface 9 (stop S2) is 1.324 mm.

TABLE 11B

| Aspheric Coefficients | | | | |
|---|---|---|---|---|
| Surface # | 2 | 3 | 4 | 5 |
| k = | −5.8337200E+00 | −1.3359800E+01 | −8.2300000E+01 | 2.2046300E−01 |
| A4 = | 3.6252726E−01 | 1.1968405E+00 | −1.1405378E−01 | 1.1284920E−01 |
| A6 = | 1.9124727E+00 | 1.3500871E+00 | 3.8651080E+00 | −3.1724491E−01 |
| A8 = | −2.1295237E+01 | −1.7362519E+01 | −2.3630690E+01 | 1.2679241E+00 |
| A10 = | 8.5907811E+01 | 4.9229393E+01 | 6.9152968E+01 | −2.9982888E+00 |
| A12 = | −1.7378983E+02 | −6.2457303E+01 | −1.0441564E+02 | 3.7278679E+00 |
| A14 = | 1.3788817E+02 | 2.8426949E+01 | 6.0029026E+01 | −1.9679662E+00 |
| Surface # | 10 | 11 | 12 | 13 |
| k = | −2.8715200E+01 | −3.1959200E+00 | −1.9627400E+00 | 1.1612100E+00 |
| A4 = | −1.3734109E−01 | −1.6922115E−01 | 4.1465604E−02 | −8.4122198E−04 |
| A6 = | 5.7758868E−01 | 4.8507414E−01 | −8.6113771E−02 | 1.1146478E−03 |
| A8 = | −9.1782239E−01 | −7.7906275E−01 | 1.2486696E−01 | 2.2023756E−02 |
| A10 = | 8.4297817E−01 | 8.4683548E−01 | −8.4245033E−02 | −3.0112422E−02 |
| A12 = | −4.1212289E−01 | −5.8728386E−01 | 3.0215761E−02 | 1.5489231E−02 |
| A14 = | 4.4853715E−02 | 2.4460184E−01 | −5.5060589E−03 | −2.7263578E−03 |
| A16 = | 5.5009229E−02 | −5.5865781E−02 | 3.9947713E−04 | 6.7334763E−05 |
| A18 = | −2.6422221E−02 | 5.3825763E−03 | | |
| A20 = | 3.7502204E−03 | | | |
| Surface # | 14 | 15 | 16 | 17 |
| k = | 3.2787700E+01 | 2.4118000E+01 | −5.1579900E+00 | −2.0341700E+00 |
| A4 = | 3.4026721E−01 | 3.7102602E−01 | 4.1381634E−01 | 2.9722885E−03 |
| A6 = | −7.5275525E−01 | −1.8230961E+00 | −1.8798522E+00 | −1.1226800E+00 |
| A8 = | 9.7069120E−01 | 3.9350287E+00 | 2.4228143E+00 | 1.9095092E+00 |
| A10 = | −6.8752347E−01 | −5.2806727E+00 | −1.7813168E+00 | −1.6618476E+00 |
| A12 = | 1.3524454E−01 | 4.8130123E+00 | 8.6277102E−01 | 8.7201161E−01 |
| A14 = | 1.8544888E−01 | −3.0932904E+00 | −2.8228664E−01 | −2.7464214E−01 |
| A16 = | −1.8937307E−01 | 1.4121015E+00 | 5.9985906E−02 | 4.5408295E−02 |
| A18 = | 8.9943530E−02 | −4.4661819E−01 | −7.4284034E−03 | −1.4347468E−03 |
| A20 = | −2.5200823E−02 | 9.2161891E−02 | 4.0431256E−04 | −6.5614432E−04 |
| A22 = | 3.9976330E−03 | −1.1047931E−02 | | 7.1564070E−05 |
| A24 = | −2.7581397E−04 | 5.7887963E−04 | | |

In the 11th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 11th embodiment, so an explanation in this regard will not be provided again.

Moreover, these parameters can be calculated from Table 11A and Table 11B as the values and satisfy the conditions in Table 11C:

TABLE 11C

| 11th Embodiment | | | |
|---|---|---|---|
| f [mm] | 2.38 | f/f12 | 0.59 |
| Fno | 2.41 | f/f3456 | 0.56 |
| HFOV [degrees] | 37.5 | f12/R4 | −3.74 |
| (N3 + N6)/2 | 1.69 | f2/f56 | 0.73 |
| (V4 + V5)/(V3 + V6) | 2.95 | f2/R4 | −3.39 |
| (CT1 + T12 + CT2)/f | 0.48 | f56/f | 2.10 |
| T23/f | 1.26 | f5 × f6/(f × f) | 23.64 |
| T23/ImgH | 1.66 | f6/R11 + f6/R12 | 32.59 |
| (T34 + T56)/f | 0.03 | R6/R7 | 1.47 |
| (T34 + T56)/ΣAT | 0.02 | Y62/Y11 | 3.23 |
| (R3 − R4)/(R3 + R4) | 0.23 | Y62/Y22 | 2.01 |
| (R6 − R7)/(R6 + R7) | 0.19 | ATmax/f | 1.26 |
| (R11 − R12)/(R11 + R12) | 0.07 | SL/TL | 1.02 |
| f/(CT1 + CT2) | 2.27 | TL/ImgH | 4.29 |
| f2/f1 | −0.27 | TL/EPD | 7.87 |
| f/R1 | −2.77 | FOV [degrees] | 75.1 |
| f/R7 | 0.67 | | |

Figure 21B:
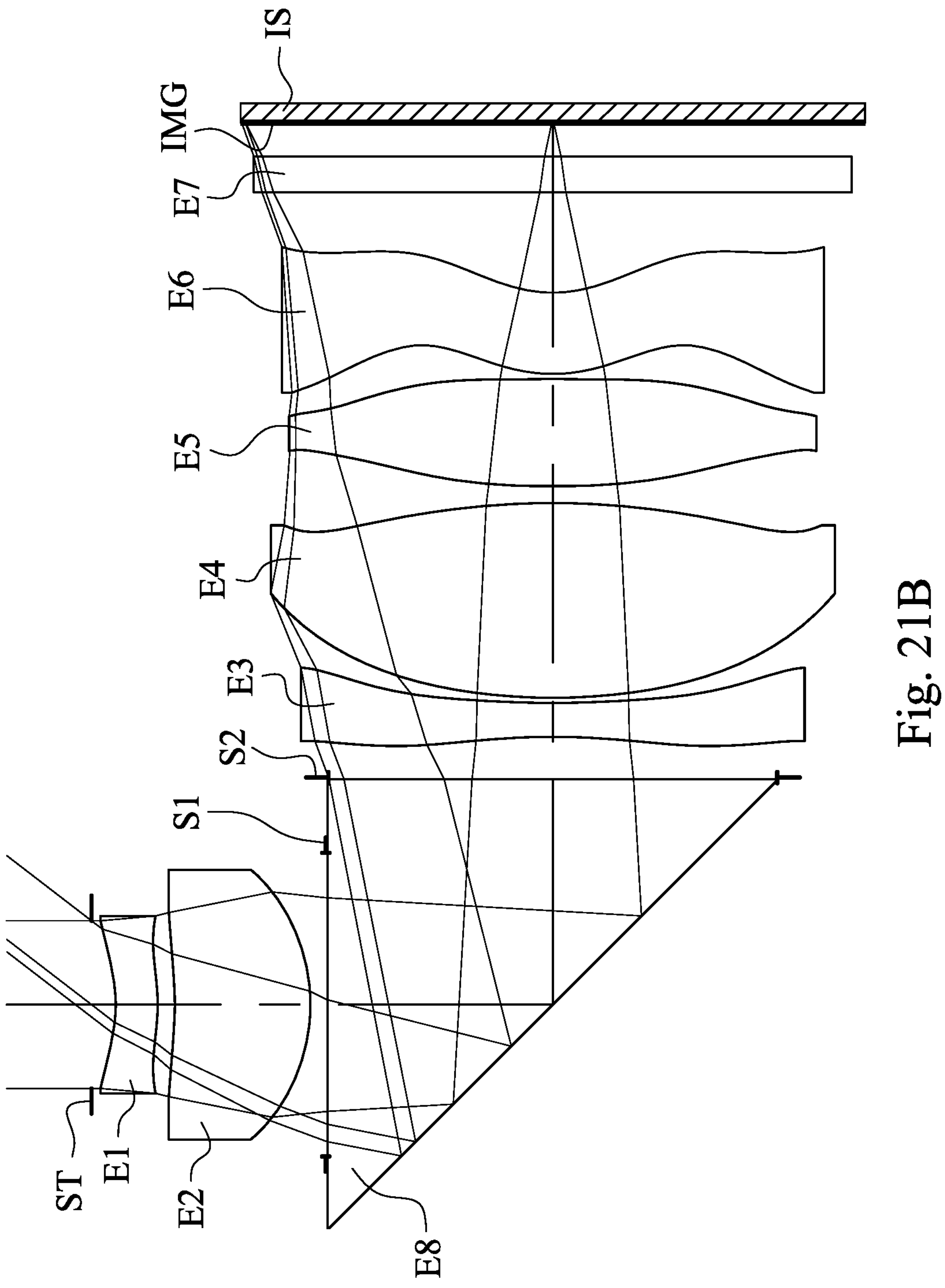
FIG. 21B is a schematic view of the imaging apparatus according to the 11th embodiment with another reflective element.

FIG. 21B is a schematic view of the imaging apparatus 11 according to the 11th embodiment with another reflective element E8. The difference between FIG. 21B and FIG. 21A is the reflective element E8 in FIG. 21B can fold the direction of the optical direction, which is favorable for being applied to electronic devices for different requirements.

12th Embodiment

Figure 23A:
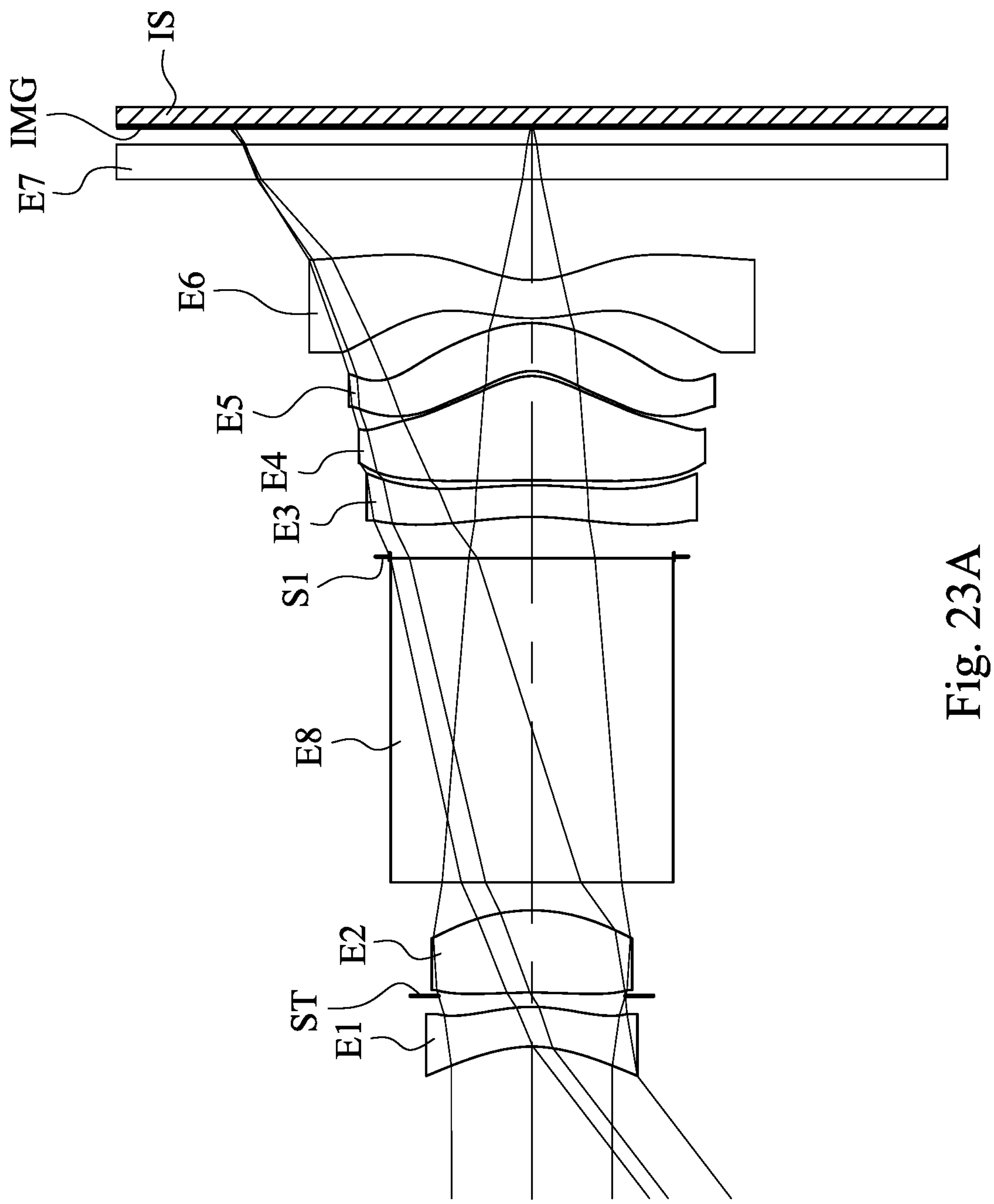
FIG. 23A is a schematic view of an imaging apparatus according to the 12th embodiment of the present disclosure.
Figure 24:
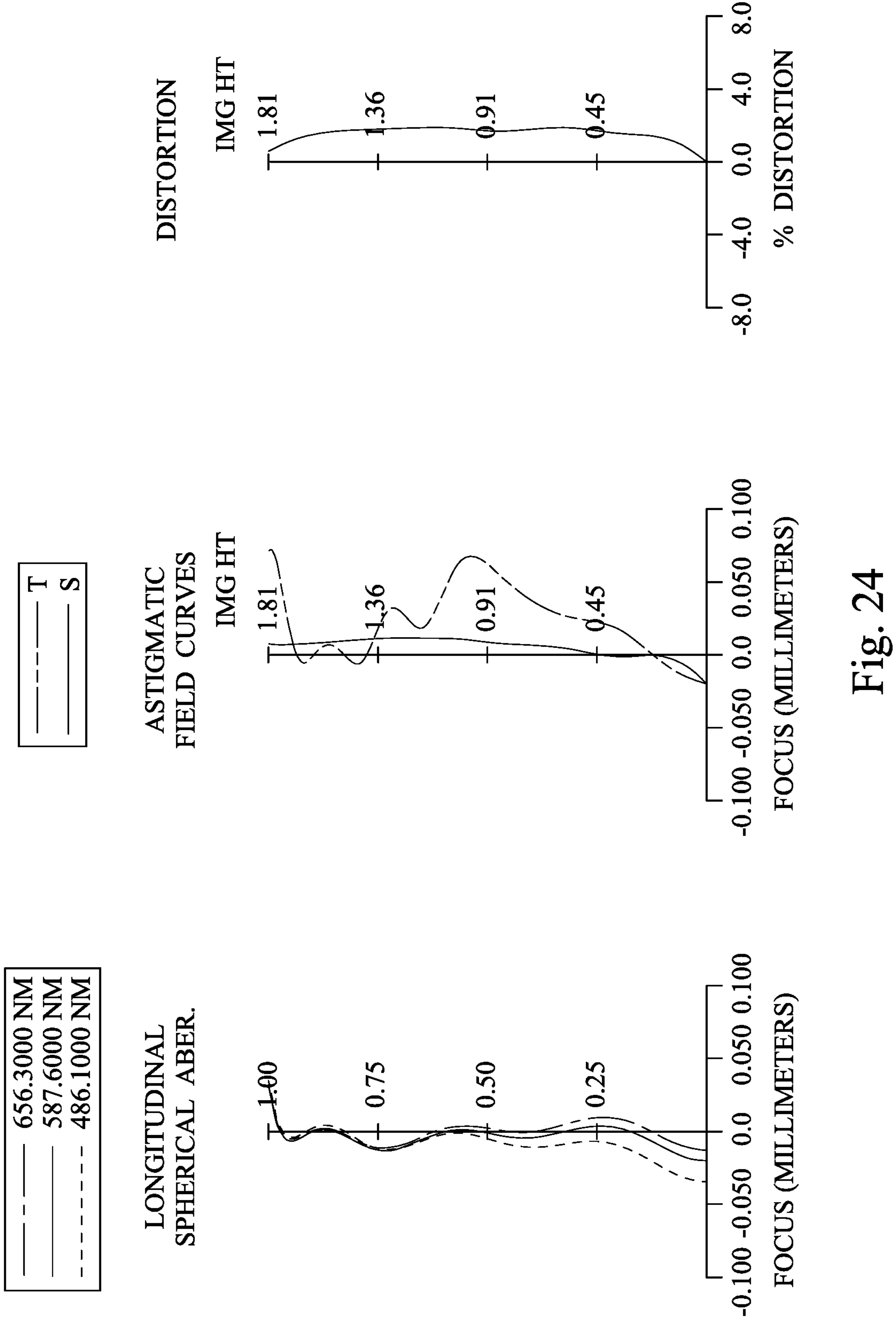
FIG. 24 shows spherical aberration curves, astigmatic field curves and a distortion curve of the imaging apparatus according to the 12th embodiment.

FIG. 23A is a schematic view of an imaging apparatus 12 according to the 12th embodiment of the present disclosure. FIG. 24 shows spherical aberration curves, astigmatic field curves and a distortion curve of the imaging apparatus 12 according to the 12th embodiment. In FIG. 23A, the imaging apparatus 12 includes an imaging system lens assembly (its reference numeral is omitted) and an image sensor IS. The imaging system lens assembly includes, in order from an object side to an image side along an optical path, a first lens element E1, an aperture stop ST, a second lens element E2, a reflective element E8, a stop S1, a third lens element E3, a fourth lens element E4, a fifth lens element E5, a sixth lens element E6, a filter E7 and an image surface IMG, wherein the image sensor IS is disposed on the image surface IMG of the imaging system lens assembly. The imaging system lens assembly includes six lens elements (E1, E2, E3, E4, E5, E6) without additional one or more lens elements inserted between the first lens element E1 and the sixth lens element E6.

The first lens element E1 with negative refractive power has an object-side surface being concave in a paraxial region thereof and an image-side surface being convex in a paraxial region thereof. The first lens element E1 is made of a plastic material, and has the object-side surface and the image-side surface being both aspheric. Furthermore, the image-side surface of the first lens element E1 includes one inflection point.

The second lens element E2 with positive refractive power has an object-side surface being concave in a paraxial region thereof and an image-side surface being convex in a paraxial region thereof. The second lens element E2 is made of a plastic material, and has the object-side surface and the image-side surface being both aspheric. Furthermore, the object-side surface of the second lens element E2 includes one inflection point, and the image-side surface of the second lens element E2 includes one inflection point.

The third lens element E3 with negative refractive power has an object-side surface being concave in a paraxial region thereof and an image-side surface being convex in a paraxial region thereof. The third lens element E3 is made of a plastic material, and has the object-side surface and the image-side surface being both aspheric. Furthermore, the object-side surface of the third lens element E3 includes one inflection point, and the image-side surface of the third lens element E3 includes two inflection points.

The fourth lens element E4 with positive refractive power has an object-side surface being concave in a paraxial region thereof and an image-side surface being convex in a paraxial region thereof. The fourth lens element E4 is made of a plastic material, and has the object-side surface and the image-side surface being both aspheric. Furthermore, the object-side surface of the fourth lens element E4 includes three inflection points, and the image-side surface of the fourth lens element E4 includes five inflection points.

The fifth lens element E5 with negative refractive power has an object-side surface being concave in a paraxial region thereof and an image-side surface being convex in a paraxial region thereof. The fifth lens element E5 is made of a plastic material, and has the object-side surface and the image-side surface being both aspheric. Furthermore, the object-side surface of the fifth lens element E5 includes four inflection points, and the image-side surface of the fifth lens element E5 includes two inflection points.

The sixth lens element E6 with negative refractive power has an object-side surface being convex in a paraxial region thereof and an image-side surface being concave in a paraxial region thereof. The sixth lens element E6 is made of a plastic material, and has the object-side surface and the image-side surface being both aspheric. Furthermore, the object-side surface of the sixth lens element E6 includes two inflection points, and the image-side surface of the sixth lens element E6 includes two inflection points and includes one critical point in an off-axis region thereof.

According to the 12th embodiment, the reflective element E8 is a prism, which is made of glass material and disposed between the second lens element E2 and the third lens element E3.

The filter E7 is made of a glass material, which is located between the sixth lens element E6 and the image surface IMG in order, and will not affect the focal length of the imaging system lens assembly.

The detailed optical data of the 12th embodiment are shown in Table 12A and the aspheric surface data are shown in Table 12B below.

TABLE 12A

| 12th Embodiment f = 2.33 mm, Fno = 2.40, HFOV = 37.5 deg. | | | | | | | | |
|---|---|---|---|---|---|---|---|---|
| Surface # | | Curvature Radius | | Thickness | Material | Index | Abbe # | Focal Length |
| 0 | Object | Plano | | Infinity | | | | |
| 1 | Lens 1 | −0.8107 | ASP | 0.239 | Plastic | 1.569 | 37.4 | −15.16 |
| 2 | | −0.9905 | ASP | 0.066 | | | | |
| 3 | Ape. Stop | Plano | | 0.020 | | | | |
| 4 | Lens 2 | −3.3021 | ASP | 0.495 | Plastic | 1.546 | 56.0 | 2.66 |
| 5 | | −1.0630 | ASP | 0.170 | | | | |
| 6 | Prism | Plano | | 1.950 | Glass | 1.909 | 31.4 | — |
| 7 | | Plano | | 0.010 | | | | |
| 8 | Stop | Plano | | 0.240 | | | | |
| 9 | Lens 3 | −1.8854 | ASP | 0.190 | Plastic | 1.693 | 18.4 | −10.39 |
| 10 | | −2.6604 | ASP | 0.030 | | | | |
| 11 | Lens 4 | −7.4970 | ASP | 0.628 | Plastic | 1.546 | 56.0 | 0.57 |
| 12 | | −0.3087 | ASP | 0.030 | | | | |
| 13 | Lens 5 | −0.2735 | ASP | 0.288 | Plastic | 1.546 | 56.0 | −0.95 |
| 14 | | −0.7909 | ASP | 0.030 | | | | |
| 15 | Lens 6 | 1.0477 | ASP | 0.230 | Plastic | 1.693 | 18.4 | −2.77 |
| 16 | | 0.6169 | ASP | 0.606 | | | | |
| 17 | Filter | Plano | | 0.210 | Glass | 1.518 | 64.2 | — |
| 18 | | Plano | | 0.108 | | | | |
| 19 | Image | Plano | | — | | | | |

Reference wavelength is 587.6 nm (d-line).
Effective radius of Surface 9 (stop S1) is 0.8535 mm.

TABLE 12B

| Aspheric Coefficients | | | | |
|---|---|---|---|---|
| Surface # | 2 | 3 | 5 | 6 |
| k = | −5.0926130E+00 | −1.2367550E+01 | −9.0000000E+01 | −1.4636110E+00 |
| A4 = | −2.4789383E−01 | 2.3621982E−01 | 8.5488094E−01 | 7.5040477E−02 |
| A6 = | 2.0128610E+00 | 1.6030292E+00 | −6.5619391E+00 | −5.0067469E+00 |
| A8 = | −8.8195915E+00 | −4.2580286E+00 | 4.4980916E+01 | 7.2548263E+01 |
| A10 = | 2.6040107E+01 | 3.3671655E+00 | −1.9220539E+02 | −5.9447084E+02 |
| A12 = | −4.8407222E+01 | 3.9032329E+01 | 5.1222053E+02 | 2.9249177E+03 |
| A14 = | 4.4448777E+01 | −1.0211260E+02 | −7.1579735E+02 | −8.7081077E+03 |
| A16 = | −1.3655325E+01 | 6.8625662E+01 | 3.4788045E+02 | 1.5270825E+04 |
| A18 = | | | 1.6401400E+02 | −1.4344617E+04 |
| A20 = | | | −1.5789199E+02 | 5.5177182E+03 |
| Surface # | 10 | 11 | 12 | 13 |
| k = | −4.4669200E+01 | −9.0000000E+01 | 3.3681850E+01 | −9.1169820E+00 |
| A4 = | −3.3743470E−01 | 5.6822705E−02 | 7.4121098E−01 | −5.3530087E+00 |
| A6 = | 4.9303444E+00 | 1.4998803E+00 | −5.8455888E+00 | 5.9339725E+01 |
| A8 = | −2.9069165E+01 | −1.1272392E+01 | 2.9772933E+01 | −3.1365274E+02 |
| A10 = | 1.0816395E+02 | 4.9055518E+01 | −1.0558994E+02 | 9.0793809E+02 |
| A12 = | −2.6695834E+02 | −1.2509882E+02 | 2.9780304E+02 | −1.3928026E+03 |
| A14 = | 4.5057486E+02 | 1.9270498E+02 | −6.5857400E+02 | 6.4786990E+02 |
| A16 = | −5.3079958E+02 | −1.8072146E+02 | 1.0607444E+03 | 1.5153877E+03 |
| A18 = | 4.4048227E+02 | 9.8135276E+01 | −1.1779756E+03 | −3.2971504E+03 |
| A20 = | −2.5635385E+02 | −2.3646322E+01 | 8.6795279E+02 | 3.0830913E+03 |
| A22 = | 1.0230494E+02 | −3.6347048E+00 | −4.0351573E+02 | −1.5982197E+03 |
| A24 = | −2.6620908E+01 | 3.9736776E+00 | 1.0695972E+02 | 4.4576326E+02 |
| A26 = | 4.0605974E+00 | −9.8532757E−01 | −1.2309894E+01 | −5.2222411E+01 |
| A28 = | −2.7491162E−01 | 8.6148888E−02 | | |
| Surface # | 14 | 15 | 16 | 17 |
| k = | −8.2135800E+00 | −1.0000000E+00 | −4.7651970E+01 | −1.0000000E+00 |
| A4 = | −6.7856608E+00 | −1.3219353E+00 | 5.4949383E−01 | −1.5659351E+00 |
| A6 = | 7.9890108E+01 | 2.4811457E+01 | −2.1629681E+00 | 1.1279780E+00 |
| A8 = | −4.5016571E+02 | −1.6643532E+02 | −1.4777704E+01 | −7.1740460E−02 |
| A10 = | 1.4554311E+03 | 6.5324890E+02 | 8.8025547E+01 | 1.2139271E+00 |
| A12 = | −2.8422483E+03 | −1.7000655E+03 | −2.1267733E+02 | −4.2369595E+00 |
| A14 = | 3.2570619E+03 | 3.0863621E+03 | 3.0201227E+02 | 4.8410402E+00 |
| A16 = | −1.6553177E+03 | −3.9779525E+03 | −2.7895784E+02 | −2.0774766E+00 |
| A18 = | −8.0854111E+02 | 3.6407925E+03 | 1.7416406E+02 | −5.0751150E−01 |
| A20 = | 1.9805298E+03 | −2.3330268E+03 | −7.4148103E+01 | 9.8296550E−01 |
| A22 = | −1.4788153E+03 | 1.0137465E+03 | 2.1212585E+01 | −4.6275038E−01 |

TABLE 12B-continued

| Aspheric Coefficients | | | | |
|---|---|---|---|---|
| A24 = | 5.7301409E+02 | −2.8097982E+02 | −3.9001726E+00 | 1.0127286E−01 |
| A26 = | −1.1214737E+02 | 4.3976441E+01 | 4.1625406E−01 | −8.8406337E−03 |
| A28 = | 8.1891896E+00 | −2.8620569E+00 | −1.9597395E−02 | |

In the 12th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 12th embodiment, so an explanation in this regard will not be provided again.

Moreover, these parameters can be calculated from Table 12A and Table 12B as the values and satisfy the conditions in Table 12C:

TABLE 12C

| 12th Embodiment | | | |
|---|---|---|---|
| f [mm] | 2.33 | f/f12 | 0.84 |
| Fno | 2.40 | f/f3456 | 0.29 |
| HFOV [degrees] | 37.5 | f12/R4 | −2.60 |
| (N3 + N6)/2 | 1.69 | f2/f56 | −4.57 |
| (V4 + V5)/(V3 + V6) | 3.05 | f2/R4 | −2.51 |
| (CT1 + T12 + CT2)/f | 0.35 | f56/f | −0.25 |
| T23/f | 1.02 | f5 × f6/(f × f) | 0.49 |
| T23/ImgH | 1.31 | f6/R11 + f6/R12 | −7.14 |
| (T34 + T56)/f | 0.03 | R6/R7 | 0.35 |
| (T34 + T56)/ΣAT | 0.02 | Y62/Y11 | 2.11 |
| (R3 − R4)/(R3 + R4) | 0.51 | Y62/Y22 | 2.22 |
| (R6 − R7)/(R6 + R7) | −0.48 | ATmax/f | 1.02 |
| (R11 − R12)/(R11 + R12) | 0.26 | SL/TL | 0.94 |
| f/(CT1 + CT2) | 3.17 | TL/ImgH | 3.05 |
| f2/f1 | −0.18 | TL/EPD | 5.71 |
| f/R1 | −2.87 | FOV [degrees] | 75.0 |
| f/R7 | −0.31 | | |

Figure 23B:
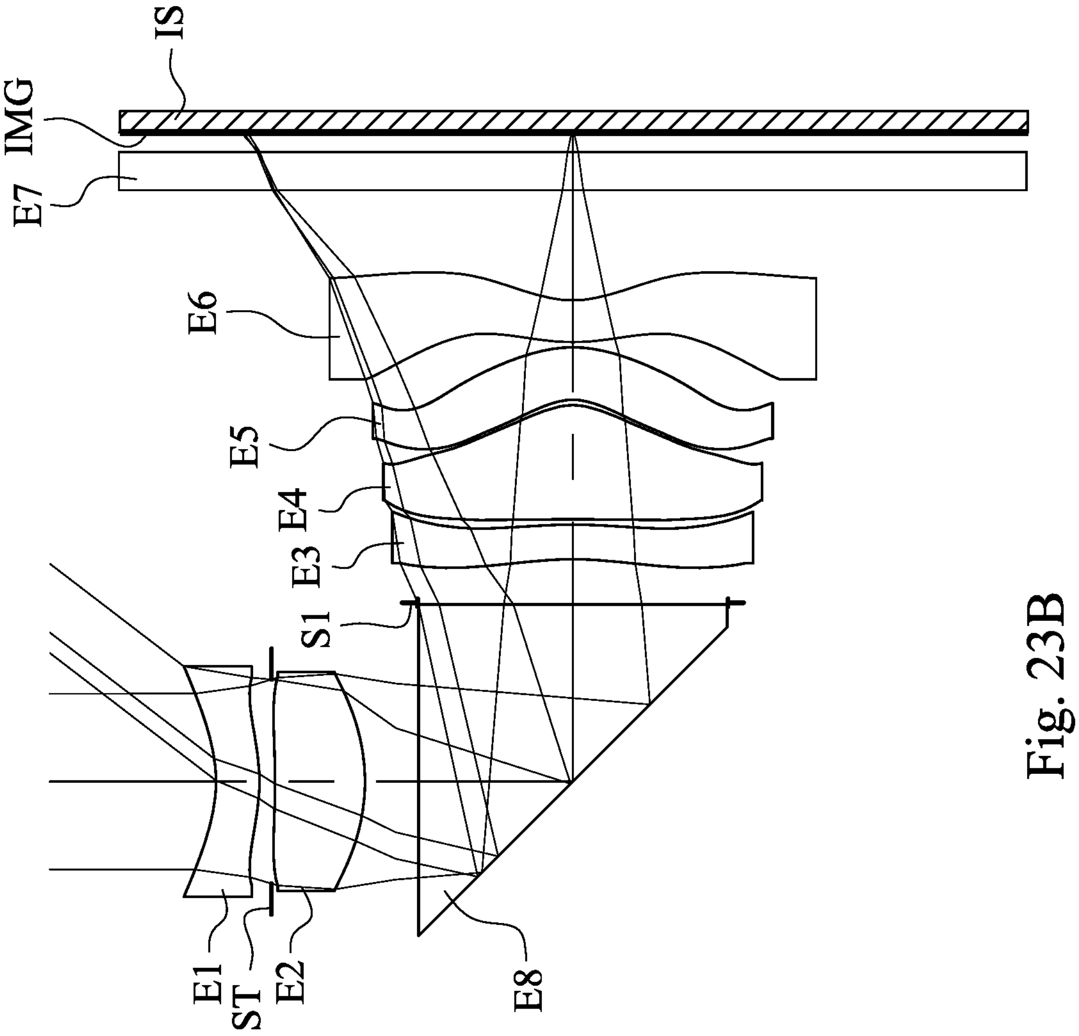
FIG. 23B is a schematic view of the imaging apparatus according to the 12th embodiment with another reflective element.

FIG. 23B is a schematic view of the imaging apparatus 12 according to the 12th embodiment with another reflective element E8. The difference between FIG. 23B and FIG. 23A is the reflective element E8 in FIG. 23B can fold the direction of the optical direction, which is favorable for being applied to electronic devices for different requirements.

13th Embodiment

Figure 25A:
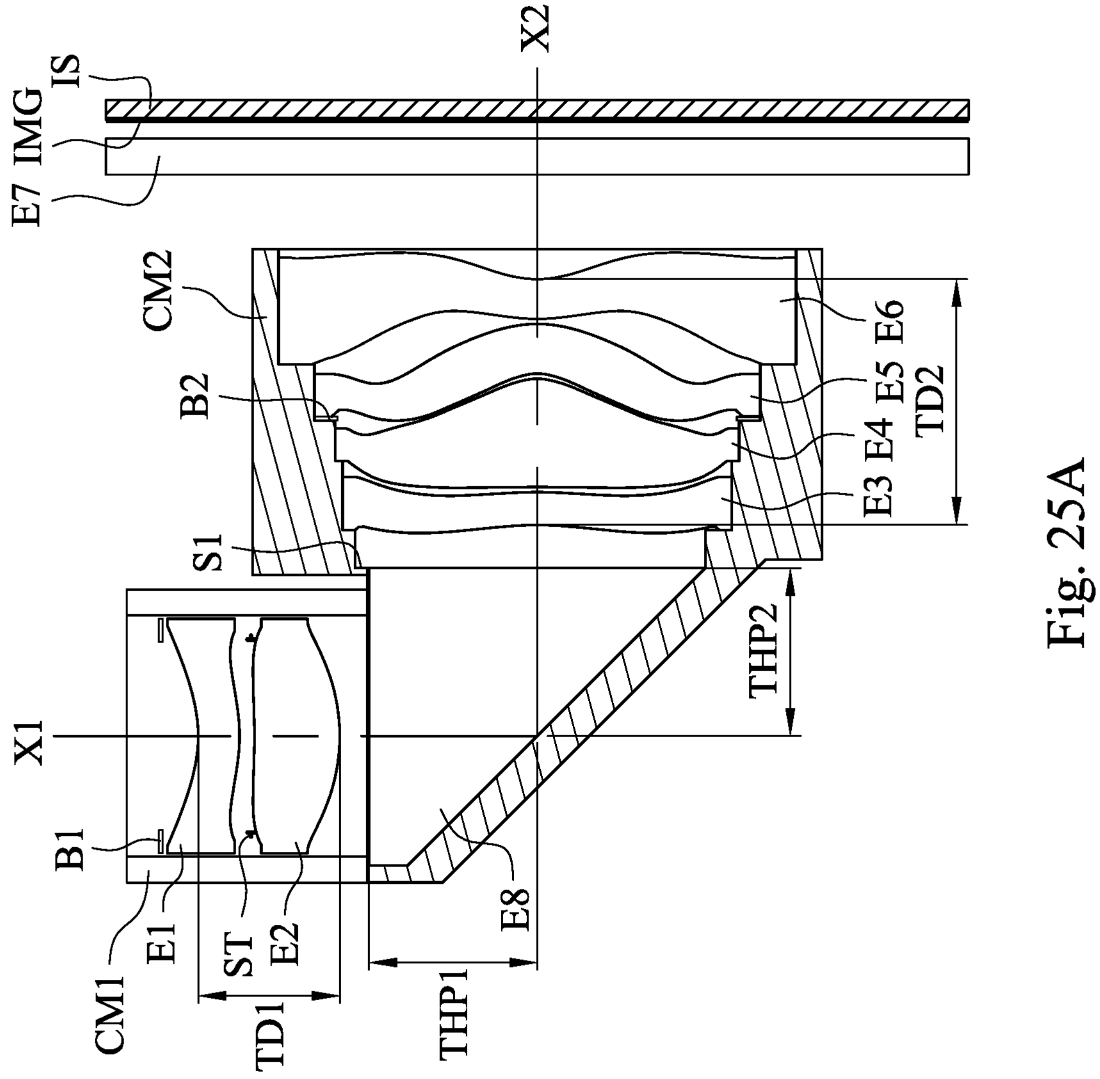
FIG. 25A is a schematic view of parameters of an imaging apparatus according to the 13th embodiment of the present disclosure.
Figure 25B:
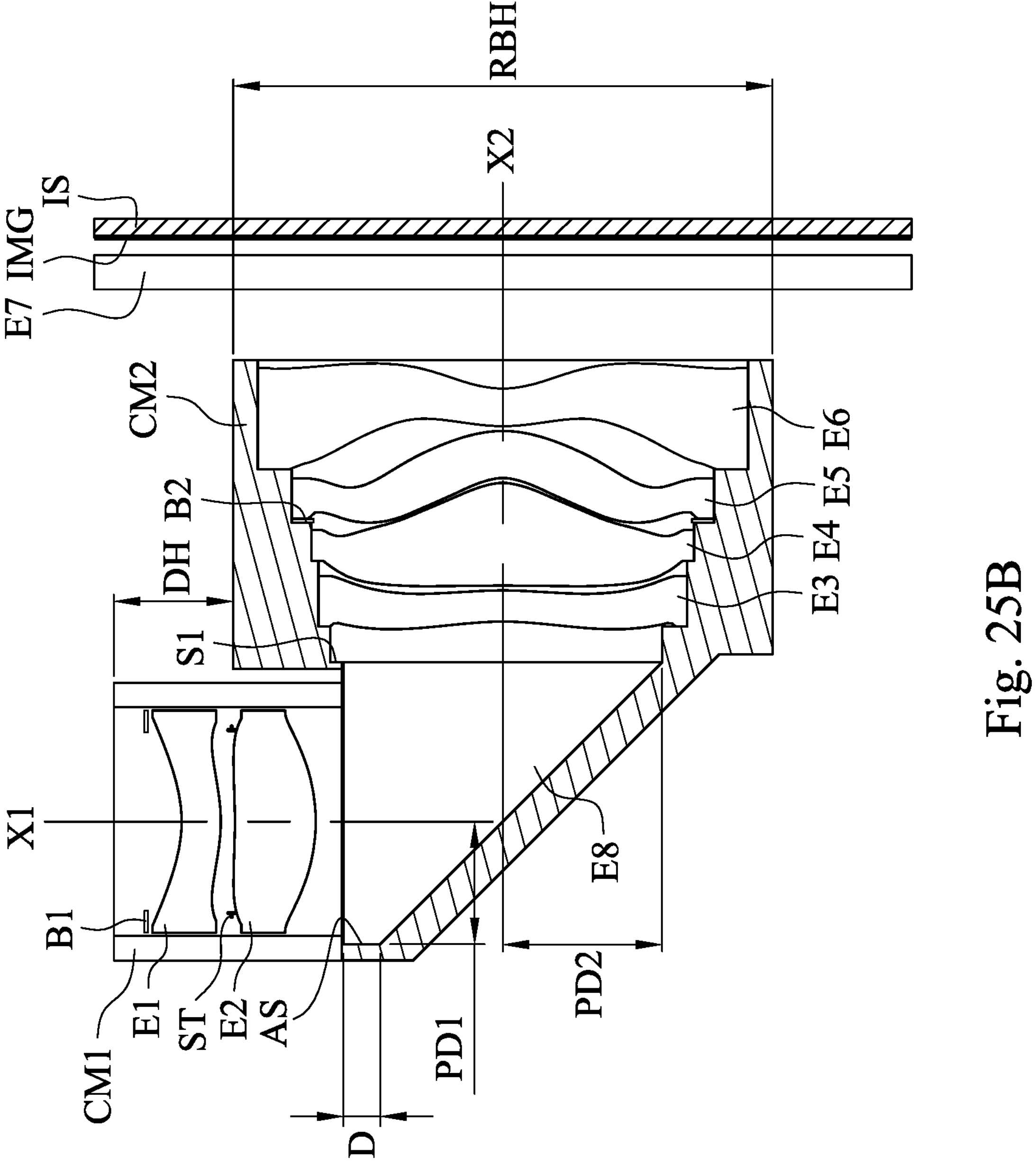
FIG. 25B is another schematic view of parameters of the imaging apparatus according to the 13th embodiment of the present disclosure.
Figure 25C:
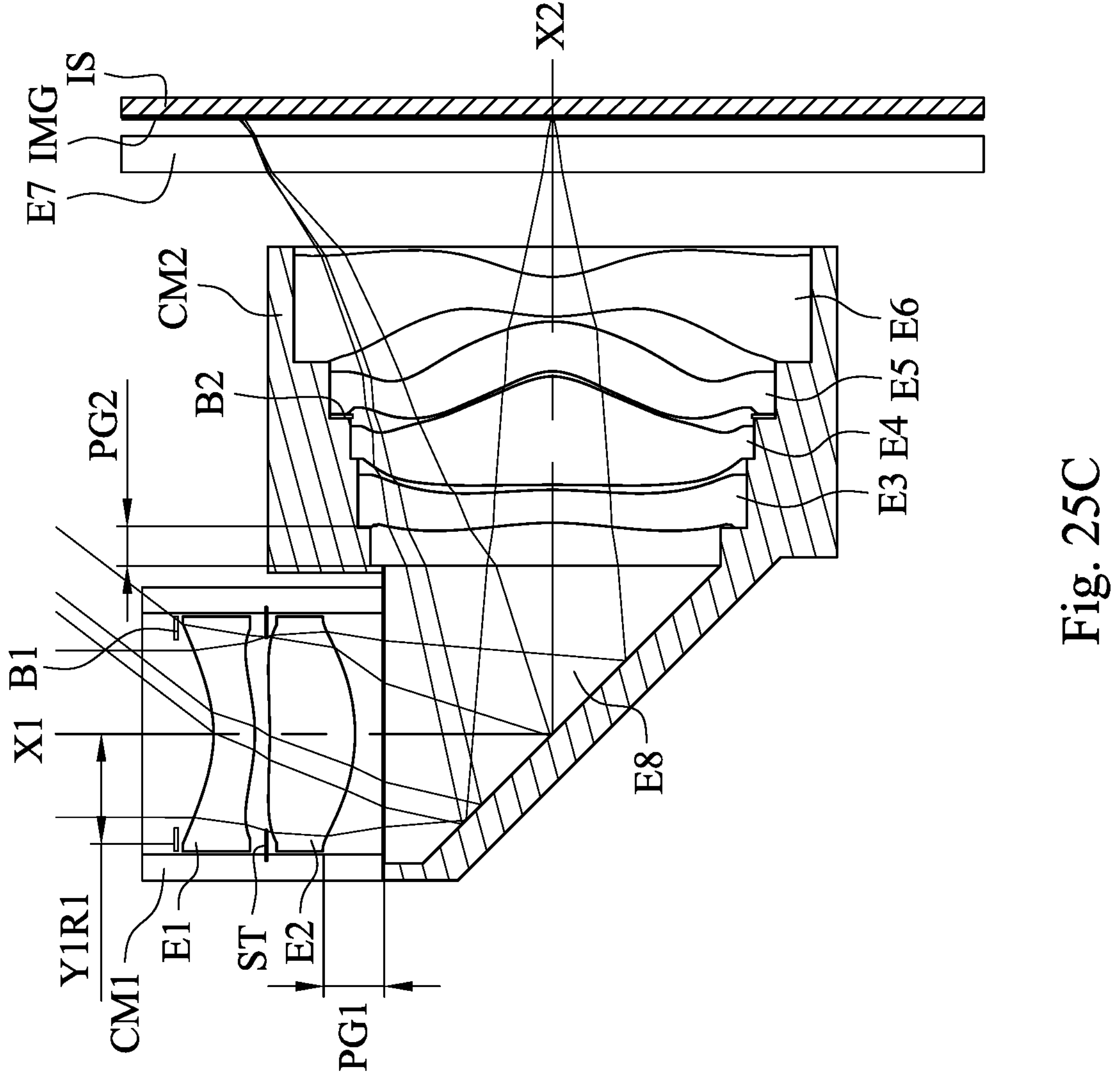
FIG. 25C is another schematic view of parameters of the imaging apparatus according to the 13th embodiment of the present disclosure.

FIG. 25A, FIG. 25B and FIG. 25C are schematic views of parameters of an imaging apparatus 13 according to the 13th embodiment of the present disclosure. In FIG. 25A, FIG. 25B and FIG. 25C, the imaging apparatus 13 of the 13th embodiment includes an imaging system lens assembly (its reference numeral is omitted) and an image sensor IS. The imaging system lens assembly includes, in order from an object side to an image side along an optical path, a first lens containing mechanism CM1, a second lens containing mechanism CM2, a filter E7 and an image surface IMG, and the imaging system lens assembly further includes at least one light blocking element. The image sensor IS is disposed on the image surface IMG.

The first lens containing mechanism CM1 includes a first lens group. The first lens group includes at least one lens element, the lens element of the first lens group has an object-side surface towards the object side and an image-side surface towards the image side. An optical axis of the first lens group is a first optical axis X1. Specifically, the first lens group includes a first lens element E1 and a second lens element E2, and a light blocking sheet B1, the first lens element E1, an aperture stop ST and the second lens element E2 are disposed in the first lens containing mechanism CM1 in order from the object side to the image side along an optical path.

The second lens containing mechanism CM2 includes a reflective element E8 and a second lens group. The second lens group includes at least one lens element, each of the reflective element E8 and the lens element of the second lens group has an object-side surface towards the object side and an image-side surface towards the image side. An optical axis of the second lens group is a second optical axis X2. Specifically, the reflective element E8, a stop S1, a third lens element E3, a fourth lens element E4, a light blocking sheet B2, a fifth lens element E5 and a sixth lens element E6 are disposed in the second lens containing mechanism CM2 in order from the object side to the image side along an optical path. The reflective element E8 is a prism, the object-side surface of the third lens element E3 has a light blocking coating, which can be deemed as the light blocking element. Further, in FIG. 25B, the second lens containing mechanism CM2 has a receiving surface AS, the receiving surface AS parallel to the first optical axis X1 is located between the prism (which is reflective element E8) and the second lens containing mechanism CM2.

Figure 25D:
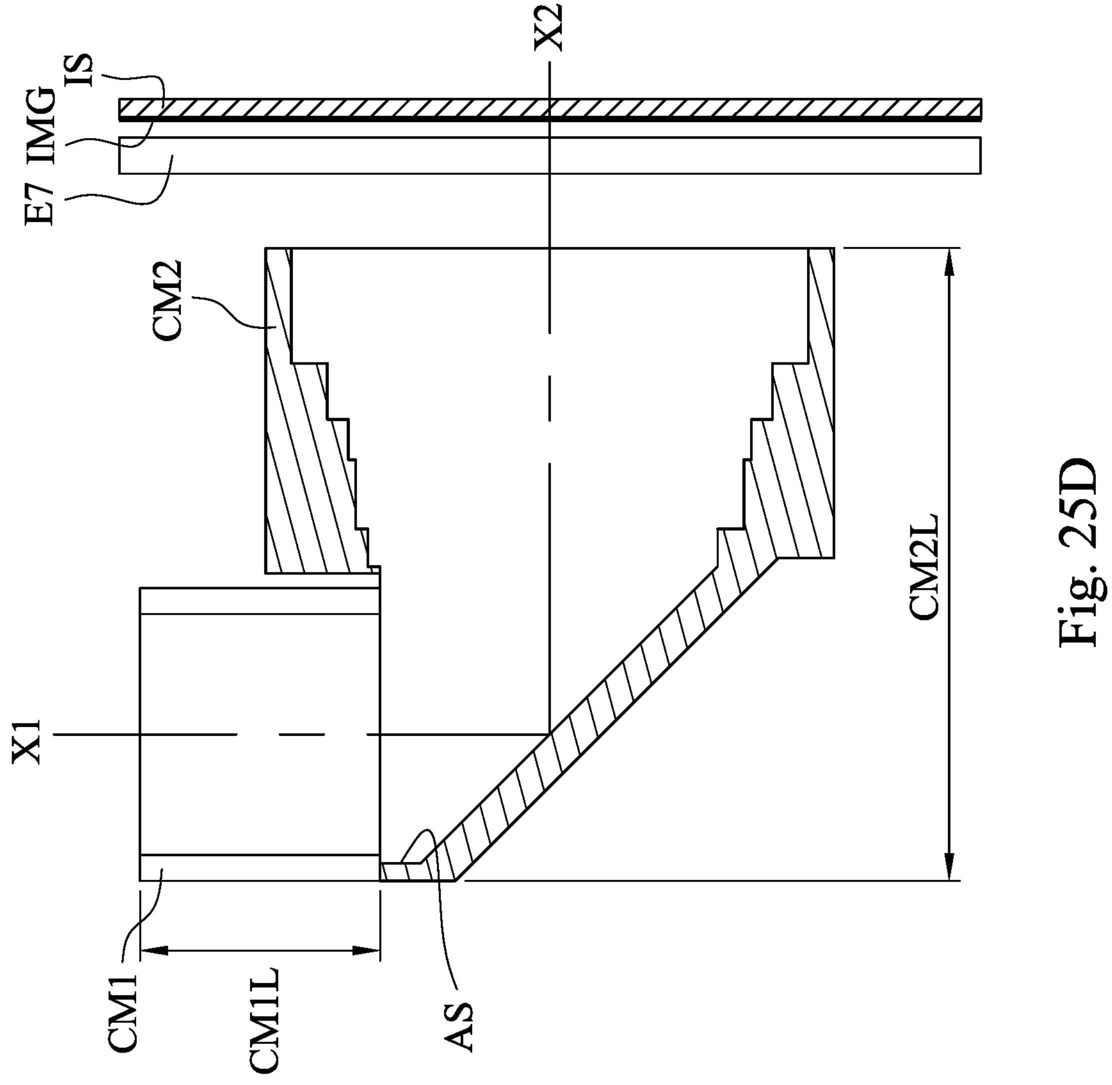
FIG. 25D is a schematic view of the first lens containing mechanism and the second lens containing mechanism of the imaging apparatus according to the 13th embodiment.
Figure 25E:
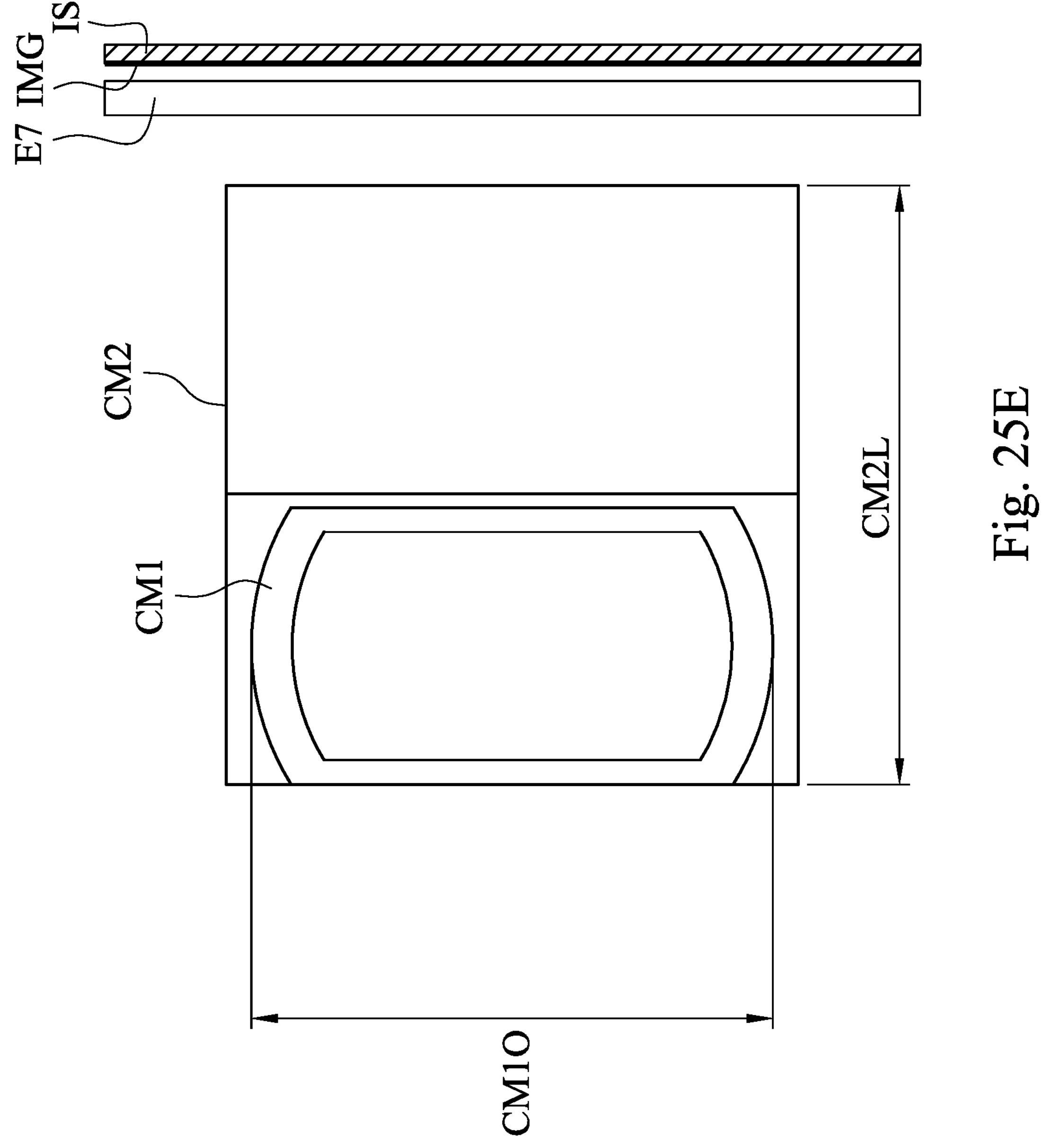
FIG. 25E is another schematic view of the first lens containing mechanism and the second lens containing mechanism of the imaging apparatus according to the 13th embodiment.
Figure 25F:
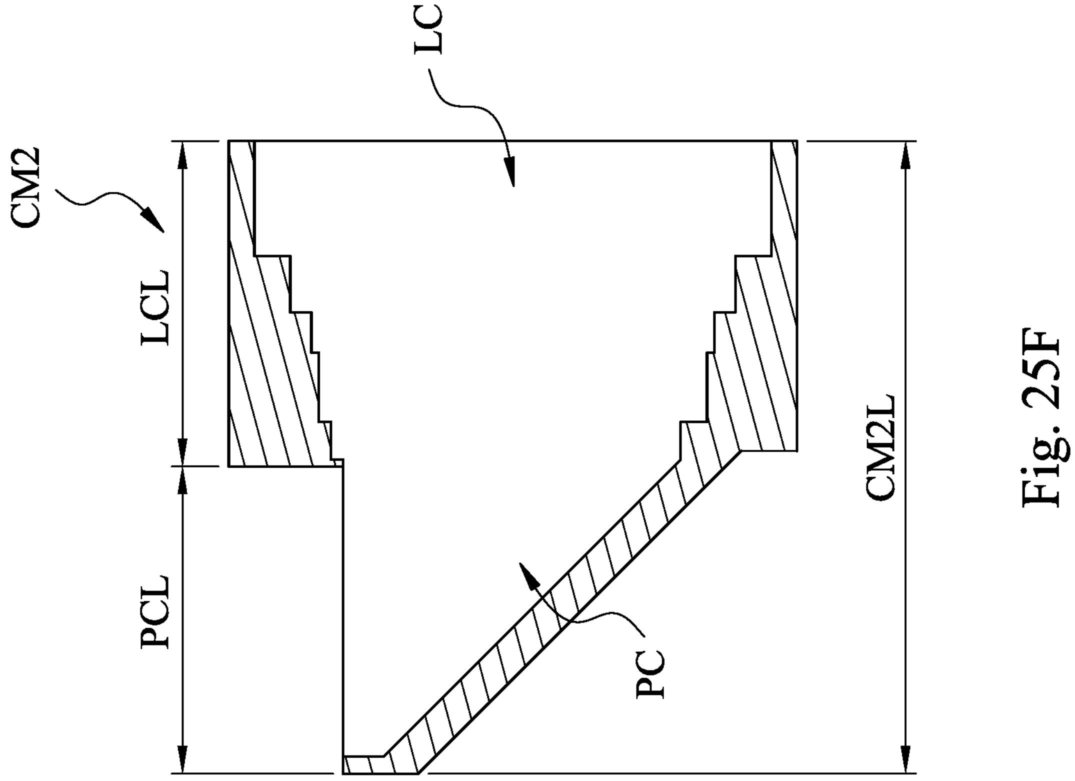
FIG. 25F is a schematic view of the second lens containing mechanism of the imaging apparatus according to the 13th embodiment.

FIG. 25D is a schematic view of the first lens containing mechanism CM1 and the second lens containing mechanism CM2 of the imaging apparatus 13 according to the 13th embodiment. FIG. 25E is another schematic view of the first lens containing mechanism CM1 and the second lens containing mechanism CM2 of the imaging apparatus 13 according to the 13th embodiment. FIG. 25F is a schematic view of the second lens containing mechanism CM2 of the imaging apparatus 13 according to the 13th embodiment. In FIG. 25D, the surface closest to the image side of the first lens containing mechanism CM1 is connected to the surface closest to the object side of the second lens containing mechanism CM2, a maximum length along the first optical axis X1 of the first lens containing mechanism CM1 is CM1L, and a maximum length along the second optical axis X2 of the second lens containing mechanism CM2 is CM2L. In FIG. 25E, viewed from a surface closest to the object side of the first lens containing mechanism CM1, a maximum outer diameter of the first lens containing mechanism CM1 is CM1O, and a maximum length along the second optical axis X2 of the second lens containing mechanism CM2 is CM2L. In FIG. 25F, the second lens containing mechanism CM2 can be separated into a prism containing space PC and a lens containing space LC, wherein a maximum length along the second optical axis X2 of the second lens containing mechanism CM2 is CM2L, a maximum length along the second optical axis X2 of the prism containing space PC is PCL, a maximum length along the second optical axis X2 of the lens containing space LC is LCL. The prism containing space PC is the portion of the second lens containing mechanism CM2 which is connected to the first lens containing mechanism CM1, which can provide the space for folding the optical axis of the imaging apparatus 13 so as to be applicable to the electronic devices with different sizes.

Figure 25G:
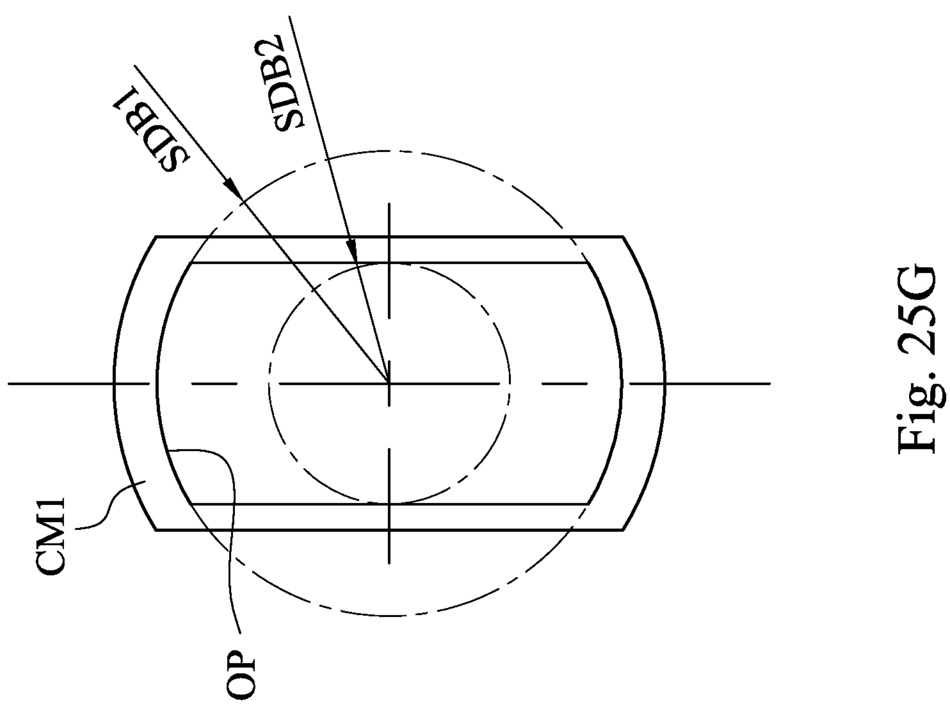
FIG. 25G is a schematic view of the first lens containing mechanism of the imaging apparatus according to the 13th embodiment.

FIG. 25G is a schematic view of the first lens containing mechanism CM1 of the imaging apparatus 13 according to the 13th embodiment. In FIG. 25G, viewed from the surface closest to the object side of the first lens containing mechanism CM1, an opening OP closest to the object side of the imaging system lens assembly defines a circumscribed circle and an inscribed circle, the circumscribed circle covers a smallest circle of the opening OP, a radius of the circumscribed circle covering the opening OP is SDB1, the inscribed circle is a largest circle without covering the first lens containing mechanism CM1, a radius of the inscribed circle without covering the first lens containing mechanism CM1 is SDB2. In FIG. 25A to FIG. 25C, a maximum effective radius of the object-side surface of the first lens element E1 is Y1R1, a height of the second lens containing mechanism CM2 along the first optical axis X1 is RBH, a length of the first optical axis X1 in the prism (which is reflective element E8) is THP1, a length of the second optical axis X2 in the prism (which is reflective element E8) is THP2, a minimum height difference along the first optical axis X1 between an opening surface closest to the object side of the imaging system lens assembly and the second lens containing mechanism CM2 is DH, a distance parallel to the first optical axis X1 between an object-side surface of the prism (which is reflective element E8) and a position of a maximum effective radius of an adjacent lens surface (which is the image-side surface of the second lens element E2) is PG1, a distance parallel to the second optical axis X2 between an image-side surface of the prism (which is reflective element E8) and a position of a maximum effective radius of an adjacent lens surface (which is the object-side surface of the third lens element E3) is PG2, a shortest distance along the second optical axis X2 between an intersection of an object-side surface of the prism (which is reflective element E8) and the first optical axis X1 and the second lens containing mechanism CM2 is PD1, a shortest distance along the first optical axis X1 between an intersection of an image-side surface of the prism (which is reflective element E8) and the second optical axis X2 and the second lens containing mechanism CM2 is PD2, an axial distance (along the first optical axis X1) between a most object-side lens element surface (which is the object-side surface of the first lens element E1) and a most image-side lens element surface (which is the image-side surface of the second lens element E2) of the first lens group is TD1, an axial distance (along the second optical axis X2) between a most object-side lens element surface (which is the object-side surface of the third lens element E3) and a most image-side lens element surface (which is the image-side surface of the sixth lens element E6) of the second lens group is TD2, a length alone the first optical axis X1 of the receiving surface AS is D, and the data and the satisfied conditions are listed in the Table 13A below.

Figure 25H:
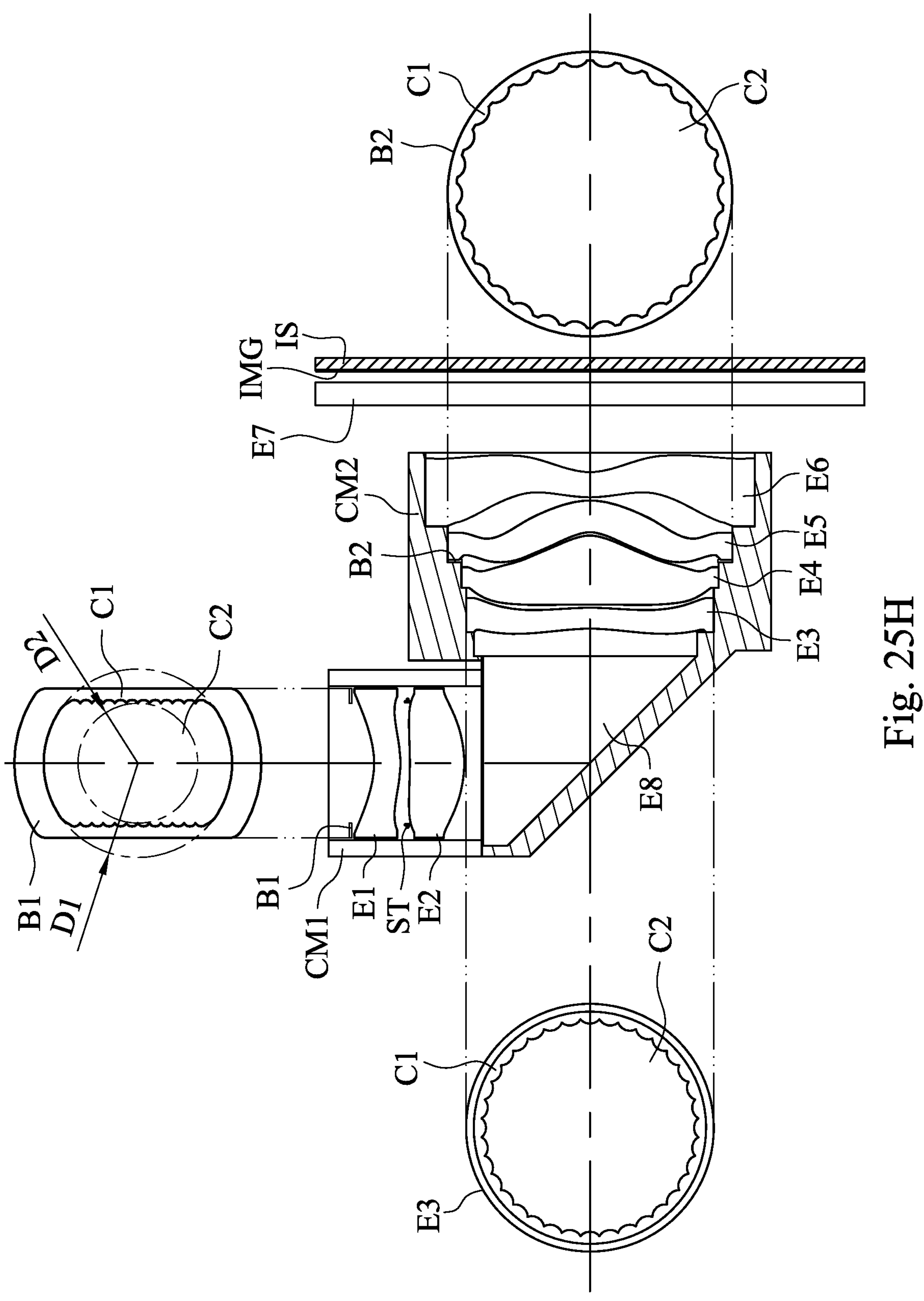
FIG. 25H is a schematic view of the light blocking elements of the imaging apparatus according to the 13th embodiment.
Figures 25I, 25J:
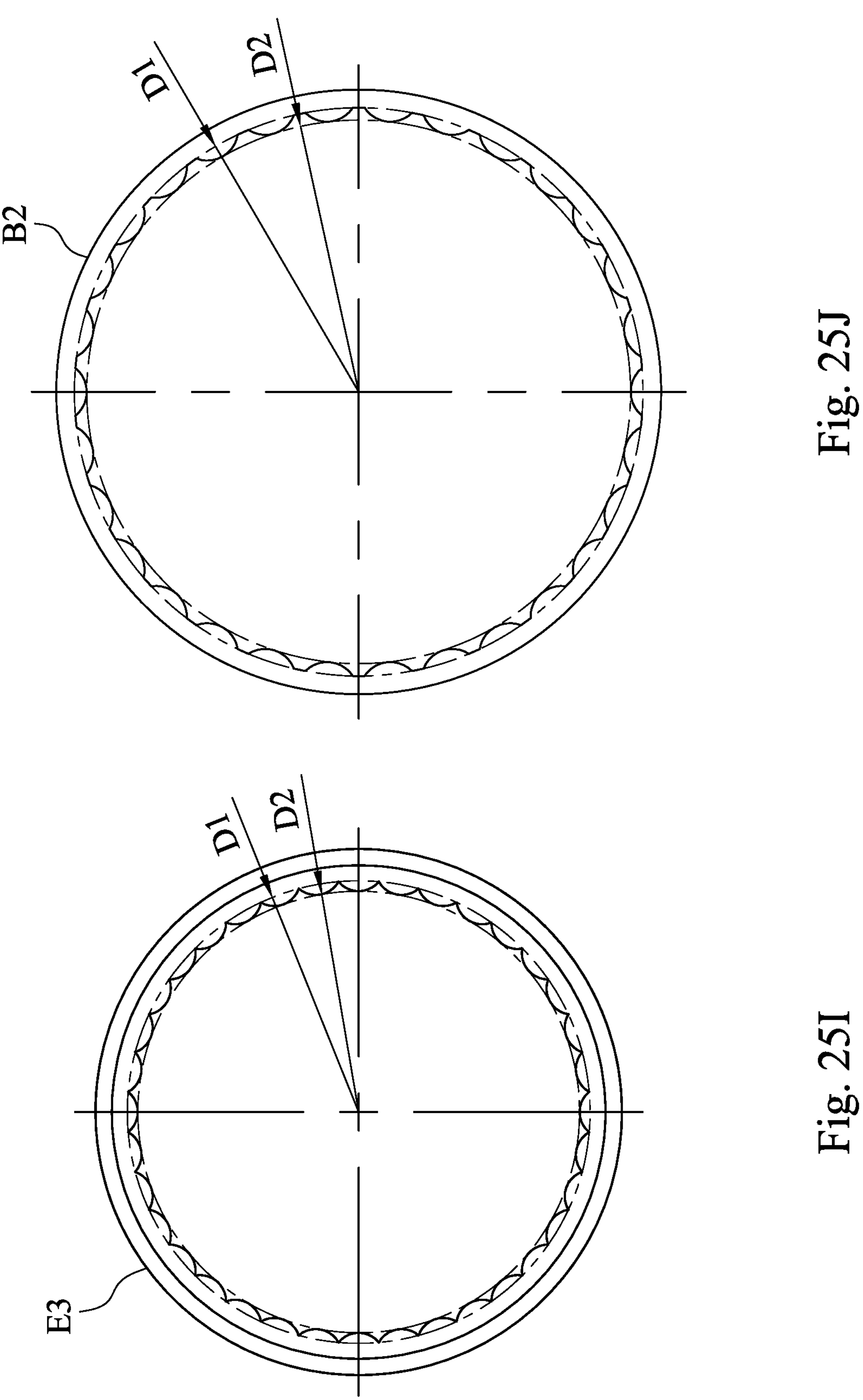
FIG. 25I is a schematic view of the third lens element of the imaging apparatus according to the 13th embodiment.
FIG. 25J is a schematic view of the light blocking sheet of the imaging apparatus according to the 13th embodiment.

FIG. 25H is a schematic view of the light blocking elements of the imaging apparatus 13 according to the 13th embodiment. FIG. 25I is a schematic view of the third lens element E3 of the imaging apparatus 13 according to the 13th embodiment. FIG. 25J is a schematic view of the light blocking sheet B2 of the imaging apparatus 13 according to the 13th embodiment. In FIG. 25H, FIG. 25I and FIG. 25J, the imaging apparatus 13 according to the 13th embodiment includes three light blocking elements, which are the light blocking sheet B1, the third lens element E3 and the light blocking sheet B2, wherein each of the light blocking elements includes a light blocking portion C1 and an aperture portion C2. The light blocking portion C1 is a portion of the light blocking element which a light cannot pass through. The aperture portion C2 is a portion of the light blocking element which the light can pass through, the aperture portion C2 defines a circumscribed circle and an inscribed circle. The circumscribed circle is a largest aperture of the aperture portion C2, a radius of the circumscribed circle of the largest aperture of the aperture portion C2 of the light blocking element is D1; the inscribed circle is a largest aperture without covering the light blocking portion C1, a radius of the inscribed circle of the largest aperture without covering the light blocking portion C1 of the light blocking element is D2, and the data and the satisfied conditions are listed in the Table 13A and Table 13B below. Furthermore, the aperture portion C2 has a plurality of protrusions, wherein a number of the protrusions of each of the light blocking sheet B1, the third lens element E3 and the light blocking sheet B2 is 24, 36 and 30. Moreover, the third lens element E3 has an effective diameter being non-circular, which is disposed relative to the light blocking portion C1, and the light blocking portion C1 thereof is a subwavelength structure.

In the 13th embodiment, the equation of the aspheric surface profiles of the aforementioned lens elements is the same as the equation of the 1st embodiment. Also, the definitions of some parameters shown in the following Table 13A and Table 13B are the same as those stated in the 1st embodiment with corresponding values for the 13th embodiment, so an explanation in this regard will not be provided again.

TABLE 13A

| 13th Embodiment | | | |
|---|---|---|---|
| D [mm] | 0.23 | f [mm] | 2.25 |
| DH [mm] | 0.73 | Fno | 2.40 |
| ImgH [mm] | 1.81 | HFOV [degrees] | 37.5 |
| PD1 [mm] | 0.75 | PD1/ImgH | 0.41 |
| PD2 [mm] | 0.98 | PD2/ImgH | 0.54 |
| PG1 [mm] | 0.35 | RBH/ImgH | 1.84 |
| PG2 [mm] | 0.23 | SDB2/SDB1 | 0.52 |
| RBH [mm] | 3.30 | (TD1 + TD2)/(THP1 + THP2) | 1.15 |
| SDB1 [mm] | 1.35 | (THP1 + THP2)/ImgH | 1.07 |
| SDB2 [mm] | 0.70 | Y1R1/ImgH | 0.35 |
| TD1 [mm] | 0.82 | TL/ImgH | 3.05 |
| TD2 [mm] | 1.43 | TL/EPD | 5.71 |
| THP1 [mm] | 0.98 | Y1R1 [mm] | 0.64 |
| THP2 [mm] | 0.98 | FOV [degrees] | 75.0 |

TABLE 13B

| 13th Embodiment | | | |
|---|---|---|---|
| light blocking element | D1 | D2 | D2/D1 |
| light blocking sheet B1 | 0.86 | 0.56 | 0.65 |
| third lens element E3 | 0.99 | 0.95 | 0.96 |
| light blocking sheet B2 | 1.22 | 1.17 | 0.96 |

14th Embodiment

Figure 26A:
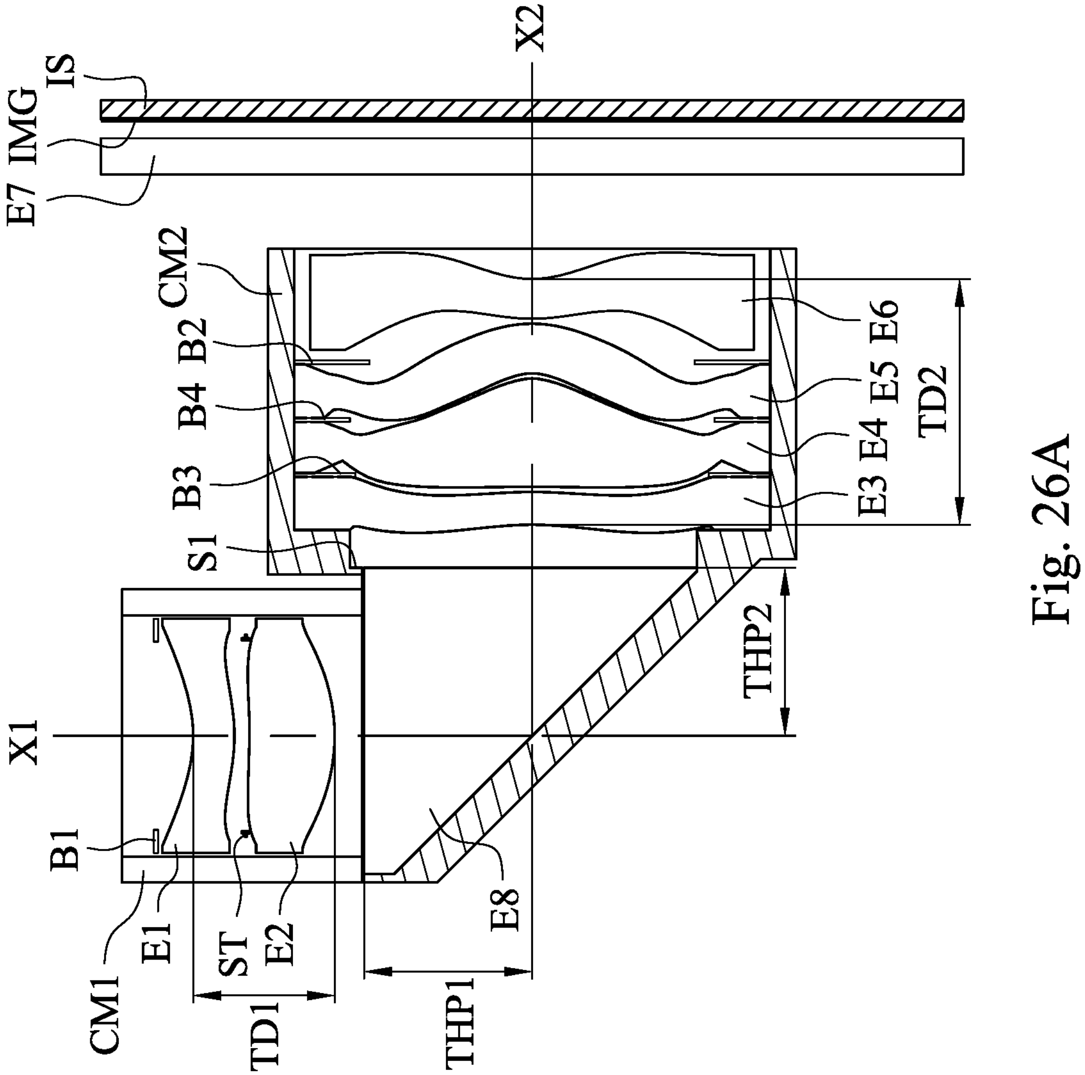
FIG. 26A is a schematic view of parameters of an imaging apparatus according to the 14th embodiment of the present disclosure.
Figure 26B:
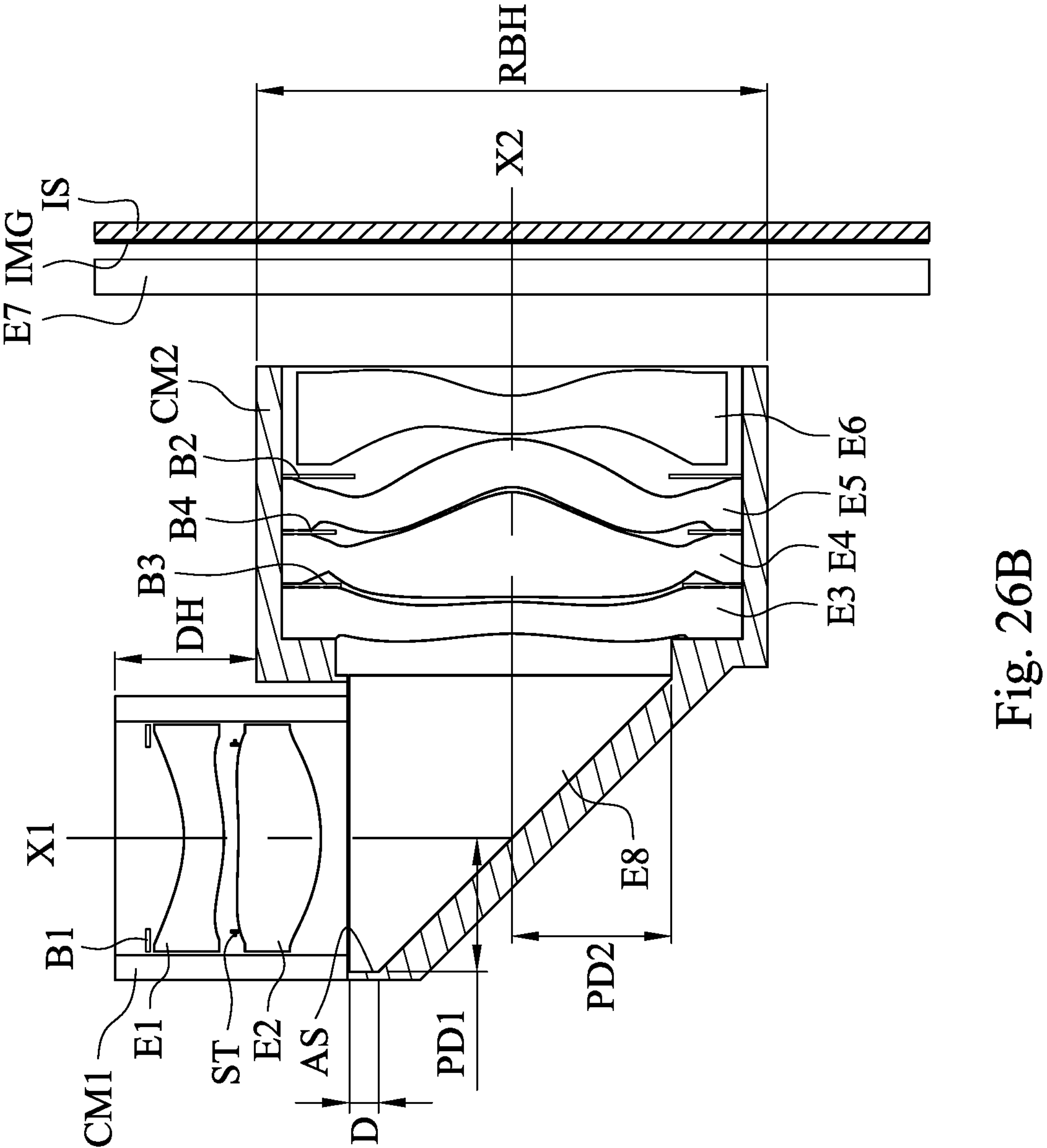
FIG. 26B is another schematic view of parameters of the imaging apparatus according to the 14th embodiment of the present disclosure.
Figure 26C:
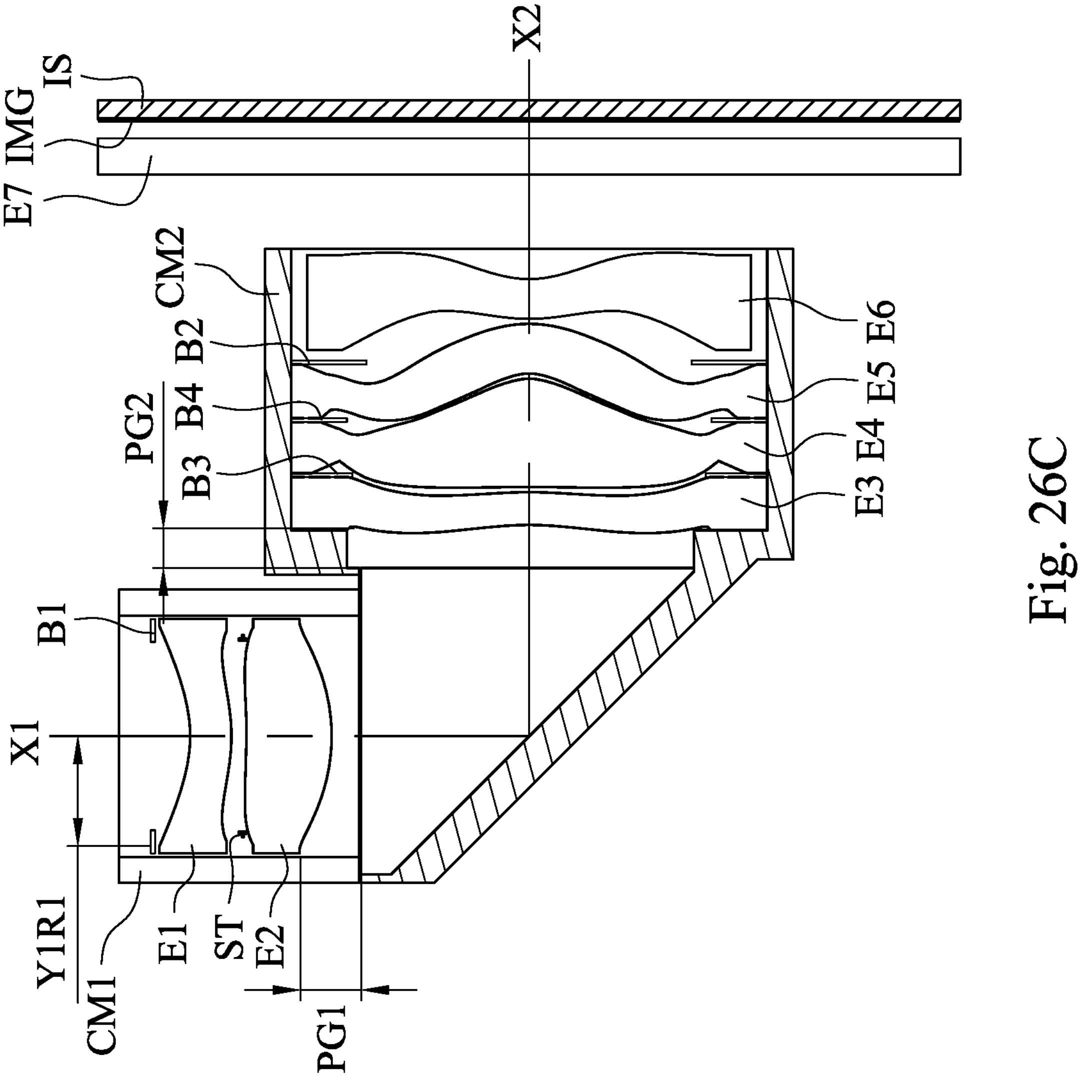
FIG. 26C is another schematic view of parameters of the imaging apparatus according to the 14th embodiment of the present disclosure.

FIG. 26A, FIG. 26B and FIG. 26C are schematic views of parameters of an imaging apparatus 14 according to the 14th embodiment of the present disclosure. In FIG. 26A, FIG. 26B and FIG. 26C, the imaging apparatus 14 of the 14th embodiment includes an imaging system lens assembly (its reference numeral is omitted) and an image sensor IS. The imaging system lens assembly includes, in order from an object side to an image side along an optical path, a first lens containing mechanism CM1, a second lens containing mechanism CM2, a filter E7 and an image surface IMG, and the imaging system lens assembly further includes at least one light blocking element. The image sensor IS is disposed on the image surface IMG.

The first lens containing mechanism CM1 includes a first lens group. The first lens group includes at least one lens element, the lens element of the first lens group has an object-side surface towards the object side and an image-side surface towards the image side. An optical axis of the first lens group is a first optical axis X1. Specifically, the first lens group includes a first lens element E1 and a second lens element E2, and a light blocking sheet B1, the first lens element E1, an aperture stop ST and the second lens element E2 are disposed in the first lens containing mechanism CM1 in order from the object side to the image side along an optical path.

The second lens containing mechanism CM2 includes a reflective element E8 and a second lens group. The second lens group includes at least one lens element, each of the reflective element E8 and the lens element of the second lens group has an object-side surface towards the object side and an image-side surface towards the image side. An optical axis of the second lens group is a second optical axis X2. Specifically, the reflective element E8, a stop S1, a third lens element E3, a light blocking sheet B3, a fourth lens element E4, a light blocking sheet B4, a fifth lens element E5, a light blocking sheet B2 and a sixth lens element E6 are disposed in the second lens containing mechanism CM2 in order from the object side to the image side along an optical path. The reflective element E8 is a prism, the object-side surface of the third lens element E3 has a light blocking coating, which can be deemed as the light blocking element. Further, in FIG. 26B, the second lens containing mechanism CM2 has a receiving surface AS, the receiving surface AS parallel to the first optical axis X1 is located between the prism (which is reflective element E8) and the second lens containing mechanism CM2.

Figure 26D:
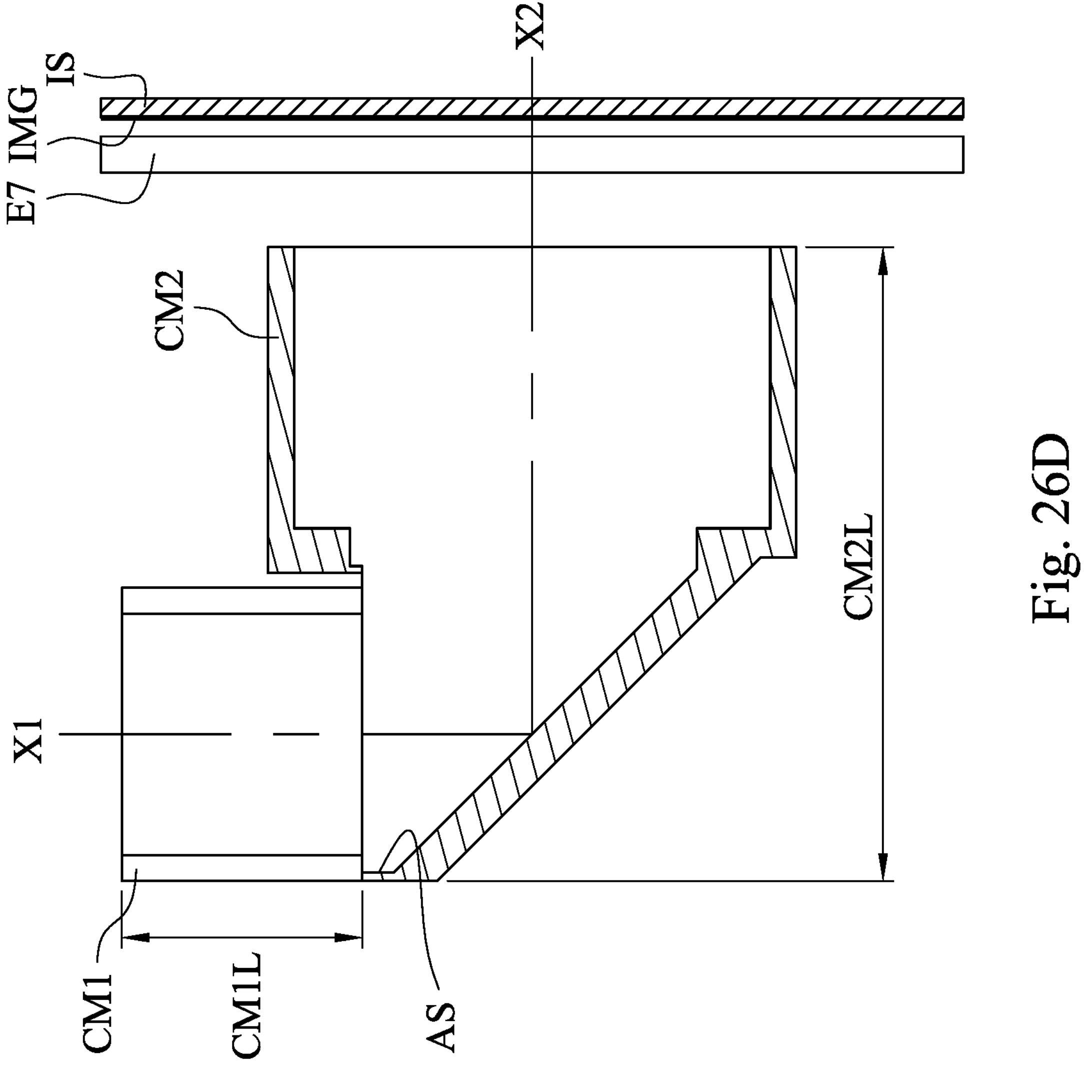
FIG. 26D is a schematic view of the first lens containing mechanism and the second lens containing mechanism of the imaging apparatus according to the 14th embodiment.
Figure 26E:
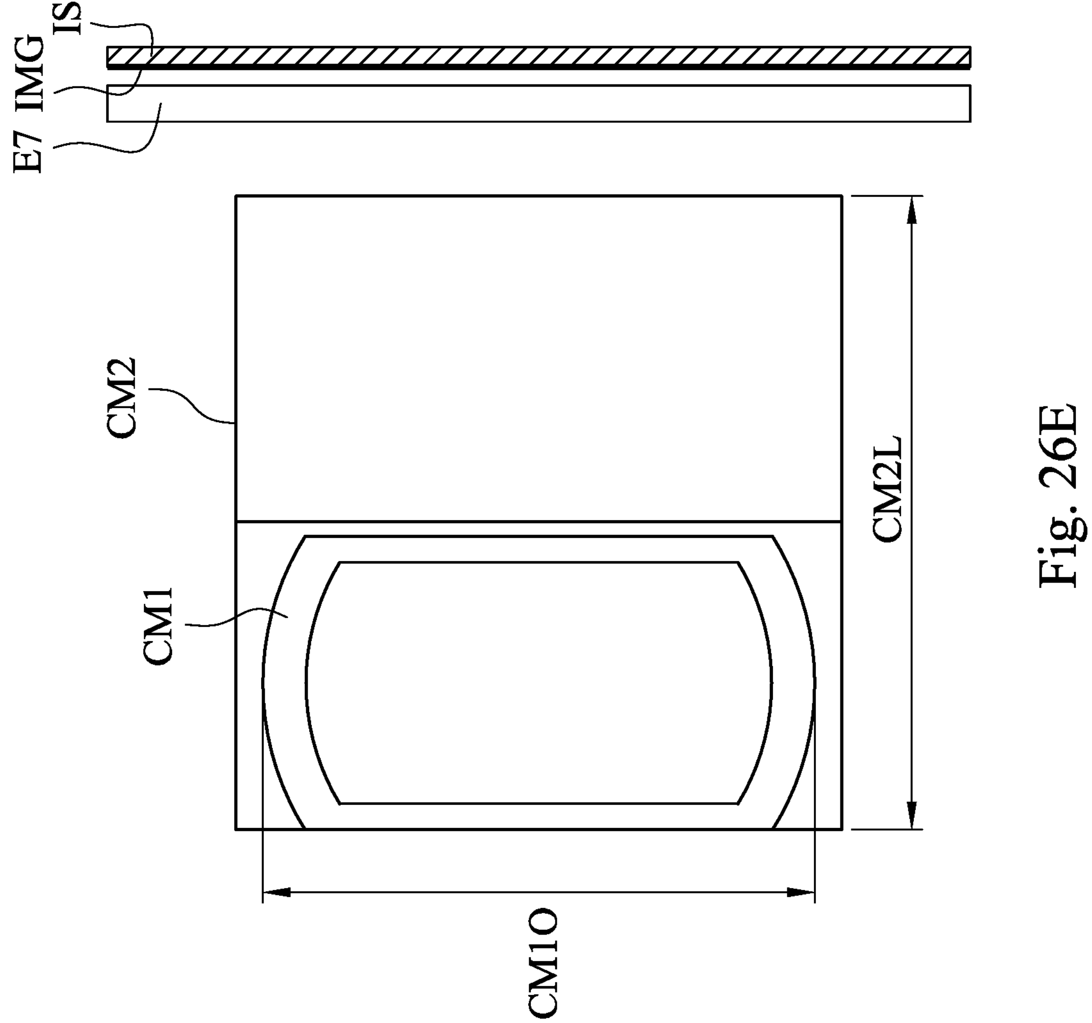
FIG. 26E is another schematic view of the first lens containing mechanism and the second lens containing mechanism of the imaging apparatus according to the 14th embodiment.
Figure 26F:
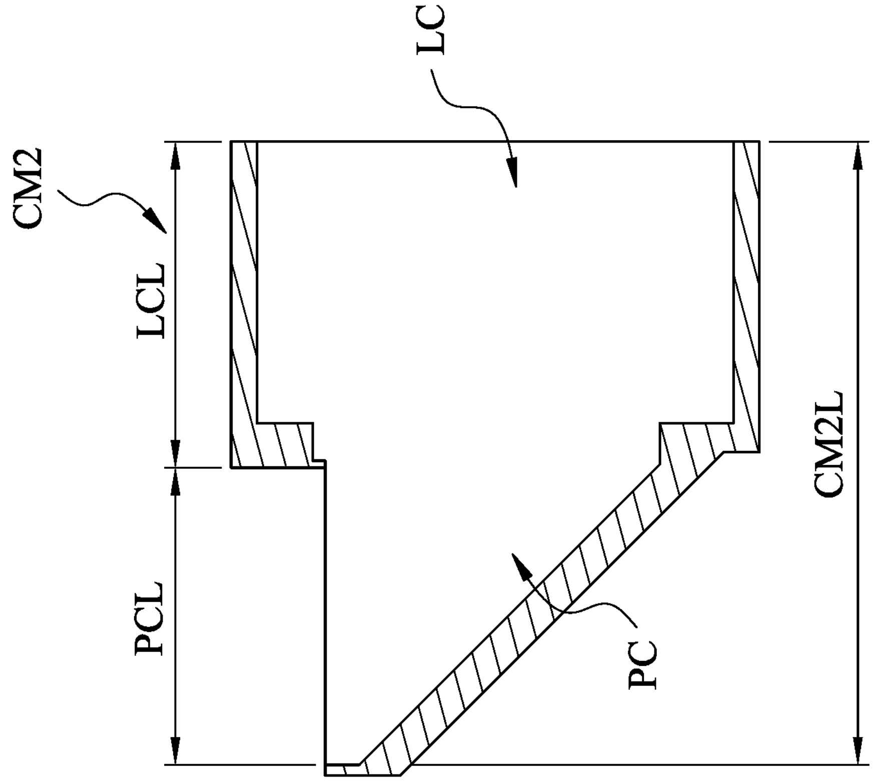
FIG. 26F is a schematic view of the second lens containing mechanism of the imaging apparatus according to the 14th embodiment.

FIG. 26D is a schematic view of the first lens containing mechanism CM1 and the second lens containing mechanism CM2 of the imaging apparatus 14 according to the 14th embodiment. FIG. 26E is another schematic view of the first lens containing mechanism CM1 and the second lens containing mechanism CM2 of the imaging apparatus 14 according to the 14th embodiment. FIG. 26F is a schematic view of the second lens containing mechanism CM2 of the imaging apparatus 14 according to the 14th embodiment. In FIG. 26D, the surface closest to the image side of the first lens containing mechanism CM1 is connected to the surface closest to the object side of the second lens containing mechanism CM2, a maximum length along the first optical axis X1 of the first lens containing mechanism CM1 is CM1L, and a maximum length along the second optical axis X2 of the second lens containing mechanism CM2 is CM2L. In FIG. 26E, viewed from a surface closest to the object side of the first lens containing mechanism CM1, a maximum outer diameter of the first lens containing mechanism CM1 is CM1O, and a maximum length along the second optical axis X2 of the second lens containing mechanism CM2 is CM2L. In FIG. 26F, the second lens containing mechanism CM2 can be separated into a prism containing space PC and a lens containing space LC, wherein a maximum length along the second optical axis X2 of the second lens containing mechanism CM2 is CM2L, a maximum length along the second optical axis X2 of the prism containing space PC is PCL, a maximum length along the second optical axis X2 of the lens containing space LC is LCL. The prism containing space PC is the portion of the second lens containing mechanism CM2 which is connected to the first lens containing mechanism CM1, which can provide the space for folding the optical axis of the imaging apparatus 14 so as to be applicable to the electronic devices with different sizes.

Figure 26G:
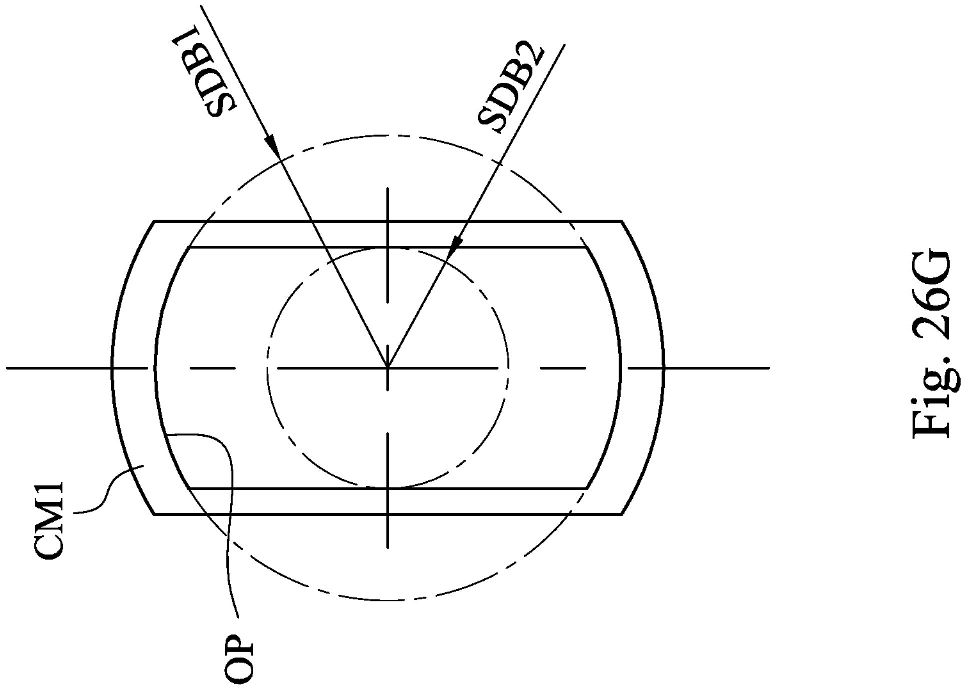
FIG. 26G is a schematic view of the first lens containing mechanism of the imaging apparatus according to the 14th embodiment.

FIG. 26G is a schematic view of the first lens containing mechanism CM1 of the imaging apparatus 14 according to the 14th embodiment. In FIG. 26G, viewed from the surface closest to the object side of the first lens containing mechanism CM1, an opening OP closest to the object side of the imaging system lens assembly defines a circumscribed circle and an inscribed circle, the circumscribed circle covers a smallest circle of the opening OP, a radius of the circumscribed circle covering the opening OP is SDB1, the inscribed circle is a largest circle without covering the first lens containing mechanism CM1, a radius of the inscribed circle without covering the first lens containing mechanism CM1 is SDB2. In FIG. 26A to FIG. 26C, a maximum effective radius of the object-side surface of the first lens element E1 is Y1R1, a height of the second lens containing mechanism CM2 along the first optical axis X1 is RBH, a length of the first optical axis X1 in the prism (which is reflective element E8) is THP1, a length of the second optical axis X2 in the prism (which is reflective element E8) is THP2, a minimum height difference along the first optical axis X1 between an opening surface closest to the object side of the imaging system lens assembly and the second lens containing mechanism CM2 is DH, a distance parallel to the first optical axis X1 between an object-side surface of the prism (which is reflective element E8) and a position of a maximum effective radius of an adjacent lens surface (which is the image-side surface of the second lens element E2) is PG1, a distance parallel to the second optical axis X2 between an image-side surface of the prism (which is reflective element E8) and a position of a maximum effective radius of an adjacent lens element surface (which is the object-side surface of the third lens element E3) is PG2, a shortest distance along the second optical axis X2 between an intersection of an object-side surface of the prism (which is reflective element E8) and the first optical axis X1 and the second lens containing mechanism CM2 is PD1, a shortest distance along the first optical axis X1 between an intersection of an image-side surface of the prism (which is reflective element E8) and the second optical axis X2 and the second lens containing mechanism CM2 is PD2, an axial distance (along the first optical axis X1) between a most object-side lens element surface (which is the object-side surface of the first lens element E1) and a most image-side lens element surface (which is the image-side surface of the second lens element E2) of the first lens group is TD1, an axial distance (along the second optical axis X2) between a most object-side lens element surface (which is the object-side surface of the third lens element E3) and a most image-side lens element surface (which is the image-side surface of the sixth lens element E6) of the second lens group is TD2, a length alone the first optical axis X1 of the receiving surface AS is D, and the data and the satisfied conditions are listed in the Table 14A below.

Figure 26H:
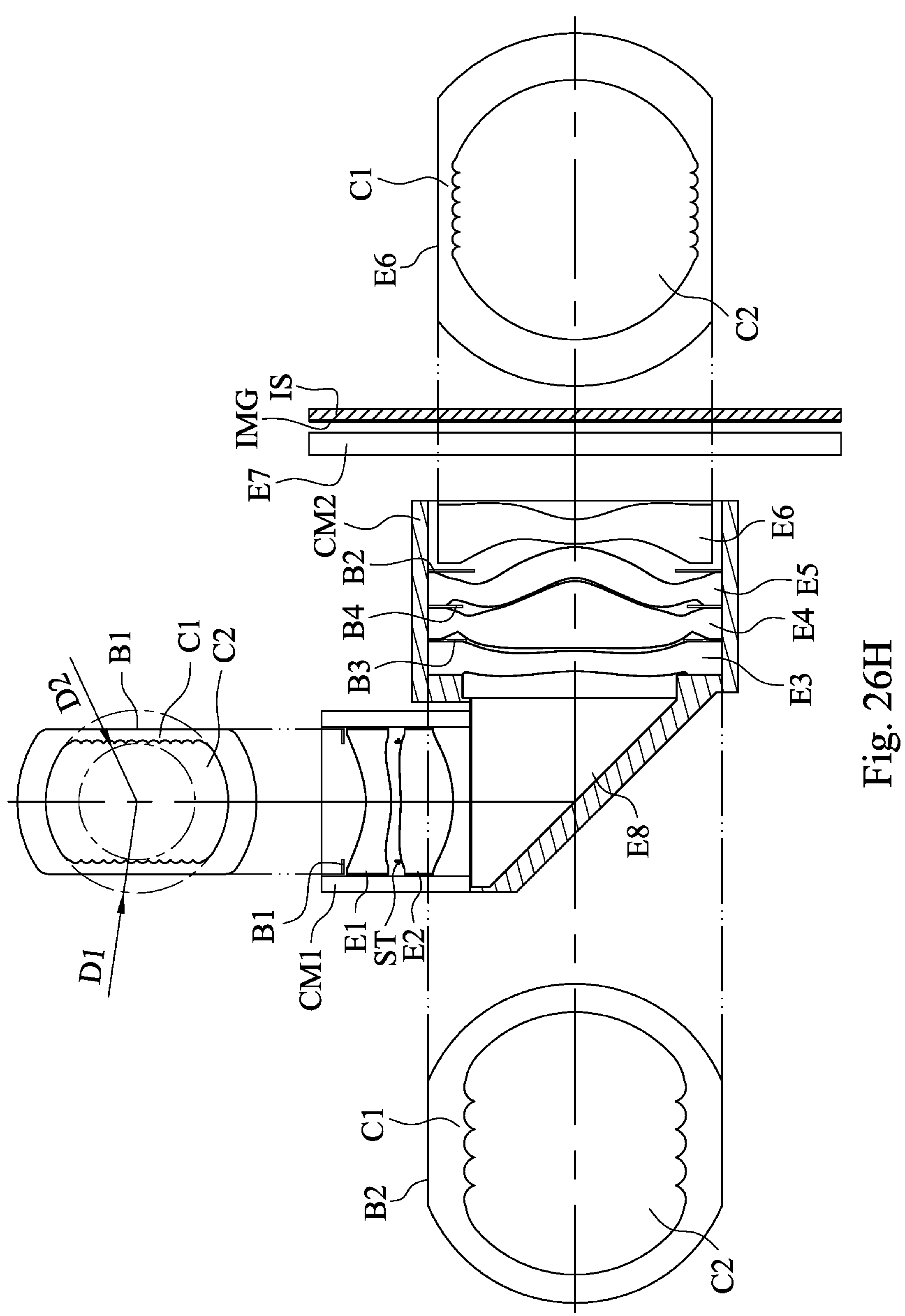
FIG. 26H is a schematic view of the light blocking elements of the imaging apparatus according to the 14th embodiment.
Figure 26J:
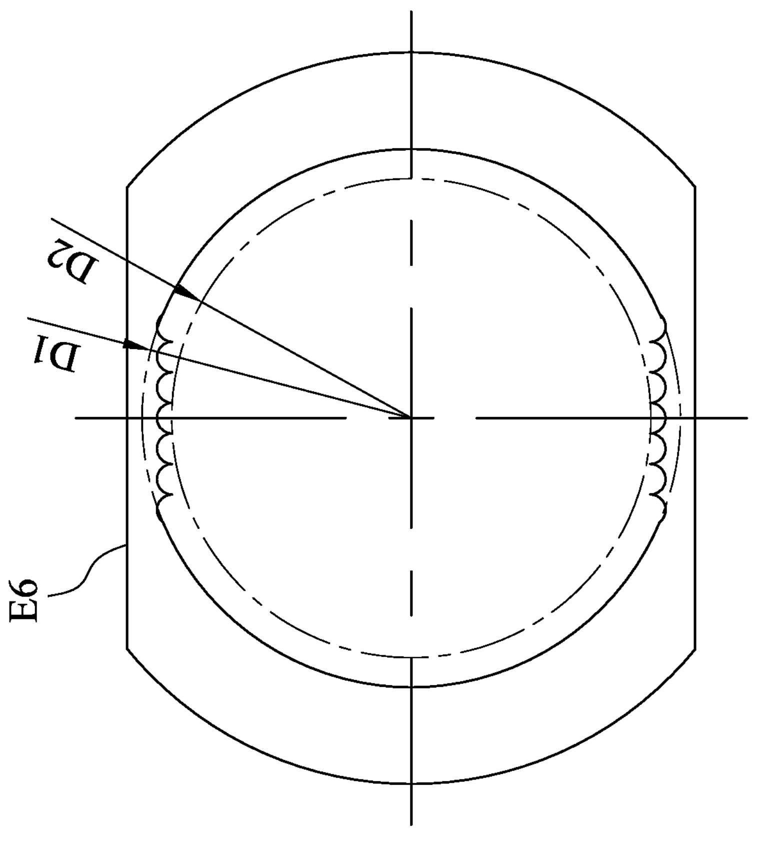
FIG. 26J is a schematic view of the sixth lens element of the imaging apparatus according to the 14th embodiment.
Figure 26I:
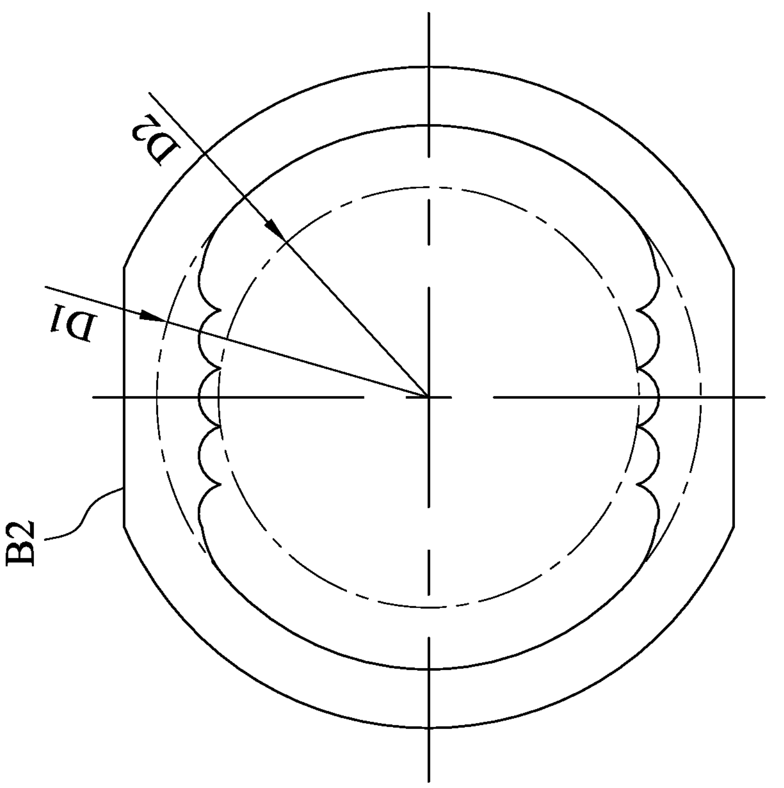
FIG. 26I is a schematic view of the light blocking sheet of the imaging apparatus according to the 14th embodiment.

FIG. 26H is a schematic view of the light blocking elements of the imaging apparatus 14 according to the 14th embodiment. FIG. 26I is a schematic view of the light blocking sheet B2 of the imaging apparatus 14 according to the 14th embodiment. FIG. 26J is a schematic view of the sixth lens element E6 of the imaging apparatus 14 according to the 14th embodiment. In FIG. 26H, FIG. 26I and FIG. 26J, the imaging apparatus 14 according to the 14th embodiment includes three light blocking elements, which are the light blocking sheet B1, the light blocking sheet B2 and the sixth lens element E6, wherein each of the light blocking elements includes a light blocking portion C1 and an aperture portion C2. The light blocking portion C1 is a portion of the light blocking element which a light cannot pass through. The aperture portion C2 is a portion of the light blocking element which the light can pass through, the aperture portion C2 defines a circumscribed circle and an inscribed circle. The circumscribed circle is a largest aperture of the aperture portion C2, a radius of the circumscribed circle of the largest aperture of the aperture portion C2 of the light blocking element is D1; the inscribed circle is a largest aperture without covering the light blocking portion C1, a radius of the inscribed circle of the largest aperture without covering the light blocking portion C1 of the light blocking element is D2, and the data and the satisfied conditions are listed in the Table 14A and Table 14B below. Furthermore, the aperture portion C2 has a plurality of protrusions, wherein a number of the protrusions of each of the light blocking sheet B1, the light blocking sheet B2 and the sixth lens element E6 is 24, 10 and 14. Moreover, the sixth lens element E6 has an effective diameter being non-circular, which is disposed relative to the light blocking portion C1, and the light blocking portion C1 thereof is a subwavelength structure.

In the 14th embodiment, the equation of the aspheric surface profiles of the aforementioned lens elements is the same as the equation of the 1st embodiment. Also, the definitions of some parameters shown in the following Table 14A and Table 14B are the same as those stated in the 1st embodiment with corresponding values for the 14th embodiment, so an explanation in this regard will not be provided again.

TABLE 14A

| 14th Embodiment | | | |
|---|---|---|---|
| D [mm] | 0.18 | f [mm] | 2.25 |
| DH [mm] | 0.85 | Fno | 2.40 |
| ImgH [mm] | 1.81 | HFOV [degrees] | 37.5 |
| PD1 [mm] | 0.80 | PD1/ImgH | 0.41 |
| PD2 [mm] | 0.96 | PD2/ImgH | 0.54 |
| PG1 [mm] | 0.35 | RBH/ImgH | 1.69 |
| PG2 [mm] | 0.23 | SDB2/SDB1 | 0.52 |
| RBH [mm] | 3.06 | (TD1 + TD2)/(THP1 + THP2) | 1.15 |
| SDB1 [mm] | 1.35 | (THP1 + THP2)/ImgH | 1.07 |
| SDB2 [mm] | 0.70 | Y1R1/ImgH | 0.35 |
| TD1 [mm] | 0.82 | TL/ImgH | 3.05 |
| TD2 [mm] | 1.43 | TL/EPD | 5.71 |
| THP1 [mm] | 0.98 | Y1R1 [mm] | 0.64 |
| THP2 [mm] | 0.98 | FOV [degrees] | 75.0 |

TABLE 14B

| 14th Embodiment | | | |
|---|---|---|---|
| light blocking element | D1 | D2 | D2/D1 |
| light blocking sheet B1 | 0.86 | 0.55 | 0.64 |
| light blocking sheet B2 | 1.23 | 0.95 | 0.77 |
| sixth lens element E6 | 1.22 | 1.09 | 0.89 |

15th Embodiment

Figure 30:
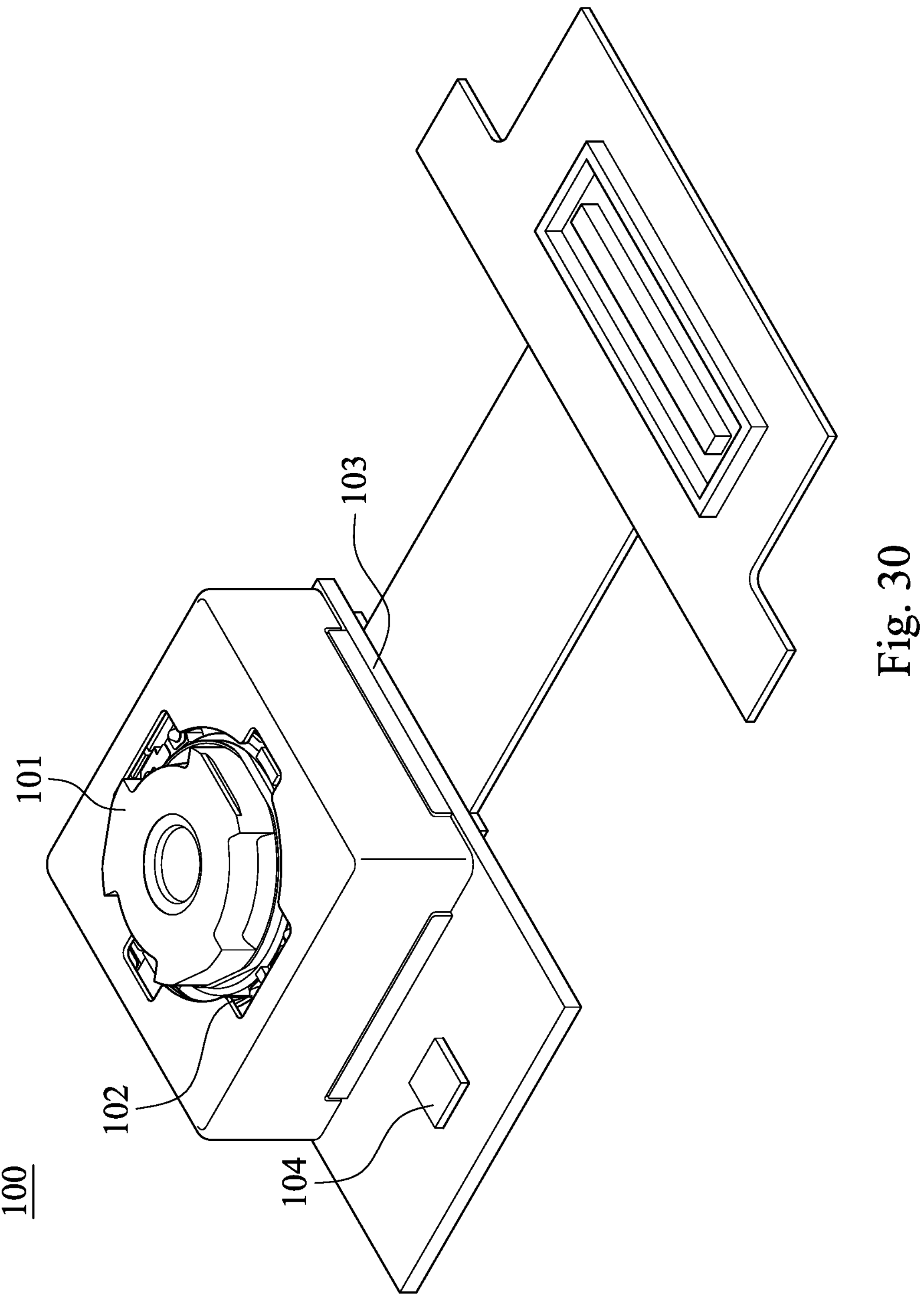
FIG. 30 is a schematic view of an imaging apparatus according to the 15th embodiment of the present disclosure.

FIG. 30 is a schematic view of an imaging apparatus 100 according to the 15th embodiment of the present disclosure. In FIG. 30, the imaging apparatus 100 of the 15th embodiment is a camera module, the imaging apparatus 100 includes an imaging lens assembly 101, a driving apparatus 102 and an image sensor 103, wherein the imaging lens assembly 101 includes the imaging system lens assembly of the present disclosure and a lens barrel (not shown in drawings) for carrying the imaging system lens assembly. The imaging apparatus 100 can focus light from an imaged object via the imaging lens assembly 101, perform image focusing by the driving apparatus 102, and generate an image on the image sensor 103, and the imaging information can be transmitted.

The driving apparatus 102 can be an auto-focus module, which can be driven by driving systems, such as voice coil motors (VCM), micro electro-mechanical systems (MEMS), piezoelectric systems, and shape memory alloys etc. The imaging system lens assembly can obtain a favorable imaging position by the driving apparatus 102 so as to capture clear images when the imaged object is disposed at different object distances.

The imaging apparatus 100 can include the image sensor 103 located on the image surface of the imaging system lens assembly, such as CMOS and CCD, with superior photosensitivity and low noise. Thus, it is favorable for providing realistic images with high definition image quality thereof. Moreover, the imaging apparatus 100 can further include an image stabilization module 104, which can be a kinetic energy sensor, such as an accelerometer, a gyro sensor, and a Hall Effect sensor. In the 15th embodiment, the image stabilization module 104 is a gyro sensor, but is not limited thereto. Therefore, the variation of different axial directions of the imaging system lens assembly can adjusted so as to compensate the image blur generated by motion at the moment of exposure, and it is further favorable for enhancing the image quality while photographing in motion and low light situation. Furthermore, advanced image compensation functions, such as optical image stabilizations (OIS) and electronic image stabilizations (EIS) etc., can be provided.

16th Embodiment

Figure 31A:
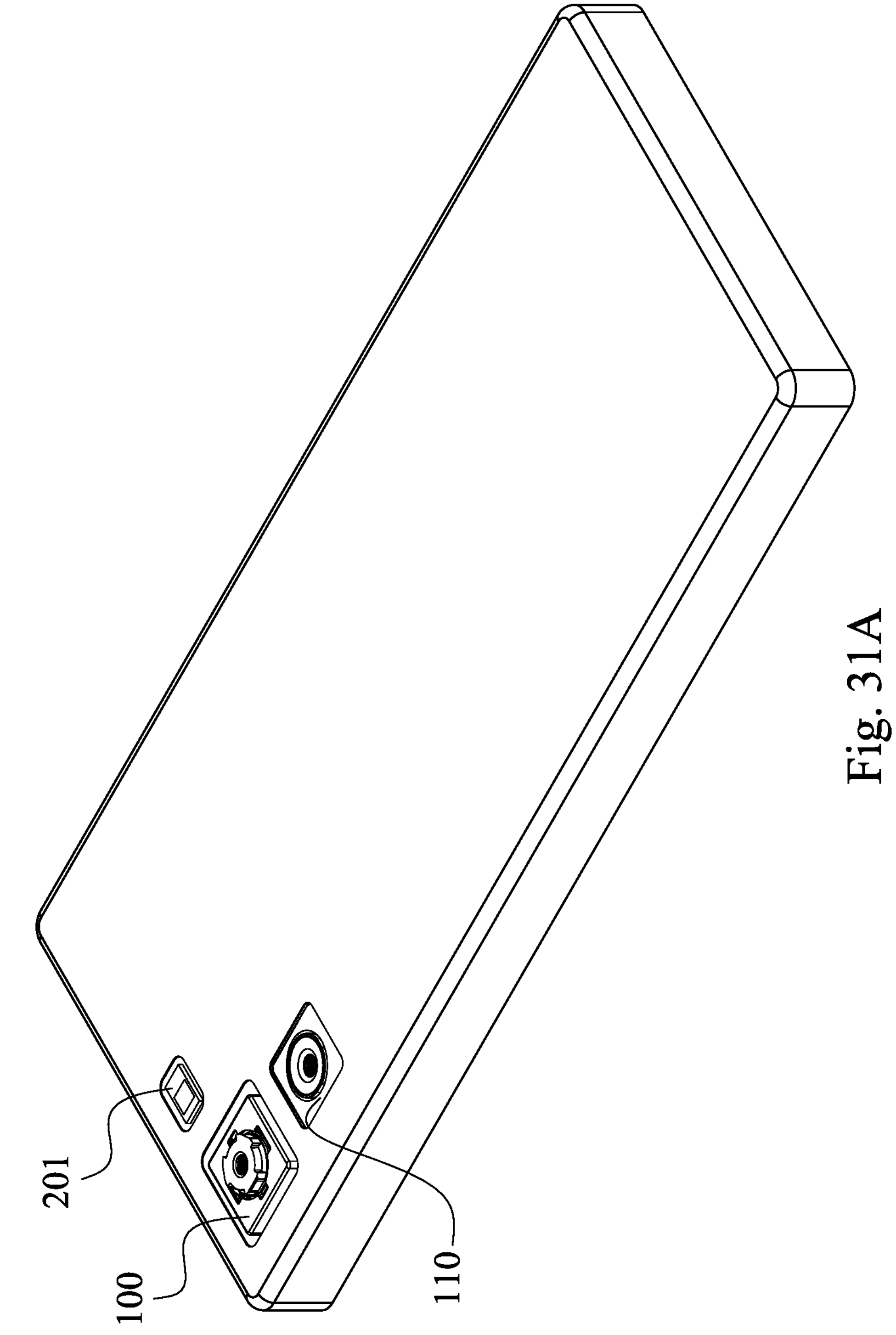
FIG. 31A is a schematic view of one side of an electronic device according to the 16th embodiment of the present disclosure.
Figure 31B:
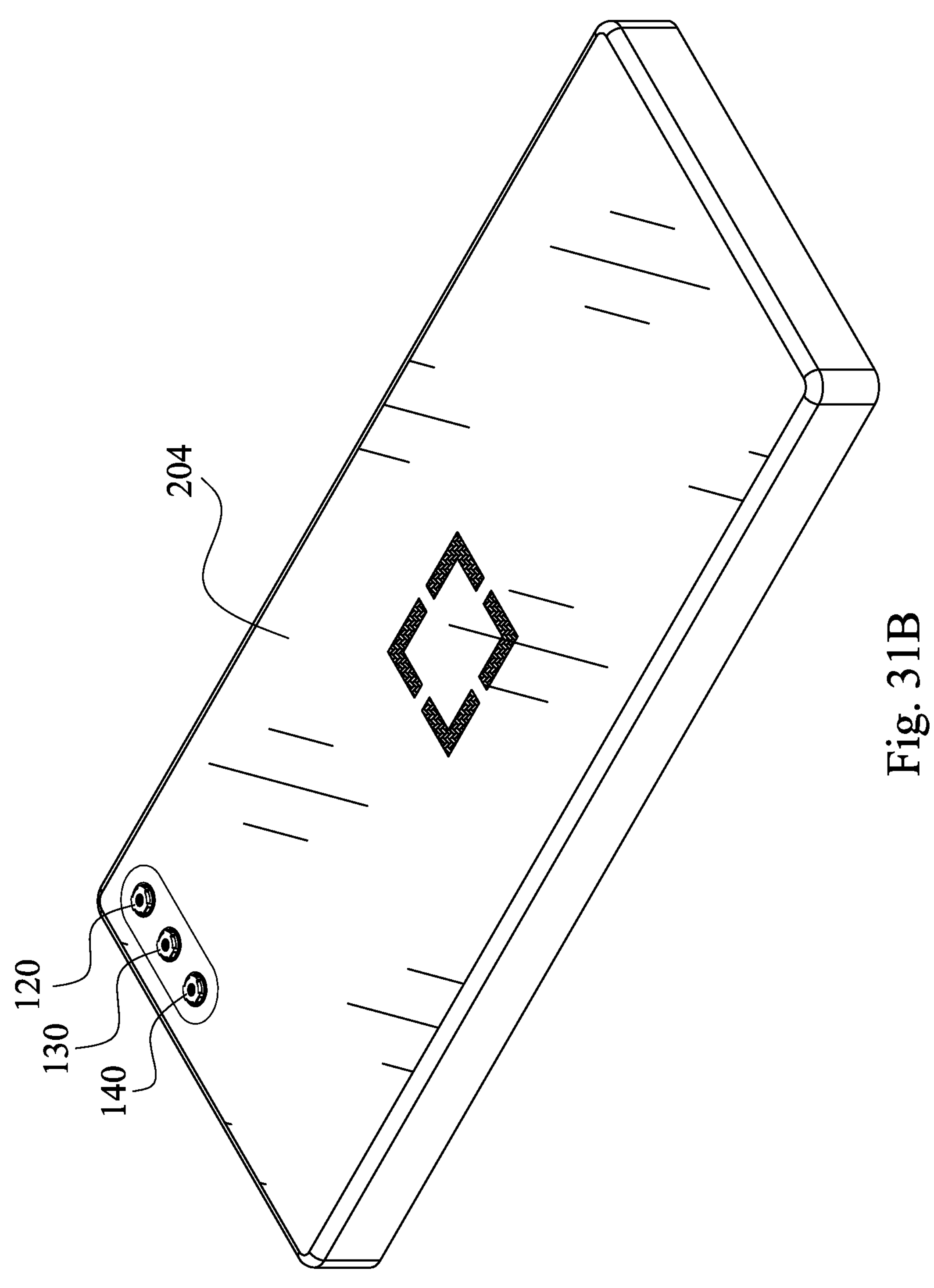
FIG. 31B is a schematic view of another side of the electronic device of FIG. 31A.
Figure 31C:
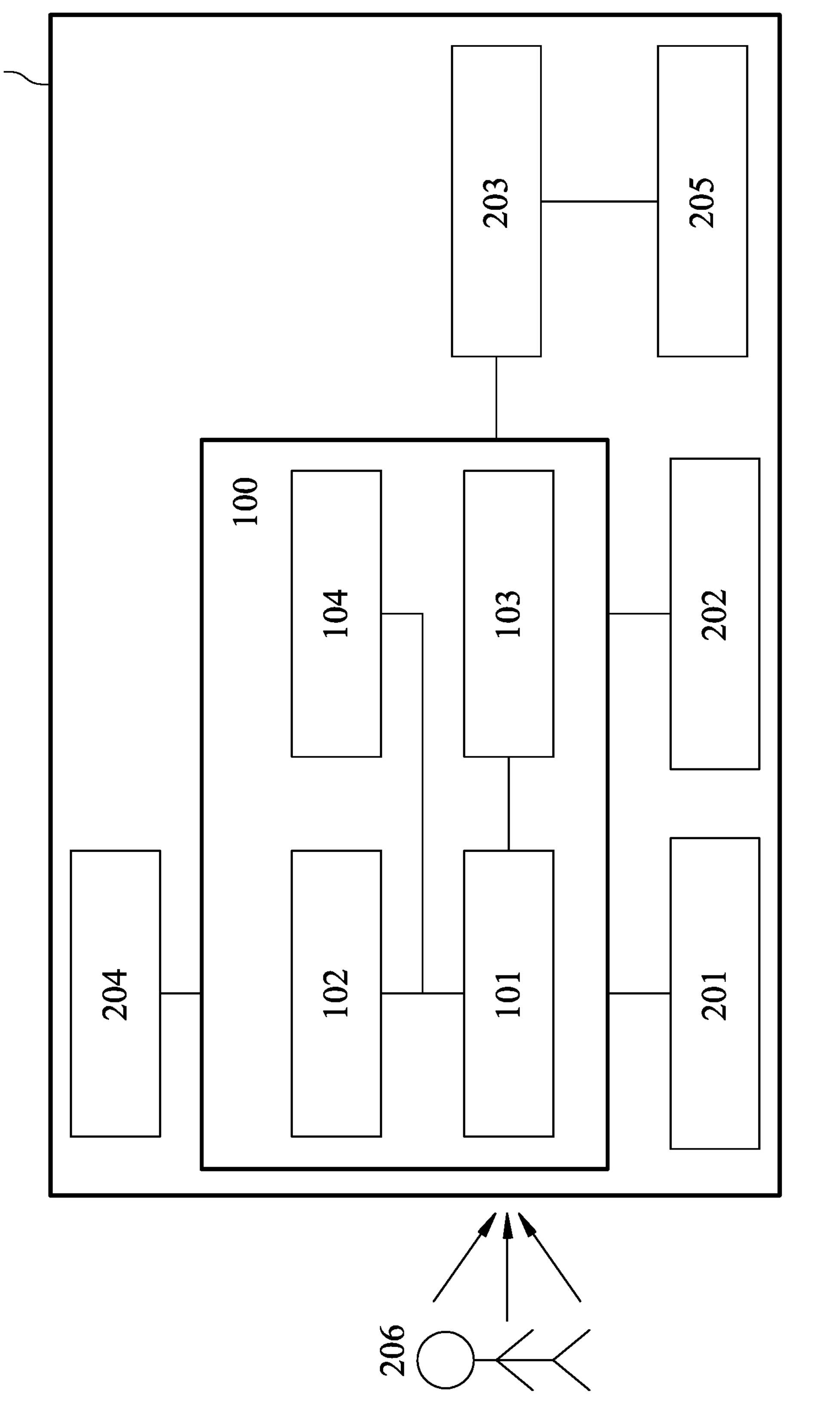
FIG. 31C is a system schematic view of the electronic device of FIG. 31A.

FIG. 31A is a schematic view of one side of an electronic device 200 according to the 16th embodiment of the present disclosure. FIG. 31B is a schematic view of another side of the electronic device 200 of FIG. 31A. FIG. 31C is a system schematic view of the electronic device 200 of FIG. 31A. In FIGS. 31A, 31B and 31C, the electronic device 200 according to the 16th embodiment is a smartphone, which include imaging apparatuses 100, 110, 120, 130, 140, a flash module 201, a focusing assisting module 202, an image signal processor (ISP) 203, a user interface 204 and an image software processor 205, wherein each of the imaging apparatuses 120, 130, 140 is a front camera. When the user captures images of an imaged object 206 via the user interface 204, the electronic device 200 focuses and generates an image via at least one of the imaging apparatuses 100, 110, 120, 130, 140, while compensating for low illumination via the flash module 201 when necessary. Then, the electronic device 200 quickly focuses on the imaged object 206 according to its object distance information provided by the focusing assisting module 202, and optimizes the image via the image signal processor 203 and the image software processor 205. Thus, the image quality can be further enhanced. The focusing assisting module 202 can adopt conventional infrared or laser for obtaining quick focusing, and the user interface 204 can utilize a touch screen or a physical button for capturing and processing the image with various functions of the image processing software.

Each of the imaging apparatuses 100, 110, 120, 130, 140 according to the 16th embodiment can include the imaging system lens assembly of the present disclosure, and can be the same or similar to the imaging apparatus 100 according to the aforementioned 15th embodiment, and will not describe again herein. In detail, according to the 16th embodiment, the imaging apparatuses 100, 110 can be wide angle imaging apparatus and ultra-wide angle imaging apparatus, respectively. The imaging apparatuses 120, 130, 140 can be wide angle imaging apparatus, ultra-wide angle imaging apparatus and TOF (Time-Of-Flight) module, respectively, or can be others imaging apparatuses, which will not be limited thereto. Further, the connecting relationships between each of the imaging apparatuses 110, 120, 130, 140 and other elements can be the same as the imaging apparatus 100 in FIG. 31C, or can be adaptively adjusted according to the type of the imaging apparatuses, which will not be shown and detailed descripted again.

17th Embodiment

Figure 32:
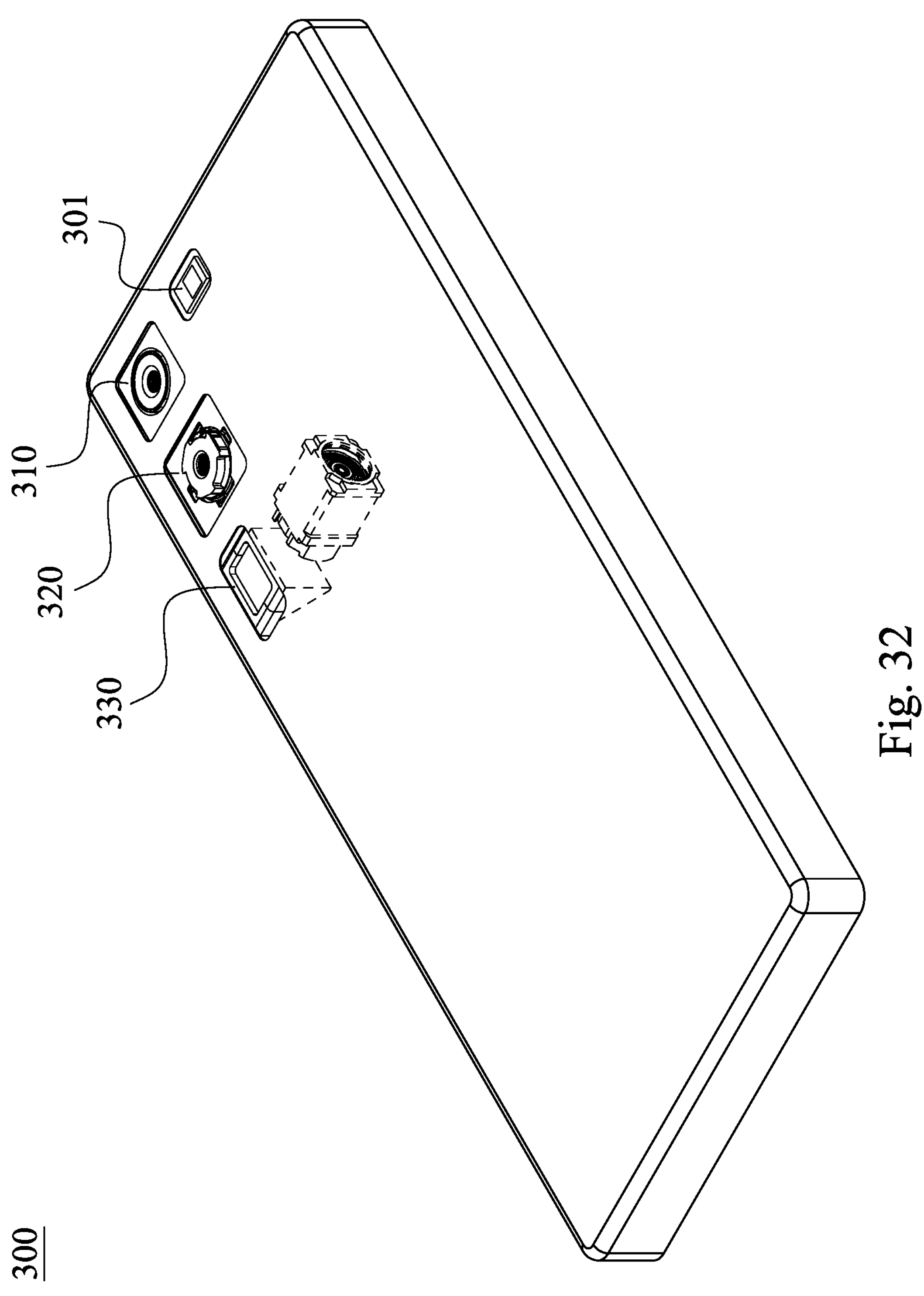
FIG. 32 is a schematic view of one side of an electronic device according to the 17th embodiment of the present disclosure.

FIG. 32 is a schematic view of one side of an electronic device 300 according to the 17th embodiment of the present disclosure. According to the 17th embodiment, the electronic device 300 is a smartphone, which include imaging apparatuses 310, 320, 330 and a flash module 301.

The electronic device 300 according to the 17th embodiment can include the same or similar elements to that according to the 16th embodiment, and each of the imaging apparatuses 310, 320, 330 according to the 16th embodiment can have a configuration which is the same or similar to that according to the 15th embodiment, and will not describe again herein. In detail, according to the 17th embodiment, each of the imaging apparatuses 310, 320, 330 can include the imaging system lens assembly of the present disclosure, and can be the same or similar to the imaging apparatus 100 according to the aforementioned 15th embodiment, and will not describe again herein. In detail, the imaging apparatus 310 can be ultra-wide angle imaging apparatus, the imaging apparatus 320 can be wide angle imaging apparatus, the imaging apparatus 330 can be telephoto imaging apparatus (which can include light path folding element), or can be adaptively adjusted according to the type of the imaging apparatuses, which will not be limited to the arrangement.

18th Embodiment

Figure 33:
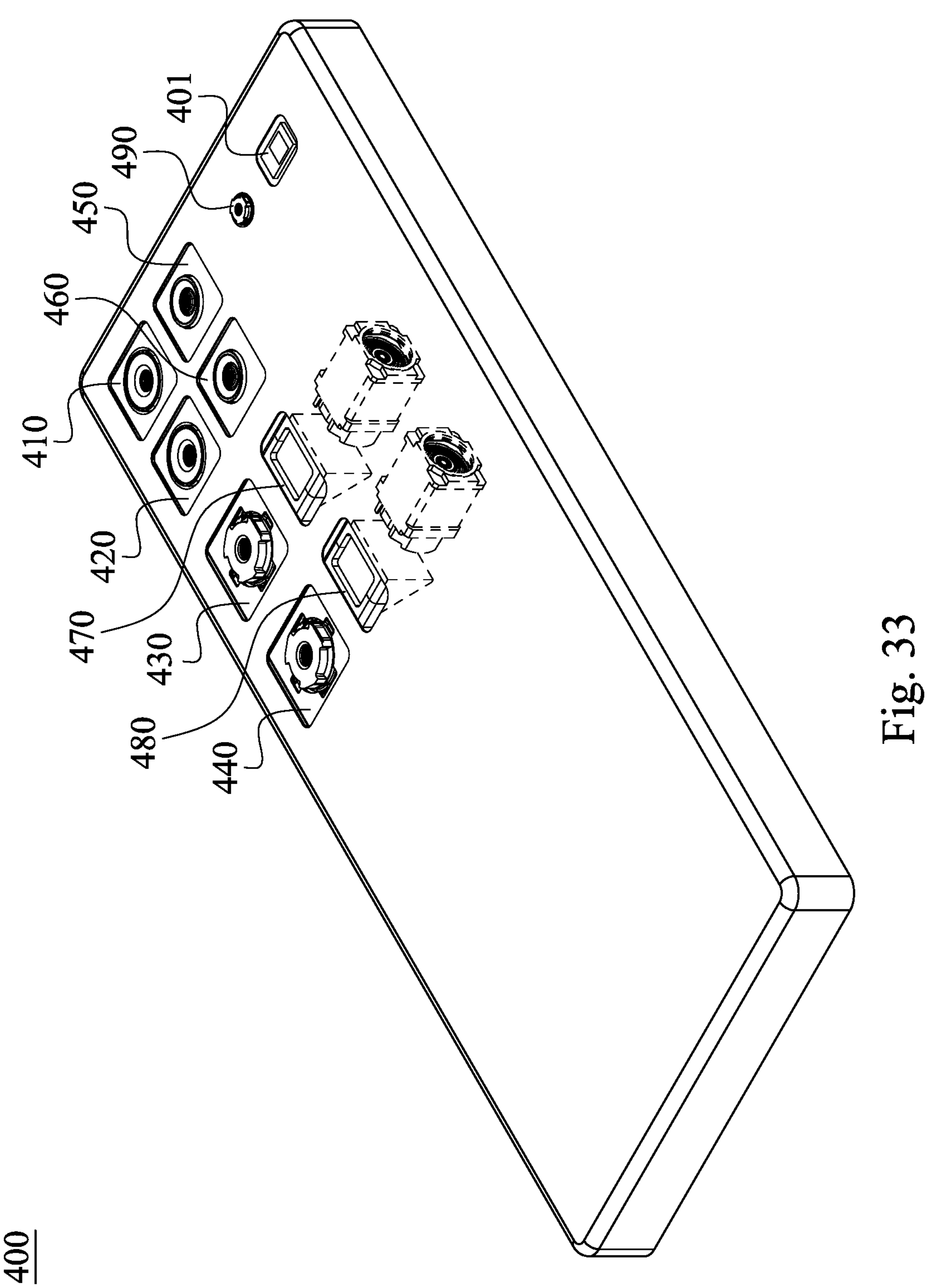
FIG. 33 is a schematic view of one side of an electronic device according to the 18th embodiment of the present disclosure.

FIG. 33 is a schematic view of one side of an electronic device 400 according to the 18th embodiment of the present disclosure. According to the 18th embodiment, the electronic device 400 is a smartphone, which include imaging apparatuses 410, 420, 430, 440, 450, 460, 470, 480, 490 and a flash module 401.

The electronic device 400 according to the 18th embodiment can include the same or similar elements to that according to the 16th embodiment, and each of the imaging apparatuses 410, 420, 430, 440, 450, 460, 470, 480, 490 and the flash module 401 can have a configuration which is the same or similar to that according to the 16th embodiment, and will not describe again herein. In detail, according to the 18th embodiment, each of the imaging apparatuses 410, 420, 430, 440, 450, 460, 470, 480, 490 can include the imaging system lens assembly of the present disclosure, and can be the same or similar to the imaging apparatus 100 according to the aforementioned 15th embodiment, and will not describe again herein.

In detail, each of the imaging apparatuses 410, 420 can be ultra-wide angle imaging apparatus, each of the imaging apparatuses 430, 440 can be wide angle imaging apparatus, each of the imaging apparatuses 450, 460 can be telephoto imaging apparatus, each of the imaging apparatuses 470, 480 can be telephoto imaging apparatus (which can include light path folding element), the imaging apparatus 490 can be TOF module, or can be adaptively adjusted according to the type of the imaging apparatuses, which will not be limited to the arrangement.

19th Embodiment

Figures 34A, 34B:
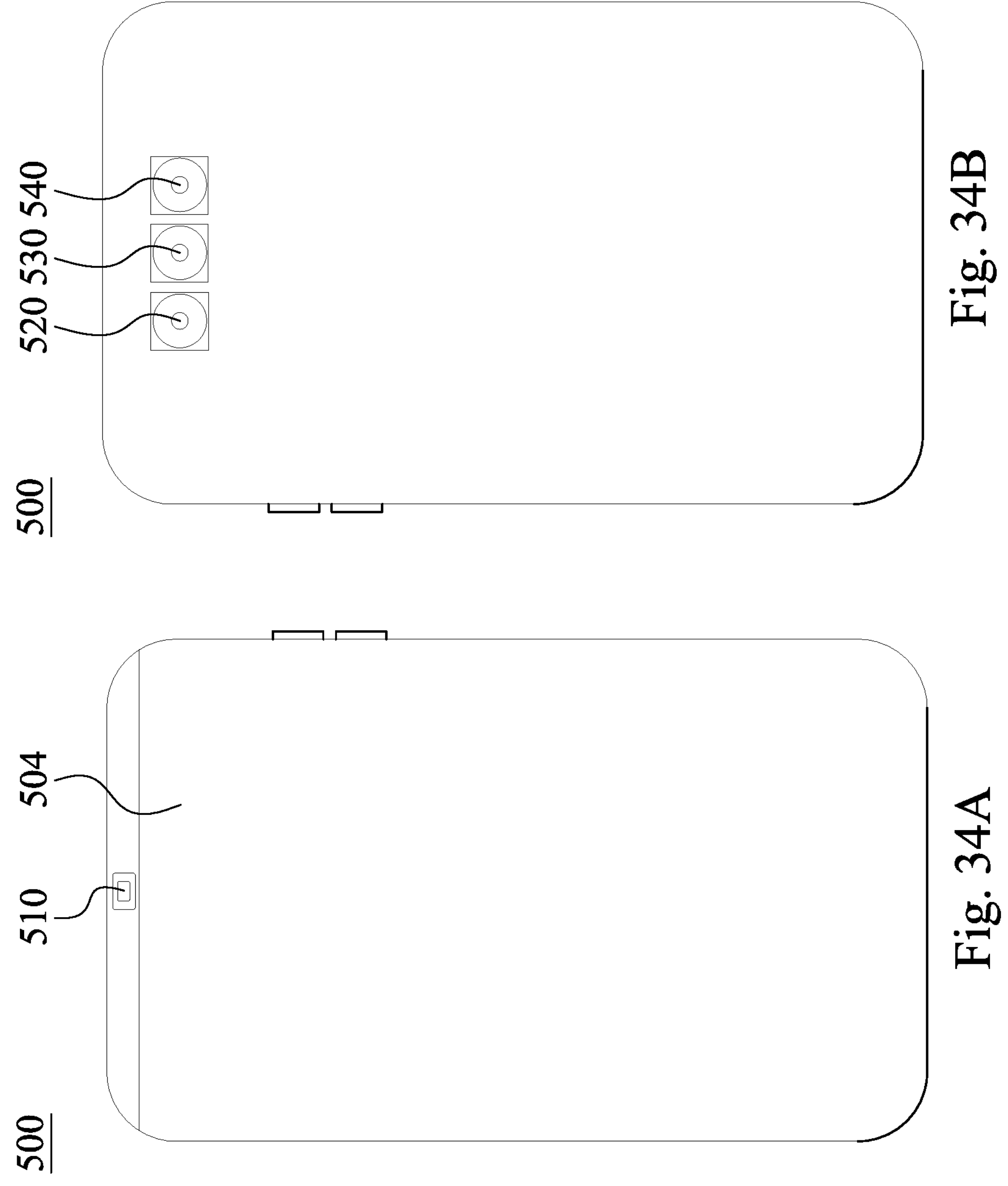
FIG. 34A is a schematic view of one side of an electronic device according to the 19th embodiment of the present disclosure.
FIG. 34B is a schematic view of another side of the electronic device of FIG. 34A.

FIG. 34A is a schematic view of one side of an electronic device 500 according to the 19th embodiment of the present disclosure. FIG. 34B is a schematic view of another side of the electronic device 500 of FIG. 34A. In FIGS. 34A and 34B, the electronic device 500 according to the 19th embodiment is a smartphone, which include imaging apparatuses 510, 520, 530, 540 and a user interface 504.

The electronic device 500 according to the 19th embodiment can include the same or similar elements to that according to the 16th embodiment, and each of the imaging apparatuses 510, 520, 530, 540 and the user interface 504 according to the 19th embodiment can have a configuration which is the same or similar to that according to the 16th embodiment, and will not describe again herein.

In detail, according to the 19th embodiment, the imaging apparatus 510 can be relative to a non-circular opening on the outside of the electronic device 500 for capturing the image. The imaging apparatus 520 can be telephoto imaging apparatus, the imaging apparatus 530 can be wide angle imaging apparatus, the imaging apparatus 540 can be ultra-wide angle imaging apparatus, or can be adaptively adjusted according to the type of the imaging apparatuses, which will not be limited to the arrangement.

The foregoing description, for purpose of explanation, has been described with reference to specific embodiments. It is to be noted that Tables show different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. An imaging system lens assembly comprising six lens elements, the six lens elements being, in order from an object side to an image side along an optical path:

a first lens element, a second lens element, a third lens element, a fourth lens element, a fifth lens element and a sixth lens element; each of the six lens elements has an object-side surface towards the object side and an image-side surface towards the image side;

wherein the third lens element has negative refractive power; at least one surface of at least one of the first lens element to the sixth lens element comprises at least one inflection point;

wherein an axial distance between the second lens element and the third lens element is T23, a focal length of the imaging system lens assembly is f, a focal length of the first lens element is f1, a focal length of the second lens element is f2, a composite focal length of the first lens element and the second lens element is f12, a curvature radius of the object-side surface of the sixth lens element is R11, a curvature radius of the image-side surface of the sixth lens element is R12, a maximum field of view of the imaging system lens assembly is FOV, a central thickness of the first lens element is CT1, a central thickness of the second lens element is CT2, an axial distance between the first lens element and the second lens element is T12, and the following conditions are satisfied:

$$0.45<T23/f<3.50;$$

$$-0.55<(R11-R12)/(R11+R12)<0.75;$$

$$30.0\ \text{degrees}<FOV<125.0\ \text{degrees};$$

$$-1.22<f2/f1;$$

$$0.16<f/f12<0.67;\ \text{and}$$

$$0.30<(CT1+T12+CT2)/f<0.85.$$

2. The imaging system lens assembly of claim 1, wherein the first lens element is meniscus in a paraxial region thereof; each of the object-side surface and the image-side surface of the fourth lens element comprises at least one convex surface in an off-axis region thereof.

3. The imaging system lens assembly of claim 1, wherein the second lens element has positive refractive power, the image-side surface of the second lens element is convex in a paraxial region thereof.

4. The imaging system lens assembly of claim 1, wherein a refractive index of the third lens element is N3, a refractive index of the sixth lens element is N6, and the following condition is satisfied:

$$1.60<(N3+N6)/2.$$

5. The imaging system lens assembly of claim 1, wherein an axial distance between the third lens element and the fourth lens element is T34, an axial distance between the fifth lens element and the sixth lens element is T56, a sum of all axial distances between adjacent lens elements of the imaging system lens assembly is ΣAT, and the following condition is satisfied:

$$0<(T34+T56)/\Sigma AT<0.09.$$

6. The imaging system lens assembly of claim 1, wherein the focal length of the imaging system lens assembly is f, a composite focal length of the third lens element, the fourth lens element, the fifth lens element and the sixth lens element is f3456, and the following condition is satisfied:

$$0.55<f/f3456<1.10.$$

7. The imaging system lens assembly of claim 1, wherein the fifth lens element and the sixth lens element have refractive power with different signs, the focal length of the imaging system lens assembly is f, a composite focal length of the fifth lens element and the sixth lens element is f56, and the following condition is satisfied:

$$0.75<f56/f<5.00.$$

8. The imaging system lens assembly of claim 1, wherein the focal length of the first lens element is f1, the focal length of the second lens element is f2, and the following condition is satisfied:

$$1.22<f2/f1<1.0.$$

9. The imaging system lens assembly of claim 1, wherein the axial distance between the second lens element and the third lens element is T23, a maximum image height of the imaging system lens assembly is ImgH, and the following condition is satisfied:

$$1.00<T23/\text{ImgH}<2.00.$$

10. The imaging system lens assembly of claim 1, wherein the first lens element and the second lens element belong a front lens group, the third lens element, the fourth lens element, the fifth lens element and the sixth lens element belong a rear lens group, the rear lens group is movable relative to the front lens group.

11. An imaging system lens assembly comprising six lens elements, the six lens elements being, in order from an object side to an image side along an optical path:

a first lens element, a second lens element, a third lens element, a fourth lens element, a fifth lens element and a sixth lens element; each of the six lens elements has an object-side surface towards the object side and an image-side surface towards the image side;

wherein the third lens element has negative refractive power; the image-side surface of the sixth lens element is concave in a paraxial region thereof;

wherein an axial distance between the second lens element and the third lens element is T23, a focal length of the imaging system lens assembly is f, a focal length of the fifth lens element is f5, a focal length of the sixth lens element is f6, a composite focal length of the third lens element, the fourth lens element, the fifth lens element and the sixth lens element is f3456, a curvature radius of the image-side surface of the third lens element is R6, a curvature radius of the object-side surface of the fourth lens element is R7, a curvature radius of the object-side surface of the sixth lens element is R11, a curvature radius of the image-side surface of the sixth lens element is R12, a maximum field of view of the imaging system lens assembly is FOV, an axial distance between the first lens element and the second lens element is T12, an axial distance between the third lens element and the fourth lens element is T34, an axial distance between the fourth lens element and the fifth lens element is T45, an axial distance between the fifth lens element and the sixth lens element is T56, a maximum among T12, T23, T34, T45, T56 is ATmax, and the following conditions are satisfied:

$$0.45<T23/f<3.50;$$

$$-0.80<(R11-R12)/(R11+R12)<1.20;$$

$$30.0\ \text{degrees}<FOV<125.0\ \text{degrees};$$

$$f5\times f6/(f\times f)<0.90;$$

$$0.55<f/f3456<1.10;$$

$$-0.75<(R6-R7)/(R6+R7)<1.50;\ \text{and}$$

$$0.85<AT\max/f<5.0.$$

12. The imaging system lens assembly of claim 11, wherein an Abbe number of the third lens element is V3, an Abbe number of the fourth lens element is V4, an Abbe number of the fifth lens element is V5, an Abbe number of the sixth lens element is V6, and the following condition is satisfied:

$$2.50<(V4+V5)/(V3+V6)<4.00.$$

13. The imaging system lens assembly of claim 11, wherein a focal length of the second lens element is f2, a composite focal length of the fifth lens element and the sixth lens element is f56, and the following condition is satisfied:

$$0.25<f2/f56<2.20.$$

14. The imaging system lens assembly of claim 11, wherein a focal length of the sixth lens element is f6, the curvature radius of the object-side surface of the sixth lens element is R11, the curvature radius of the image-side surface of the sixth lens element is R12, and the following condition is satisfied:

$$-12.00<f6/R11+f6/R12<-6.00.$$

15. The imaging system lens assembly of claim 11, wherein a composite focal length of the first lens element and the second lens element is f12, a curvature radius of the image-side surface of the second lens element is R4, and the following condition is satisfied:

$$-7.50<f12/R4<-1.00.$$

16. The imaging system lens assembly of claim 11, further comprising:

a reflective element disposed between the second lens element and the third lens element;

wherein a focal length of the second lens element is f2, a curvature radius of the image-side surface of the second lens element is R4, and the following condition is satisfied:

$$-3.50<f2/R4<-0.80.$$

17. The imaging system lens assembly of claim 11, wherein an axial distance between the object-side surface of the first lens element and an image surface is TL, an entrance pupil diameter of the imaging system lens assembly is EPD, a maximum image height of the imaging system lens assembly is ImgH, and the following conditions are satisfied:

$$6.00<TL/EPD<10.00; \text{ and}$$

$$3.00<TL/\mathrm{ImgH}<5.00.$$

18. The imaging system lens assembly of claim 11, wherein the focal length of the imaging system lens assembly is f, a central thickness of the first lens element is CT1, a central thickness of the second lens element is CT2, the axial distance between the first lens element and the second lens element is T12, and the following condition is satisfied:

$$0.30<(CT1+T12+CT2)/f<0.85.$$

19. An imaging system lens assembly comprising six lens elements, the six lens elements being, in order from an object side to an image side along an optical path:

a first lens element, a second lens element, a third lens element, a fourth lens element, a fifth lens element and a sixth lens element; each of the six lens elements has an object-side surface towards the object side and an image-side surface towards the image side;

wherein the second lens element has positive refractive power; the third lens element has negative refractive power; the image-side surface of the sixth lens element is concave in a paraxial region thereof;

wherein an axial distance between the second lens element and the third lens element is T23, a focal length of the imaging system lens assembly is f, a focal length of the fifth lens element is f5, a focal length of the sixth lens element is f6, a curvature radius of the image-side surface of the third lens element is R6, a curvature radius of the object-side surface of the fourth lens element is R7, a curvature radius of the object-side surface of the sixth lens element is R11, a curvature radius of the image-side surface of the sixth lens element is R12, a central thickness of the first lens element is CT1, a central thickness of the second lens element is CT2, and the following conditions are satisfied:

$$0.78<T23/f<3.30;$$

$$-0.35<(R11-R12)/(R11+R12)<1.20;$$

$$f5\times f6/(f\times f)<9.0;$$

$$-0.47<(R6-R7)/(R6+R7)<1.90;$$

$$R6/R7<1.25; \text{ and}$$

$$2.30<f/(CT1+CT2)<5.20.$$

20. The imaging system lens assembly of claim 19, wherein the image-side surface of the third lens element is concave in a paraxial region thereof; the object-side surface of the fourth lens element is convex in a paraxial region thereof; the object-side surface of the sixth lens element is convex in a paraxial region thereof.

21. The imaging system lens assembly of claim 19, wherein at least one surface of each of at least two of the first lens element to the sixth lens element comprises at least one inflection point; a maximum distance between an optical effective region of the object-side surface of the first lens element and an optical axis is Y11, a maximum distance between an optical effective region of the image-side surface of the sixth lens element and the optical axis is Y62, and the following condition is satisfied:

$$2.00<Y62/Y11<3.50.$$

22. The imaging system lens assembly of claim 19, wherein the curvature radius of the image-side surface of the third lens element is R6, the curvature radius of the object-side surface of the fourth lens element is R7, and the following condition is satisfied:

$$2.0<R6/R7<1.25.$$

23. The imaging system lens assembly of claim 19, wherein the focal length of the imaging system lens assembly is f, a composite focal length of the third lens element, the fourth lens element, the fifth lens element and the sixth lens element is f3456, and the following condition is satisfied:

$$0.55<f/f3456<0.95.$$

24. The imaging system lens assembly of claim 19, wherein the focal length of the imaging system lens assembly is f, an axial distance between the third lens element and the fourth lens element is T34, an axial distance between the fifth lens element and the sixth lens element is T56, and the following condition is satisfied:

$$0.01<(T34+T56)/f<0.15.$$

25. The imaging system lens assembly of claim 19, wherein a maximum distance between an optical effective region of the image-side surface of the second lens element and an optical axis is Y22, a maximum distance between an optical effective region of the image-side surface of the sixth lens element and the optical axis is Y62, and the following condition is satisfied:

$$2.00<Y62/Y22<3.50.$$

26. The imaging system lens assembly of claim 19, wherein the first lens element and the second lens element belong a front lens group, the third lens element, the fourth lens element, the fifth lens element and the sixth lens element belong a rear lens group, the rear lens group is movable relative to the front lens group.

27. An imaging apparatus, comprising:

the imaging system lens assembly of claim 19; and an image sensor disposed on an image surface of the imaging system lens assembly.

28. An electronic device, comprising:

the imaging apparatus of claim 27.

* * * * *